(12) United States Patent
Carrigan et al.

(10) Patent No.: US 12,504,944 B2
(45) Date of Patent: Dec. 23, 2025

(54) METHODS AND USER INTERFACES FOR SHARING AUDIO

(71) Applicant: Apple Inc., Cupertino, CA (US)

(72) Inventors: Taylor G. Carrigan, San Francisco, CA (US); David C. Graham, Columbus, OH (US); Patrick L. Coffman, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/228,597

(22) Filed: Jul. 31, 2023

(65) Prior Publication Data

US 2023/0376268 A1    Nov. 23, 2023

Related U.S. Application Data

(63) Continuation of application No. 17/509,356, filed on Oct. 25, 2021, now Pat. No. 11,714,597, which is a
(Continued)

(51) Int. Cl.
  *G06F 3/0484*    (2022.01)
  *G06F 3/0481*    (2022.01)
  (Continued)

(52) U.S. Cl.
  CPC ............ *G06F 3/165* (2013.01); *G06F 3/0481* (2013.01); *G06F 3/0484* (2013.01);
  (Continued)

(58) Field of Classification Search
  CPC .. G06F 3/0481; G06F 3/0484; G06F 3/04842; G06F 3/04847; G06F 3/165; G06F 3/167; H04L 65/61
  See application file for complete search history.

(56) References Cited

U.S. PATENT DOCUMENTS 4,803,487 A   2/1989   Willard et al.
5,202,961 A   4/1993   Mills et al.
(Continued)

FOREIGN PATENT DOCUMENTS

AU    2007100826 A4    9/2007
AU    2008100011 A4    2/2008
(Continued)

OTHER PUBLICATIONS

3C Blogger Kisplay Share, Samsung Galaxy Tab S Hands-on SideSync 3.0 Is Amazing, http://www.samsung.com/tw/article/galaxy-tab-s-blogger-kisplay., Jul. 4, 2014, 4 pages.
(Continued)

*Primary Examiner* — Tamara T Kyle
*Assistant Examiner* — William Wong
(74) *Attorney, Agent, or Firm* — YHE Law LLP

(57) ABSTRACT

The present disclosure relates generally to sharing audio, including while the electronic device is connected to a first external device via a communication link, wherein the electronic device is configured to provide audio data to the first external device via the communication link, detecting an indication that a physical proximity between the electronic device and a second external device, different from the first external device, satisfies a proximity condition; in response to detecting the indication that the physical proximity between the electronic device and the second external device satisfies the proximity condition, displaying, via the display device, a first user interface including a first affordance; detecting an input corresponding to selection of the first affordance; and in response to detecting the input corresponding to selection of the first affordance, initiating a process to provide audio data concurrently with the first external device and the second external device.

36 Claims, 43 Drawing Sheets

Related U.S. Application Data continuation of application No. 16/583,994, filed on Sep. 26, 2019, now Pat. No. 11,157,234.

(60) Provisional application No. 62/855,897, filed on May 31, 2019.

(51) Int. Cl.
*G06F 3/04842* (2022.01)
*G06F 3/04847* (2022.01)
*G06F 3/16* (2006.01)
*H04L 65/61* (2022.01)

(52) U.S. Cl.
CPC ...... *G06F 3/04842* (2013.01); *G06F 3/04847* (2013.01); *G06F 3/167* (2013.01); *H04L 65/61* (2022.05)

(56) References Cited

U.S. PATENT DOCUMENTS

| | | |
|---|---|---|
| 5,617,031 A | 4/1997 | Tuttle |
| 5,793,366 A | 8/1998 | Mano et al. |
| 5,825,353 A | 10/1998 | Will |
| 5,853,327 A | 12/1998 | Gilboa |
| 6,008,807 A | 12/1999 | Bretschneider et al. |
| 6,016,248 A | 1/2000 | Anzai et al. |
| 6,094,197 A | 7/2000 | Buxton et al. |
| 6,167,353 A | 12/2000 | Piernot et al. |
| 6,190,174 B1 | 2/2001 | Lam et al. |
| 6,232,972 B1 | 5/2001 | Arcuri et al. |
| 6,359,837 B1 | 3/2002 | Tsukamoto |
| 6,429,896 B1 | 8/2002 | Aruga et al. |
| 6,504,934 B1 | 1/2003 | Kasai et al. |
| 6,522,347 B1 | 2/2003 | Sakai et al. |
| 6,650,894 B1 | 11/2003 | Berstis et al. |
| 6,674,452 B1 | 1/2004 | Kraft et al. |
| 6,809,724 B1 | 10/2004 | Shiraishi et al. |
| 6,809,759 B1 | 10/2004 | Chiang |
| 6,819,867 B2 | 11/2004 | Mayer et al. |
| 6,833,848 B1 | 12/2004 | Wolff et al. |
| 6,857,105 B1 | 2/2005 | Fox et al. |
| 6,889,138 B1 | 5/2005 | Krull et al. |
| 7,463,304 B2 | 12/2008 | Murray |
| 7,537,162 B1 | 5/2009 | Siu |
| 7,571,014 B1 | 8/2009 | Lambourne et al. |
| 7,593,749 B2 | 9/2009 | Vallström et al. |
| 7,653,883 B2 | 1/2010 | Hotelling et al. |
| 7,656,393 B2 | 2/2010 | King et al. |
| 7,831,054 B2 | 11/2010 | Ball et al. |
| 7,843,471 B2 | 11/2010 | Doan et al. |
| 7,905,815 B2 | 3/2011 | Ellis et al. |
| 8,028,323 B2 | 9/2011 | Weel |
| 8,116,807 B2 | 2/2012 | Matas |
| 8,189,087 B2 | 5/2012 | Misawa et al. |
| 8,196,043 B2 | 6/2012 | Crow et al. |
| 8,280,539 B2 | 10/2012 | Jehan et al. |
| 8,290,603 B1 | 10/2012 | Lambourne |
| 8,458,780 B1 | 6/2013 | Takkallapally et al. |
| 8,462,961 B1 | 6/2013 | Bywaters et al. |
| 8,624,836 B1 | 1/2014 | Miller et al. |
| 8,675,084 B2 | 3/2014 | Bolton et al. |
| 8,742,890 B2 | 6/2014 | Gocho et al. |
| 8,762,895 B2 | 6/2014 | Mehta et al. |
| 8,811,951 B1 | 8/2014 | Faaborg et al. |
| 8,830,181 B1 | 9/2014 | Clark et al. |
| 8,894,462 B2 | 11/2014 | Huang et al. |
| 8,914,752 B1 | 12/2014 | Spiegel |
| 8,924,894 B1 | 12/2014 | Yaksick et al. |
| 8,983,539 B1 | 3/2015 | Kim et al. |
| 9,042,556 B2 | 5/2015 | Kallai et al. |
| 9,071,945 B1 | 6/2015 | Rubin et al. |
| 9,080,736 B1 | 7/2015 | Salzinger et al. |
| 9,084,003 B1 | 7/2015 | Sanio et al. |
| 9,100,944 B2 | 8/2015 | Sauhta et al. |
| 9,112,849 B1 | 8/2015 | Werkelin Ahlin et al. |
| 9,134,902 B2 | 9/2015 | Kang et al. |
| 9,146,124 B2 | 9/2015 | Parada et al. |
| 9,171,268 B1 | 10/2015 | Penilla et al. |
| 9,172,866 B2 | 10/2015 | Ito et al. |
| 9,185,062 B1 | 11/2015 | Yang et al. |
| 9,191,988 B2 | 11/2015 | Newham |
| 9,202,509 B2 | 12/2015 | Kallai et al. |
| 9,223,296 B2 | 12/2015 | Yang et al. |
| 9,247,363 B2 | 1/2016 | Triplett et al. |
| 9,251,787 B1 | 2/2016 | Hart et al. |
| 9,294,853 B1 | 3/2016 | Dhaundiyal |
| 9,319,782 B1 | 4/2016 | Crump et al. |
| 9,329,831 B1 | 5/2016 | Fullerton et al. |
| 9,369,537 B1 | 6/2016 | Mathew et al. |
| 9,374,607 B2 | 6/2016 | Bates et al. |
| 9,400,489 B2 | 7/2016 | Kim et al. |
| D765,118 S | 8/2016 | Bachman et al. |
| 9,405,766 B2 | 8/2016 | Robbin et al. |
| 9,423,868 B2 | 8/2016 | Iwasaki |
| 9,431,021 B1 | 8/2016 | Scalise et al. |
| 9,450,812 B2 | 9/2016 | Lee et al. |
| 9,451,144 B2 | 9/2016 | Dye |
| 9,462,340 B1 | 10/2016 | Mathurin |
| 9,477,208 B2 | 10/2016 | Park et al. |
| 9,495,575 B2 | 11/2016 | Kim et al. |
| D773,510 S | 12/2016 | Foss et al. |
| 9,519,413 B2 | 12/2016 | Bates |
| 9,544,563 B1 | 1/2017 | Cheng et al. |
| 9,547,419 B2 | 1/2017 | Yang et al. |
| 9,560,629 B2 | 1/2017 | Migicovsky et al. |
| 9,574,896 B2 | 2/2017 | Mcgavran et al. |
| 9,588,661 B1 | 3/2017 | Jauhal et al. |
| 9,594,354 B1 | 3/2017 | Kahn et al. |
| 9,628,414 B1 | 4/2017 | Umapathy et al. |
| 9,628,950 B1 | 4/2017 | Noeth et al. |
| 9,652,741 B2 | 5/2017 | Goldberg et al. |
| D789,381 S | 6/2017 | Okumura et al. |
| 9,703,369 B1 | 7/2017 | Mullen |
| 9,704,386 B2 | 7/2017 | Yoon et al. |
| 9,710,639 B1 | 7/2017 | Saini |
| 9,727,749 B2 | 8/2017 | Tzeng et al. |
| 9,753,543 B2 | 9/2017 | Jeon et al. |
| 9,794,720 B1 | 10/2017 | Kadri |
| 9,820,323 B1 | 11/2017 | Young et al. |
| 9,832,697 B2 | 11/2017 | Kotecha et al. |
| 9,892,715 B2 | 2/2018 | Komulainen et al. |
| 9,898,250 B1 | 2/2018 | Williams et al. |
| 9,927,957 B1 | 3/2018 | Sagar et al. |
| 9,942,463 B2 | 4/2018 | Kuo et al. |
| 9,954,989 B2 | 4/2018 | Zhou |
| 9,973,674 B2 | 5/2018 | Dye et al. |
| 10,019,599 B1 | 7/2018 | Moran et al. |
| 10,104,089 B2 | 10/2018 | Kim et al. |
| 10,129,044 B2 | 11/2018 | Kangshang et al. |
| 10,135,905 B2 | 11/2018 | Chaudhri et al. |
| 10,157,040 B2 | 12/2018 | Ballinger et al. |
| 10,182,138 B2 | 1/2019 | Motika et al. |
| 10,198,563 B2 | 2/2019 | Wang et al. |
| 10,200,468 B2 | 2/2019 | Leban et al. |
| 10,216,392 B2 | 2/2019 | Zhao |
| 10,284,980 B1 | 5/2019 | Woo et al. |
| 10,299,300 B1 | 5/2019 | Young |
| 10,300,394 B1 | 5/2019 | Evans et al. |
| 10,303,422 B1 | 5/2019 | Woo et al. |
| 10,310,697 B2 | 6/2019 | Roberts et al. |
| 10,324,590 B2 | 6/2019 | Yang et al. |
| 10,339,769 B2 | 7/2019 | Mixter et al. |
| 10,356,070 B2 | 7/2019 | Cha et al. |
| 10,374,804 B2 | 8/2019 | Lee et al. |
| 10,466,881 B2 | 11/2019 | Sasaki et al. |
| 10,523,625 B1 | 12/2019 | Allen et al. |
| 10,524,300 B2 | 12/2019 | Ueda et al. |
| 10,585,472 B2 | 3/2020 | Tokubo et al. |
| 10,627,914 B2 | 4/2020 | Ang et al. |
| 10,643,246 B1 | 5/2020 | Suprasadachandran Pillai |
| 10,671,174 B2 | 6/2020 | Ang et al. |
| 10,684,693 B2 | 6/2020 | Kletsov et al. |
| 10,691,332 B2 | 6/2020 | Offenberg et al. |

(56) References Cited

U.S. PATENT DOCUMENTS

| | | | |
|---|---|---|---|
| 10,713,699 B1 | 7/2020 | Lien et al. |
| 10,721,711 B2 | 7/2020 | Kirov et al. |
| 10,732,819 B2 | 8/2020 | Wang et al. |
| 10,742,645 B2 | 8/2020 | Hevizi et al. |
| 10,742,648 B2 | 8/2020 | Magyar et al. |
| 10,783,883 B2 | 9/2020 | Mixter et al. |
| 10,802,598 B2 | 10/2020 | Ang et al. |
| 10,824,299 B2 | 11/2020 | Bai |
| 10,833,887 B2 | 11/2020 | Wu |
| 10,924,446 B1 | 2/2021 | Paul |
| 10,929,099 B2 | 2/2021 | Querze et al. |
| 10,963,145 B1 | 3/2021 | Voss et al. |
| 10,966,149 B2 | 3/2021 | Yoon et al. |
| 11,024,303 B1 | 6/2021 | Devaraj et al. |
| 11,048,334 B2 | 6/2021 | Rothberg et al. |
| 11,050,873 B2 | 6/2021 | Kim et al. |
| 11,079,913 B1 | 8/2021 | Kim et al. |
| 11,099,647 B2 | 8/2021 | Ang et al. |
| 11,157,143 B2 | 10/2021 | Yang et al. |
| 11,164,580 B2 | 11/2021 | Kraker |
| 11,176,940 B1 | 11/2021 | Zhong et al. |
| 11,283,916 B2 | 3/2022 | Coffman et al. |
| 11,316,709 B2 | 4/2022 | Brown et al. |
| 11,343,370 B1 | 5/2022 | Gordon et al. |
| 11,343,613 B2 | 5/2022 | Gordon et al. |
| 11,431,834 B1 | 8/2022 | Gordon et al. |
| 11,463,576 B1 | 10/2022 | Gordon et al. |
| 11,523,166 B1 | 12/2022 | Tu et al. |
| 11,543,887 B2 | 1/2023 | Ang et al. |
| 11,589,184 B1 | 2/2023 | Mont-Reynaud |
| 11,868,531 B1 | 1/2024 | Tasci |
| 12,014,118 B2 | 6/2024 | Gruber et al. |
| 12,085,421 B2 | 9/2024 | Yedid et al. |
| 12,170,883 B2 | 12/2024 | Marculescu et al. |
| 2001/0030597 A1 | 10/2001 | Inoue et al. |
| 2001/0031622 A1 | 10/2001 | Kivela et al. |
| 2002/0002039 A1 | 1/2002 | Qureshey et al. |
| 2002/0057262 A1 | 5/2002 | Patrick et al. |
| 2002/0068600 A1 | 6/2002 | Chihara et al. |
| 2002/0115478 A1 | 8/2002 | Fujisawa et al. |
| 2002/0140803 A1 | 10/2002 | Gutta et al. |
| 2002/0142734 A1 | 10/2002 | Wickstead |
| 2002/0168938 A1 | 11/2002 | Chang |
| 2002/0171737 A1 | 11/2002 | Tullis et al. |
| 2003/0025802 A1 | 2/2003 | Mayer, Jr. et al. |
| 2003/0028382 A1 | 2/2003 | Chambers et al. |
| 2003/0081506 A1 | 5/2003 | Karhu et al. |
| 2003/0112938 A1 | 6/2003 | Kanakubo et al. |
| 2003/0128237 A1 | 7/2003 | Sakai |
| 2003/0151982 A1 | 8/2003 | Brewer et al. |
| 2003/0158927 A1 | 8/2003 | Sagey et al. |
| 2003/0171984 A1 | 9/2003 | Wodka et al. |
| 2004/0032955 A1 | 2/2004 | Hashimoto et al. |
| 2004/0044953 A1 | 3/2004 | Watkins et al. |
| 2004/0100389 A1 | 5/2004 | Naito et al. |
| 2004/0261010 A1 | 12/2004 | Matsuishi |
| 2004/0264916 A1 | 12/2004 | Van et al. |
| 2005/0052458 A1 | 3/2005 | Lambert |
| 2005/0117601 A1 | 6/2005 | Anderson et al. |
| 2005/0134695 A1 | 6/2005 | Deshpande et al. |
| 2005/0144247 A1 | 6/2005 | Christensen et al. |
| 2005/0198319 A1 | 9/2005 | Chan et al. |
| 2005/0233780 A1 | 10/2005 | Jani et al. |
| 2005/0237194 A1 | 10/2005 | Voba et al. |
| 2005/0246642 A1 | 11/2005 | Valderas et al. |
| 2006/0002523 A1 | 1/2006 | Bettis et al. |
| 2006/0019649 A1 | 1/2006 | Feinleib et al. |
| 2006/0079973 A1 | 4/2006 | Bacharach et al. |
| 2006/0135064 A1 | 6/2006 | Cho et al. |
| 2006/0161621 A1 | 7/2006 | Rosenberg |
| 2006/0161870 A1 | 7/2006 | Hotelling et al. |
| 2006/0161871 A1 | 7/2006 | Hotelling et al. |
| 2006/0210092 A1 | 9/2006 | Navid |
| 2006/0217104 A1 | 9/2006 | Cho |
| 2006/0258289 A1 | 11/2006 | Dua |
| 2007/0021153 A1 | 1/2007 | Novak |
| 2007/0025711 A1 | 2/2007 | Marcus et al. |
| 2007/0027682 A1 | 2/2007 | Bennett |
| 2007/0040810 A1 | 2/2007 | Dowe et al. |
| 2007/0096283 A1 | 5/2007 | Ljung et al. |
| 2007/0109417 A1 | 5/2007 | Hyttfors et al. |
| 2007/0113294 A1 | 5/2007 | Field et al. |
| 2007/0143495 A1 | 6/2007 | Porat |
| 2007/0150842 A1 | 6/2007 | Chaudhri et al. |
| 2007/0157097 A1 | 7/2007 | Peters et al. |
| 2007/0165103 A1 | 7/2007 | Arima et al. |
| 2007/0180392 A1 | 8/2007 | Russo |
| 2007/0191008 A1 | 8/2007 | Bucher et al. |
| 2007/0254640 A1 | 11/2007 | Bliss |
| 2007/0259654 A1 | 11/2007 | Oijer |
| 2008/0004113 A1 | 1/2008 | Avery et al. |
| 2008/0036743 A1 | 2/2008 | Westerman et al. |
| 2008/0052643 A1 | 2/2008 | Ike et al. |
| 2008/0055263 A1 | 3/2008 | Lemay et al. |
| 2008/0057926 A1 | 3/2008 | Forstall et al. |
| 2008/0077673 A1 | 3/2008 | Thomas et al. |
| 2008/0081558 A1 | 4/2008 | Dunko et al. |
| 2008/0084400 A1 | 4/2008 | Rosenberg |
| 2008/0091717 A1 | 4/2008 | Garbow et al. |
| 2008/0100693 A1 | 5/2008 | Jobs et al. |
| 2008/0120029 A1 | 5/2008 | Zelek et al. |
| 2008/0122794 A1 | 5/2008 | Koiso et al. |
| 2008/0122796 A1 | 5/2008 | Jobs et al. |
| 2008/0126935 A1 | 5/2008 | Blomgren |
| 2008/0155474 A1 | 6/2008 | Duhig et al. |
| 2008/0163127 A1 | 7/2008 | Newell et al. |
| 2008/0165136 A1 | 7/2008 | Christie et al. |
| 2008/0168185 A1 | 7/2008 | Robbin et al. |
| 2008/0214191 A1 | 9/2008 | Yach et al. |
| 2008/0219151 A1* | 9/2008 | Ma .................. H04L 67/1068 370/221 |
| 2008/0250319 A1 | 10/2008 | Lee et al. |
| 2008/0259829 A1 | 10/2008 | Rosenblatt |
| 2008/0273712 A1 | 11/2008 | Eichfeld et al. |
| 2008/0273713 A1 | 11/2008 | Hartung et al. |
| 2008/0284855 A1 | 11/2008 | Umeyama et al. |
| 2008/0285772 A1 | 11/2008 | Haulick et al. |
| 2009/0002335 A1 | 1/2009 | Chaudhri |
| 2009/0007188 A1 | 1/2009 | Omernick |
| 2009/0051649 A1 | 2/2009 | Rondel |
| 2009/0055377 A1 | 2/2009 | Hedge et al. |
| 2009/0060170 A1 | 3/2009 | Coughlan et al. |
| 2009/0061837 A1 | 3/2009 | Chaudhri et al. |
| 2009/0066648 A1 | 3/2009 | Kerr et al. |
| 2009/0068984 A1 | 3/2009 | Burnett |
| 2009/0088207 A1 | 4/2009 | Sweeney et al. |
| 2009/0102933 A1 | 4/2009 | Harris et al. |
| 2009/0125571 A1 | 5/2009 | Kiilerich et al. |
| 2009/0143114 A1 | 6/2009 | Vargas et al. |
| 2009/0144391 A1 | 6/2009 | Jung et al. |
| 2009/0195402 A1 | 8/2009 | Izadi et al. |
| 2009/0195497 A1 | 8/2009 | Fitzgerald et al. |
| 2009/0199130 A1 | 8/2009 | Tsern et al. |
| 2009/0203315 A1 | 8/2009 | Kawabata et al. |
| 2009/0207743 A1 | 8/2009 | Huq et al. |
| 2009/0222748 A1 | 9/2009 | Lejeune et al. |
| 2009/0225060 A1 | 9/2009 | Rizoiu et al. |
| 2009/0228868 A1 | 9/2009 | Forstall et al. |
| 2009/0231960 A1 | 9/2009 | Hutcheson |
| 2009/0239587 A1 | 9/2009 | Negron et al. |
| 2009/0284476 A1 | 11/2009 | Bull et al. |
| 2009/0304205 A1 | 12/2009 | Hardacker et al. |
| 2009/0311993 A1 | 12/2009 | Horodezky |
| 2009/0315671 A1 | 12/2009 | Gocho et al. |
| 2009/0325630 A1 | 12/2009 | Tiitola et al. |
| 2010/0004031 A1 | 1/2010 | Kim |
| 2010/0017474 A1 | 1/2010 | Kandekar et al. |
| 2010/0026640 A1 | 2/2010 | Kim et al. |
| 2010/0050086 A1 | 2/2010 | Sherrard et al. |
| 2010/0054497 A1 | 3/2010 | Bull et al. |
| 2010/0058253 A1 | 3/2010 | Son |
| 2010/0070490 A1 | 3/2010 | Amidon et al. |
| 2010/0106647 A1 | 4/2010 | Raman |
| 2010/0121636 A1 | 5/2010 | Burke et al. |

(56) References Cited

U.S. PATENT DOCUMENTS

| | | |
|---|---|---|
| 2010/0125785 A1 | 5/2010 | Moore et al. |
| 2010/0138764 A1 | 6/2010 | Hatambeiki et al. |
| 2010/0146463 A1 | 6/2010 | Cho et al. |
| 2010/0149090 A1 | 6/2010 | Morris et al. |
| 2010/0162160 A1 | 6/2010 | Stallings et al. |
| 2010/0169790 A1 | 7/2010 | Vaughan et al. |
| 2010/0178873 A1 | 7/2010 | Lee et al. |
| 2010/0205563 A1 | 8/2010 | Haapsaari et al. |
| 2010/0228836 A1 | 9/2010 | Lehtovirta et al. |
| 2010/0235729 A1 | 9/2010 | Kocienda et al. |
| 2010/0251304 A1 | 9/2010 | Donoghue et al. |
| 2010/0259482 A1 | 10/2010 | Ball |
| 2010/0284389 A1 | 11/2010 | Ramsay et al. |
| 2010/0287513 A1 | 11/2010 | Singh et al. |
| 2010/0289740 A1 | 11/2010 | Kim et al. |
| 2010/0289910 A1 | 11/2010 | Kamshilin et al. |
| 2010/0293598 A1 | 11/2010 | Collart et al. |
| 2010/0296678 A1 | 11/2010 | Kuhn-Rahloff et al. |
| 2010/0299639 A1 | 11/2010 | Ramsay et al. |
| 2010/0304729 A1 | 12/2010 | Sabotta et al. |
| 2010/0318908 A1 | 12/2010 | Neuman et al. |
| 2010/0318928 A1 | 12/2010 | Neuman et al. |
| 2010/0318939 A1 | 12/2010 | Moon |
| 2010/0321201 A1 | 12/2010 | Huang et al. |
| 2011/0003587 A1 | 1/2011 | Belz et al. |
| 2011/0016425 A1 | 1/2011 | Homburg et al. |
| 2011/0029750 A1 | 2/2011 | Jang et al. |
| 2011/0037712 A1 | 2/2011 | Kim et al. |
| 2011/0058052 A1 | 3/2011 | Bolton et al. |
| 2011/0059769 A1 | 3/2011 | Brunolli |
| 2011/0081860 A1 | 4/2011 | Brown et al. |
| 2011/0106921 A1 | 5/2011 | Brown et al. |
| 2011/0111735 A1 | 5/2011 | Pietrow |
| 2011/0115932 A1 | 5/2011 | Shin et al. |
| 2011/0126148 A1 | 5/2011 | Krishnaraj et al. |
| 2011/0130168 A1 | 6/2011 | Vendrow et al. |
| 2011/0138284 A1 | 6/2011 | Wigdor et al. |
| 2011/0153628 A1 | 6/2011 | Basu et al. |
| 2011/0157046 A1 | 6/2011 | Lee et al. |
| 2011/0159469 A1 | 6/2011 | Hwang et al. |
| 2011/0159927 A1 | 6/2011 | Choi |
| 2011/0181520 A1 | 7/2011 | Boda et al. |
| 2011/0183613 A1 | 7/2011 | Nocera |
| 2011/0183650 A1 | 7/2011 | Mckee |
| 2011/0225492 A1 | 9/2011 | Boettcher et al. |
| 2011/0237221 A1 | 9/2011 | Prakash et al. |
| 2011/0242002 A1 | 10/2011 | Kaplan et al. |
| 2011/0246942 A1 | 10/2011 | Misawa |
| 2011/0252318 A1 | 10/2011 | Helms |
| 2011/0283334 A1 | 11/2011 | Choi et al. |
| 2011/0291971 A1 | 12/2011 | Masaki et al. |
| 2011/0306393 A1 | 12/2011 | Goldman et al. |
| 2011/0316884 A1 | 12/2011 | Giambalvo et al. |
| 2012/0004920 A1 | 1/2012 | Kelly et al. |
| 2012/0019400 A1 | 1/2012 | Patel et al. |
| 2012/0019610 A1 | 1/2012 | Hornyak et al. |
| 2012/0044062 A1 | 2/2012 | Jersa et al. |
| 2012/0050185 A1 | 3/2012 | Davydov et al. |
| 2012/0051560 A1 | 3/2012 | Sanders |
| 2012/0054278 A1 | 3/2012 | Taleb et al. |
| 2012/0069206 A1 | 3/2012 | Hsieh |
| 2012/0071146 A1 | 3/2012 | Shrivastava et al. |
| 2012/0089300 A1 | 4/2012 | Wolterman et al. |
| 2012/0110455 A1 | 5/2012 | Sharma et al. |
| 2012/0115608 A1 | 5/2012 | Pfeifer et al. |
| 2012/0120277 A1 | 5/2012 | Tsai et al. |
| 2012/0178431 A1 | 7/2012 | Gold |
| 2012/0192094 A1 | 7/2012 | Goertz et al. |
| 2012/0197419 A1 | 8/2012 | Dhruv et al. |
| 2012/0198531 A1 | 8/2012 | Ort et al. |
| 2012/0210226 A1 | 8/2012 | Mccoy et al. |
| 2012/0218177 A1 | 8/2012 | Pang et al. |
| 2012/0222092 A1 | 8/2012 | Rabii |
| 2012/0223959 A1 | 9/2012 | Lengeling et al. |
| 2012/0236037 A1 | 9/2012 | Lessing et al. |
| 2012/0260169 A1 | 10/2012 | Schwartz et al. |
| 2012/0266093 A1 | 10/2012 | Park et al. |
| 2012/0272230 A1 | 10/2012 | Lee |
| 2012/0287290 A1 | 11/2012 | Jain et al. |
| 2012/0290653 A1 | 11/2012 | Sharkey |
| 2012/0294118 A1 | 11/2012 | Haulick et al. |
| 2012/0311444 A1 | 12/2012 | Chaudhri |
| 2012/0316777 A1 | 12/2012 | Kitta et al. |
| 2012/0320141 A1 | 12/2012 | Bowen et al. |
| 2012/0322508 A1 | 12/2012 | Forstall et al. |
| 2013/0007617 A1 | 1/2013 | Mackenzie et al. |
| 2013/0016048 A1 | 1/2013 | So et al. |
| 2013/0016818 A1 | 1/2013 | Cohn |
| 2013/0017846 A1 | 1/2013 | Schoppe |
| 2013/0022221 A1 | 1/2013 | Kallai et al. |
| 2013/0026293 A1 | 1/2013 | Schneider et al. |
| 2013/0027289 A1 | 1/2013 | Choi et al. |
| 2013/0027341 A1 | 1/2013 | Mastandrea |
| 2013/0038771 A1 | 2/2013 | Brunner et al. |
| 2013/0047084 A1 | 2/2013 | Sanders et al. |
| 2013/0051755 A1 | 2/2013 | Brown et al. |
| 2013/0053107 A1 | 2/2013 | Kang et al. |
| 2013/0055150 A1 | 2/2013 | Galor |
| 2013/0057472 A1 | 3/2013 | Dizac et al. |
| 2013/0063364 A1 | 3/2013 | Moore |
| 2013/0065482 A1 | 3/2013 | Trickett et al. |
| 2013/0073584 A1 | 3/2013 | Kuper et al. |
| 2013/0076591 A1 | 3/2013 | Sirpal et al. |
| 2013/0080516 A1 | 3/2013 | Bologh |
| 2013/0080955 A1 | 3/2013 | Reimann et al. |
| 2013/0085931 A1 | 4/2013 | Runyan |
| 2013/0093904 A1 | 4/2013 | Wagner et al. |
| 2013/0094666 A1 | 4/2013 | Haaff et al. |
| 2013/0094770 A1 | 4/2013 | Lee et al. |
| 2013/0106603 A1 | 5/2013 | Weast et al. |
| 2013/0111550 A1 | 5/2013 | Naveh et al. |
| 2013/0117693 A1 | 5/2013 | Anderson et al. |
| 2013/0120106 A1 | 5/2013 | Cauwels et al. |
| 2013/0124207 A1 | 5/2013 | Sarin et al. |
| 2013/0125016 A1 | 5/2013 | Pallakoff et al. |
| 2013/0132865 A1 | 5/2013 | Li |
| 2013/0134212 A1 | 5/2013 | Chang et al. |
| 2013/0138272 A1 | 5/2013 | Louise-Babando et al. |
| 2013/0141325 A1 | 6/2013 | Bailey et al. |
| 2013/0141331 A1 | 6/2013 | Shiu et al. |
| 2013/0141362 A1 | 6/2013 | Asanuma et al. |
| 2013/0143512 A1 | 6/2013 | Hernandez et al. |
| 2013/0145316 A1 | 6/2013 | Heo |
| 2013/0159858 A1 | 6/2013 | Joffray et al. |
| 2013/0162411 A1 | 6/2013 | Moses et al. |
| 2013/0166679 A1 | 6/2013 | Kuwahara et al. |
| 2013/0168444 A1 | 7/2013 | Hsieh et al. |
| 2013/0173794 A1 | 7/2013 | Agerbak et al. |
| 2013/0191454 A1 | 7/2013 | Oliver et al. |
| 2013/0194476 A1 | 8/2013 | Shimosato |
| 2013/0201098 A1 | 8/2013 | Schilit et al. |
| 2013/0205375 A1 | 8/2013 | Woxblom et al. |
| 2013/0219285 A1 | 8/2013 | Iwasaki et al. |
| 2013/0219303 A1 | 8/2013 | Eriksson et al. |
| 2013/0222270 A1 | 8/2013 | Winkler et al. |
| 2013/0223279 A1 | 8/2013 | Tinnakornsrisuphap et al. |
| 2013/0225152 A1 | 8/2013 | Matthews et al. |
| 2013/0234924 A1 | 9/2013 | Janefalkar et al. |
| 2013/0243924 A1 | 9/2013 | Bhandari et al. |
| 2013/0244633 A1 | 9/2013 | Jacobs et al. |
| 2013/0246522 A1 | 9/2013 | Bilinski et al. |
| 2013/0246916 A1 | 9/2013 | Reimann et al. |
| 2013/0262298 A1 | 10/2013 | Morley et al. |
| 2013/0268593 A1 | 10/2013 | Parekh |
| 2013/0275881 A1 | 10/2013 | Hahm et al. |
| 2013/0282180 A1 | 10/2013 | Layton |
| 2013/0286251 A1 | 10/2013 | Wood et al. |
| 2013/0305354 A1 | 11/2013 | King et al. |
| 2013/0314204 A1 | 11/2013 | Ho et al. |
| 2013/0322634 A1 | 12/2013 | Bennett et al. |
| 2013/0324081 A1 | 12/2013 | Gargi et al. |
| 2013/0325524 A1 | 12/2013 | Boudville |
| 2013/0329074 A1 | 12/2013 | Zhang et al. |
| 2013/0329924 A1 | 12/2013 | Fleizach et al. |

(56) References Cited

U.S. PATENT DOCUMENTS

| | | |
|---|---|---|
| 2013/0331130 A1 | 12/2013 | Lee |
| 2013/0339436 A1 | 12/2013 | Gray |
| 2013/0346859 A1 | 12/2013 | Bates et al. |
| 2013/0346882 A1 | 12/2013 | Shiplacoff et al. |
| 2013/0347022 A1 | 12/2013 | Bates et al. |
| 2014/0006949 A1 | 1/2014 | Briand et al. |
| 2014/0007021 A1 | 1/2014 | Akiyama et al. |
| 2014/0015546 A1 | 1/2014 | Frederick et al. |
| 2014/0022399 A1 | 1/2014 | Rashid et al. |
| 2014/0028546 A1 | 1/2014 | Jeon et al. |
| 2014/0033100 A1 | 1/2014 | Noda et al. |
| 2014/0037107 A1 | 2/2014 | Marino et al. |
| 2014/0040831 A1 | 2/2014 | Akasaka et al. |
| 2014/0045463 A1 | 2/2014 | Hsieh et al. |
| 2014/0046464 A1 | 2/2014 | Reimann |
| 2014/0047020 A1 | 2/2014 | Matus et al. |
| 2014/0049447 A1 | 2/2014 | Choi |
| 2014/0053281 A1 | 2/2014 | Benoit et al. |
| 2014/0057569 A1* | 2/2014 | Toivanen ............... H04B 7/26 455/41.3 |
| 2014/0068526 A1 | 3/2014 | Figelman et al. |
| 2014/0068755 A1 | 3/2014 | King et al. |
| 2014/0073252 A1 | 3/2014 | Lee et al. |
| 2014/0073256 A1 | 3/2014 | Newham et al. |
| 2014/0075003 A1 | 3/2014 | Tanaka et al. |
| 2014/0075311 A1 | 3/2014 | Boettcher et al. |
| 2014/0078371 A1 | 3/2014 | Kinoshita |
| 2014/0080416 A1 | 3/2014 | Seo et al. |
| 2014/0084857 A1 | 3/2014 | Liu et al. |
| 2014/0095225 A1 | 4/2014 | Williams et al. |
| 2014/0104449 A1 | 4/2014 | Masarik et al. |
| 2014/0114966 A1 | 4/2014 | Bilinski et al. |
| 2014/0118563 A1 | 5/2014 | Mehta et al. |
| 2014/0122331 A1 | 5/2014 | Vaish et al. |
| 2014/0123043 A1 | 5/2014 | Schmidt et al. |
| 2014/0141721 A1 | 5/2014 | Kim et al. |
| 2014/0142851 A1 | 5/2014 | Larmo et al. |
| 2014/0143678 A1 | 5/2014 | Mistry et al. |
| 2014/0143737 A1 | 5/2014 | Mistry et al. |
| 2014/0149859 A1 | 5/2014 | Van Dyken et al. |
| 2014/0155123 A1 | 6/2014 | Lee et al. |
| 2014/0156801 A1 | 6/2014 | Fernandes et al. |
| 2014/0160033 A1 | 6/2014 | Brikman et al. |
| 2014/0160078 A1 | 6/2014 | Seo et al. |
| 2014/0160304 A1 | 6/2014 | Galor et al. |
| 2014/0164544 A1 | 6/2014 | Gagneraud |
| 2014/0164907 A1 | 6/2014 | Jung et al. |
| 2014/0164930 A1 | 6/2014 | Lieb et al. |
| 2014/0167986 A1 | 6/2014 | Parada et al. |
| 2014/0168056 A1 | 6/2014 | Swaminathan et al. |
| 2014/0171156 A1 | 6/2014 | Pattikonda et al. |
| 2014/0173455 A1 | 6/2014 | Shimizu et al. |
| 2014/0176298 A1 | 6/2014 | Kumar et al. |
| 2014/0180582 A1 | 6/2014 | Pontarelli et al. |
| 2014/0181183 A1 | 6/2014 | Yamamoto et al. |
| 2014/0181202 A1 | 6/2014 | Gossain |
| 2014/0181654 A1 | 6/2014 | Kumar et al. |
| 2014/0181658 A1 | 6/2014 | Kumar et al. |
| 2014/0184524 A1 | 7/2014 | Schiefer et al. |
| 2014/0191715 A1 | 7/2014 | Wechlin et al. |
| 2014/0195943 A1 | 7/2014 | Zheng et al. |
| 2014/0204229 A1 | 7/2014 | Leung et al. |
| 2014/0207707 A1 | 7/2014 | Na et al. |
| 2014/0210708 A1 | 7/2014 | Simmons et al. |
| 2014/0218599 A1 | 8/2014 | Nakamura et al. |
| 2014/0228063 A1 | 8/2014 | Harris et al. |
| 2014/0237361 A1 | 8/2014 | Martin et al. |
| 2014/0237389 A1 | 8/2014 | Ryall et al. |
| 2014/0240216 A1 | 8/2014 | Bukurak et al. |
| 2014/0240577 A1 | 8/2014 | Masugi |
| 2014/0267002 A1 | 9/2014 | Luna |
| 2014/0267911 A1 | 9/2014 | Grant et al. |
| 2014/0269614 A1 | 9/2014 | Maguire et al. |
| 2014/0270183 A1 | 9/2014 | Luna |
| 2014/0273975 A1 | 9/2014 | Barat et al. |
| 2014/0282068 A1 | 9/2014 | Levkovitz et al. |
| 2014/0302834 A1 | 10/2014 | Jones |
| 2014/0310350 A1 | 10/2014 | Borggaard et al. |
| 2014/0310598 A1 | 10/2014 | Sprague et al. |
| 2014/0320387 A1 | 10/2014 | Eriksson et al. |
| 2014/0328147 A1 | 11/2014 | Yang et al. |
| 2014/0331314 A1 | 11/2014 | Fujioka |
| 2014/0333602 A1 | 11/2014 | Yang et al. |
| 2014/0334644 A1 | 11/2014 | Selig et al. |
| 2014/0335789 A1 | 11/2014 | Cohen et al. |
| 2014/0337450 A1 | 11/2014 | Choudhary et al. |
| 2014/0337748 A1 | 11/2014 | Lee |
| 2014/0337791 A1 | 11/2014 | Agnetta et al. |
| 2014/0343843 A1 | 11/2014 | Yanku |
| 2014/0344951 A1 | 11/2014 | Brewer |
| 2014/0358707 A1 | 12/2014 | Perkins et al. |
| 2014/0359124 A1 | 12/2014 | Adimatyam et al. |
| 2014/0359481 A1 | 12/2014 | Graham et al. |
| 2014/0362293 A1 | 12/2014 | Bakar et al. |
| 2014/0363024 A1 | 12/2014 | Apodaca |
| 2014/0364056 A1 | 12/2014 | Belk et al. |
| 2014/0365113 A1 | 12/2014 | Yue et al. |
| 2014/0365904 A1 | 12/2014 | Kim et al. |
| 2014/0368719 A1 | 12/2014 | Kaneko et al. |
| 2014/0370807 A1 | 12/2014 | Pierce et al. |
| 2014/0380187 A1 | 12/2014 | Gardenfors et al. |
| 2015/0011199 A1 | 1/2015 | Lee et al. |
| 2015/0017956 A1 | 1/2015 | Jeong |
| 2015/0019981 A1 | 1/2015 | Petitt et al. |
| 2015/0019982 A1 | 1/2015 | Petitt et al. |
| 2015/0022438 A1 | 1/2015 | Hong |
| 2015/0022674 A1 | 1/2015 | Koss et al. |
| 2015/0026615 A1 | 1/2015 | Choi et al. |
| 2015/0026647 A1 | 1/2015 | Park et al. |
| 2015/0032812 A1 | 1/2015 | Dudley |
| 2015/0033136 A1 | 1/2015 | Sasaki et al. |
| 2015/0033361 A1 | 1/2015 | Choi et al. |
| 2015/0035762 A1 | 2/2015 | Lu |
| 2015/0036853 A1 | 2/2015 | Solum et al. |
| 2015/0040012 A1 | 2/2015 | Faaborg et al. |
| 2015/0049033 A1 | 2/2015 | Kim et al. |
| 2015/0049233 A1 | 2/2015 | Choi |
| 2015/0049591 A1 | 2/2015 | Adams et al. |
| 2015/0052222 A1 | 2/2015 | Farrell et al. |
| 2015/0061842 A1 | 3/2015 | Yoon et al. |
| 2015/0061972 A1 | 3/2015 | Kang et al. |
| 2015/0065035 A1 | 3/2015 | Son et al. |
| 2015/0067580 A1 | 3/2015 | Um et al. |
| 2015/0067803 A1 | 3/2015 | Alduaiji |
| 2015/0085057 A1 | 3/2015 | Ouyang et al. |
| 2015/0086041 A1 | 3/2015 | Reimann |
| 2015/0089359 A1 | 3/2015 | Brisebois |
| 2015/0094031 A1 | 4/2015 | Liu |
| 2015/0094050 A1 | 4/2015 | Bowles et al. |
| 2015/0094093 A1 | 4/2015 | Pierce et al. |
| 2015/0095804 A1 | 4/2015 | Grossman et al. |
| 2015/0098309 A1 | 4/2015 | Adams et al. |
| 2015/0100621 A1 | 4/2015 | Pan |
| 2015/0100623 A1 | 4/2015 | Gudell et al. |
| 2015/0106221 A1 | 4/2015 | Tapley et al. |
| 2015/0113407 A1 | 4/2015 | Hoffert et al. |
| 2015/0121231 A1 | 4/2015 | Edwardson et al. |
| 2015/0130737 A1 | 5/2015 | Im et al. |
| 2015/0131121 A1 | 5/2015 | Kang |
| 2015/0135049 A1 | 5/2015 | Murphy |
| 2015/0138101 A1 | 5/2015 | Park et al. |
| 2015/0149599 A1 | 5/2015 | Caunter et al. |
| 2015/0163788 A1 | 6/2015 | Karunakaran |
| 2015/0177914 A1 | 6/2015 | Coyner et al. |
| 2015/0189162 A1 | 7/2015 | Kuo et al. |
| 2015/0189426 A1 | 7/2015 | Pang |
| 2015/0193130 A1 | 7/2015 | Cho et al. |
| 2015/0193138 A1 | 7/2015 | Relyea et al. |
| 2015/0193196 A1 | 7/2015 | Lin et al. |
| 2015/0194050 A1 | 7/2015 | Lee |
| 2015/0200715 A1 | 7/2015 | Oiwa et al. |
| 2015/0205511 A1 | 7/2015 | Vinna et al. |
| 2015/0205971 A1 | 7/2015 | Sanio et al. |
| 2015/0206529 A1 | 7/2015 | Kwon et al. |

(56) References Cited

U.S. PATENT DOCUMENTS

| | | |
|---|---|---|
| 2015/0208158 A1 | 7/2015 | Sanders |
| 2015/0215382 A1 | 7/2015 | Arora et al. |
| 2015/0222615 A1 | 8/2015 | Allain et al. |
| 2015/0222680 A1 | 8/2015 | Grover |
| 2015/0223005 A1 | 8/2015 | Hardman et al. |
| 2015/0229650 A1 | 8/2015 | Grigg et al. |
| 2015/0229782 A1 | 8/2015 | Zuidema et al. |
| 2015/0242065 A1* | 8/2015 | Ko .................... G09G 5/14 715/779 |
| 2015/0242073 A1 | 8/2015 | Munoz et al. |
| 2015/0242597 A1 | 8/2015 | Danciu |
| 2015/0242611 A1 | 8/2015 | Cotterill |
| 2015/0242837 A1 | 8/2015 | Yarbrough et al. |
| 2015/0243163 A1 | 8/2015 | Shoemake |
| 2015/0243246 A1 | 8/2015 | Mun et al. |
| 2015/0248235 A1 | 9/2015 | Offenberg et al. |
| 2015/0248268 A1 | 9/2015 | Kumar et al. |
| 2015/0253960 A1 | 9/2015 | Lin et al. |
| 2015/0261415 A1 | 9/2015 | Lee et al. |
| 2015/0261493 A1 | 9/2015 | Lemmon et al. |
| 2015/0264202 A1 | 9/2015 | Pawlowski |
| 2015/0264304 A1 | 9/2015 | Chastney et al. |
| 2015/0286360 A1 | 10/2015 | Wachter |
| 2015/0287403 A1 | 10/2015 | Holzer Zaslansky et al. |
| 2015/0297185 A1 | 10/2015 | Mccormack et al. |
| 2015/0309768 A1 | 10/2015 | Van Der Heide |
| 2015/0312299 A1 | 10/2015 | Chen |
| 2015/0312617 A1 | 10/2015 | Chen et al. |
| 2015/0319006 A1 | 11/2015 | Plummer et al. |
| 2015/0324552 A1 | 11/2015 | Beckhardt |
| 2015/0339261 A1 | 11/2015 | Jha et al. |
| 2015/0346834 A1 | 12/2015 | Martinez Fernandez et al. |
| 2015/0347738 A1 | 12/2015 | Ulrich et al. |
| 2015/0350029 A1 | 12/2015 | Skrobotov |
| 2015/0355816 A1 | 12/2015 | Shim |
| 2015/0355818 A1 | 12/2015 | Corbin |
| 2015/0355879 A1 | 12/2015 | Beckhardt et al. |
| 2015/0356278 A1 | 12/2015 | Britt et al. |
| 2015/0358043 A1 | 12/2015 | Jeong et al. |
| 2015/0358304 A1 | 12/2015 | Beckhardt et al. |
| 2015/0370426 A1 | 12/2015 | Carrigan et al. |
| 2015/0370455 A1 | 12/2015 | Van Os et al. |
| 2015/0373172 A1 | 12/2015 | Boesen |
| 2015/0373178 A1 | 12/2015 | Felt et al. |
| 2015/0378522 A1 | 12/2015 | Butts |
| 2016/0004393 A1 | 1/2016 | Faaborg et al. |
| 2016/0004417 A1 | 1/2016 | Bates |
| 2016/0005189 A1 | 1/2016 | Gray et al. |
| 2016/0011850 A1 | 1/2016 | Sheen et al. |
| 2016/0014266 A1 | 1/2016 | Bhatt |
| 2016/0018846 A1 | 1/2016 | Zenoff |
| 2016/0021168 A1 | 1/2016 | Chaudhri et al. |
| 2016/0026425 A1 | 1/2016 | Lee et al. |
| 2016/0026429 A1 | 1/2016 | Triplett |
| 2016/0028869 A1 | 1/2016 | Bhatt |
| 2016/0029146 A1 | 1/2016 | Tembey et al. |
| 2016/0034742 A1 | 2/2016 | Kim et al. |
| 2016/0036996 A1 | 2/2016 | Midholt et al. |
| 2016/0043905 A1 | 2/2016 | Fiedler |
| 2016/0048369 A1 | 2/2016 | Zenoff |
| 2016/0048370 A1 | 2/2016 | Zenoff |
| 2016/0048705 A1 | 2/2016 | Yang |
| 2016/0050476 A1 | 2/2016 | Patil |
| 2016/0054710 A1 | 2/2016 | Jo et al. |
| 2016/0061613 A1 | 3/2016 | Jung et al. |
| 2016/0062487 A1 | 3/2016 | Foss et al. |
| 2016/0062567 A1 | 3/2016 | Yang et al. |
| 2016/0062572 A1 | 3/2016 | Yang et al. |
| 2016/0062589 A1 | 3/2016 | Wan et al. |
| 2016/0062606 A1 | 3/2016 | Vega et al. |
| 2016/0062719 A1* | 3/2016 | Romano .................. H04W 4/80 345/2.3 |
| 2016/0065707 A1 | 3/2016 | Yang et al. |
| 2016/0065708 A1 | 3/2016 | Yang et al. |
| 2016/0066277 A1 | 3/2016 | Yang et al. |
| 2016/0077734 A1 | 3/2016 | Buxton et al. |
| 2016/0088039 A1 | 3/2016 | Millington et al. |
| 2016/0092053 A1 | 3/2016 | Loganathan et al. |
| 2016/0092072 A1 | 3/2016 | So et al. |
| 2016/0099901 A1 | 4/2016 | Allen et al. |
| 2016/0116941 A1 | 4/2016 | Kuwabara et al. |
| 2016/0127799 A1 | 5/2016 | Alsina et al. |
| 2016/0134737 A1 | 5/2016 | Pulletikurty |
| 2016/0134942 A1 | 5/2016 | Lo |
| 2016/0142763 A1 | 5/2016 | Kim et al. |
| 2016/0150624 A1 | 5/2016 | Meerbeek et al. |
| 2016/0155443 A1 | 6/2016 | Khan et al. |
| 2016/0156597 A1 | 6/2016 | Meng et al. |
| 2016/0156687 A1 | 6/2016 | Leung |
| 2016/0156957 A1 | 6/2016 | Yun |
| 2016/0156992 A1 | 6/2016 | Kuper |
| 2016/0162252 A1 | 6/2016 | Di Censo et al. |
| 2016/0165037 A1 | 6/2016 | Youn et al. |
| 2016/0183046 A1 | 6/2016 | Kwon |
| 2016/0191511 A1 | 6/2016 | Tijerina et al. |
| 2016/0195864 A1 | 7/2016 | Kim |
| 2016/0196042 A1 | 7/2016 | Laute et al. |
| 2016/0196106 A1 | 7/2016 | Hammer et al. |
| 2016/0202866 A1 | 7/2016 | Zambetti |
| 2016/0209939 A1 | 7/2016 | Zambetti et al. |
| 2016/0210983 A1 | 7/2016 | Amada et al. |
| 2016/0231902 A1 | 8/2016 | Sirpal et al. |
| 2016/0239167 A1 | 8/2016 | Reimann et al. |
| 2016/0241983 A1 | 8/2016 | Lambourne et al. |
| 2016/0246566 A1 | 8/2016 | Fullerton et al. |
| 2016/0253145 A1 | 9/2016 | Lee et al. |
| 2016/0259489 A1 | 9/2016 | Yang |
| 2016/0260414 A1 | 9/2016 | Yang |
| 2016/0267319 A1 | 9/2016 | Murillo et al. |
| 2016/0269176 A1 | 9/2016 | Pang et al. |
| 2016/0277903 A1 | 9/2016 | Poosala et al. |
| 2016/0283194 A1 | 9/2016 | Patil et al. |
| 2016/0291824 A1 | 10/2016 | Grossman et al. |
| 2016/0291924 A1 | 10/2016 | Bierbower et al. |
| 2016/0294896 A1 | 10/2016 | O'Driscoll et al. |
| 2016/0295340 A1 | 10/2016 | Baker et al. |
| 2016/0299669 A1 | 10/2016 | Bates |
| 2016/0299736 A1 | 10/2016 | Bates et al. |
| 2016/0313875 A1 | 10/2016 | Williams et al. |
| 2016/0320849 A1 | 11/2016 | Koo |
| 2016/0327911 A1 | 11/2016 | Eim et al. |
| 2016/0335041 A1 | 11/2016 | Wachter et al. |
| 2016/0336531 A1 | 11/2016 | Yokoyama |
| 2016/0337206 A1 | 11/2016 | Bugenhagen et al. |
| 2016/0342141 A1 | 11/2016 | Koumaiha et al. |
| 2016/0342386 A1 | 11/2016 | Kallai et al. |
| 2016/0345039 A1 | 11/2016 | Billmeyer |
| 2016/0350839 A1 | 12/2016 | Avidor et al. |
| 2016/0351191 A1 | 12/2016 | Vilermo et al. |
| 2016/0357507 A1 | 12/2016 | Decker et al. |
| 2016/0360344 A1 | 12/2016 | Shim et al. |
| 2016/0364600 A1 | 12/2016 | Shah et al. |
| 2016/0366531 A1 | 12/2016 | Popova |
| 2016/0372113 A1 | 12/2016 | David et al. |
| 2016/0373884 A1 | 12/2016 | Peterson et al. |
| 2016/0381476 A1 | 12/2016 | Gossain et al. |
| 2017/0003931 A1 | 1/2017 | Dvortsov et al. |
| 2017/0006210 A1 | 1/2017 | Dye et al. |
| 2017/0010794 A1 | 1/2017 | Cho et al. |
| 2017/0011210 A1 | 1/2017 | Cheong et al. |
| 2017/0013562 A1 | 1/2017 | Lim et al. |
| 2017/0019517 A1 | 1/2017 | Wilder et al. |
| 2017/0025124 A1 | 1/2017 | Mixter et al. |
| 2017/0026686 A1 | 1/2017 | Glazier et al. |
| 2017/0031552 A1 | 2/2017 | Lin |
| 2017/0031648 A1 | 2/2017 | So et al. |
| 2017/0034253 A1 | 2/2017 | Jiang et al. |
| 2017/0041727 A1 | 2/2017 | Reimann |
| 2017/0053542 A1 | 2/2017 | Wilson et al. |
| 2017/0068402 A1 | 3/2017 | Lochhead et al. |
| 2017/0068507 A1 | 3/2017 | Kim et al. |
| 2017/0070346 A1 | 3/2017 | Lombardi et al. |
| 2017/0078294 A1 | 3/2017 | Medvinsky |
| 2017/0083188 A1 | 3/2017 | Yang et al. |

(56) References Cited

U.S. PATENT DOCUMENTS

| | | |
|---|---|---|
| 2017/0083285 A1 | 3/2017 | Meyers et al. |
| 2017/0083494 A1 | 3/2017 | Kim et al. |
| 2017/0092085 A1 | 3/2017 | Agarwal |
| 2017/0092270 A1 | 3/2017 | Newendorp et al. |
| 2017/0097621 A1 | 4/2017 | Ackmann et al. |
| 2017/0099270 A1 | 4/2017 | Anson |
| 2017/0115940 A1 | 4/2017 | Byeon |
| 2017/0127145 A1 | 5/2017 | Rajapakse |
| 2017/0134553 A1 | 5/2017 | Jeon et al. |
| 2017/0134567 A1 | 5/2017 | Jeon et al. |
| 2017/0134872 A1 | 5/2017 | Silva et al. |
| 2017/0142087 A1 | 5/2017 | Maninder et al. |
| 2017/0149795 A1 | 5/2017 | Day, II |
| 2017/0156110 A1 | 6/2017 | Ueno et al. |
| 2017/0160098 A1 | 6/2017 | Mcgavran et al. |
| 2017/0160819 A1 | 6/2017 | Yi et al. |
| 2017/0180843 A1 | 6/2017 | Perianu et al. |
| 2017/0185373 A1 | 6/2017 | Kim et al. |
| 2017/0192743 A1* | 7/2017 | Chun .................. H04W 76/14 |
| 2017/0193813 A1 | 7/2017 | Carroll et al. |
| 2017/0195772 A1 | 7/2017 | Han et al. |
| 2017/0205854 A1 | 7/2017 | Zenoff |
| 2017/0206779 A1 | 7/2017 | Lee et al. |
| 2017/0212590 A1 | 7/2017 | Vanblon et al. |
| 2017/0230236 A1 | 8/2017 | Kim et al. |
| 2017/0230705 A1 | 8/2017 | Pardue et al. |
| 2017/0235545 A1 | 8/2017 | Millington et al. |
| 2017/0242653 A1 | 8/2017 | Lang et al. |
| 2017/0308292 A1 | 10/2017 | Choi |
| 2017/0322711 A1 | 11/2017 | Robinson et al. |
| 2017/0322713 A1 | 11/2017 | Hwang et al. |
| 2017/0331901 A1 | 11/2017 | Sarlandie De La Robertie et al. |
| 2017/0357420 A1 | 12/2017 | Dye et al. |
| 2017/0357421 A1 | 12/2017 | Dye et al. |
| 2017/0357425 A1 | 12/2017 | Smith et al. |
| 2017/0357426 A1 | 12/2017 | Wilson et al. |
| 2017/0357434 A1 | 12/2017 | Coffman et al. |
| 2017/0357439 A1 | 12/2017 | Lemay et al. |
| 2017/0357477 A1 | 12/2017 | Im et al. |
| 2017/0357479 A1 | 12/2017 | Shenoy et al. |
| 2017/0359191 A1 | 12/2017 | Smith et al. |
| 2017/0363436 A1 | 12/2017 | Eronen et al. |
| 2018/0013815 A1* | 1/2018 | Gold .................. H04L 63/00 |
| 2018/0020530 A1 | 1/2018 | Scordato et al. |
| 2018/0039916 A1 | 2/2018 | Ravindra |
| 2018/0040324 A1 | 2/2018 | Wilberding |
| 2018/0067712 A1* | 3/2018 | Behzadi .................. G06F 3/14 |
| 2018/0069957 A1 | 3/2018 | Mushikabe et al. |
| 2018/0070187 A1 | 3/2018 | Drinkwater et al. |
| 2018/0096064 A1 | 4/2018 | Lennon et al. |
| 2018/0101297 A1 | 4/2018 | Yang et al. |
| 2018/0122378 A1 | 5/2018 | Mixter et al. |
| 2018/0137266 A1 | 5/2018 | Kim et al. |
| 2018/0139292 A1 | 5/2018 | Koren et al. |
| 2018/0144590 A1 | 5/2018 | Mixter et al. |
| 2018/0190279 A1 | 7/2018 | Anderson et al. |
| 2018/0199137 A1 | 7/2018 | Mate et al. |
| 2018/0213396 A1 | 7/2018 | Segal et al. |
| 2018/0217709 A1 | 8/2018 | Hotelling |
| 2018/0218636 A1 | 8/2018 | Alaouf et al. |
| 2018/0227341 A1 | 8/2018 | Rizzi |
| 2018/0228003 A1 | 8/2018 | O'Driscoll et al. |
| 2018/0228006 A1 | 8/2018 | Baker et al. |
| 2018/0253151 A1 | 9/2018 | Kletsov et al. |
| 2018/0259915 A1 | 9/2018 | Hosoi et al. |
| 2018/0262677 A1 | 9/2018 | Dye et al. |
| 2018/0267773 A1 | 9/2018 | Kim et al. |
| 2018/0267774 A1 | 9/2018 | Williams et al. |
| 2018/0286395 A1 | 10/2018 | Li et al. |
| 2018/0288104 A1 | 10/2018 | Padilla et al. |
| 2018/0288560 A1 | 10/2018 | Naik et al. |
| 2018/0307303 A1 | 10/2018 | Powderly et al. |
| 2018/0308480 A1 | 10/2018 | Jang et al. |
| 2018/0321842 A1 | 11/2018 | Lee et al. |
| 2018/0329585 A1 | 11/2018 | Carrigan et al. |
| 2018/0329586 A1 | 11/2018 | Sundstrom et al. |
| 2018/0332559 A1 | 11/2018 | Gudivada et al. |
| 2018/0335903 A1 | 11/2018 | Coffman et al. |
| 2018/0337924 A1 | 11/2018 | Graham et al. |
| 2018/0338038 A1 | 11/2018 | Ly et al. |
| 2018/0341448 A1 | 11/2018 | Behzadi et al. |
| 2018/0351762 A1 | 12/2018 | Iyengar et al. |
| 2018/0352435 A1 | 12/2018 | Donley et al. |
| 2018/0364665 A1 | 12/2018 | Clymer et al. |
| 2019/0012069 A1 | 1/2019 | Bates |
| 2019/0012073 A1 | 1/2019 | Hwang |
| 2019/0012966 A1 | 1/2019 | Shi |
| 2019/0025943 A1 | 1/2019 | Jobs et al. |
| 2019/0028419 A1 | 1/2019 | Sullivan |
| 2019/0028865 A1 | 1/2019 | Raleigh et al. |
| 2019/0037004 A1 | 1/2019 | Chaudhri et al. |
| 2019/0056854 A1 | 2/2019 | Azzolin et al. |
| 2019/0058777 A1 | 2/2019 | Chen |
| 2019/0074991 A1 | 3/2019 | Peterson et al. |
| 2019/0075200 A1 | 3/2019 | Seo et al. |
| 2019/0102145 A1 | 4/2019 | Wilberding et al. |
| 2019/0121300 A1 | 4/2019 | Peterson et al. |
| 2019/0129661 A1 | 5/2019 | Hirota et al. |
| 2019/0138696 A1 | 5/2019 | Carpenter et al. |
| 2019/0138951 A1 | 5/2019 | Brownhill et al. |
| 2019/0146422 A1 | 5/2019 | Meyer et al. |
| 2019/0158645 A1 | 5/2019 | Yang et al. |
| 2019/0179423 A1 | 6/2019 | Rose et al. |
| 2019/0182749 A1 | 6/2019 | Breaux et al. |
| 2019/0187861 A1 | 6/2019 | Yang |
| 2019/0196600 A1 | 6/2019 | Rothberg et al. |
| 2019/0238675 A1 | 8/2019 | Soni et al. |
| 2019/0265849 A1 | 8/2019 | Yang et al. |
| 2019/0279634 A1 | 9/2019 | Tak et al. |
| 2019/0281547 A1 | 9/2019 | Yoon et al. |
| 2019/0294406 A1 | 9/2019 | Bierbower et al. |
| 2019/0297439 A1 | 9/2019 | Maeda |
| 2019/0306607 A1 | 10/2019 | Clayton et al. |
| 2019/0310759 A1 | 10/2019 | Stein et al. |
| 2019/0332400 A1 | 10/2019 | Spoor et al. |
| 2019/0339769 A1 | 11/2019 | Cox et al. |
| 2019/0340348 A1 | 11/2019 | Yu et al. |
| 2019/0347181 A1 | 11/2019 | Cranfill et al. |
| 2019/0349469 A1 | 11/2019 | Skogen et al. |
| 2019/0354252 A1 | 11/2019 | Badr |
| 2019/0361575 A1 | 11/2019 | Ni et al. |
| 2019/0370094 A1 | 12/2019 | Louch et al. |
| 2019/0372862 A1 | 12/2019 | Carrigan et al. |
| 2020/0042087 A1 | 2/2020 | Ang et al. |
| 2020/0042088 A1 | 2/2020 | Ang et al. |
| 2020/0042089 A1 | 2/2020 | Ang et al. |
| 2020/0042094 A1 | 2/2020 | Ang et al. |
| 2020/0042145 A1 | 2/2020 | Williams et al. |
| 2020/0042311 A1 | 2/2020 | Shin |
| 2020/0050426 A1 | 2/2020 | Jung et al. |
| 2020/0050502 A1 | 2/2020 | Ghafourifar et al. |
| 2020/0067245 A1 | 2/2020 | Maley |
| 2020/0104018 A1 | 4/2020 | Coffman et al. |
| 2020/0127988 A1 | 4/2020 | Bradley et al. |
| 2020/0135191 A1 | 4/2020 | Nourbakhsh |
| 2020/0142667 A1 | 5/2020 | Querze et al. |
| 2020/0152186 A1 | 5/2020 | Koh et al. |
| 2020/0154583 A1 | 5/2020 | Lee et al. |
| 2020/0159374 A1 | 5/2020 | Yang et al. |
| 2020/0174734 A1* | 6/2020 | Gomes .................. H04R 1/10 |
| 2020/0186378 A1 | 6/2020 | Six et al. |
| 2020/0192627 A1 | 6/2020 | Jang et al. |
| 2020/0201491 A1 | 6/2020 | Coffman et al. |
| 2020/0201495 A1 | 6/2020 | Coffman et al. |
| 2020/0213437 A1 | 7/2020 | Bhatt |
| 2020/0218486 A1 | 7/2020 | Behzadi et al. |
| 2020/0225817 A1 | 7/2020 | Coffman et al. |
| 2020/0228646 A1 | 7/2020 | Hotes et al. |
| 2020/0264764 A1 | 8/2020 | Seymour et al. |
| 2020/0285379 A1 | 9/2020 | George-Svahn |
| 2020/0302913 A1 | 9/2020 | Marcinkiewicz |
| 2020/0304917 A1* | 9/2020 | Ryu .................. G10L 19/00 |
| 2020/0310748 A1 | 10/2020 | Huang |
| 2020/0312318 A1 | 10/2020 | Olson et al. |

(56) References Cited

U.S. PATENT DOCUMENTS

| | | |
|---|---|---|
| 2020/0335187 A1 | 10/2020 | Lefkofsky et al. |
| 2020/0342144 A1 | 10/2020 | Alameh et al. |
| 2020/0356252 A1 | 11/2020 | Ko et al. |
| 2020/0356687 A1 | 11/2020 | Salzman et al. |
| 2020/0359204 A1 | 11/2020 | Hawkins et al. |
| 2020/0374645 A1 | 11/2020 | Settel |
| 2020/0379711 A1 | 12/2020 | Graham et al. |
| 2020/0379712 A1 | 12/2020 | Carrigan |
| 2020/0379713 A1 | 12/2020 | Carrigan |
| 2020/0379714 A1 | 12/2020 | Graham et al. |
| 2020/0379716 A1 | 12/2020 | Carrigan et al. |
| 2020/0379729 A1 | 12/2020 | Graham et al. |
| 2020/0379730 A1 | 12/2020 | Graham et al. |
| 2020/0395012 A1 | 12/2020 | Kim et al. |
| 2021/0011588 A1 | 1/2021 | Coffman et al. |
| 2021/0014610 A1 | 1/2021 | Carrigan et al. |
| 2021/0043189 A1 | 2/2021 | Pyun |
| 2021/0064317 A1 | 3/2021 | Juenger et al. |
| 2021/0065134 A1 | 3/2021 | Chhabra et al. |
| 2021/0099829 A1 | 4/2021 | Soto et al. |
| 2021/0103338 A1 | 4/2021 | Ang et al. |
| 2021/0158830 A1 | 5/2021 | Boehlke |
| 2021/0181903 A1 | 6/2021 | Carrigan et al. |
| 2021/0203765 A1 | 7/2021 | Yang et al. |
| 2021/0216654 A1 | 7/2021 | Ko et al. |
| 2021/0255750 A1 | 8/2021 | Al et al. |
| 2021/0255816 A1 | 8/2021 | Behzadi et al. |
| 2021/0255819 A1 | 8/2021 | Graham et al. |
| 2021/0263702 A1 | 8/2021 | Carrigan |
| 2021/0266274 A1 | 8/2021 | Liu et al. |
| 2021/0321197 A1 | 10/2021 | Annamraju |
| 2021/0323406 A1 | 10/2021 | So et al. |
| 2021/0349680 A1 | 11/2021 | Kim et al. |
| 2021/0352172 A1 | 11/2021 | Kim et al. |
| 2021/0373718 A1 | 12/2021 | Yang et al. |
| 2021/0392223 A1 | 12/2021 | Coffman et al. |
| 2021/0407507 A1 | 12/2021 | Zhou et al. |
| 2022/0004356 A1 | 1/2022 | Kim et al. |
| 2022/0043626 A1 | 2/2022 | Carrigan |
| 2022/0083183 A1 | 3/2022 | Patton |
| 2022/0100367 A1 | 3/2022 | Carrigan et al. |
| 2022/0101719 A1 | 3/2022 | Bojic et al. |
| 2022/0167113 A1 | 5/2022 | Beckhardt |
| 2022/0179497 A1 | 6/2022 | Jung et al. |
| 2022/0180862 A1 | 6/2022 | Sharifi et al. |
| 2022/0240408 A1 | 7/2022 | Faulkner et al. |
| 2022/0244782 A1 | 8/2022 | Robert et al. |
| 2022/0276780 A1 | 9/2022 | Ko et al. |
| 2022/0279063 A1 | 9/2022 | Coffman et al. |
| 2022/0286549 A1 | 9/2022 | Coffman et al. |
| 2022/0303383 A1 | 9/2022 | Coffman et al. |
| 2022/0326817 A1 | 10/2022 | Carrigan et al. |
| 2022/0350482 A1 | 11/2022 | Carrigan et al. |
| 2022/0374085 A1 | 11/2022 | Nguyen et al. |
| 2022/0391166 A1 | 12/2022 | Sanders |
| 2023/0041125 A1 | 2/2023 | Kim et al. |
| 2023/0052490 A1 | 2/2023 | Chaudhri et al. |
| 2023/0073844 A1 | 3/2023 | Coffman et al. |
| 2023/0084551 A1 | 3/2023 | Coffman et al. |
| 2023/0104819 A1 | 4/2023 | Coffman et al. |
| 2023/0106600 A1 | 4/2023 | Coffman et al. |
| 2023/0106761 A1 | 4/2023 | Coffman et al. |
| 2023/0127384 A1 | 4/2023 | Stout |
| 2023/0131489 A1 | 4/2023 | Marzorati et al. |
| 2023/0179700 A1 | 6/2023 | Bhatt |
| 2023/0214089 A1 | 7/2023 | Yang et al. |
| 2023/0224667 A1 | 7/2023 | Rodman et al. |
| 2023/0234444 A1 | 7/2023 | Derichs et al. |
| 2023/0252737 A1 | 8/2023 | Dreyer et al. |
| 2023/0266866 A1 | 8/2023 | Bates et al. |
| 2023/0291824 A1 | 9/2023 | Yang et al. |
| 2023/0335139 A1 | 10/2023 | Breton et al. |
| 2023/0353862 A1 | 11/2023 | Yi et al. |
| 2023/0376193 A1 | 11/2023 | Han et al. |
| 2023/0393809 A1 | 12/2023 | Carrigan et al. |
| 2023/0409191 A1 | 12/2023 | Carrigan et al. |
| 2023/0409279 A1 | 12/2023 | Reese et al. |
| 2024/0053953 A1 | 2/2024 | Sanders |
| 2024/0062640 A1 | 2/2024 | Carrigan et al. |
| 2024/0080642 A1 | 3/2024 | Carrigan et al. |
| 2024/0205628 A1 | 6/2024 | Sharifi et al. |
| 2024/0211891 A1 | 6/2024 | Kennedy et al. |
| 2024/0220009 A1 | 7/2024 | Dryer et al. |
| 2024/0263956 A1 | 8/2024 | Vashisht |
| 2024/0310982 A1 | 9/2024 | Chaudhri et al. |
| 2024/0385691 A1 | 11/2024 | Nie et al. |
| 2024/0406290 A1 | 12/2024 | Giuliani et al. |
| 2024/0419322 A1 | 12/2024 | Carrigan et al. |
| 2025/0047777 A1 | 2/2025 | Bhatt |
| 2025/0054379 A1 | 2/2025 | Carrigan et al. |
| 2025/0080940 A1 | 3/2025 | White |
| 2025/0094021 A1 | 3/2025 | Yang et al. |
| 2025/0097641 A1 | 3/2025 | Maclean et al. |
| 2025/0117110 A1 | 4/2025 | Carrigan et al. |
| 2025/0165216 A1 | 5/2025 | Carrigan et al. |
| 2025/0224859 A1 | 7/2025 | Kim et al. |

FOREIGN PATENT DOCUMENTS

| | | |
|---|---|---|
| AU | 2015101019 A4 | 9/2015 |
| CA | 2532145 A1 | 7/1995 |
| CN | 1556955 A | 12/2004 |
| CN | 1558690 A | 12/2004 |
| CN | 1705346 A | 12/2005 |
| CN | 1863281 A | 11/2006 |
| CN | 101107668 A | 1/2008 |
| CN | 101243383 A | 8/2008 |
| CN | 101427574 A | 5/2009 |
| CN | 101433034 A | 5/2009 |
| CN | 101567858 A | 10/2009 |
| CN | 101861562 A | 10/2010 |
| CN | 101873386 A | 10/2010 |
| CN | 201928419 U | 8/2011 |
| CN | 102281294 A | 12/2011 |
| CN | 102301323 A | 12/2011 |
| CN | 102450040 A | 5/2012 |
| CN | 202309894 U | 7/2012 |
| CN | 102695302 A | 9/2012 |
| CN | 102740146 A | 10/2012 |
| CN | 102769705 A | 11/2012 |
| CN | 102830795 A | 12/2012 |
| CN | 102833345 A | 12/2012 |
| CN | 102968267 A | 3/2013 |
| CN | 103260079 A | 8/2013 |
| CN | 103415084 A | 11/2013 |
| CN | 203311163 U | 11/2013 |
| CN | 103576902 A | 2/2014 |
| CN | 103593154 A | 2/2014 |
| CN | 103604272 A | 2/2014 |
| CN | 103778082 A | 5/2014 |
| CN | 103793075 A | 5/2014 |
| CN | 103795866 A | 5/2014 |
| CN | 103839023 A | 6/2014 |
| CN | 103853493 A | 6/2014 |
| CN | 103914238 A | 7/2014 |
| CN | 103970208 A | 8/2014 |
| CN | 104024987 A | 9/2014 |
| CN | 104106036 A | 10/2014 |
| CN | 203930358 U | 11/2014 |
| CN | 104205785 A | 12/2014 |
| CN | 104272854 A | 1/2015 |
| CN | 104281430 A | 1/2015 |
| CN | 104346297 A | 2/2015 |
| CN | 104423581 A | 3/2015 |
| CN | 104956182 A | 9/2015 |
| CN | 105051676 A | 11/2015 |
| CN | 105208511 A | 12/2015 |
| CN | 105388998 A | 3/2016 |
| CN | 105549947 A | 5/2016 |
| CN | 105574378 A | 5/2016 |
| CN | 105657465 A | 6/2016 |
| CN | 105745863 A | 7/2016 |
| CN | 105794231 A | 7/2016 |
| CN | 105830015 A | 8/2016 |

(56) References Cited

FOREIGN PATENT DOCUMENTS

| | | | |
|---|---|---|---|
| CN | 105900376 A | 8/2016 |
| CN | 105940678 A | 9/2016 |
| CN | 105959906 A | 9/2016 |
| CN | 106030700 A | 10/2016 |
| CN | 106060772 A | 10/2016 |
| CN | 106062810 A | 10/2016 |
| CN | 106134209 A | 11/2016 |
| CN | 106170783 A | 11/2016 |
| CN | 103914238 B | 2/2017 |
| CN | 106383645 A | 2/2017 |
| CN | 106416142 A | 2/2017 |
| CN | 106797415 A | 5/2017 |
| CN | 106851528 A | 6/2017 |
| CN | 106936929 A | 7/2017 |
| CN | 107077288 A | 8/2017 |
| CN | 107250949 A | 10/2017 |
| CN | 107637073 A | 1/2018 |
| CN | 107683470 A | 2/2018 |
| CN | 107797657 A | 3/2018 |
| CN | 107852572 A | 3/2018 |
| CN | 107949879 A | 4/2018 |
| CN | 104012150 B | 5/2018 |
| CN | 108289239 A | 7/2018 |
| CN | 108292203 A | 7/2018 |
| CN | 108958608 A | 12/2018 |
| CN | 208188782 U | 12/2018 |
| CN | 109196825 A | 1/2019 |
| CN | 109302531 A | 2/2019 |
| CN | 109314795 A | 2/2019 |
| CN | 109347581 A | 2/2019 |
| CN | 109461462 A | 3/2019 |
| CN | 109584879 A | 4/2019 |
| CN | 109688442 A | 4/2019 |
| CN | 108683798 B | 4/2021 |
| CN | 109584879 B | 7/2021 |
| CN | 113835583 A | 12/2021 |
| CN | 108958608 B | 7/2022 |
| EP | 0836074 A2 | 4/1998 |
| EP | 1133119 A2 | 9/2001 |
| EP | 1406176 A1 | 4/2004 |
| EP | 1614992 A1 | 1/2006 |
| EP | 1705883 A1 | 9/2006 |
| EP | 1858238 A2 | 11/2007 |
| EP | 1885109 A2 | 2/2008 |
| EP | 1953663 A1 | 8/2008 |
| EP | 2018032 A1 | 1/2009 |
| EP | 2096413 A1 | 9/2009 |
| EP | 2194698 A1 | 6/2010 |
| EP | 2306692 A1 | 4/2011 |
| EP | 2367098 A2 | 9/2011 |
| EP | 2428947 A2 | 3/2012 |
| EP | 2466260 A1 | 6/2012 |
| EP | 2523439 A1 | 11/2012 |
| EP | 2629291 A1 | 8/2013 |
| EP | 2629483 A1 | 8/2013 |
| EP | 2632131 A1 | 8/2013 |
| EP | 1614992 B1 | 10/2013 |
| EP | 2703972 A1 | 3/2014 |
| EP | 2720442 A1 | 4/2014 |
| EP | 2750062 A2 | 7/2014 |
| EP | 2770673 A1 | 8/2014 |
| EP | 2892240 A1 | 7/2015 |
| EP | 2980715 A1 | 2/2016 |
| EP | 2993909 A1 | 3/2016 |
| EP | 2998822 A2 | 3/2016 |
| EP | 3001282 A1 | 3/2016 |
| EP | 3032537 A2 | 6/2016 |
| EP | 3038427 A2 | 6/2016 |
| EP | 3057342 A1 | 8/2016 |
| EP | 3073703 A1 | 9/2016 |
| EP | 3138300 A1 | 3/2017 |
| EP | 3163495 A1 | 5/2017 |
| EP | 3276905 A1 | 1/2018 |
| EP | 3379853 A1 | 9/2018 |
| EP | 3420441 A1 | 1/2019 |
| FR | 3069679 A1 | 2/2019 |
| GB | 2341698 A | 3/2000 |
| GB | 0412212 | 7/2004 |
| GB | 2402105 A | 12/2004 |
| IN | 1038/MUM/2005 | 6/2007 |
| JP | 11183183 A | 7/1999 |
| JP | 2001-67099 A | 3/2001 |
| JP | 2001-309455 A | 11/2001 |
| JP | 2002-58082 A | 2/2002 |
| JP | 2006-185154 A | 7/2006 |
| JP | 2008-99330 A | 4/2008 |
| JP | 2009-502048 A | 1/2009 |
| JP | 3162246 U | 8/2010 |
| JP | 2011-60281 A | 3/2011 |
| JP | 2011-217000 A | 10/2011 |
| JP | 2013-146557 A | 8/2013 |
| JP | 2014-44483 A | 3/2014 |
| JP | 2014-53692 A | 3/2014 |
| JP | 2014-71835 A | 4/2014 |
| JP | 2014-87126 A | 5/2014 |
| JP | 2014-123169 A | 7/2014 |
| JP | 2014-128032 A | 7/2014 |
| JP | 2014-143575 A | 8/2014 |
| JP | 2014-170982 A | 9/2014 |
| JP | 2015-61318 A | 3/2015 |
| JP | 2015-533441 A | 11/2015 |
| JP | 2016-13151 A | 1/2016 |
| JP | 2016-38615 A | 3/2016 |
| JP | 2016-157292 A | 9/2016 |
| JP | 2017-34563 A | 2/2017 |
| JP | 2017-143357 A | 8/2017 |
| JP | 2018-7158 A | 1/2018 |
| JP | 2018-113544 A | 7/2018 |
| JP | 2018-147265 A | 9/2018 |
| JP | 2018-200624 A | 12/2018 |
| KR | 20-2008-0004775 U | 10/2008 |
| KR | 10-2010-0036351 A | 4/2010 |
| KR | 10-2015-0031010 A | 3/2015 |
| KR | 10-2015-0121177 A | 10/2015 |
| KR | 10-2016-0000330 A | 1/2016 |
| KR | 10-2016-0012008 A | 2/2016 |
| KR | 10-2016-0092363 A | 8/2016 |
| KR | 10-2016-0141847 A | 12/2016 |
| KR | 10-2017-0027435 A | 3/2017 |
| KR | 10-2017-0027999 A | 3/2017 |
| KR | 10-2017-0032471 A | 3/2017 |
| KR | 10-2017-0082022 A | 7/2017 |
| KR | 10-2017-0124954 A | 11/2017 |
| KR | 10-2018-0085931 A | 7/2018 |
| KR | 10-2019-0020850 A | 3/2019 |
| KR | 10-2019-0022883 A | 3/2019 |
| KR | 10-2011177 | 8/2019 |
| KR | 10-2020-0039030 A | 4/2020 |
| TW | 201012152 A | 3/2010 |
| TW | 201215086 A | 4/2012 |
| TW | M474482 U | 3/2014 |
| TW | 201509168 A | 3/2015 |
| WO | 2007/008321 A2 | 1/2007 |
| WO | 2007/105937 A1 | 9/2007 |
| WO | 2007/142703 A1 | 12/2007 |
| WO | 2007/149731 A1 | 12/2007 |
| WO | 2008/027924 A2 | 3/2008 |
| WO | 2008/030976 A2 | 3/2008 |
| WO | 2008/051472 A1 | 5/2008 |
| WO | 2009/005563 A1 | 1/2009 |
| WO | 2009/010827 A2 | 1/2009 |
| WO | 2009/067670 A1 | 5/2009 |
| WO | 2009/086599 A1 | 7/2009 |
| WO | 2009/137419 A2 | 11/2009 |
| WO | 2009/140095 A2 | 11/2009 |
| WO | 2010/087988 A1 | 8/2010 |
| WO | 2011/063516 A1 | 6/2011 |
| WO | 2012/004288 A1 | 1/2012 |
| WO | 2012/104288 A1 | 8/2012 |
| WO | 2012/166352 A1 | 12/2012 |
| WO | 2012/172970 A1 | 12/2012 |
| WO | 2013/049346 A1 | 4/2013 |
| WO | 2013/153405 A2 | 10/2013 |
| WO | 2013/169849 A2 | 11/2013 |

(56) References Cited

FOREIGN PATENT DOCUMENTS

| | | |
|---|---|---|
| WO | 2013/169875 A2 | 11/2013 |
| WO | 2014/018242 A1 | 1/2014 |
| WO | 2014/030320 A1 | 2/2014 |
| WO | 2014/092980 A1 | 6/2014 |
| WO | 2014/105276 A1 | 7/2014 |
| WO | 2014/107469 A2 | 7/2014 |
| WO | 2014/113987 A1 | 7/2014 |
| WO | 2014/143776 A2 | 9/2014 |
| WO | 2014/151089 A1 | 9/2014 |
| WO | 2014/171734 A2 | 10/2014 |
| WO | 2014/204960 A1 | 12/2014 |
| WO | 2015/061831 A1 | 5/2015 |
| WO | 2015/065402 A1 | 5/2015 |
| WO | 2015/076930 A1 | 5/2015 |
| WO | 2015/102572 A1 | 7/2015 |
| WO | 2015/124831 A1 | 8/2015 |
| WO | 2015/134692 A1 | 9/2015 |
| WO | 2015/185123 A1 | 12/2015 |
| WO | 2016/022203 A1 | 2/2016 |
| WO | 2016/022205 A1 | 2/2016 |
| WO | 2016/033400 A1 | 3/2016 |
| WO | 2016/036472 A1 | 3/2016 |
| WO | 2016/036541 A2 | 3/2016 |
| WO | 2016/040405 A1 | 3/2016 |
| WO | 2016/057117 A1 | 4/2016 |
| WO | 2016/200603 A1 | 12/2016 |
| WO | 2016/204186 A1 | 12/2016 |
| WO | 2017/058442 A1 | 4/2017 |
| WO | 2017/062621 A1 | 4/2017 |
| WO | 2017/112003 A1 | 6/2017 |
| WO | 2017/173155 A1 | 10/2017 |
| WO | 2017/218143 A1 | 12/2017 |
| WO | 2017/218192 A1 | 12/2017 |
| WO | 2017/218199 A1 | 12/2017 |
| WO | 2018/032085 A1 | 2/2018 |
| WO | 2018/048510 A1 | 3/2018 |
| WO | 2018/084802 A1 | 5/2018 |
| WO | 2018/098136 A1 | 5/2018 |
| WO | 2018/213401 A1 | 11/2018 |
| WO | 2018/213415 A1 | 11/2018 |
| WO | 2018/213844 A1 | 11/2018 |
| WO | 2018/232333 A1 | 12/2018 |
| WO | 2019/173136 | 9/2019 |
| WO | 2019/200350 A1 | 10/2019 |
| WO | 2019/217086 A2 | 11/2019 |
| WO | 2020/063762 A1 | 4/2020 |
| WO | 2021/010933 A1 | 1/2021 |

OTHER PUBLICATIONS

Advisory Action received for U.S. Appl. No. 13/038,217, mailed on Dec. 8, 2014, 3 pages.
Advisory Action received for U.S. Appl. No. 14/863,099, mailed on Sep. 8, 2016, 3 pages.
Advisory Action received for U.S. Appl. No. 15/730,610, mailed on Oct. 24, 2019, 5 pages.
Advisory Action received for U.S. Appl. No. 16/583,989, mailed on Sep. 22, 2020, 5 pages.
Akshay, "Control your SmartThings compatible devices on the Gear S2 and S3 with the Smarter Things app", Online available at: https://iotgadgets.com/2017/09/control-smartthings-compatible-devices-gear-s2-s3-smarter-things-app/, Sep. 7, 2017, 4 pages.
Alba Davey, "Samsung Shape: for $400, Your Music Can Follow You Around the House", Online available at: https://www.popularmechanics.com/technology/audio/a9536/samsung-shape-for-400-your-music-can-follow-you-aroundnd-15997831/, Oct. 3, 2013, 5 pages.
Androidcentral, "How do I respond to group messages from notification bar?", Available online at: https://forums.androidcentral.com/ask-question/952030-how-do-i-respond-group-messages-notification-bar.html, Mar. 25, 2019, 3 pages.
Apple, "iPhone User's Guide", iPhone first generation, Available at: <http://pocketpccentral.net/iphone/products/1 g_iphone.htm>,, Jun. 29, 2007, 124 pages.
Applicant-Initiated Interview Summary received for U.S. Appl. No. 16/583,989, mailed on Aug. 3, 2020, 6 pages.
Applicant-Initiated Interview Summary received for U.S. Appl. No. 16/583,989, mailed on Mar. 25, 2020, 4 pages.
Applicant-Initiated Interview Summary received for U.S. Appl. No. 16/583,994, mailed on Apr. 3, 2020, 5 pages.
Applicant-Initiated Interview Summary received for U.S. Appl. No. 16/584,490, mailed on Jul. 28, 2020, 4 pages.
Applicant-Initiated Interview Summary received for U.S. Appl. No. 16/702,968, mailed on Jul. 1, 2020, 5 pages.
Applicant-Initiated Interview Summary received for U.S. Appl. No. 17/176,908, mailed on Jun. 14, 2022, 6 pages.
Applicant-Initiated Interview Summary received for U.S. Appl. No. 17/188,228, mailed on Jun. 14, 2022, 9 pages.
Applicant-Initiated Interview Summary received for U.S. Appl. No. 15/730,610, mailed on Aug. 25, 2020, 6 pages.
Applicant-Initiated Interview Summary received for U.S. Appl. No. 15/910,263, mailed on Nov. 18, 2020, 6 pages.
Applicant-Initiated Interview Summary received for U.S. Appl. No. 16/144,264, mailed on Jul. 22, 2020, 5 pages.
Applicant-Initiated Interview Summary received for U.S. Appl. No. 16/147,523, mailed on Apr. 27, 2020, 3 pages.
Applicant-Initiated Interview Summary received for U.S. Appl. No. 16/147,523, mailed on Dec. 10, 2021, 4 pages.
Applicant-Initiated Interview Summary received for U.S. Appl. No. 16/147,523, mailed on Jun. 13, 2022, 4 pages.
Applicant-Initiated Interview Summary received for U.S. Appl. No. 16/147,523, mailed on Oct. 26, 2020, 3 pages.
Applicant-Initiated Interview Summary received for U.S. Appl. No. 16/147,523, mailed on Sep 14, 2021, 3 pages.
Applicant-Initiated Interview Summary received for U.S. Appl. No. 16/259,954, mailed on Mar. 23, 2020, 3 pages.
Applicant-Initiated Interview Summary received for U.S. Appl. No. 16/281,838, mailed on Jun. 2, 2020, 5 pages.
Applicant-Initiated Interview Summary received for U.S. Appl. No. 16/583,981, mailed on Mar. 9, 2020, 5 pages.
Applicant-Initiated Interview Summary received for U.S. Appl. No. 16/583,981, mailed on Sep. 14, 2020, 6 pages.
Applicant-Initiated Interview Summary received for U.S. Appl. No. 16/583,994, mailed on May 28, 2021, 5 pages.
Applicant-Initiated Interview Summary received for U.S. Appl. No. 16/583,994, mailed on Nov. 24, 2020, 4 pages.
Applicant-Initiated Interview Summary received for U.S. Appl. No. 16/584,490, mailed on Jan. 31, 2020, 4 pages.
Applicant-Initiated Interview Summary received for U.S. Appl. No. 16/653,857, mailed on Dec. 14, 2020, 3 pages.
Applicant-Initiated Interview Summary received for U.S. Appl. No. 16/653,857, mailed on May 3, 2021, 4 pages.
Applicant-Initiated Interview Summary received for U.S. Appl. No. 16/679,967, mailed on Feb. 10, 2022, 2 pages.
Applicant-Initiated Interview Summary received for U.S. Appl. No. 16/679,967, mailed on Jun. 1, 2022, 2 pages.
Applicant-Initiated Interview Summary received for U.S. Appl. No. 16/679,967, mailed on Oct. 25, 2021, 2 pages.
Applicant-Initiated Interview Summary received for U.S. Appl. No. 16/702,968, mailed on Sep. 28, 2020, 6 pages.
Applicant-Initiated Interview Summary received for U.S. Appl. No. 16/723,583, mailed on Dec. 28, 2020, 6 pages.
Applicant-Initiated Interview Summary received for U.S. Appl. No. 16/749,929, mailed on Oct. 13, 2020, 4 pages.
Applicant-Initiated Interview Summary received for U.S. Appl. No. 16/803,849, mailed on Aug. 21, 2020, 5 pages.
Applicant-Initiated Interview Summary received for U.S. Appl. No. 16/803,849, mailed on Dec. 21, 2020, 5 pages.
Applicant-Initiated Interview Summary received for U.S. Appl. No. 16/803,849, mailed on Feb. 28, 2022, 9 pages.
Applicant-Initiated Interview Summary received for U.S. Appl. No. 16/803,849, mailed on Oct. 12, 2021, 6 pages.
Applicant-Initiated Interview Summary received for U.S. Appl. No. 16/807,604, mailed on Dec. 21, 2020, 7 pages.

(56) References Cited

OTHER PUBLICATIONS

Applicant-Initiated Interview Summary received for U.S. Appl. No. 16/807,604, mailed on Jul. 24, 2020, 5 pages.
Applicant-Initiated Interview Summary received for U.S. Appl. No. 16/836,571, mailed on Jul. 7, 2021, 6 pages.
Applicant-Initiated Interview Summary received for U.S. Appl. No. 16/922,675, mailed on Dec. 16, 2020, 3 pages.
Applicant-Initiated Interview Summary received for U.S. Appl. No. 16/922,675, mailed on Nov. 2, 2020, 3 pages.
Applicant-Initiated Interview Summary received for U.S. Appl. No. 16/922,675, mailed on Nov. 15, 2022, 2 pages.
Applicant-Initiated Interview Summary received for U.S. Appl. No. 16/922,675, mailed on Sep. 3, 2021, 2 pages.
Applicant-Initiated Interview Summary received for U.S. Appl. No. 17/013,778, mailed on Feb. 28, 2022, 2 pages.
Applicant-Initiated Interview Summary received for U.S. Appl. No. 17/026,818, mailed on Dec. 15, 2020, 7 pages.
Applicant-Initiated Interview Summary received for U.S. Appl. No. 17/026,818, mailed on Mar. 8, 2021, 4 pages.
Applicant-Initiated Interview Summary received for U.S. Appl. No. 17/031,833, mailed on Dec. 21, 2020, 5 pages.
Applicant-Initiated Interview Summary received for U.S. Appl. No. 17/031,833, mailed on May 24, 2021, 6 pages.
Applicant-Initiated Interview Summary received for U.S. Appl. No. 17/041,350, mailed on Aug. 18, 2021, 2 pages.
Applicant-Initiated Interview Summary received for U.S. Appl. No. 17/041,350, mailed on Feb. 2, 2022, 2 pages.
Applicant-Initiated Interview Summary received for U.S. Appl. No. 17/168,069, mailed on Nov. 17, 2021, 2 pages.
Applicant-Initiated Interview Summary received for U.S. Appl. No. 17/188,228, mailed on Sep. 23, 2022, 2 pages.
Applicant-Initiated Interview Summary received for U.S. Appl. No. 17/223,794, mailed on Sep. 7, 2021, 3 pages.
Applicant-Initiated Interview Summary received for U.S. Appl. No. 17/314,948, mailed on Oct. 21, 2022, 6 pages.
Applicant-Initiated Interview Summary received for U.S. Appl. No. 17/410,169, mailed on Nov. 7, 2022, 5 pages.
Applicant-Initiated Interview Summary received for U.S. Appl. No. 17/461,103, mailed on Jan. 26, 2022, 6 pages.
Applicant-Initiated Interview Summary received for U.S. Appl. No. 17/476,404, mailed on Dec. 20, 2022, 2 pages.
Applicant-Initiated Interview Summary received for U.S. Appl. No. 17/476,404, mailed on Jul. 27, 2022, 6 pages.
Applicant-Initiated Interview Summary received for U.S. Appl. No. 17/476,404, mailed on Mar. 18, 2022, 2 pages.
Applicant-Initiated Interview Summary received for U.S. Appl. No. 17/509,356, mailed on Feb. 3, 2023, 3 pages.
Axiang's Network Notebook, Deep Analysis on Samsung's 2013 New Flagship: tell you what kind of mobile phone Galaxy S4 is!, available at: https://axiang.cc/archives/6115, Apr. 22, 2013, 4 pages.
Baar Marius, "Fitbit Ace—Unboxing, Setup and 24-Hour Test", YouTube [online] [video], Retrieved from: <https://youtu.be/ekvkfqOyrls>.See especially 4:44., Oct. 24, 2018, 3 pages.
Bennett Stephen, "ES2: Logic's Most Sophisticated Virtual Analogue Synth", Logic Notes & Techniques, Jun. 2007, 6 pages.
Board Decision received for Chinese Patent Application No. 201580046788.2, mailed on Jun. 6, 2022, 17 pages.
Board Opinion received for Chinese Patent Application No. 201580046788.2, mailed on Dec. 29, 2021, 10 pages.
Boxer David, "Change the permissions of the Google Drive file or folder or Share the file or folder", Blake School Website, Online Available at: https://support.blakeschool.org/hc/en-us/articles/231790648-Change-the-permissions-of-the-Google-Drive-file-or-folder-or-Share-the-file-or-folder, Oct. 31, 2016, 2 pages.
Brief Communication Regarding Oral Proceedings received for European Patent Application No. 15760008.1, mailed on Sep. 13, 2021, 8 pages.
Brief Communication regarding Oral Proceedings received for European Patent Application No. 17184710.6, mailed on Feb. 19, 2020, 2 pages.
Brief Communication regarding Oral Proceedings received for European Patent Application No. 17184710.6, mailed on Mar. 9, 2020, 2 pages.
Brief Communication Regarding Oral Proceedings received for European Patent Application No. 18197583.0, mailed on Feb. 18, 2021, 2 pages.
Brief Communication Regarding Oral Proceedings received for European Patent Application No. 18728002.9, mailed on Dec. 7, 2022, 1 page.
Brief Communication Regarding Oral Proceedings received for European Patent Application No. 18728002.9, mailed on Nov. 28, 2022, 7 pages.
Brief Communication Regarding Oral Proceedings received for European Patent Application No. 20158824.1, mailed on May 30, 2022, 1 page.
Brief Communication Regarding Oral Proceedings received for European Patent Application No. 20192404.0, mailed on May 4, 2022, 3 pages.
Brief Communication Regarding Oral Proceedings received for European Patent Application No. 20192404.0, mailed on May 18, 2022, 1 page.
Call Me, "Samsung R3 speaker gives you a delicious 360-degree sound experience—with WiFi and Bluetooth | Call me", 0:24 / 3:22, Available Online at: <https://www.youtube.com/watch?v=4Uv_sOhrlro>, Sep. 22, 2016, 3 pages.
Chenzai, "Apple, please don't screw up notifications on the Apple Watch", Available online at: https://digi.tech.qq.com/a/20140918/060747.htm. also published on the English webpage https://www.theverge.com/2014/9/9/6127913/apple-please-dont-screw-up-notifications-on-the-apple-watch, Sep. 18, 2014, 8 pages.
Cohn Emily, "Sonos Just Fixed the Most Annoying Thing About Its iPhone App", online available at https://www.businessinsider.com/sonos-mobile-app-works-on-lock-screen-2016-6, Jun. 27, 2016, 2 pages.
Computeradv, "Sonos App Navigation & Menu on iPhone", Available online at: https://www.youtube.com/watch?v=Jhz9XvWQ204, Aug. 4, 2015, 1 page.
Corrected Notice of Allowance received for U.S. Appl. No. 14/641,251, mailed on Jun. 17, 2016, 2 pages.
Corrected Notice of Allowance received for U.S. Appl. No. 14/839,897, mailed on Jan. 23, 2019, 6 pages.
Corrected Notice of Allowance received for U.S. Appl. No. 14/839,903, mailed on Feb. 13, 2019, 2 pages.
Corrected Notice of Allowance received for U.S. Appl. No. 14/839,903, mailed on Mar. 1, 2019, 2 pages.
Corrected Notice of Allowance received for U.S. Appl. No. 14/841,614, mailed on Jan. 8, 2019, 3 pages.
Corrected Notice of Allowance received for U.S. Appl. No. 15/268,115, mailed on Apr. 13, 2018, 11 pages.
Corrected Notice of Allowance received for U.S. Appl. No. 15/268,115, mailed on Mar. 21, 2018, 9 pages.
Corrected Notice of Allowance received for U.S. Appl. No. 15/730,610, mailed on Nov. 27, 2020, 3 pages.
Corrected Notice of Allowance received for U.S. Appl. No. 15/910,263, mailed on Feb. 10, 2021, 3 pages.
Corrected Notice of Allowance received for U.S. Appl. No. 15/910,263, mailed on Mar. 17, 2021, 3 pages.
Corrected Notice of Allowance received for U.S. Appl. No. 15/910,263, mailed on Mar. 18, 2021, 3 pages.
Corrected Notice of Allowance received for U.S. Appl. No. 16/281,838, mailed on Oct. 30, 2020, 2 pages.
Corrected Notice of Allowance received for U.S. Appl. No. 16/583,981, mailed on Apr. 6, 2021, 3 pages.
Corrected Notice of Allowance received for U.S. Appl. No. 16/583,981, mailed on May 17, 2021, 3 pages.
Corrected Notice of Allowance received for U.S. Appl. No. 16/583,994, mailed on Jul. 6, 2021, 3 pages.
Corrected Notice of Allowance received for U.S. Appl. No. 16/702,968, mailed on Jun. 8, 2021, 3 pages.
Corrected Notice of Allowance received for U.S. Appl. No. 16/702,968, mailed on Jun. 16, 2021, 4 pages.
Corrected Notice of Allowance received for U.S. Appl. No. 16/702,968, mailed on Jun. 28, 2021, 4 pages.

(56) References Cited

OTHER PUBLICATIONS

Corrected Notice of Allowance received for U.S. Appl. No. 16/702,968, mailed on May 26, 2021, 4 pages.
Corrected Notice of Allowance received for U.S. Appl. No. 16/702,968, mailed on May 28, 2021, 4 pages.
Corrected Notice of Allowance received for U.S. Appl. No. 16/803,849, mailed on Jul. 7, 2022, 3 pages.
Corrected Notice of Allowance received for U.S. Appl. No. 16/803,849, mailed on Jun. 8, 2022, 3 pages.
Corrected Notice of Allowance received for U.S. Appl. No. 16/807,604, mailed on Jul. 26, 2021, 3 pages.
Corrected Notice of Allowance received for U.S. Appl. No. 16/807,604, mailed on Jun. 28, 2021, 3 pages.
Corrected Notice of Allowance received for U.S. Appl. No. 16/807,604, mailed on May 28, 2021, 3 pages.
Corrected Notice of Allowance received for U.S. Appl. No. 16/807,604, mailed on Oct. 4, 2021, 5 pages.
Corrected Notice of Allowance received for U.S. Appl. No. 16/807,604, mailed on Oct. 14, 2021, 3 pages.
Corrected Notice of Allowance received for U.S. Appl. No. 16/807,604, mailed on Oct. 22, 2021, 3 pages.
Corrected Notice of Allowance received for U.S. Appl. No. 16/836,571, mailed on Dec. 6, 2021, 5 pages.
Corrected Notice of Allowance received for U.S. Appl. No. 16/836,571, mailed on Mar. 25, 2022, 2 pages.
Corrected Notice of Allowance received for U.S. Appl. No. 16/836,571, mailed on Nov. 4, 2021, 4 pages.
Corrected Notice of Allowance received for U.S. Appl. No. 16/836,571, mailed on Nov. 18, 2021, 3 pages.
Corrected Notice of Allowance received for U.S. Appl. No. 16/836,571, mailed on Oct. 12, 2021, 4 pages.
Corrected Notice of Allowance received for U.S. Appl. No. 16/922,675, mailed on Jan. 9, 2023, 3 pages.
Corrected Notice of Allowance received for U.S. Appl. No. 16/922,675, mailed on Jan. 20, 2023, 3 pages.
Corrected Notice of Allowance received for U.S. Appl. No. 16/922,675, mailed on Mar. 4, 2022, 6 pages.
Corrected Notice of Allowance received for U.S. Appl. No. 17/013,778, mailed on Mar. 7, 2023, 5 pages.
Corrected Notice of Allowance received for U.S. Appl. No. 17/027,373, mailed on Jul. 12, 2022, 2 pages.
Corrected Notice of Allowance received for U.S. Appl. No. 17/027,373, mailed on Oct. 26, 2022, 2 pages.
Corrected Notice of Allowance received for U.S. Appl. No. 17/031,833, mailed on Aug. 2, 2021, 3 pages.
Corrected Notice of Allowance received for U.S. Appl. No. 17/041,350, mailed on Apr. 4, 2022, 3 pages.
Corrected Notice of Allowance received for U.S. Appl. No. 17/041,350, mailed on Mar. 15, 2022, 3 pages.
Corrected Notice of Allowance received for U.S. Appl. No. 17/168,069, mailed on Feb. 9, 2022, 2 pages.
Corrected Notice of Allowance received for U.S. Appl. No. 17/461,103, mailed on Apr. 14, 2022, 2 pages.
Corrected Notice of Allowance received for U.S. Appl. No. 17/461,103, mailed on Aug. 3, 2022, 2 pages.
Corrected Notice of Allowance received for U.S. Appl. No. 17/461,103, mailed on May 10, 2022, 2 pages.
Corrected Notice of Allowance received for U.S. Appl. No. 17/509,356, mailed on Jun. 13, 2023, 2 pages.
Corrected Notice of Allowance received for U.S. Appl. No. 17/509,356, mailed on May 24, 2023, 2 pages.
Crutnacker, "Amazon Echo Tips and Tricks: Playing Music Demonstration", Available Online at: https://www.youtube.com/watch?v=W_bqq2ynUII, Nov. 4, 2015, 1 page.
Customize Notifications and Content on Your Galaxy Phone's Lock Screen, Online Available at: https://www.samsung.com/us/support/answer/ANS00062636, Oct. 4, 2017, 5 pages.
Decision on Appeal received for U.S. Appl. No. 14/774,664, mailed on Sep. 12, 2019, 8 pages.
Decision on Appeal received for U.S. Appl. No. 14/863,099, mailed on Aug. 22, 2019, 9 pages.
Decision to Grant received for Danish Patent Application No. PA201570664, mailed on Feb. 20, 2017, 2 pages.
Decision to grant received for Danish Patent Application No. PA201570788, mailed on Jul. 10, 2017, 2 pages.
Decision to Grant received for Danish Patent Application No. PA201570791, mailed on Jun. 7, 2017, 2 pages.
Decision to Grant received for Danish Patent Application No. PA201770392, mailed on Oct. 24, 2018, 2 pages.
Decision to Grant received for Danish Patent Application No. PA201770401, mailed on Oct. 24, 2018, 2 pages.
Decision to Grant received for Danish Patent Application No. PA201770403, mailed on Oct. 24, 2018, 2 pages.
Decision to Grant received for Danish Patent Application No. PA201770404, mailed on Nov. 11, 2019, 3 pages.
Decision to Grant received for Danish Patent Application No. PA201770406, mailed on May 15, 2020, 2 pages.
Decision to Grant received for Danish Patent Application No. PA202070560, mailed on Oct. 21, 2021, 2 pages.
Decision to Grant received for Danish Patent Application No. PA202070609, mailed on May 3, 2021, 2 pages.
Decision to Grant received for Danish Patent Application No. PA202170320, mailed on Nov. 10, 2022, 2 pages.
Decision to Grant received for European Patent Application No. 15712218.5, mailed on Jun. 7, 2018, 2 pages.
Decision to Grant received for European Patent Application No. 15760008.1, mailed on Aug. 11, 2022, 2 pages.
Decision to Grant received for European Patent Application No. 15787091.6, mailed on Dec. 3, 2020, 2 pages.
Decision to Grant received for European Patent Application No. 18197583.0, mailed on Feb. 3, 2022, 3 pages.
Decision to Grant received for European Patent Application No. 18197589.7, mailed on Jun. 10, 2021, 2 pages.
Decision to Grant received for European Patent Application No. 19207753.5, mailed on Jun. 2, 2022, 3 pages.
Decision to Grant received for European Patent Application No. 20158824.1, mailed on Dec. 15, 2022, 3 pages.
Decision to Refuse received for European Patent Application No. 17184710.6, mailed on Jun. 16, 2020, 9 pages.
Decision to Refuse received for European Patent Application No. 20192404.0, mailed on Jun. 14, 2022, 15 pages.
Detroitborg, ""Apple Music: Walkthrough"", YouTube Video, online available at: "https://www.youtube.com/watch?v=NLgjodiAtbQ", Jun. 30, 2015, 1 page.
Dharmasena Anusha, "iMessage-send as text message Option", YouTube, Available online at: <https://www.youtube.com/watch?v=hXG-MdIW6FA>, Feb. 18, 2013, 1 page.
European Search Report received for European Patent Application No. 20192404.0, mailed on Nov. 20, 2020, 4 pages.
Examiner-Initiated Interview Summary received for U.S. Appl. No. 17/027,373, mailed on Mar. 31, 2022, 4 pages.
Examiner's Answer to Appeal Brief received for U.S. Appl. No. 14/774,664, mailed on May 31, 2018, 28 pages.
Examiner's Answer to Appeal Brief received for U.S. Appl. No. 14/863,099, mailed on Jul. 28, 2017, 31 pages.
Examiner's Answer to Appeal Brief received for U.S. Appl. No. 17/013,778, mailed on Dec. 20, 2022, 9 pages.
Extended European Search Report (includes Supplementary European Search Report and Search Opinion) received for European Patent Application No. 17184710.6, mailed on Nov. 28, 2017, 10 pages.
Extended European Search Report received for European Patent Application No. 18197583.0, mailed on Jun. 4, 2019, 20 pages.
Extended European Search Report received for European Patent Application No. 18197589.7, mailed on Jan. 7, 2019, 9 pages.
Extended European Search Report received for European Patent Application No. 19207753.5, mailed on Dec. 18, 2019, 9 pages.
Extended European Search Report received for European Patent Application No. 20158824.1, mailed on Aug. 10, 2020, 13 pages.
Extended European Search Report received for European Patent Application No. 21197457.1, mailed on Nov. 15, 2021, 8 pages.

(56) References Cited

OTHER PUBLICATIONS

Extended European Search Report received for European Patent Application No. 22169639.6, mailed on Jul. 19, 2022, 14 pages.
Extended European Search Report received for European Patent Application No. 22195584.2, mailed on Jan. 5, 2023, 13 pages.
Extended European Search Report received for European Patent Application No. 22201007.6, mailed on Jan. 12, 2023, 7 pages.
Farmboyreef, "Apple watch controlling your tv", Available online at: https://www.youtube.com/watch?v=xaJPG0Wm3Tg, Jun. 23, 2015, 3 pages.
Final Office Action received for U.S. Appl. No. 13/038,217, mailed on May 6, 2014, 11 pages.
Final Office Action received for U.S. Appl. No. 13/489,245, mailed on Mar. 28, 2014, 23 pages.
Final Office Action received for U.S. Appl. No. 13/489,245, mailed on Oct. 16, 2019, 25 pages.
Final Office Action received for U.S. Appl. No. 13/489,245, mailed on Sep. 27, 2018, 25 pages.
Final Office Action received for U.S. Appl. No. 14/774,664, mailed on Aug. 25, 2017, 23 pages.
Final Office Action received for U.S. Appl. No. 14/839,897, mailed on Jan. 10, 2018, 16 pages.
Final Office Action received for U.S. Appl. No. 14/841,614, mailed on May 10, 2018, 13 pages.
Final Office Action received for U.S. Appl. No. 14/841,623, mailed on Sep. 5, 2017, 16 pages.
Final Office Action received for U.S. Appl. No. 14/863,099, mailed on Apr. 21, 2016, 20 pages.
Final Office Action received for U.S. Appl. No. 15/268,115, mailed on Oct. 11, 2017, 48 pages.
Final Office Action received for U.S. Appl. No. 15/730,610, mailed on Aug. 6, 2019, 28 pages.
Final Office Action received for U.S. Appl. No. 15/910,263, mailed on Aug. 28, 2019, 32 pages.
Final Office Action received for U.S. Appl. No. 16/147,523, mailed on Aug. 4, 2020, 15 pages.
Final Office Action received for U.S. Appl. No. 16/147,523, mailed on Oct. 14, 2021, 22 pages.
Final Office Action received for U.S. Appl. No. 16/583,981, mailed on Apr. 16, 2020, 19 pages.
Final Office Action received for U.S. Appl. No. 16/583,989, mailed on Jul. 10, 2020, 23 pages.
Final Office Action received for U.S. Appl. No. 16/583,994, mailed on Jul. 23, 2020, 16 pages.
Final Office Action received for U.S. Appl. No. 16/584,490, mailed on May 1, 2020, 48 pages.
Final Office Action received for U.S. Appl. No. 16/653,857, mailed on Feb. 10, 2021, 43 pages.
Final Office Action received for U.S. Appl. No. 16/679,967, mailed on Nov. 10, 2021, 14 pages.
Final Office Action received for U.S. Appl. No. 16/702,968, mailed on Jul. 27, 2020, 21 pages.
Final Office Action received for U.S. Appl. No. 16/723,583, mailed on Feb. 5, 2021, 15 pages.
Final Office Action received for U.S. Appl. No. 16/803,849, mailed on Nov. 2, 2021, 37 pages.
Final Office Action received for U.S. Appl. No. 16/803,849, mailed on Sep. 24, 2020, 29 pages.
Final Office Action received for U.S. Appl. No. 16/807,604, mailed on Aug. 19, 2020, 35 pages.
Final Office Action received for U.S. Appl. No. 16/922,675, mailed on Dec. 3, 2020, 21 pages.
Final Office Action received for U.S. Appl. No. 16/922,675, mailed on Nov. 30, 2020, 12 pages.
Final Office Action received for U.S. Appl. No. 17/013,778, mailed on Apr. 1, 2022, 11 pages.
Final Office Action received for U.S. Appl. No. 17/026,818, mailed on Jan. 29, 2021, 21 pages.
Final Office Action received for U.S. Appl. No. 17/031,833, mailed on Jan. 26, 2021, 17 pages.
Final Office Action received for U.S. Appl. No. 17/041,350, mailed on Sep. 17, 2021, 25 pages.
Final Office Action received for U.S. Appl. No. 17/188,228, mailed on Jul. 6, 2022, 13 pages.
Final Office Action received for U.S. Appl. No. 17/314,948, mailed on Mar. 7, 2023, 31 pages.
Final Office Action received for U.S. Appl. No. 17/410,169, mailed on Feb. 6, 2023, 47 pages.
Final Office Action received for U.S. Appl. No. 17/476,404, mailed on May 5, 2022, 30 pages.
Final Office Action received for U.S. Appl. No. 14/839,903, mailed on Sep. 18, 2018, 11 pages.
Final Office Action received for U.S. Appl. No. 15/135,328 mailed on Nov. 9, 2018, 55 pages.
Fingas Jon, "Sonos Puts Speaker Controls On Your iPhone's Lock Screen", online available at https://www.engadget.com/2016-06-21-sonos-ios-lock-screen-controls.html, Jun. 21, 2016, 3 pages.
Finkelstein Ellen, "Temporarily Override Object Snap Settings", AutoCAD Tips Blog, Apr. 9, 2007, 4 pages.
Franks Tech Help, "DSLR Camera Remote Control on Android Tablet, DSLR Dashboard, Nexus 10, Canon Camera, OTG Host Cable", Available online at: https://www.youtube.com/watch?v=DD4dCVinreU, Dec. 10, 2013, 1 page.
Free Virtual Classic Analogue Mono Synth, Samsara Cycle Audio Releases DEISK-O, Jan. 2, 2011, 3 pages.
Fuji Film, "Taking Pictures Remotely: Free iPhone/Android App Fuji Film Camera Remote", Available at <http://app.fujifilm-dsc.com/en/camera_remote/guide05.html>, Apr. 22, 2014, 3 pages.
Gil Lory, "How to control Apple TV with your Apple Watch", Available online at: https://www.imore.com/how-control-your-apple-tv-remote-app%ADapple-watch], Jun. 6, 2016, 24 pages.
Google, "Google Home Help, Listen to music", Datasheet [online], Available Online at: <https://web.archive.org/web/20170326051235/https:/support.google.com/googlehome/answer/7030379?hl=en&ref_topic=7030084>, Mar. 26, 2017, 3 pages.
Gookin Dan, "Lock Screen Settings on Your Android Phone", Online Available at: https://www.dummies.com/consumer-electronics/smartphones/droid/lock-screen-settings-on-your-android-phone/, Sep. 23, 2015, 6 pages.
GT-19500(Galaxy S4) User Manual, Samsung, Rev.1.1, http://org.downloadcenter.samsung.com/downloadfile/ContentsFile.aspx?CDSite=UNI_TW&CttFileID=5406113&CDCttType=UM&ModelType=N&ModelName=GTI9500&VPath=UM/201305/20130520173017063/GTI9500_UM_Open_Taiwan_Jellybean_Chi_Rev.1.1_130520.pdf., May 2013, 14 pages.
Hobbyistsoftwareltd,"VLC Remote", Online available at: https://watchaware.com/watch-apps/297244048, 2016, 7 pages.
Hoffberger Chase, "Spotify's Collaborative Playlists Let Friends Listen Together", Evolver.fm, available online at http://www.evolver.fm/2011/08/22/spotify-collaborative-playlists/, Aug. 22, 2011, 4 pages.
Howcast, "How to Create and Edit Playlists on iPhone", Youtube, Available online at: https://www.youtube.com/watch?v=YPOnKUvcso4, Mar. 13, 2014, 3 pages.
Intention to Grant received for Danish Patent Application No. PA201570773, mailed on Mar. 9, 2018, 2 pages.
Intention to Grant received for Danish Patent Application No. PA201570788, mailed on Mar. 27, 2017, 2 pages.
Intention to Grant received for Danish Patent Application No. PA201570791, mailed on Mar. 7, 2017, 2 pages.
Intention to Grant received for Danish Patent Application No. PA201770392, mailed on Aug. 31, 2018, 2 pages.
Intention to Grant received for Danish Patent Application No. PA201770392, mailed on Jul. 2, 2018, 2 pages.
Intention to Grant received for Danish Patent Application No. PA201770401, mailed on Jun. 14, 2018, 2 pages.
Intention to Grant received for Danish Patent Application No. PA201770401, mailed on Sep. 17, 2018, 2 pages.
Intention to Grant received for Danish Patent Application No. PA201770403, mailed on May 7, 2018, 2 pages.
Intention to Grant received for Danish Patent Application No. PA201770403, mailed on Oct. 3, 2018, 2 pages.
Intention to Grant received for Danish Patent Application No. PA201770404, mailed on Sep. 23, 2019, 3 pages.

(56) References Cited

OTHER PUBLICATIONS

Intention to Grant received for Danish Patent Application No. PA201770406, mailed on Feb. 6, 2020, 3 pages.
Intention to Grant received for Danish Patent Application No. PA201770408, mailed on Nov. 30, 2018, 3 pages.
Intention to Grant received for Danish Patent Application No. PA202070560, mailed on Apr. 26, 2021, 2 pages.
Intention to Grant received for Danish Patent Application No. PA202070609, mailed on Jan. 14, 2021, 2 pages.
Intention to Grant received for Danish Patent Application No. PA202070617, mailed on Nov. 15, 2021, 2 pages.
Intention to Grant received for Danish Patent Application No. PA202170320, mailed on Jul. 27, 2022, 2 pages.
Intention to Grant received for Danish Patent Application No. PA202270464, mailed on Feb. 20, 2023, 2 pages.
Intention to Grant received for European Patent Application No. 15712218.5, mailed on Jan. 24, 2018, 7 pages.
Intention to Grant received for European Patent Application No. 15760008.1, mailed on Apr. 6, 2022, 11 pages.
Intention to Grant received for European Patent Application No. 15760008.1, mailed on Oct. 5, 2021, 11 pages.
Intention to Grant received for European Patent Application No. 15787091.6, mailed on Apr. 23, 2020, 7 pages.
Intention to Grant received for European Patent Application No. 15787091.6, mailed on Sep. 30, 2020, 7 pages.
Intention to Grant received for European Patent Application No. 18197583.0, mailed on Jan. 17, 2022, 9 pages.
Intention to Grant received for European Patent Application No. 18197583.0, mailed on Jul. 23, 2021, 9 pages.
Intention to Grant received for European Patent Application No. 18197589.7, mailed on Jan. 21, 2021, 8 pages.
Intention to Grant received for European Patent Application No. 19207753.5, mailed on Jan. 28, 2022, 8 pages.
Intention to Grant received for European Patent Application No. 19207753.5, mailed on Sep. 3, 2021, 8 pages.
Intention to Grant received for European Patent Application No. 20158824.1, mailed on Aug. 11, 2022, 10 pages.
International Preliminary Report on Patentability received for PCT Patent Application No. PCT/US2012/025314, mailed on Sep. 12, 2013, 8 pages.
International Preliminary Report on Patentability received for PCT Patent Application No. PCT/US2014/027882, mailed on Sep. 24, 2015, 8 pages.
International Preliminary Report on Patentability received for PCT Patent Application No. PCT/US2015/019298, mailed on Mar. 16, 2017, 12 pages.
International Preliminary Report on Patentability received for PCT Patent Application No. PCT/US2015/041424, mailed on Feb. 2, 2017, 13 pages.
International Preliminary Report on Patentability received for PCT Patent Application No. PCT/US2015/047507, mailed on Mar. 16, 2017, 16 pages.
International Preliminary Report on Patentability received for PCT Patent Application No. PCT/US2015/055165, mailed on Sep. 21, 2017, 15 pages.
International Preliminary Report on Patentability received for PCT Patent Application No. PCT/US2016/016621, mailed on Aug. 24, 2017, 8 pages.
International Preliminary Report on Patentability received for PCT Patent Application No. PCT/US2018/032158, mailed on Nov. 21, 2019, 12 pages.
International Preliminary Report on Patentability received for PCT Patent Application No. PCT/US2018/032904, mailed on Nov. 21, 2019, 14 pages.
International Preliminary Report on Patentability received for PCT Patent Application No. PCT/US2019/024792, mailed on Dec. 17, 2020, 9 pages.
International Preliminary Report on Patentability received for PCT Patent Application No. PCT/US2020/026044, mailed on Dec. 9, 2021, 18 pages.
International Preliminary Report on Patentability received for PCT Patent Application No. PCT/US2020/031536, mailed on Nov. 18, 2021, 11 pages.
International Preliminary Report on Patentability received for PCT Patent Application No. PCT/US2020/035446, mailed on Dec. 9, 2021, 14 pages.
International Preliminary Report on Patentability received for PCT Patent Application No. PCT/US2020/035488, mailed on Dec. 9, 2021, 16 pages.
International Preliminary Report on Patentability received for PCT Patent Application No. PCT/US2021/031760, mailed on Nov. 24, 2022, 11 pages.
International Preliminary Report on Patentability received for PCT Patent Application No. PCT/US2015/046787, mailed on Mar. 16, 2017, 19 pages.
International Search Report and Written Opinion received for PCT Application No. PCT/US2015/047507, mailed on Feb. 22, 2016, 22 pages.
International Search Report and Written Opinion received for PCT Patent Application No. PCT/US2012/025314, mailed on May 14, 2012, 10 pages.
International Search Report and Written Opinion received for PCT Patent Application No. PCT/US2013/032498, mailed on Feb. 10, 2014, 18 pages.
International Search Report and Written Opinion received for PCT Patent Application No. PCT/US2014/027882, mailed on Oct. 10, 2014, 11 pages.
International Search Report and Written Opinion received for PCT Patent Application No. PCT/US2015/019298, mailed on Jul. 13, 2015, 17 pages.
International Search Report and Written Opinion received for PCT Patent Application No. PCT/US2015/041424, mailed on Mar. 31, 2016, 18 pages.
International Search Report and Written Opinion received for PCT Patent Application No. PCT/US2015/046787, mailed on Apr. 1, 2016, 26 pages.
International Search Report and Written Opinion received for PCT Patent Application No. PCT/US2015/055165, mailed on Apr. 20, 2016, 22 pages.
International Search Report and Written Opinion received for PCT Patent Application No. PCT/US2016/016621, mailed on May 9, 2016, 12 pages.
International Search Report and Written Opinion received for PCT Patent Application No. PCT/US2018/032158, mailed on Nov. 2, 2018, 19 pages.
International Search Report and Written Opinion received for PCT Patent Application No. PCT/US2018/032904, mailed on Oct. 1, 2018, 21 pages.
International Search Report and Written Opinion received for PCT Patent Application No. PCT/US2019/024792, mailed on Jul. 18, 2019, 13 pages.
International Search Report and Written Opinion received for PCT Patent Application No. PCT/US2020/026044, mailed on Sep. 9, 2020, 26 pages.
International Search Report and Written Opinion received for PCT Patent Application No. PCT/US2020/031536, mailed on Sep. 23, 2020, 16 pages.
International Search Report and Written Opinion received for PCT Patent Application No. PCT/US2020/035446, mailed on Nov. 10, 2020, 20 pages.
International Search Report and Written Opinion received for PCT Patent Application No. PCT/US2020/035488, mailed on Nov. 17, 2020, 21 pages.
International Search Report and Written Opinion received for PCT Patent Application No. PCT/US2021/031760, mailed on Sep. 16, 2021, 18 pages.
International Search Report and Written Opinion received for PCT Patent Application No. PCT/US2021/048358, mailed on Feb. 24, 2022, 21 pages.
International Search Report and Written Opinion received for PCT Patent Application No. PCT/US2022/031252, mailed on Oct. 7, 2022, 18 pages.

(56) References Cited

OTHER PUBLICATIONS

Invitation to Pay Addition Fees and Partial International Search Report received for PCT Patent Application No. PCT/US2018/032904, mailed on Jul. 31, 2018, 18 pages.
Invitation to Pay Additional Fees received for PCT Patent Application No. PCT/US2014/027882, mailed on Aug. 5, 2014, 2 pages.
Invitation to Pay Additional Fees received for PCT Patent Application No. PCT/US2015/041424, mailed on Nov. 12, 2015, 6 pages.
Invitation to Pay Additional Fees received for PCT Patent Application No. PCT/US2015/046787, mailed on Dec. 15, 2015, 8 pages.
Invitation to Pay Additional Fees received for PCT Patent Application No. PCT/US2015/047507, mailed on Jan. 4, 2016, 8 pages.
Invitation to Pay Additional Fees received for PCT Patent Application No. PCT/US2015/055165, mailed on Jan. 18, 2016, 6 pages.
Invitation to Pay Additional Fees received for PCT Patent Application No. PCT/US2018/032158, mailed on Sep. 10, 2018, 16 pages.
Invitation to Pay Additional Fees received for PCT Patent Application No. PCT/US2020/026044, mailed on Jun. 25, 2020, 12 pages.
Invitation to Pay Additional Fees received for PCT Patent Application No. PCT/US2020/031536, mailed on Jul. 31, 2020, 9 pages.
Invitation to Pay Additional Fees received for PCT Patent Application No. PCT/US2020/035446, mailed on Sep. 11, 2020, 12 pages.
Invitation to Pay Additional Fees received for PCT Patent Application No. PCT/US2020/035488, mailed on Sep. 23, 2020, 15 pages.
Invitation to Pay Additional Fees received for PCT Patent Application No. PCT/US2021/048358, mailed on Dec. 23, 2021, 14 pages.
Invitation to Pay Search Fees received for European Patent Application No. 15753796.0, mailed on Mar. 24, 2020, 3 pages.
Invitation to Pay Search Fees received for European Patent Application No. 18728002.9, mailed on Sep. 2, 2020, 8 pages.
Invitation to Pay Search Fees received for European Patent Application No. 18733381.0, mailed on Jun. 30, 2021, 4 pages.
Invitation to Pay Search Fees received for European Patent Application No. 20760624.5, mailed on Jan. 2, 2023, 3 pages.
Invitation to Pay Search Fees received for European Patent Application No. 21728781.2, mailed on Dec. 2, 2022, 3 pages.
Iphone, "User Guide for iOS 7.1 Software", Mar. 2014, 162 pages.
Itjungles, "iPhone 6: How to Pair with Another Bluetooth Device", Available Online at: https://www.youtube.com/watch?v=9setanYtHAk, Aug. 5, 2015, 3 pages.
Jarvie, "Alexa plays me music", Available online at: https://www.youtube.com/watch?v=bR2ZC8Sy8YQ, Feb. 23, 2015, 1 page.
Jean, "Our Pact Parental Control Review", Available online at: https://www.bewebsmart.com/parental-controls/our-pact-parental-control-review/, Jun. 25, 2016, 25 pages.
Kazmucha Allyson, "Sonos Controller App for iPhone and iPad Review", online available at https://www.imore.com/sonos-controller-app-iphone-and-ipad-review, Mar. 1, 2018, 4 pages.
Kim et al., "An Energy Efficient Transmission Scheme for Real-Time Data in Wireless Sensor Networks", Sensors, vol. 15, in Sensors 2015, May 20, 2015, 25 pages.
Klein Matt, "How to Add, Remove, and Rearrange Apps on the Apple Watch's Dock", Available online at: https://www.howtogeek.com/279796/how-to-add-remove-and-rearrange-apps-on-the-apple-watch%E2%80%99s-dock/, Nov. 18, 2016, 10 pages.
Locklear Mallory, "Samsung to bring SmartThings control to its Gear smartwatches", Online available at: https://www.engadget.com/2018-01-08-samsung-smartthings-app-gear-smartwatches.html, Jan. 8, 2018, 12 pages.
Low Cherlynn, "So you bought a smartwatch. Now what?", Online available at: https://www.engadget.com/2018-02-06-how-to-set-up-your-smartwatch.html, Feb. 6, 2018, 19 pages.
Minutes of Oral Proceedings received for European Patent Application No. 18728002.9, mailed on Dec. 22, 2022, 7 pages.
Minutes of the Oral Proceedings received for European Patent Application No. 15760008.1, mailed on Sep. 21, 2021, 6 pages.
Minutes of the Oral Proceedings received for European Patent Application No. 18197583.0, mailed on Mar. 9, 2021, 6 pages.
My Mate Vince, "Setting up the Fitbit Alta HR Activity Tracker on Apple iOS", Online available at: <https://youtu.be/FdwRF4lfvFc>, Jun. 18, 2017, 3 pages.
NBC News, "NBC News—YouTube Democratic Debate (full)", Online available at:—https://www.youtube.com/watch?v=ti2Nokoq1J4, Jan. 17, 2016, 1 page.
Nikolov Anton, "Design principle: Consistency", Available online at: https://uxdesign.cc/design-principle-consistency-6b0cf7e7339f, Apr. 8, 2017, 9 pages.
Non-Final Office Action received for U.S. Appl. No. 14/839,913, mailed on Mar. 2, 2016, 11 pages.
Non-Final Office Action received for U.S. Appl. No. 14/864,011, mailed on Jan. 21, 2016, 10 pages.
Non-Final Office Action received for U.S. Appl. No. 17/013,778, mailed on Aug. 20, 2021, 9 pages.
Non-Final Office Action received for U.S. Appl. No. 16/679,967, mailed on Sep. 2, 2021, 12 pages.
Non-Final Office Action received for U.S. Appl. No. 14/805,403, mailed on Nov. 16, 2017, 21 pages.
Non-Final Office Action received for U.S. Appl. No. 13/038,217, mailed on Sep. 13, 2013, 16 pages.
Non-Final Office Action received for U.S. Appl. No. 13/489,245, mailed on Apr. 8, 2019, 27 pages.
Non-Final Office Action received for U.S. Appl. No. 13/489,245, mailed on Dec. 27, 2017, 22 pages.
Non-Final Office Action received for U.S. Appl. No. 13/489,245, mailed on Nov. 20, 2013, 25 Pages.
Non-Final Office Action received for U.S. Appl. No. 14/774,664, mailed on Mar. 7, 2017, 23 pages.
Non-Final Office Action received for U.S. Appl. No. 14/839,897, mailed on May 18, 2017, 11 pages.
Non-Final Office Action received for U.S. Appl. No. 14/839,903, mailed on Feb. 26, 2018, 10 pages.
Non-Final Office Action received for U.S. Appl. No. 14/839,913, mailed on Jul 28, 2016, 12 pages.
Non-Final Office Action received for U.S. Appl. No. 14/841,608, mailed on Apr. 12, 2017, 9 Pages.
Non-Final Office Action received for U.S. Appl. No. 14/841,614, mailed on Jul. 27, 2017, 13 pages.
Non-Final Office Action received for U.S. Appl. No. 14/841,623, mailed on Feb. 2, 2017, 17 pages.
Non-Final Office Action received for U.S. Appl. No. 14/863,099, mailed on Dec. 2, 2015, 12 pages.
Non-Final Office Action received for U.S. Appl. No. 14/864,011, mailed on Jun. 10, 2016, 10 pages.
Non-Final Office Action received for U.S. Appl. No. 15/135,328, mailed on Apr. 11, 2018, 64 pages.
Non-Final Office Action received for U.S. Appl. No. 15/268,115, mailed on Apr. 13, 2017, 44 pages.
Non-Final Office Action received for U.S. Appl. No. 15/433,238, mailed on Nov. 3, 2017, 6 pages.
Non-Final Office Action received for U.S. Appl. No. 15/730,610, mailed on Apr. 15, 2020, 36 pages.
Non-Final Office Action received for U.S. Appl. No. 15/730,610, mailed on Feb. 1, 2019, 22 pages.
Non-Final Office Action received for U.S. Appl. No. 15/910,263, mailed on Jun. 15, 2020, 38 pages.
Non-Final Office Action received for U.S. Appl. No. 15/910,263, mailed on Mar. 4, 2019, 26 pages.
Non-Final Office Action received for U.S. Appl. No. 16/144,264, mailed on May 1, 2020, 30 pages.
Non-Final Office Action received for U.S. Appl. No. 16/147,523, mailed on Apr. 26, 2022, 22 pages.
Non-Final Office Action received for U.S. Appl. No. 16/147,523, mailed on Dec. 27, 2019, 11 pages.
Non-Final Office Action received for U.S. Appl. No. 16/147,523, mailed on Jul. 21, 2021, 20 pages.
Non-Final Office Action received for U.S. Appl. No. 16/259,954, mailed on Feb. 5, 2020, 10 pages.

(56) References Cited

OTHER PUBLICATIONS

Non-Final Office Action received for U.S. Appl. No. 16/281,838, mailed on Mar. 26, 2020, 18 pages.
Non-Final Office Action received for U.S. Appl. No. 16/407,584, mailed on Jul. 10, 2019, 8 pages.
Non-Final Office Action received for U.S. Appl. No. 16/583,981, mailed on Dec. 6, 2019, 14 pages.
Non-Final Office Action received for U.S. Appl. No. 16/583,989, mailed on Jan. 24, 2020, 20 pages.
Non-Final Office Action received for U.S. Appl. No. 16/583,994, mailed on Dec. 23, 2020, 17 pages.
Non-Final Office Action received for U.S. Appl. No. 16/583,994, mailed on Dec. 30, 2019, 14 pages.
Non-Final Office Action received for U.S. Appl. No. 16/584,490, mailed on Dec. 10, 2019, 27 pages.
Non-Final Office Action received for U.S. Appl. No. 16/653,857, mailed on Jul. 9, 2020, 35 pages.
Non-Final Office Action received for U.S. Appl. No. 16/653,857, mailed on Jul. 22, 2021, 45 pages.
Non-Final Office Action received for U.S. Appl. No. 16/679,967, mailed on Apr. 19, 2022, 13 pages.
Non-Final Office Action received for U.S. Appl. No. 16/702,968, mailed on Apr. 8, 2020, 20 pages.
Non-Final Office Action received for U.S. Appl. No. 16/723,583, mailed on Aug. 13, 2020, 13 pages.
Non-Final Office Action received for U.S. Appl. No. 16/749,929, mailed on May 13, 2020, 11 pages.
Non-Final Office Action received for U.S. Appl. No. 16/803,849, mailed on Jul. 13, 2020, 23 pages.
Non-Final Office Action received for U.S. Appl. No. 16/803,849, mailed on May 14, 2021, 34 pages.
Non-Final Office Action received for U.S. Appl. No. 16/807,604, mailed on Jun. 2, 2020, 28 pages.
Non-Final Office Action received for U.S. Appl. No. 16/836,571, mailed on Mar. 25, 2021, 28 pages.
Non-Final Office Action received for U.S. Appl. No. 16/922,675, mailed on Aug. 13, 2020, 17 pages.
Non-Final Office Action received for U.S. Appl. No. 16/922,675, mailed on Jun. 8, 2022, 21 pages.
Non-Final Office Action received for U.S. Appl. No. 16/922,675, mailed on May 4, 2021, 23 pages.
Non-Final Office Action received for U.S. Appl. No. 17/013,778, mailed on Dec. 9, 2021, 11 pages.
Non-Final Office Action received for U.S. Appl. No. 17/026,818, mailed on Nov. 25, 2020, 20 pages.
Non-Final Office Action received for U.S. Appl. No. 17/027,373, mailed on Feb. 2, 2022, 17 pages.
Non-Final Office Action received for U.S. Appl. No. 17/031,833, mailed on Dec. 7, 2020, 13 pages.
Non-Final Office Action received for U.S. Appl. No. 17/041,350, mailed on Jun. 10, 2021, 24 pages.
Non-Final Office Action received for U.S. Appl. No. 17/168,069, mailed on Jul. 21, 2021, 17 pages.
Non-Final Office Action received for U.S. Appl. No. 17/176,908, mailed on Feb. 24, 2022, 28 pages.
Non-Final Office Action received for U.S. Appl. No. 17/188,228, mailed on Dec. 21, 2021, 14 pages.
Non-Final Office Action received for U.S. Appl. No. 17/223,794, mailed on Jun. 16, 2021, 32 pages.
Non-Final Office Action received for U.S. Appl. No. 17/314,948, mailed on Aug. 1, 2022, 33 pages.
Non-Final Office Action received for U.S. Appl. No. 17/410,169, mailed on Sep. 16, 2022, 42 pages.
Non-Final Office Action received for U.S. Appl. No. 17/461,103, mailed on Nov. 22, 2021, 15 pages.
Non-Final Office Action received for U.S. Appl. No. 17/476,404, mailed on Feb. 8, 2022, 26 pages.
Non-Final Office Action received for U.S. Appl. No. 17/476,404, mailed on Sep. 14, 2022, 31 pages.
Non-Final Office Action received for U.S. Appl. No. 17/509,356, mailed on Dec. 22, 2022, 16 pages.
Non-Final Office Action received for U.S. Appl. No. 17/746,807, mailed on Feb. 2, 2023, 14 pages.
Non-Final Office Action received for U.S. Appl. No. 17/747,804, mailed on Mar. 1, 2023, 14 pages.
Non-Final Office Action received for U.S. Appl. No. 17/752,582, mailed on Mar. 6, 2023, 17 pages.
Non-Final Office Action received for U.S. Appl. No. 17/867,317, mailed on Feb. 28, 2023, 18 pages.
Noriega Josh, "How to Store and Listen to Music Directly from Your Android Wear Smartwatch", Guiding Tech, Available online at: https://www.guidingtech.com/55254/listen-music-android-wear-smartwatch, Jan. 15, 2016, 16 pages.
Notice of Acceptance received for Australian Patent Application No. 2015385757, mailed on Jul. 16, 2018, 3 pages.
Notice of Acceptance received for Australian Patent Application No. 2016218318, mailed on Jul. 3, 2019, 3 pages.
Notice of Acceptance received for Australian Patent Application No. 2018223051, mailed on Oct. 30, 2018, 3 pages.
Notice of Acceptance received for Australian Patent Application No. 2018236872, mailed on Jul. 9, 2019, 3 pages.
Notice of Acceptance received for Australian Patent Application No. 2018247345, mailed on May 15, 2019, 3 pages.
Notice of Acceptance received for Australian Patent Application No. 2018268111, mailed on Feb. 18, 2021, 3 pages.
Notice of Acceptance received for Australian Patent Application No. 2020239670, mailed on Jul. 2, 2021, 3 pages.
Notice of Acceptance received for Australian Patent Application No. 2020239711, mailed on Dec. 16, 2021, 3 pages.
Notice of Acceptance received for Australian Patent Application No. 2020282362, mailed on Jan. 4, 2022, 3 pages.
Notice of Acceptance received for Australian Patent Application No. 2020285524, mailed on Dec. 17, 2021, 3 pages.
Notice of Acceptance received for Australian Patent Application No. 2021203669, mailed on May 25, 2022, 3 pages.
Notice of Acceptance received for Australian Patent Application No. 2021204454, mailed on Feb. 25, 2022, 3 pages.
Notice of Acceptance received for Australian Patent Application No. 2021250863, mailed on Jan. 13, 2023, 3 pages.
Notice of Acceptance received for Australian Patent Application No. 2022200515, mailed on Dec. 21, 2022, 3 pages.
Notice of Acceptance received for Australian Patent Application No. 2022200901, mailed on Mar. 9, 2023, 3 pages.
Notice of Acceptance received for Australian Patent Application No. 2022201369, mailed on Mar. 17, 2022, 3 pages.
Notice of Acceptance received for Australian Patent Application No. 2022202458, mailed on May, 6, 2022, 3 pages.
Notice of Acceptance received for Australian Patent Application No. 2022204555, mailed on May 11, 2023, 3 pages.
Notice of Allowance received for Chinese Patent Application No. 201580046237.6, mailed on Aug. 29, 2018, 4 pages.
Notice of Allowance received for Chinese Patent Application No. 201580077218.X, mailed on Nov. 13, 2020, 2 pages.
Notice of Allowance received for Chinese Patent Application No. 201610084974.1, mailed on Aug. 5, 2019, 2 pages.
Notice of Allowance received for Chinese Patent Application No. 201710657424.9, mailed on May 8, 2020, 2 pages.
Notice of Allowance received for Chinese Patent Application No. 201810321928.8, mailed on Sep. 11, 2019, 2 pages.
Notice of Allowance received for Chinese Patent Application No. 201811539260.0, mailed on Mar. 15, 2021, 2 pages.
Notice of Allowance received for Chinese Patent Application No. 201880001436.9, mailed on May 8, 2020, 3 pages.
Notice of Allowance received for Chinese Patent Application No. 201910990432.4, mailed on Apr. 27, 2021, 2 pages.
Notice of Allowance received for Chinese Patent Application No. 201980036737.X, mailed on Apr. 20, 2021, 10 pages.
Notice of Allowance received for Chinese Patent Application No. 202010125114.4, mailed on Nov. 24, 2021, 2 pages.
Notice of Allowance received for Chinese Patent Application No. 202080039642.6, mailed on Apr. 17, 2023, 6 pages.

(56) References Cited

OTHER PUBLICATIONS

Notice of Allowance received for Chinese Patent Application No. 202110011509.6, mailed on Mar. 2, 2022, 2 pages.
Notice of Allowance received for Chinese Patent Application No. 202111612841.4, mailed on Jan. 5, 2023, 3 pages.
Notice of Allowance received for Danish Patent Application No. PA201570771, mailed on Sep. 2, 2016, 2 pages.
Notice of Allowance received for Danish Patent Application No. PA201570773, mailed on Apr. 26, 2018, 2 pages.
Notice of Allowance received for Danish Patent Application No. PA201770408, mailed on Feb. 8, 2019, 2 pages.
Notice of Allowance received for Japanese Patent Application No. 2017-545733, mailed on Jun. 1, 2018, 4 pages.
Notice of Allowance received for Japanese Patent Application No. 2018-126311, mailed on Feb. 1, 2019, 4 pages.
Notice of Allowance received for Japanese Patent Application No. 2020-159840, mailed on Jul. 8, 2022, 4 pages.
Notice of Allowance received for Japanese Patent Application No. 2020-551465, mailed on Jun. 28, 2021, 4 pages.
Notice of Allowance received for Japanese Patent Application No. 2021-122610, mailed on Aug. 5, 2022, 4 pages.
Notice of Allowance received for Japanese Patent Application No. 2021-563716, mailed on Mar. 14, 2022, 4 pages.
Notice of Allowance received for Japanese Patent Application No. 2021-571464, mailed on May 30, 2022, 4 pages.
Notice of Allowance received for Japanese Patent Application No. 2022-079682, mailed on Jul. 15, 2022, 4 pages.
Notice of Allowance received for Japanese Patent Application No. 2022-102840, mailed on Aug. 19, 2022, 4 pages.
Notice of Allowance received for Japanese Patent Application No. 2022-125792, mailed on Jan. 27, 2023, 4 pages.
Notice of Allowance received for Japanese Patent Application No. 2022-139320, mailed on Jan. 6, 2023, 4 pages.
Notice of Allowance received for Korean Patent Application No. 10-2020-0123805, mailed on Jun. 19, 2022, 5 pages.
Notice of Allowance received for Korean Patent Application No. 10-2020-7028759, mailed on Oct. 19, 2021, 4 pages.
Notice of Allowance received for Korean Patent Application No. 10-2021-7035472, mailed on Nov. 23, 2021, 4 pages.
Notice of Allowance received for Korean Patent Application No. 10-2021-7039234, mailed on Dec. 20, 2021, 4 pages.
Notice of Allowance received for Korean Patent Application No. 10-2022-0091730, mailed on Oct. 4, 2022, 5 pages.
Notice of Allowance received for Korean Patent Application No. 10-2022-7001721, mailed on Feb. 28, 2022, 5 pages.
Notice of Allowance received for Korean Patent Application No. 10-2022-7006175, mailed on Jan. 12, 2023, 7 pages.
Notice of Allowance received for Korean Patent Application No. 10-2022-7008567, mailed on Jul. 4, 2022, 9 pages.
Notice of Allowance received for Taiwanese Patent Application No. 104107328, mailed on Jun. 12, 2017, 3 pages.
Notice of Allowance received for Taiwanese Patent Application No. 104123593, mailed on Oct. 1, 2018, 4 pages.
Notice of Allowance received for Taiwanese Patent Application No. 104128519, mailed on Nov. 20, 2017, 5 pages.
Notice of Allowance received for Taiwanese Patent Application No. 104128700, mailed on Mar. 27, 2017, 3 pages.
Notice of Allowance received for Taiwanese Patent Application No. 104133756, mailed on Nov. 30, 2017, 5 pages.
Notice of Allowance received for Taiwanese Patent Application No. 104133757, mailed on Jan. 18, 2017, 3 pages.
Notice of Allowance received for U.S. Appl. No. 16/702,968, mailed on Apr. 21, 2021, 20 pages.
Notice of Allowance received for U.S. Appl. No. 14/841,608, mailed on Nov. 14, 2017, 5 pages.
Notice of Allowance received for U.S. Appl. No. 14/641,251, mailed on May 18, 2016, 13 pages.
Notice of Allowance received for U.S. Appl. No. 14/805,403, mailed on Jul. 11, 2018, 15 pages.
Notice of Allowance received for U.S. Appl. No. 14/839,897, mailed on Jun. 8, 2018, 11 pages.
Notice of Allowance received for U.S. Appl. No. 14/839,903, mailed on Jan. 3, 2019, 7 pages.
Notice of Allowance received for U.S. Appl. No. 14/839,913, mailed on Aug. 11, 2016, 5 pages.
Notice of Allowance received for U.S. Appl. No. 14/841,614, mailed on Oct. 24, 2018, 10 pages.
Notice of Allowance received for U.S. Appl. No. 14/841,623, mailed on Feb. 23, 2018, 8 pages.
Notice of Allowance received for U.S. Appl. No. 14/864,011, mailed on Apr. 28, 2016, 5 pages.
Notice of Allowance received for U.S. Appl. No. 14/864,011, mailed on Oct. 5, 2016, 5 pages.
Notice of Allowance received for U.S. Appl. No. 15/135,328, mailed on Jul. 1, 2019, 25 pages.
Notice of Allowance received for U.S. Appl. No. 15/268,115, mailed on Mar. 7, 2018, 15 pages.
Notice of Allowance received for U.S. Appl. No. 15/366,607, mailed on Apr. 2, 2019, 2 pages.
Notice of Allowance received for U.S. Appl. No. 15/366,607, mailed on Feb. 21, 2019, 9 pages.
Notice of Allowance received for U.S. Appl. No. 15/433,238, mailed on May 17, 2018, 7 pages.
Notice of Allowance received for U.S. Appl. No. 15/790,610, mailed on Oct. 21, 2020, 29 pages.
Notice of Allowance received for U.S. Appl. No. 15/910,263, mailed on Feb. 18, 2021, 3 pages.
Notice of Allowance received for U.S. Appl. No. 15/910,263, mailed on Jan. 22, 2021, 33 pages.
Notice of Allowance received for U.S. Appl. No. 15/975,581, mailed on Oct. 3, 2018, 25 pages.
Notice of Allowance received for U.S. Appl. No. 16/144,264, mailed on Nov. 16, 2020, 10 pages.
Notice of Allowance received for U.S. Appl. No. 16/147,523, mailed on Aug. 4, 2022, 9 pages.
Notice of Allowance received for U.S. Appl. No. 16/147,523, mailed on Nov 28, 2022, 8 pages.
Notice of Allowance received for U.S. Appl. No. 16/147,523, mailed on Oct. 4, 2022, 8 pages.
Notice of Allowance received for U.S. Appl. No. 16/259,954, mailed on May 7, 2020, 9 pages.
Notice of Allowance received for U.S. Appl. No. 16/281,838, mailed on Aug. 26, 2020, 9 pages.
Notice of Allowance received for U.S. Appl. No. 16/281,838, mailed on May 20, 2021, 9 pages.
Notice of Allowance received for U.S. Appl. No. 16/407,584, mailed on Oct. 28, 2019, 5 pages.
Notice of Allowance received for U.S. Appl. No. 16/583,981, mailed on Mar. 26, 2021, 10 pages.
Notice of Allowance received for U.S. Appl. No. 16/583,989, mailed on Apr. 1, 2021, 5 pages.
Notice of Allowance received for U.S. Appl. No. 16/583,989, mailed on Dec. 24, 2020, 7 pages.
Notice of Allowance received for U.S. Appl. No. 16/583,994, mailed on Jun. 24, 2021, 10 pages.
Notice of Allowance received for U.S. Appl. No. 16/584,490, mailed on Aug. 27, 2020, 13 pages.
Notice of Allowance received for U.S. Appl. No. 16/584,490, mailed on Mar. 26, 2021, 13 pages.
Notice of Allowance received for U.S. Appl. No. 16/653,857, mailed on Feb. 16, 2022, 34 pages.
Notice of Allowance received for U.S. Appl. No. 16/679,967, mailed on Jun. 15, 2022, 7 pages.
Notice of Allowance received for U.S. Appl. No. 16/679,967, mailed on Nov. 2, 2022, 7 pages.
Notice of Allowance received for U.S. Appl. No. 16/749,929, mailed on Dec. 16, 2020, 2 pages.
Notice of Allowance received for U.S. Appl. No. 16/749,929, mailed on Nov. 4, 2020, 5 pages.
Notice of Allowance received for U.S. Appl. No. 16/803,849, mailed on May 17, 2022, 12 pages.

(56) References Cited

OTHER PUBLICATIONS

Notice of Allowance received for U.S. Appl. No. 16/807,604, mailed on Apr. 30, 2021, 25 pages.
Notice of Allowance received for U.S. Appl. No. 16/836,571, mailed on Feb. 14, 2022, 31 pages.
Notice of Allowance received for U.S. Appl. No. 16/836,571, mailed on Sep. 8, 2021, 25 pages.
Notice of Allowance received for U.S. Appl. No. 16/867,002, mailed on Aug. 20, 2021, 12 pages.
Notice of Allowance received for U.S. Appl. No. 16/867,002, mailed on Mar. 1, 2022, 7 pages.
Notice of Allowance received for U.S. Appl. No. 16/888,775, mailed on Feb. 21, 2023, 5 pages.
Notice of Allowance received for U.S. Appl. No. 16/888,775, mailed on Jan. 12, 2022, 5 pages.
Notice of Allowance received for U.S. Appl. No. 16/888,775, mailed on Jul. 26, 2021, 5 pages.
Notice of Allowance received for U.S. Appl. No. 16/888,775, mailed on Jun. 3, 2021, 11 pages.
Notice of Allowance received for U.S. Appl. No. 16/888,775, mailed on Oct. 19, 2022, 6 pages.
Notice of Allowance received for U.S. Appl. No. 16/922,675, mailed on Dec. 8, 2022, 9 pages.
Notice of Allowance received for U.S. Appl. No. 16/922,675, mailed on Feb. 10, 2022, 8 pages.
Notice of Allowance received for U.S. Appl. No. 16/922,675, mailed on Jan. 21, 2021, 7 pages.
Notice of Allowance received for U.S. Appl. No. 16/922,675, mailed on Sep. 27, 2021, 10 pages.
Notice of Allowance received for U.S. Appl. No. 17/013,778, mailed on Feb. 23, 2023, 8 pages.
Notice of Allowance received for U.S. Appl. No. 17/026,818, mailed on May 13, 2021, 10 pages.
Notice of Allowance received for U.S. Appl. No. 17/027,373, mailed on Aug. 2, 2022, 2 pages.
Notice of Allowance received for U.S. Appl. No. 17/027,373, mailed on Jun. 3, 2022, 8 pages.
Notice of Allowance received for U.S. Appl. No. 17/027,373, mailed on Oct. 3, 2022, 5 pages.
Notice of Allowance received for U.S. Appl. No. 17/031,833, mailed on Jun. 25, 2021, 15 pages.
Notice of Allowance received for U.S. Appl. No. 17/031,833, mailed on Sep. 20, 2021, 6 pages.
Notice of Allowance received for U.S. Appl. No. 17/041,350, mailed on Feb. 24, 2022, 6 pages.
Notice of Allowance received for U.S. Appl. No. 17/168,069, mailed on Jan. 19, 2022, 12 pages.
Notice of Allowance received for U.S. Appl. No. 17/168,069, mailed on Mar. 22, 2022, 5 pages.
Notice of Allowance received for U.S. Appl. No. 17/188,228 mailed on Feb. 1, 2023, 5 pages.
Notice of Allowance received for U.S. Appl. No. 17/188,228 mailed on Oct. 19, 2022, 6 pages.
Notice of Allowance received for U.S. Appl. No. 17/461,103 mailed on Jun. 20, 2022, 6 pages.
Notice of Allowance received for U.S. Appl. No. 17/461,103 mailed on Mar. 17, 2022, 10 pages.
Notice of Allowance received for U.S. Appl. No. 17/509,356 mailed on Apr. 7, 2023, 11 pages.
Nozawa Naoki et al., "iPad Perfect Manual for iOS 4", JPN, Sotec Ltd., Yanagisawa Junichi, Dec. 31, 2010, pp, 189-190.
Office Action received for Australian Patent Application No. 2015385757, mailed on Sep. 11, 2017, 3 pages.
Office Action received for Australian Patent Application No. 2016100155, mailed on May 4, 2016, 7 pages.
Office Action received for Australian Patent Application No. 2016218318, mailed on Aug. 24, 2018, 5 pages.
Office Action received for Australian Patent Application No. 2016218318, mailed on Sep. 26, 2018, 3 pages.
Office Action received for Australian Patent Application No. 2018236870, mailed on Jul. 29, 2019, 7 pages.
Office Action received for Australian Patent Application No. 2018236870, mailed on Nov. 21, 2018, 10 pages.
Office Action received for Australian Patent Application No. 2018236870, mailed on Oct. 31, 2019, 8 pages.
Office Action received for Australian Patent Application No. 2018236872, mailed on Nov. 23, 2018, 4 pages.
Office Action received for Australian Patent Application No. 2018247345, mailed on May 6, 2019, 2 pages.
Office Action received for Australian Patent Application No. 2019268111, mailed on Oct. 27, 2020, 7 pages.
Office Action received for Australian Patent Application No. 2020239670, mailed on Mar. 3, 2021, 4 pages.
Office Action received for Australian Patent Application No. 2020239711, mailed on Sep. 13, 2021, 5 pages.
Office Action received for Australian Patent Application No. 2020282362, mailed on Nov. 25, 2021, 3 pages.
Office Action received for Australian Patent Application No. 2021203669, mailed on Apr. 5, 2022, 3 pages.
Office Action received for Australian Patent Application No. 2021204454, mailed on Aug. 9, 2021, 7 pages.
Office Action received for Australian Patent Application No. 2021250863, mailed on Oct. 6, 2022, 6 pages.
Office Action received for Australian Patent Application No. 2022200515, mailed on Nov. 2, 2022, 2 pages.
Office Action received for Australian Patent Application No. 2022200901, mailed on Dec. 19, 2022, 4 pages.
Office Action received for Australian Patent Application No. 2022201532, mailed on Dec. 19, 2022, 5 pages.
Office Action received for Australian Patent Application No. 2022204555, mailed on Feb. 17, 2023, 5 pages.
Office Action received for Australian Patent Application No. 2022241590, mailed on Mar. 17, 2023, 5 pages.
Office Action received for Australian Patent Application No. 2022241590, mailed on Nov. 18, 2022, 8 pages.
Office Action received for Chinese Patent Application No. 201580046237.6, mailed on Feb. 6, 2018, 10 pages.
Office Action received for Chinese Patent Application No. 201580046788.2, mailed on Apr. 15, 2019, 13 pages.
Office Action received for Chinese Patent Application No. 201580046788.2, mailed on Feb. 25, 2020, 14 pages.
Office Action received for Chinese Patent Application No. 201580046788.2, mailed on Mar. 25, 2021, 9 pages.
Office Action received for Chinese Patent Application No. 201580046788.2, mailed on Sep. 22, 2020, 10 pages.
Office Action received for Chinese Patent Application No. 201580077218.X, mailed on Feb. 3, 2020, 23 pages.
Office Action received for Chinese Patent Application No. 201610084974.1, mailed on Dec. 5, 2018, 6 pages.
Office Action received for Chinese Patent Application No. 201610084974.1, mailed on May 3, 2018, 12 pages.
Office Action received for Chinese Patent Application No. 201620119869.2, mailed on Jun. 3, 2016, 2 pages.
Office Action received for Chinese Patent Application No. 201620119869.2, mailed on Nov. 22, 2016, 2 pages.
Office Action received for Chinese Patent Application No. 201710657424.9, mailed on Sep. 17, 2019, 23 pages.
Office Action received for Chinese Patent Application No. 201810321928.8, mailed on Jul. 2, 2019, 10 pages.
Office Action received for Chinese Patent Application No. 201811539259.8, mailed on Apr. 3, 2020, 10 pages.
Office Action received for Chinese Patent Application No. 201811539259.8, mailed on Sep. 3, 2020, 10 pages.
Office Action received for Chinese Patent Application No. 201811539259.8, mailed on Sep. 18, 2019, 12 pages.
Office Action received for Chinese Patent Application No. 201811539260.0, mailed on Jun. 3, 2020, 8 pages.
Office Action received for Chinese Patent Application No. 201811539260.0, mailed on Nov. 4, 2020, 9 pages.
Office Action received for Chinese Patent Application No. 201811539260.0, mailed on Oct. 8, 2019, 14 pages.

(56) References Cited

OTHER PUBLICATIONS

Office Action received for Chinese Patent Application No. 201880001436.9, mailed on Apr. 28, 2019, 19 pages.
Office Action received for Chinese Patent Application No. 201880001436.9, mailed on Nov. 6, 2019, 24 pages.
Office Action received for Chinese Patent Application No. 201910990432.4, mailed on Dec. 28, 2020, 6 pages.
Office Action received for Chinese Patent Application No. 201910990432.4, mailed on May 18, 2020, 15 pages.
Office Action received for Chinese Patent Application No. 201911128105.4, mailed on Apr. 8, 2021, 10 pages.
Office Action received for Chinese Patent Application No. 201911128105.4, mailed on Jan. 4, 2021, 14 pages.
Office Action received for Chinese Patent Application No. 201911128105.4, mailed on Jul. 3, 2020, 18 pages.
Office Action received for Chinese Patent Application No. 201911288715.0, mailed on Jan. 20, 2023, 23 pages.
Office Action received for Chinese Patent Application No. 202010125114.4, mailed on Aug. 21, 2020, 16 pages.
Office Action received for Chinese Patent Application No. 202010125114.4, mailed on Jun. 7, 2021, 7 pages.
Office Action received for Chinese Patent Application No. 202010125114.4, mailed on Mar. 1, 2021, 15 pages.
Office Action received for Chinese Patent Application No. 202080039642.6, mailed on Sep. 5, 2022, 12 pages.
Office Action received for Chinese Patent Application No. 202110011509.6, mailed on Oct. 11, 2021, 10 pages.
Office Action received for Chinese Patent Application No. 202111612841.4, mailed on Jul. 22, 2022, 13 pages.
Office Action received for Chinese Patent Application No. 202111652452.4, mailed on Aug. 29, 2022, 23 pages.
Office Action received for Chinese Patent Application No. 202111652452.4, mailed on Feb. 11, 2023, 28 pages.
Office Action received for Danish Patent Application No. PA201570664, mailed on Dec. 14, 2016, 2 pages.
Office Action received for Danish Patent Application No. PA201570664, mailed on Jun. 3, 2016, 3 pages.
Office Action received for Danish Patent Application No. PA201570664, mailed on Mar. 15, 2016, 10 pages.
Office Action received for Danish Patent Application No. PA201570771, mailed on Jun. 13, 2016, 3 pages.
Office Action received for Danish Patent Application No. PA201570771, mailed on Mar. 17, 2016, 8 pages.
Office Action received for Danish Patent Application No. PA201570773, mailed on Aug. 28, 2017, 3 pages.
Office Action received for Danish Patent Application No. PA201570773, mailed on Feb. 15, 2017, 3 pages.
Office Action received for Danish Patent Application No. PA201570773, mailed on Mar. 18, 2016, 9 pages.
Office Action received for Danish Patent Application No. PA201570773, mailed on Sep. 12, 2016, 3 pages.
Office Action received for Danish Patent Application No. PA201570788, mailed on Apr. 8, 2016, 11 pages.
Office Action received for Danish Patent Application No. PA201570788, mailed on Sep. 13, 2016, 3 pages.
Office action received for Danish Patent Application No. PA201570791, mailed on Apr. 6, 2016, 12 pages.
Office action received for Danish Patent Application No. PA201570791, mailed on Sep. 6, 2016, 4 pages.
Office Action received for Danish Patent Application No. PA201670074, mailed on Apr. 7, 2016, 8 pages.
Office Action received for Danish Patent Application No. PA201670074, mailed on Jun. 28, 2016, 5 pages.
Office Action received for Danish Patent Application No. PA201670074, mailed on Mar. 16, 2017, 2 pages.
Office Action received for Danish Patent Application No. PA201770392, mailed on Apr. 17, 2018, 2 pages.
Office Action received for Danish Patent Application No. PA201770392, mailed on Dec. 8, 2017, 4 pages.
Office Action received for Danish Patent Application No. PA201770392, mailed on Jun. 20, 2017, 11 pages.
Office Action received for Danish Patent Application No. PA201770401, mailed on Jan. 31, 2018, 3 pages.
Office Action received for Danish Patent Application No. PA201770401, mailed on May 17, 2018, 3 pages.
Office Action received for Danish Patent Application No. PA201770402, mailed on Apr. 16, 2018, 5 pages.
Office Action received for Danish Patent Application No. PA201770402, mailed on Dec. 18, 2017, 6 pages.
Office Action received for Danish Patent Application No. PA201770402, mailed on Jun. 19, 2017, 11 pages.
Office Action received for Danish Patent Application No. PA201770403, mailed on Dec. 12, 2017, 3 pages.
Office Action received for Danish Patent Application No. PA201770403, mailed on Jun. 16, 2017, 8 pages.
Office Action received for Danish Patent Application No. PA201770404, mailed on Aug. 8, 2018, 4 pages.
Office Action received for Danish Patent Application No. PA201770404, mailed on Dec. 1, 2017, 5 pages.
Office Action received for Danish Patent Application No. PA201770404, mailed on Feb. 21, 2019, 2 pages.
Office Action received for Danish Patent Application No. PA201770404, mailed on May 1, 2019, 2 pages.
Office Action received for Danish Patent Application No. PA201770406, mailed on Feb. 27, 2018, 7 pages.
Office Action received for Danish Patent Application No. PA201770406, mailed on Jan. 25, 2019, 8 pages.
Office Action received for Danish Patent Application No. PA201770406, mailed on Jun. 22, 2017, 11 pages.
Office Action received for Danish Patent Application No. PA201770406, mailed on Mar. 26, 2019, 3 pages.
Office Action received for Danish Patent Application No. PA201770406, mailed on Nov. 11, 2019, 4 pages.
Office Action received for Danish Patent Application No. PA201770408, mailed on Dec. 21, 2017, 6 pages.
Office Action received for Danish Patent Application No. PA201770408, mailed on Jun. 20, 2017, 9 pages.
Office Action received for Danish Patent Application No. PA201770408, mailed on May 3, 2018, 7 pages.
Office Action received for Danish Patent Application No. PA201770410, mailed on Apr. 9, 2018, 5 pages.
Office Action received for Danish Patent Application No. PA201770410, mailed on Jun. 23, 2017, 9 pages.
Office Action received for Danish Patent Application No. PA201770410, mailed on Nov. 22, 2018, 5 pages.
Office Action received for Danish Patent Application No. PA201870060, mailed on Jan. 15, 2019, 4 pages.
Office Action received for Danish Patent Application No. PA201870060, mailed on Jul. 25, 2019, 2 pages.
Office Action received for Danish Patent Application No. PA201870419, mailed on Feb. 27, 2020, 8 pages.
Office Action received for Danish Patent Application No. PA201870419, mailed on Sep. 30, 2019, 4 pages.
Office Action received for Danish Patent Application No. PA201870598, mailed on May 1, 2019, 3 pages.
Office Action received for Danish Patent Application No. PA201870598, mailed on Nov. 8, 2019, 4 pages.
Office Action received for Danish Patent Application No. PA201970533, mailed on Apr. 20, 2021, 2 pages.
Office Action received for Danish Patent Application No. PA201970533, mailed on Jul. 17, 2020, 6 pages.
Office Action received for Danish Patent Application No. PA202070560, mailed on Dec. 11, 2020, 7 pages.
Office Action received for Danish Patent Application No. PA202070560, mailed on Mar. 10, 2021, 7 pages.
Office Action received for Danish Patent Application No. PA202070609, mailed on Dec. 10, 2020, 8 ages.
Office Action received for Danish Patent Application No. PA202070610, mailed on Jun. 18, 2021, 8 pages.
Office Action received for Danish Patent Application No. PA202070610, mailed on Mar. 14, 2022, 7 pages.

(56) References Cited

OTHER PUBLICATIONS

Office Action received for Danish Patent Application No. PA201970617, mailed on Sep. 24, 2021, 4 pages.
Office Action received for Danish Patent Application No. PA202170320, mailed on May 3, 2022, 3 pages.
Office Action received for Danish Patent Application No. PA202270464, mailed on Dec. 20, 2022, 3 pages.
Office Action received for Danish Patent Application No. PA202270464, mailed on Oct. 25, 2022, 9 pages.
Office Action received for European Patent Application No. 15712218.5, mailed on Aug. 3, 2017, 4 pages.
Office Action received for European Patent Application No. 15753796.0, mailed on Aug. 4, 2020, 9 pages.
Office Action received for European Patent Application No. 15753796.0, mailed on Jun. 2, 2022, 2 pages.
Office Action received for European Patent Application No. 15760008.1, mailed on Jul. 16, 2019, 9 pages.
Office Action received for European Patent Application No. 15787091.6, mailed on Aug. 2, 2019, 8 pages.
Office Action received for European Patent Application No. 15787091.6, mailed on Oct. 8, 2018, 7 pages.
Office Action received for European Patent Application No. 16708003.5, mailed on Feb. 22, 2021, 10 pages.
Office Action received for European Patent Application No. 17184710.6, mailed on Dec. 21, 2018, 7 pages.
Office Action received for European Patent Application No. 18197583.0, mailed on Feb. 28, 2020, 8 pages.
Office Action received for European Patent Application No. 18197589.7, mailed on Oct. 1, 2019, 5 pages.
Office Action received for European Patent Application No. 18728002.9, mailed on Dec. 14, 2020, 15 pages.
Office Action received for European Patent Application No. 18733381.0, mailed on Oct. 29, 2021, 9 pages.
Office Action received for European Patent Application No. 19207753.5, mailed on May 10, 2021, 4 pages.
Office Action received for European Patent Application No. 19207753.5, mailed on Nov. 12, 2020, 5 pages.
Office Action received for European Patent Application No. 19722280.5, mailed on Oct. 4, 2021, 7 pages.
Office Action received for European Patent Application No. 20158824.1, mailed on Jun. 13, 2022, 5 pages.
Office Action received for European Patent Application No. 20158824.1, mailed on May 18, 2021, 10 pages.
Office Action received for European Patent Application No. 20192404.0, mailed on Dec. 2, 2020, 8 pages.
Office Action received for European Patent Application No. 20192404.0, mailed on Jun. 8, 2021, 7 pages.
Office Action received for European Patent Application No. 20720310.0, mailed on Apr. 11, 2023, 8 pages.
Office Action received for European Patent Application No. 20720310.0, mailed on Oct. 4, 2022, 9 pages.
Office Action received for European Patent Application No. 20729346.5, mailed on Jan. 17, 2022, 8 pages.
Office Action received for European Patent Application No. 20729346.5, mailed on Jul. 28, 2022, 9 pages.
Office Action received for European Patent Application No. 20760624.5, mailed on Mar. 7, 2023, 13 pages.
Office Action received for European Patent Application No. 21197457.1, mailed on Sep. 2, 2022, 8 pages.
Office Action received for European Patent Application No. 21728781.2, mailed on Mar. 1, 2023, 13 pages.
Office Action received for Indian Patent Application No. 202014041529, mailed on Dec. 6, 2021, 6 pages.
Office Action received for Indian Patent Application No. 202017041557, mailed on Dec. 8, 2021, 8 pages.
Office Action received for Japanese Patent Application No. 2018-126311, mailed on Nov. 2, 2018, 4 pages.
Office Action received for Japanese Patent Application No. 2017-545733, mailed on Feb. 13, 2018, 7 pages.
Office Action received for Japanese Patent Application No. 2020-159840, mailed on Dec. 10, 2021, 13 pages.
Office Action received for Japanese Patent Application No. 2020-159840, mailed on Mar. 28, 2022, 6 pages.
Office Action received for Korean Patent Application No. 10-2020-7028759, mailed on Jun. 29, 2021, 12 pages.
Office Action received for Korean Patent Application No. 10-2022-7006175, mailed on May 27, 2022, 7 pages.
Office Action received for Korean Patent Application No. 10-2022-7008567, mailed on Mar. 28, 2022, 5 pages.
Office Action received for Taiwanese Patent Application No. 104123593, mailed on May 24, 2016, 57 pages.
Office Action received for Taiwanese Patent Application No. 104123593, mailed on Sep. 13, 2016, 8 pages.
Office Action received for Taiwanese Patent Application No. 104128519, mailed on Mar. 29, 2017, 16 pages.
Office Action received for Taiwanese Patent Application No. 104128700, mailed on Aug. 31, 2016, 13 pages.
Office Action received for Taiwanese Patent Application No. 104133756, issued on May 17, 2017, 13 pages.
Office Action received for Taiwanese Patent Application No. 104133757, issued on Jul. 6, 2016, 22 pages.
Office Action received for Taiwanese Patent Application No. 104107328, mailed on Dec. 28, 2016, 4 pages.
Ojeda-Zapata Julio, "Five Apps That Play Podcasts Directly from Your Apple Watch", Available online at: https://tidbits.com/2018/04/09/five-apps-that-play-podcasts-directly-from-your-apple-watch/ , Apr. 9, 2018, 12 pages.
Pairing Your Apple Watch With Your AppleTV, Available online at: https://www.youtube.com/watch?v=C4t8YFSJ-UY, Apr. 27, 2015, 3 pages.
Partial European Search Report received for European Patent Application No. 20158824.1, mailed on May 8, 2020, 14 pages.
Partial European Search Report received for European Patent Application No. 18197583.0, mailed on Jan. 14, 2019, 18 pages.
PartyShare—turn your Xperia into a jukebox, Available at: https://forum.xda-developers.com/crossdevice-dev/sony/app-partyshare-xperia-jukebox-t2877807, Sep. 15, 2014, 5 pages.
Petternitter, "User Restricted Collaborative Playlists—The Spotify Community", Downloaded from: https://community.spotify.com/t5/Archived-Ideas/User-restricted-collaborative-playlists/idi-p/70721, May 28, 2012, 4 pages.
Philips Support Website, "How to switch to preferred audio language in Philips TV from a broadcast with multiple languages audio stream?", Available Online at: https://www.usa.philips.com/c-f/XC000010105/how-to-switch-to-preferred-audio-language-in-philips-tv-from-a-broadcast-with-multiple-languages-audio-stream, Dec. 29, 2016, 5 pages.
Plaisant et al., "Touchscreen Toggle Switches: Push or slide? Design Issues and Usability Study", Technical Report CAR-TR-521, CS-TR-2557, Nov. 1990, pp. 1-10.
PlayMemories Camera Apps, "PlayMemories Camera Apps Help Guide", available at <https://www.playmemoriescameraapps.com/portal/manual/IS9104-NPIA09014_00-F00002/en/index.html>, 2012, 3 pages.
Remote Shot for SmartWatch 2, Available online at: https://play.google.com/store/apps/details?id=net.watea.sw2.rshot&hl=en, Nov. 21, 2017, 3 pages.
Result of Consultation received for European Patent Application No. 15760008.1, mailed on Sep. 9, 2021, 7 pages.
Result of Consultation received for European Patent Application No. 17184710.6, mailed on Feb. 21, 2020, 6 pages.
Result of Consultation received for European Patent Application No. 17184710.6, mailed on Feb. 28, 2020, 3 pages.
Result of Consultation received for European Patent Application No. 18197583.0, mailed on Feb. 24, 2021, 3 pages.
Result of Consultation received for European Patent Application No. 18197589.7, mailed on Dec. 1, 2020, 9 pages.
Result of Consultation received for European Patent Application No. 18197589.7, mailed on Dec. 17, 2020, 6 pages.
Result of Consultation received for European Patent Application No. 20158824.1, mailed on May 17, 2022, 7 pages.

(56) References Cited

OTHER PUBLICATIONS

Review: Samsung Radiant R3 Wireless Speakers, Available Online at: <https://www.youtube.com/watch?v=ZBICVE1WdKE>, Jan. 19, 2016, 3 pages.
Richards,"TN Audio Mixer and Master Volume Control with Automatic Configuration", Technical Disclosure Bulletin, vol. 37, No. 01, Jan. 1, 1994, pp. 485-486.
Rossignol Joe, "iOS 10 Concept Simplifies Lock Screen With Collapsed Notifications", Available online at: https://www.macrumors.com/2016/06/16/ios-10-collapsed-notifications-concept/, Jun. 16, 2016, 10 pages.
Samsung, "Control an individual smart device on your watch", Online Available at: https://www.samsung.com/us/support/troubleshooting/TSG01003208/, Nov. 9, 2018, 1 page.
Samsung, "Problems with SmartThings on your Samsung Smartwatch", Online Available at: https://www.samsung.com/us/support/troubleshooting/TSG01003169/#smartthings-error-on-samsung-smartwatch, Nov. 9, 2018, 10 pages.
Samsung, "Samsung—User manual—Galaxy Watch", Online available at: https://content.abt.com/documents/90234/SM-R810NZDAXAR-use.pdf, Aug. 24, 2018, 102 pages.
Samsung, "Samsung R3 Wireless 360° Smart Speaker (Black)", User Manual ver. 1.0 (English), User manual [online], Available Online at: <https://www.samsung.com/uk/support/model/WAM3500/XU/>, Dec. 16, 2016, 3 pages.
Samsung, "SM-G900F User Manual", English (EU). Rev.1.0, Mar. 2014, 249 pages.
Sandrahoutz, "How Do I Delete a Playlist From a Synced iPod but Not Remove it From the Library in itunes", Apple Communities Website, Available online at: https://discussions.apple.com/thread/7503609, Mar. 23, 2016, 2 pages.
Search Report and Opinion received for Danish Patent Application No. PA201770401, mailed on Jun. 19, 2017, 6 pages.
Search Report and Opinion received for Danish Patent Application No. PA201870060 mailed on Apr. 30, 2018, 7 pages.
Search Report and Opinion received for Danish Patent Application No. PA201870419, mailed on Aug. 27, 2018, 7 pages.
Search Report and Opinion received for Danish Patent Application No. PA201870419, mailed on Sep. 10, 2018, 9 pages.
Search Report and Opinion received for Danish Patent Application No. PA201870598, mailed on Dec. 5, 2018, 8 pages.
Search Report and Opinion received for Danish Patent Application No. PA201970533, mailed on Oct. 25, 2019, 9 pages.
Search Report and Opinion received for Danish Patent Application No. PA202070610, mailed on Jan. 8, 2021, 9 pages.
Search Report and Opinion received for Danish Patent Application No. PA202070617, mailed on Dec. 23, 2020, 8 pages.
Search Report and Opinion received for Danish Patent Application No. PA202170320, mailed on Oct. 6, 2021, 9 pages.
Search Report received for Danish Patent Application No. PA201770404, mailed on Jun. 20, 2017, 8 pages.
Search Report received for Danish Patent Application No. PA201770409, mailed on Jun. 20, 2017, 9 pages.
Seifert Dan, "Google Home review: Home is where the smart is", The Verge, Available Online at: <https://www.theverge.com/2016/11/3/13504658/google-home-review-speaker-assistant-amazon-echo-competitor>, Nov. 3, 2016, 11 pages.
Seifi Joe, "Pianist Pro Review", available at <http://www.appsafari.com/productivity/11529/pianist-pro/>, Apr. 24, 2010, 9 pages.
Senicar et al., "User-Centred Design and Development of an Intelligent Light Switch for Sensor Systems", Technical Gazette, vol. 26, No. 2, available online at: https://hrcak.srce.hr/file/320403, 2019, pp. 339-345.
Sharepoint at Rackspace, "Sharepoint 2013: How to Edit a List or Library Using Quick Edit", Available online at: https://www.youtube.com/watch?v=foZXcFC1k80, Oct. 10, 2014, 1 page.
Singh Ajit, "Mytunz: Free Iphone Media Player App With Sleep Timer, Gesture Control", Available online at: https://www.ilovefreesoftware.com/01/iphone/mytunz-free-iphone-media-player-app.html, Jul. 1, 2014, 6 pages.

Smart Home App—What is the Widget, Online Available at: https://support.vivint.com/s/article/Vivint-Smart-Home-App-What-is-the-Widget, Jan. 26, 2019, 4 pages.
Smarttricks, "Top 3 Music Player For Android", Available online at: <https://www.youtube.com/watch?v=He7RTn4CL34>, Feb. 22, 2017, 4 pages.
Sonos, "Sonos Controller App for iPad Product Guide", Available online at: https://www.sonos.com/documents/productguides/en/iPadGuide_EN.pdf, Nov. 2014, 47 pages.
Sony, "Sony Smartwatch 3 SWR50", User Guide, Jul. 2014, 31 pages.
Stroud Forrest, "Screen Lock Meaning & Definition", Online Available at: https://www.webopedia.com/definitions/screen-lock, Jan. 30, 2014, 3 pages.
Summons to Attend Oral Proceedings received for European Patent Application 20158824.1, mailed on Dec. 7, 2021, 6 pages.
Summons to Attend Oral Proceedings received for European Patent Application No. 15760008.1, mailed on Feb. 5, 2021, 11 pages.
Summons to Attend Oral Proceedings received for European Patent Application No. 16708003.5, mailed on Dec. 13, 2022, 11 pages.
Summons to Attend Oral Proceedings received for European Patent Application No. 17184710.6, mailed on Sep. 17, 2019, 7 pages.
Summons to Attend Oral Proceedings received for European Patent Application No. 18197583.0, mailed on Aug. 14, 2020, 12 pages.
Summons to attend Oral proceedings received for European Patent Application No. 18197589.7, mailed on Apr. 9, 2020, 7 pages.
Summons to Attend Oral Proceedings received for European Patent Application No. 18728002.9, mailed on Jun. 3, 2022, 15 pages.
Summons to Attend Oral Proceedings received for European Patent Application No. 20192404.0, mailed on Feb. 2, 2022, 11 pages.
Summons to Attend Oral Proceedings received for European Patent Application No. 20729346.5, mailed on Jan. 23, 2023, 11 pages.
Supertunetv, "iPod Nano 6G—Sync Selected Playlist iTunes", Youtube, Available online at: https://www.youtube.com/watch?v=xU3rYRabt_I, Sep. 10, 2012, 3 pages.
Supplemental Notice of Allowance received for U.S. Appl. No. 14/805,403, mailed on Oct. 4, 2018, 3 pages.
Supplemental Notice of Allowance received for U.S. Appl. No. 14/841,608, mailed on Jan. 25, 2018, 2 pages.
Supplemental Notice of Allowance received for U.S. Appl. No. 15/433,238, mailed on Jun. 20, 2018, 2 pages.
Supplemental Notice of Allowance received for U.S. Appl. No. 16/147,523, mailed on Aug. 23, 2022, 2 pages.
Supplemental Notice of Allowance received for U.S. Appl. No. 16/584,490, mailed on Apr. 13, 2021, 2 pages.
Supplemental Notice of Allowance received for U.S. Appl. No. 16/867,002, mailed on Mar. 16, 2022, 2 pages.
Supplemental Notice of Allowance received for U.S. Appl. No. 16/867,002, mailed on Sep. 9, 2021, 2 pages.
Supplemental Notice of Allowance received for U.S. Appl. No. 16/888,775, mailed on Mar. 1, 2023, 2 pages.
Supplemental Notice of Allowance received for U.S. Appl. No. 17/168,069, mailed on Apr. 20, 2022, 2 pages.
Supplemental Notice of Allowance received for U.S. Appl. No. 17/168,069, mailed on Feb. 2, 2022, 2 pages.
Techsmith, "Snagit® 11 Snagit 11.4 Help", available at <http://assets.techsmith.com/Downloads/ua-tutorials-snagit-11/Snagit_11.pdf>, Jan. 2014, 146 pages.
Tedeschi Bob, "Stoking a Music Fan's Fancy With Apps That Rock", available at <http://www.nytimes.com/2010/05/20/technology/personaltech/20smart.html>, May 19, 2010, 3 pages.
The Single Keyboard Piano, available at <http://moocowmusic.com/PianistPro/Manual/ManualSingleKeyboardPiano.html>, Sep. 26, 2010, 4 pages.
Walker Alissa, "Apple Watch's Walking Directions Buzz Your Wrist When It's Time to Turn", available online at: http://gizmodo.com/apple-watch-will-give-you-a-buzz-when-its-time-to-turn-1632557384, Sep. 9, 2014, 2 pages.
Wearablezone, "How To Set Up Your Fitbit Profile", Online available at: <https://youtu.be/jsWPtcDWiJM>, Jun. 6, 2016, 3 pages.
Whitney Lance, "How to Listen to Music on Your Apple Watch", Available Online at: https://medium.com/pcmag-access/how-to-listen-to-music-on-your-apple-watch-f48a6c20dd52#:~:text=On%

(56) References Cited

OTHER PUBLICATIONS

20your%20iPhone%2C%20go%20to,.%E2%80%9D%20Tap%20on%20Add%20Music., Mar. 2, 2018, 13 pages.
Whitwam Ryan, "How to Sync and Play Music on Your Android Wear Watch", Available online at: https://www.greenbot.com/article/2997520/how-to-sync-and-play-music-on-your-android-wear-watch.html, Nov. 2, 2015, 4 pages.
Woolsey Amanda, "Apple Watch Tips—How To Add and Play Music", Available online at: < https://www.youtube.com/watch?v=E0QEuqMaoi8>, Apr. 26, 2015, 3 pages.
Xdream, "TickTalk Video User Manual", YouTube [online] [video], Online available at: <https://youtu.be/jYhq3DwmVzo>, Mar. 17, 2017, 3 pages.
Xiao et al., "Expanding the Input Expressivity of Smartwatches with Mechanical Pan, Twist, Tilt and Click", 14th Proceedings of the SIGCHI Conference on Human Factors in Computing Systems, Apr. 26, 2014, pp. 193-196.
Xperia Blog, "Action Camera Extension Gives Smartwatch/Smartband Owners Ability to Control Sony Wireless Cameras", Available at <http://www.xperiablog.net/2014/06/13/action-camera-extension-gives-smartwatchsmartband-owners-ability-to-control-sony-wireless-cameras/>, Jun. 13, 2014, 10 pages.
Final Office Action received for U.S. Appl. No. 18/088,309, mailed on Jan. 9, 2024, 13 pages.
International Preliminary Report on Patentability received for PCT Patent Application No. PCT/US2022/031252, mailed on Dec. 21, 2023, 13 pages.
Summons to Attend Oral Proceedings received for European Patent Application No. 20720310.0, mailed on Jan. 3, 2024, 12 pages.
Office Action received for Chinese Patent Application No. 202080039832.8, mailed on Mar. 23, 2024, 22 pages (12 pages of English Translation and 10 pages of Official Copy).
Office Action received for European Patent Application No. 23158566.2, mailed on Apr. 9, 2024, 7 pages.
Office Action received for Indian Patent Application No. 202118049678, mailed on Apr. 18, 2024, 8 pages.
Result of Consultation received for European Patent Application No. 20720310.0, mailed on Apr. 17, 2024, 9 pages.
Final Office Action received for U.S. Appl. No. 17/978,930, mailed on Apr. 5, 2024, 28 pages.
Final Office Action received for U.S. Appl. No. 18/122,625, mailed on Apr. 5, 2024, 12 pages.
International Preliminary Report on Patentability received for PCT Patent Application No. PCT/US2022/044236, mailed on Apr. 4, 2024, 12 pages.
Invitation to Pay Search Fees received for European Patent Application No. 21789897.2, mailed on Mar. 14, 2024, 3 pages.
Non-Final Office Action received for U.S. Appl. No. 17/970,417, mailed on Apr. 10, 2024, 16 pages.
Non-Final Office Action received for U.S. Appl. No. 18/088,309, mailed on Apr. 9, 2024, 14 pages.
Notice of Allowance received for Chinese Patent Application No. 202211558100.7, mailed on Mar. 29, 2024, 3 pages (2 pages of English Translation and 1 page of Official Copy).
Office Action received for Chinese Patent Application No. 201911128105.4, mailed on Mar. 16, 2024, 7 pages (4 pages of English Translation and 3 pages of Official Copy).
Office Action received for Chinese Patent Application No. 201911128105.4, mailed on Mar. 19, 2024, 16 pages (8 pages of English Translation and 8 pages of Official Copy).
Office Action received for Chinese Patent Application No. 202010728711.6, mailed on Feb. 1, 2024, 30 pages (18 pages of English Translation and 12 pages of Official Copy).
Office Action received for Chinese Patent Application No. 202311321231.8, mailed on Mar. 10, 2024, 15 pages (9 pages of English Translation and 6 pages of Official Copy).
Office Action received for Japanese Patent Application No. 2023-028786, mailed on Mar. 22, 2024, 10 pages (5 pages of English Translation and 5 pages of Official Copy).
Office Action received for Korean Patent Application No. 10-2022-7032414, mailed on Mar. 26, 2024, 11 pages (5 pages of English Translation and 6 pages of Official Copy).
Extended European Search Report received for European patent Application No. 23191379.9, mailed on Sep. 18, 2023, 8 pages.
Intention to Grant received for European Patent Application No. 19722280.5, mailed on Sep. 26, 2023, 9 pages.
Non-Final Office Action received for U.S. Appl. No. 18/088,309, mailed on Sep. 21, 2023, 11 pages.
Office Action received for European Patent Application No. 20746429.8, mailed on Sep. 20, 2023, 10 pages.
Applicant-Initiated Interview Summary received for U.S. Appl. No. 17/978,930, mailed on Mar. 13, 2024, 3 pages.
Applicant-Initiated Interview Summary received for U.S. Appl. No. 18/197,681, mailed on Mar. 18, 2024, 4 pages.
Communication for Board of Appeal received for European Patent Application No. 17184710.6, mailed on Feb. 29, 2024, 13 pages.
International Search Report and Written Opinion received for PCT Patent Application No. PCT/US2023/032084, mailed on Nov. 27, 2023, 10 pages.
Non-Final Office Action received for U.S. Appl. No. 18/200,480, mailed on Mar. 6, 2024, 17 pages.
Office Action received for Chinese Patent Application No. 202010728844.3, mailed on Jan. 27, 2024, 16 pages (8 pages of English Translation and 8 pages of Official Copy).
Office Action received for European Patent Application No. 22201007.6, mailed on Mar. 13, 2024, 4 pages.
Applicant-Initiated Interview Summary received for U.S. Appl. No. 17/476,404, mailed on Oct. 31, 2023, 4 pages.
Applicant-Initiated Interview Summary received for U.S. Appl. No. 17/746,807, mailed on Nov. 3, 2023, 2 pages.
Applicant-Initiated Interview Summary received for U.S. Appl. No. 18/088,309, mailed on Oct. 27, 2023, 2 pages.
Non-Final Office Action received for U.S. Appl. No. 18/122,625, mailed on Nov. 15, 2023, 14 pages.
Office Action received for Chinese Patent Application No. 202211081603.X, mailed on Oct. 20, 2023, 15 pages (7 pages of English Translation and 8 pages of Official Copy).
Office Action received for Chinese Patent Application No. 202211096369.8, mailed on Sep. 29, 2023, 13 pages (6 pages of English Translation and 7 pages of Official Copy).
Office Action received for Chinese Patent Application No. 202211110081.1, mailed on Oct. 13, 2023, 16 pages (7 pages of English Translation and 9 pages of Official Copy).
Office Action received for Japanese Patent Application No. 2022-149476, mailed on Nov. 2, 2023, 9 pages (4 pages of English Translation and 5 pages of Official Copy).
Intention to Grant received for European Patent Application No. 21728781.2, mailed on Dec. 12, 2023, 9 pages.
Applicant-Initiated Interview Summary received for U.S. Appl. No. 18/088,309, mailed on Feb. 28, 2024, 2 pages.
Final Office Action received for U.S. Appl. No. 17/410,169, mailed on Feb. 23, 2024, 49 pages.
Non-Final Office Action received for U.S. Appl. No. 18/200,480, mailed on Feb. 29, 2024, 16 pages.
Notice of Acceptance received for Australian Patent Application No. 2023201920, mailed on Feb. 9, 2024, 3 pages.
Notice of Allowance received for Korean Patent Application No. 10-2023-7008877, mailed on Feb. 20, 2024, 7 pages (2 pages of English Translation and 5 pages of Official Copy).
Office Action received for Chinese Patent Application No. 201880031407.7, mailed on Jan. 12, 2024, 15 pages (7 pages of English Translation and 8 pages of Official Copy).
Supplemental Notice of Allowance received for U.S. Appl. No. 17/975,141, mailed on Feb. 26, 2024, 2 pages.
Advisory Action received for U.S. Appl. No. 17/747,804, mailed on Jun. 23, 2023, 6 pages.
Applicant-Initiated Interview Summary received for U.S. Appl. No. 17/306,354, mailed on Jun. 28, 2023, 3 pages.
Applicant-Initiated Interview Summary received for U.S. Appl. No. 17/410,169, mailed on Apr. 25, 2023, 6 pages.
Applicant-Initiated Interview Summary received for U.S. Appl. No. 17/476,404, mailed on Jun. 2, 2023, 2 pages.

(56) References Cited

OTHER PUBLICATIONS

Applicant-Initiated Interview Summary received for U.S. Appl. No. 17/746,807, mailed on Jun. 9, 2023, 2 pages.
Applicant-Initiated Interview Summary received for U.S. Appl. No. 17/746,807, mailed on Mar. 31, 2023, 2 pages.
Applicant-Initiated Interview Summary received for U.S. Appl. No. 17/747,804, mailed on Mar. 17, 2023, 4 pages.
Applicant-Initiated Interview Summary received for U.S. Appl. No. 17/747,804, mailed on May 31, 2023, 4 pages.
Applicant-Initiated Interview Summary received for U.S. Appl. No. 17/752,582, mailed on Apr. 17, 2023, 3 pages.
Applicant-Initiated Interview Summary received for U.S. Appl. No. 17/824,510, mailed on Jun. 16, 2023, 4 pages.
Applicant-Initiated Interview Summary received for U.S. Appl. No. 17/867,317, mailed on May 30, 2023, 4 pages.
Applicant-Initiated Interview Summary received for U.S. Appl. No. 17/975,141, mailed on Aug. 30, 2023, 4 pages.
Brief Communication regarding Oral Proceedings received for European Patent Application No. 16708003.5, mailed on May 8, 2023, 1 page.
Corrected Notice of Allowance received for U.S. Appl. No. 16/922,675, mailed on Apr. 14, 2023, 6 pages.
Corrected Notice of Allowance received for U.S. Appl. No. 17/752,582, mailed on Jul. 17, 2023, 3 pages.
Corrected Notice of Allowance received for U.S. Appl. No. 17/848,845, mailed on Aug. 9, 2023, 4 pages.
Corrected Notice of Allowance received for U.S. Appl. No. 17/848,845, mailed on Aug. 28, 2023, 3 pages.
Corrected Notice of Allowance received for U.S. Appl. No. 18/077,905, mailed on Apr. 10, 2023, 2 pages.
Corrected Notice of Allowance received for U.S. Appl. No. 18/077,905, mailed on Apr. 19, 2023, 2 pages.
Corrected Notice of Allowance received for U.S. Appl. No. 18/077,905, mailed on Apr. 26, 2023, 3 pages.
Corrected Notice of Allowance received for U.S. Appl. No. 18/077,905, mailed on May 4, 2023, 2 pages.
Decision to Grant received for Danish Patent Application No. PA202270464, mailed on May 9, 2023, 1 page.
Extended European Search Report received for European Patent Application No. 23158566.2, mailed on Jun. 14, 2023, 10 pages.
Extended European Search Report received for European Patent Application No. 23168537.1, mailed on Jul. 25, 2023, 13 pages.
Final Office Action received for U.S. Appl. No. 17/746,807, mailed on Apr. 26, 2023, 16 pages.
Final Office Action received for U.S. Appl. No. 17/747,804, mailed on Apr. 28, 2023, 17 pages.
Han Sangwoo, "AR Glasses interaction prototype", Available Online at: https://sangwoohan.cargo.site/AR-Glasses-interaction-prototype, Oct. 2020, 4 pages.
Intention to Grant received for European Patent Application No. 16708003.5, mailed on Jun. 14, 2023, 9 pages.
Intention to Grant received for European Patent Application No. 18728002.9, mailed on Apr. 12, 2023, 9 pages.
Intention to Grant received for European Patent Application No. 20729346.5, mailed on Jul. 10, 2023, 9 pages.
Intention to Grant received for European Patent Application No. 21728781.2, mailed on Jul. 28, 2023, 9 pages.
International Preliminary Report on Patentability received for PCT Patent Application No. PCT/US2021/048358, mailed on Apr. 6, 2023, 15 pages.
International Search Report and Written Opinion received for PCT Patent Application No. PCT/US2022/044236, mailed on Mar. 27, 2023, 17 pages.
International Search Report and Written Opinion received for PCT Patent Application No. PCT/US2023/012260, mailed on Aug. 2, 2023, 22 pages.
Invitation to Pay Additional Fees and Partial International Search Report received for PCT Patent Application No. PCT/US2023/012260, mailed on Jun. 7, 2023, 11 pages.
Minutes of the Oral Proceedings received for European Patent Application No. 20729346.5, mailed on Jul. 4, 2023, 6 pages.
Mitroff Sarah, "8 things you should know about Apple Music for Android", CNET website, downloaded from https://www.cnet.com/tech/services-and-software/apple-music-for-android-what-to-know/, Nov. 11, 2015, 4 pages.
Non-Final Office Action received for U.S. Appl. No. 17/306,354, mailed on Jun. 2, 2023, 21 pages.
Non-Final Office Action received for U.S. Appl. No. 17/476,404, mailed on Mar. 30, 2023, 29 pages.
Non-Final Office Action received for U.S. Appl. No. 17/746,807, mailed on Jul. 20, 2023, 14 pages.
Non-Final Office Action received for U.S. Appl. No. 17/824,510, mailed on May 22, 2023, 15 pages.
Non-Final Office Action received for U.S. Appl. No. 17/835,110, mailed on Apr. 3, 2023, 28 pages.
Non-Final Office Action received for U.S. Appl. No. 17/975,141, mailed on Jul. 6, 2023, 22 pages.
Non-Final Office Action received for U.S. Appl. No. 18/077,971, mailed on Apr. 3, 2023, 24 pages.
Notice of Acceptance received for Australian Patent Application No. 2022201532, mailed on May 22, 2023, 3 pages.
Notice of Allowance received for Chinese Patent Application No. 201911288715.0, mailed on Jul. 12, 2023, 5 pages (1 page of English Translation and 4 pages of Official Copy).
Notice of Allowance received for U.S. Appl. No. 16/922,675, mailed on Jul. 19, 2023, 13 pages.
Notice of Allowance received for U.S. Appl. No. 16/922,675, mailed on Mar. 22, 2023, 8 pages.
Notice of Allowance received for U.S. Appl. No. 17/306,354, mailed on Jul. 24, 2023, 7 pages.
Notice of Allowance received for U.S. Appl. No. 17/752,582, mailed on Jun. 13, 2023, 18 pages.
Notice of Allowance received for U.S. Appl. No. 17/824,510, mailed on Jul. 19, 2023, 9 pages.
Notice of Allowance received for U.S. Appl. No. 17/848,845, mailed on May 24, 2023, 26 pages.
Notice of Allowance received for U.S. Appl. No. 17/867,317, mailed on Jul. 6, 2023, 11 pages.
Notice of Allowance received for U.S. Appl. No. 18/077,905, mailed on Mar. 24, 2023, 18 pages.
Ochs Susie, "Getting Started with Apple Music: 12 Things to Do First", Macworld website, downloaded from https://www.macworld.com/article/225812/getting-started-with-apple-music-12-things-to-do-first.html, Jun. 30, 2015, 12 pages.
Office Action received for Australian Patent Application No. 2022218540, mailed on Aug. 3, 2023, 5 pages.
Office Action received for Australian Patent Application No. 2022241590, mailed on Aug. 15, 2023, 6 pages.
Office Action received for Australian Patent Application No. 2022241590, mailed on Jun. 7, 2023, 7 pages.
Office Action received for Chinese Patent Application No. 201811539259.8, mailed on Mar. 13, 2023, 16 pages (8 pages of English Translation and 8 pages of Official Copy).
Office Action received for Chinese Patent Application No. 201811539259.8, mailed on May 24, 2023, 22 pages (2 pages of English Translation and 20 pages of Official Copy).
Office Action received for Chinese Patent Application No. 202111652452.4, mailed on May 19, 2023, 15 pages (8 pages of English Translation and 7 pages of Official Copy).
Office Action received for European Patent Application No. 20720310.0, mailed on Jul. 25, 2023, 11 pages.
Office Action received for European Patent Application No. 21197457.1, mailed on May 30, 2023, 8 pages.
Office Action received for Indian Patent Application No. 202215025360, mailed on Mar. 29, 2023, 6 pages.
Office Action received for Indian Patent Application No. 202215025361, mailed on Mar. 29, 2023, 6 pages.
Office Action received for Indian Patent Application No. 202215025363, mailed on Mar. 29, 2023, 6 pages.
Office Action received for Indian Patent Application No. 202215025364, mailed on Mar. 29, 2023, 6 pages.

(56) References Cited

OTHER PUBLICATIONS

Result of Consultation received for European Patent Application No. 16708003.5, mailed on Apr. 18, 2023, 9 pages.
Result of Consultation received for European Patent Application No. 20729346.5, mailed on Jun. 21, 2023, 3 pages.
Summons to Attend Oral Proceedings received for European Patent Application No. 18733381.0, mailed on Jul. 25, 2023, 7 pages.
Summons to Oral Proceedings received for European Patent Application No. 17184710.6, mailed on May 10, 2023, 3 pages.
Non-Final Office Action received for U.S. Appl. No. 17/410,169, mailed on Dec. 5, 2023, 48 pages.
Notice of Allowance received for U.S. Appl. No. 17/975,141, mailed on Dec. 7, 2023, 10 pages.
Office Action received for Korean Patent Application No. 10-2023-7008877, mailed on Nov. 29, 2023, 7 pages (3 pages of English Translation and 4 pages of Official Copy).
Decision to Grant received for European Patent Application No. 16708003.5, mailed on Oct. 19, 2023, 2 pages.
Notice of Acceptance received for Australian Patent Application No. 2022218540, mailed on Oct. 16, 2023, 3 pages.
Notice of Allowance received for Chinese Patent Application No. 202111483033.2, mailed on Oct. 7, 2023, 4 pages (1 page of English Translation and 3 pages of Official Copy).
Notice of Allowance received for U.S. Appl. No. 18/077,891, mailed on Oct. 19, 2023, 18 pages.
Office Action received for European Patent Application No. 22201007.6, mailed on Oct. 9, 2023, 5 pages.
Applicant-Initiated Interview Summary received for U.S. Appl. No. 17/746,807, mailed on May 21, 2024, 2 pages.
Applicant-Initiated Interview Summary received for U.S. Appl. No. 18/122,625, mailed on May 22, 2024, 2 pages.
Brief Communication Regarding Oral Proceedings received for European Patent Application No. 21197457.1, mailed on May 23, 2024, 5 pages.
Minutes of the Oral Proceedings received for European Patent Application No. 17184710.6, mailed on May 22, 2024, 4 pages.
Non-Final Office Action received for U.S. Appl. No. 17/747,804, mailed on Jun. 4, 2024, 20 pages.
Non-Final Office Action received for U.S. Appl. No. 18/200,480, mailed on May 20, 2024, 19 pages.
Non-Final Office Action received for U.S. Appl. No. 18/229,989, mailed on May 31, 2024, 18 pages.
Notice of Allowance received for Chinese Patent Application No. 201911128105.4, mailed on May 24, 2024, 2 pages (1 page of English Translation and 1 page of Official Copy).
Office Action received for Chinese Patent Application No. 202211081603.X, mailed on Apr. 29, 2024, 6 pages (3 pages of English Translation and 3 pages of Official Copy).
Office Action received for Chinese Patent Application No. 202211110081.1, mailed on Apr. 28, 2024, 6 pages (3 pages of English Translation and 3 pages of Official Copy).
Office Action received for European Patent Application No. 21789897.2, mailed on May 23, 2024, 12 pages.
Applicant-Initiated Interview Summary received for U.S. Appl. No. 18/122,625, mailed on Jan. 19, 2024, 2 pages.
Intention to Grant received for European Patent Application No. 15753796.0, mailed on Jan. 12, 2024, 9 pages.
Office Action received for Australian Patent Application No. 2023204396, mailed on Jan. 8, 2024, 5 pages.
Decision to Grant received for European Patent Application No. 21728781.2, mailed on Feb. 8, 2024, 3 pages.
Final Office Action received for U.S. Appl. No. 17/746,807, mailed on Feb. 20, 2024, 24 pages.
Non-Final Office Action received for U.S. Appl. No. 17/978,930, mailed on Feb. 12, 2024, 25 pages.
Office Action received for Chinese Patent Application No. 202211081603.X, mailed on Jan. 10, 2024, 10 pages (5 pages of English Translation and 5 pages of Official Copy).
Office Action received for Chinese Patent Application No. 202211110081.1, mailed on Jan. 8, 2024, 14 pages (6 pages of English Translation and 8 pages of Official Copy).
Office Action received for Chinese Patent Application No. 202211558100.7, mailed on Jan. 8, 2024, 12 pages (6 pages of English Translation and 6 pages of Official Copy).
Applicant-Initiated Interview Summary received for U.S. Appl. No. 17/410,169, mailed on May 8, 2024, 6 pages.
Applicant-Initiated Interview Summary received for U.S. Appl. No. 17/978,930, mailed on Apr. 26, 2024, 4 pages.
Notice of Acceptance received for Australian Patent Application No. 2023204396, mailed on Apr. 15, 2024, 3 pages.
Notice of Allowance received for Japanese Patent Application No. 2022-129377, mailed on Apr. 26, 2024, 4 pages (1 page of English Translation and 3 pages of Official Copy).
Notice of Allowance received for U.S. Appl. No. 17/975,141, mailed on Apr. 29, 2024, 9 pages.
Office Action received for Japanese Patent Application No. 2022-149476, mailed on Apr. 22, 2024, 8 pages (4 pages of English Translation and 4 pages of Official Copy).
Decision to Grant received for European Patent Application No. 18728002.9, mailed on Aug. 31, 2023, 4 pages.
Final Office Action received for U.S. Appl. No. 17/476,404, mailed on Sep. 12, 2023, 30 pages.
Notice of Allowance received for U.S. Appl. No. 17/867,317, mailed on Aug. 30, 2023, 6 pages.
Applicant-Initiated Interview Summary received for U.S. Appl. No. 17/410,169, mailed on Jan. 26, 2024, 5 pages.
Decision to Grant received for European Patent Application No. 19722280.5, mailed on Feb. 1, 2024, 2 pages.
Extended European Search Report received for European Patent Application No. 23203414.0, mailed on Jan. 26, 2024, 10 pages.
Non-Final Office Action received for U.S. Appl. No. 18/197,681, mailed on Jan. 30, 2024, 32 pages.
Office Action received for Indian Patent Application No. 202117048581, mailed on Feb. 1, 2024, 6 pages.
Decision to Grant received for European Patent Application No. 20729346.5, mailed on Nov. 16, 2023, 2 pages.
Extended European Search Report received for European Patent Application No. 23190753.6, mailed on Nov. 22, 2023, 13 pages.
International Search Report and Written Opinion received for PCT Patent Application No. PCT/US2023/022410, mailed on Aug. 31, 2023, 21 pages.
Notice of Acceptance received for Australian Patent Application No. 2022241590, mailed on Nov. 14, 2023, 3 pages.
Office Action received for Australian Patent Application No. 2023201920, mailed on Nov. 10, 2023, 2 pages.
Office Action received for Japanese Patent Application No. 2022-129377, mailed on Nov. 10, 2023, 6 pages (3 pages of English Translation and 3 pages of Official Copy).
Office Action received for Korean Patent Application No. 10-2023-0001668, mailed on Nov. 3, 2023, 5 pages (2 pages of English Translation and 3 pages of Official Copy).
Summons to Attend Oral Proceedings received for European Patent Application No. 21197457.1, mailed on Nov. 23. 2023, 12 pages.
Advisory Action received for U.S. Appl. No. 18/197,681, mailed on Aug. 21, 2024, 5 pages.
Examiner-Initiated Interview Summary received for U.S. Appl. No. 18/234,613, mailed on Aug. 9, 2024, 2 pages.
Notice of Allowance received for Chinese Patent Application No. 202211081603.X, mailed on Jul. 29, 2024, 2 pages (1 page of English Translation and 1 page of Official Copy).
Notice of Allowance received for Japanese Patent Application No. 2022-149476, mailed on Aug. 2, 2024, 4 pages (1 page of English Translation and 3 pages of Official Copy).
Notice of Allowance received for U.S. Appl. No. 17/978,930, mailed on Aug. 19, 2024, 9 pages.
Supplemental Notice of Allowance received for U.S. Appl. No. 17/975,141, mailed on Aug. 12, 2024, 2 pages.
Intention to Grant received for European Patent Application No. 21197457.1, mailed on Jul. 9, 2024, 12 pages.

(56) References Cited

OTHER PUBLICATIONS

Notice of Allowance received for Chinese Patent Application No. 202010728711.6, mailed on Jul. 1, 2024, 2 pages (1 page of English Translation and 1 page of Official Copy).
Notice of Allowance received for U.S. Appl. No. 18/229,989, mailed on Jul. 24, 2024, 5 pages.
Office Action received for Australian Patent Application No. 2023204647, mailed on Jul. 5, 2024, 3 pages.
Office Action received for European Patent Application No. 22201007.6, mailed on Jul. 18, 2024, 4 pages.
Final Office Action received for U.S. Appl. No. 17/970,417, mailed on Sep. 18, 2024, 24 pages.
Non-Final Office Action received for U.S. Appl. No. 17/410,169, mailed on Sep. 10, 2024, 53 pages.
Notice of Allowance received for U.S. Appl. No. 18/122,625, mailed on Sep. 20, 2024, 5 pages.
Office Action received for Australian Patent Application No. 2023204647, mailed on Sep. 19, 2024, 2 pages.
Office Action received for Chinese Patent Application No. 202310794146.7, mailed on Aug. 30, 2024, 18 pages (11 pages of English Translation and 7 pages of Official Copy).
Final Office Action received for U.S. Appl. No. 18/088,309, mailed on Aug. 1, 2024, 16 pages.
Intention to Grant received for European Patent Application No. 23168537.1, mailed on Jul. 25, 2024, 8 pages.
Notice of Allowance received for Chinese Patent Application No. 202211110081.1, mailed on Jul. 24, 2024, 2 pages (1 page of English Translation and 1 page of Official Copy).
Supplemental Notice of Allowance received for U.S. Appl. No. 18/229,989, mailed on Aug. 7, 2024, 2 pages.
Applicant-Initiated Interview Summary received for U.S. Appl. No. 18/229,989, mailed on Jun. 28, 2024, 2 pages.
Create Confirmation Dialog Box—Matlab UIconfirm, online available at: https://www.mathworks.com/help/matlab/ref/uiconfirm.html, 2017, 19 pages.
Final Office Action received for U.S. Appl. No. 18/197,681, mailed on Jun. 27, 2024, 30 pages.
Minutes of the Oral Proceedings received for European Patent Application No. 21197457.1, mailed on Jul. 3, 2024, 9 pages.
Non-Final Office Action received for U.S. Appl. No. 18/234,613, mailed on Jul. 1, 2024, 19 pages.
Notice of Allowance received for U.S. Appl. No. 17/746,807, mailed on Jul. 3, 2024, 23 pages.
Office Action received for Chinese Patent Application No. 202311305998.1, mailed on May 29, 2024, 13 pages (7 pages of English Translation and 6 pages of Official Copy).
Office Action received for European Patent Application No. 23190753.6, mailed on Jun. 25, 2024, 10 pages.
Window confirm( ), Online available at: https://www.w3schools.com/jsref/met_win_confirm.asp, 2014, 5 pages.
Decision to Grant received for European Patent Application No. 15753796.0, mailed on Sep. 26, 2024, 3 pages.
Intention to Grant received for European Patent Application No. 23158566.2, mailed on Sep. 30, 2024, 8 pages.
Non-Final Office Action received for U.S. Appl. No. 18/102,036, mailed on Sep. 29, 2024, 16 pages.
Office Action received for Australian Patent Application No. 2023266353, mailed on Sep. 19, 2024, 2 pages.
Applicant-Initiated Interview Summary received for U.S. Appl. No. 18/088,309, mailed on Aug. 27, 2024, 2 pages.
International Preliminary Report on Patentability received for PCT Patent Application No. PCT/US2023/012260, mailed on Aug. 22, 2024, 15 pages.
Office Action received for Chinese Patent Application No. 202311321231.8, mailed on Jul. 28, 2024, 9 pages (5 pages of English Translation and 4 pages of Official Copy).
Office Action received for Japanese Patent Application No. 2023-028786, mailed on Aug. 23, 2024, 10 pages (5 pages of English Translation and 5 pages of Official Copy).
Result of Consultation received for European Patent Application No. 22201007.6, mailed on Aug. 20, 2024, 3 pages.
Applicant-Initiated Interview Summary received for U.S. Appl. No. 17/970,417, mailed on Jun. 26, 2024, 2 pages.
Applicant-Initiated Interview Summary received for U.S. Appl. No. 18/088,309, mailed on Jun. 7, 2024, 2 pages.
Brief Communication Regarding Oral Proceedings received for European Patent Application No. 21197457.1, mailed on Jun. 19, 2024, 1 page.
Final Office Action received for U.S. Appl. No. 18/200,480, mailed on Jun. 17, 2024, 19 pages.
Intention to Grant received for European Patent Application No. 15753796.0, mailed on Jun. 5, 2024, 8 pages.
Intention to Grant received for European Patent Application No. 20720310.0, mailed on Jun. 13, 2024, 13 pages.
Minutes of the Oral Proceedings received for European Patent Application No. 20720310.0, mailed on Jun. 7, 2024, 7 pages.
Notice of Allowance received for Korean Patent Application No. 10-2023-0001668, mailed on May 22, 2024, 6 pages (2 pages of English Translation and 4 pages of Official Copy).
Notice of Allowance received for U.S. Appl. No. 18/122,625, mailed on Jun. 21, 2024, 7 pages.
Office Action received for Indian Patent Application No. 202218027229, mailed on Jun. 13, 2024, 8 pages.
Result of Consultation received for European Patent Application No. 20720310.0, mailed on Jun. 4, 2024, 3 pages.
Decision to Grant received for European Patent Application No. 20720310.0, mailed on Dec. 5, 2024, 2 pages.
Extended European Search Report received for European Patent Application No. 24211972.5, mailed on Jan. 2, 2025, 7 pages.
Notice of Acceptance received for Australian Patent Application No. 2023204647, mailed on Oct. 28, 2024, 3 pages.
Notice of Allowance received for Korean Patent Application No. 10-2022-7032414, mailed on Nov. 27, 2024, 7 pages (2 pages of English Translation and 5 pages of Official Copy).
Office Action received for Chinese Patent Application No. 202310794146.7, mailed on Nov. 13, 2024, 17 pages (11 pages of English Translation and 6 pages of Official Copy).
Advisory Action received for U.S. Appl. No. 17/970,417, mailed on Dec. 12, 2024, 7 pages.
Applicant-Initiated Interview Summary received for U.S. Appl. No. 17/410,169, mailed on Nov. 6, 2024, 5 pages.
Applicant-Initiated Interview Summary received for U.S. Appl. No. 17/970,417, mailed on Nov. 4, 2024, 2 pages.
Applicant-Initiated Interview Summary received for U.S. Appl. No. 17/991,708, mailed on Dec. 16, 2024, 5 pages.
Applicant-Initiated Interview Summary received for U.S. Appl. No. 18/102,036, mailed on Nov. 8, 2024, 4 pages.
Corrected Notice of Allowance received for U.S. Appl. No. 17/848,845, mailed on Dec. 11, 2024, 3 pages.
Corrected Notice of Allowance received for U.S. Appl. No. 18/234,613, mailed on Jan. 10, 2025, 5 pages.
Corrected Notice of Allowance received for U.S. Appl. No. 18/234,613, mailed on Nov. 20, 2024, 2 pages.
Corrected Notice of Allowance received for U.S. Appl. No. 18/234,613, mailed on Oct. 28, 2024, 2 pages.
Decision to Grant received for European Patent Application No. 21197457.1, mailed on Jan. 7, 2025, 4 pages.
Examiner's Answer to Appeal Brief received for U.S. Appl. No. 18/200,480, mailed on Dec. 13, 2024, 9 pages.
Extended European Search Report received for European Patent Application No. 24194531.0, mailed on Nov. 12, 2024, 8 pages.
Final Office Action received for U.S. Appl. No. 17/410,169, mailed on Dec. 3, 2024, 56 pages.
Final Office Action received for U.S. Appl. No. 17/991,708, mailed on Dec. 30, 2024, 22 pages.
Intention to Grant received for European Patent Application No. 20720310.0, mailed on Oct. 7, 2024, 14 pages.
Intention to Grant received for European Patent Application No. 21197457.1, mailed on Nov. 21, 2024, 12 pages.
Intention to Grant received for European Patent Application No. 21197457.1, mailed on Oct. 24, 2024, 12 pages.

(56) References Cited

OTHER PUBLICATIONS

Intention to Grant received for European Patent Application No. 21789897.2, mailed on Nov. 12, 2024, 9 pages.
Intention to Grant received for European Patent Application No. 22201007.6, mailed on Jan. 29, 2025, 9 pages.
Intention to Grant received for European Patent Application No. 23168537.1, mailed on Dec. 2, 2024, 8 pages.
International Preliminary Report on Patentability received for PCT Patent Application No. PCT/US2023/022410, mailed on Nov. 28, 2024, 18 pages.
International Search Report and Written Opinion received for PCT Patent Application No. PCT/US2024/023602, mailed on Nov. 26, 2024, 17 pages.
Invitation to Pay Additional Fees and Partial International Search Report received for PCT Patent Application No. PCT/US2024/023602, mailed on Aug. 26, 2024, 11 pages.
Non-Final Office Action received for U.S. Appl. No. 17/991,708, mailed on Oct. 22, 2024, 20 pages.
Non-Final Office Action received for U.S. Appl. No. 18/102,036, mailed on Dec. 20, 2024, 16 pages.
Notice of Acceptance received for Australian Patent Application No. 2023266353, mailed on Oct. 1, 2024, 3 pages.
Notice of Acceptance received for Australian Patent Application No. 2024200283, mailed on Nov. 13, 2024, 3 pages.
Notice of Allowance received for Chinese Patent Application No. 202010728844.3, mailed on Sep. 29, 2024, 2 pages (1 page of English Translation and 1 page of Official Copy).
Notice of Allowance received for Chinese Patent Application No. 202311305998.1, mailed on Jan. 2, 2025, 2 pages (1 page of English Translation and 1 page of Official Copy).
Notice of Allowance received for Chinese Patent Application No. 202311312328.2, mailed on Jan. 3, 2025, 2 pages (1 page of English Translation and 1 page of Official Copy).
Notice of Allowance received for Japanese Patent Application No. 2023-028786, mailed on Dec. 2, 2024, 4 pages (1 page of English Translation and 3 pages of Official Copy).
Notice of Allowance received for Korean Patent Application No. 10-2024-0112016, mailed on Dec. 2, 2024, 6 pages (2 pages of English Translation and 4 pages of Official Copy).
Notice of Allowance received for U.S. Appl. No. 17/746,807, mailed on Nov. 14, 2024, 6 pages.
Notice of Allowance received for U.S. Appl. No. 17/848,845, mailed on Oct. 11, 2024, 26 pages.
Notice of Allowance received for U.S. Appl. No. 17/970,417, mailed on Feb. 5, 2025, 6 pages.
Notice of Allowance received for U.S. Appl. No. 18/077,891, mailed on Dec. 10, 2024, 9 pages.
Notice of Allowance received for U.S. Appl. No. 18/234,613, mailed on Dec. 12, 2024, 7 pages.
Notice of Allowance received for U.S. Appl. No. 18/234,613, mailed on Oct. 11, 2024, 10 pages.
Office Action received for Australian Patent Application No. 2024200283, mailed on Oct. 8, 2024, 2 pages.
Office Action received for Australian Patent Application No. 2024278098, mailed on Jan. 22, 2025, 3 pages.
Office Action received for Chinese Patent Application No. 202311305998.1, mailed on Oct. 19, 2024, 6 pages (3 pages of English Translation and 3 pages of Official Copy).
Office Action received for European Patent Application No. 22737681.1, mailed on Oct. 18, 2024, 10 pages.
Office Action received for European Patent Application No. 23190753.6, mailed on Jan. 30, 2025, 9 pages.
Prabeesh, RK. , "Android Studio Tutorial—17—Highlight selected item in a ListView", Available Online at: https://www.youtube.com/watch?v=W6bBYmXP0HY, Feb. 24, 2015, 5 pages.
Szogyenyi, Zina, "Improving the usability of multi-selecting from a long list", Available online at: https://medium.com/tripaneer-techblog/improving-the-usability-of-multi-selecting-from-a-long-list-63e1a67aab35, Jun. 13, 2018, 12 pages.

Applicant-Initiated Interview Summary received for U.S. Appl. No. 18/102,036, mailed on Mar. 10, 2025, 3 pages.
Corrected Notice of Allowance received for U.S. Appl. No. 17/746,807, mailed on Feb. 26, 2025, 3 pages.
Corrected Notice of Allowance received for U.S. Appl. No. 17/970,417, mailed on Feb. 20, 2025, 2 pages.
Decision to Grant received for European Patent Application No. 23168537.1, mailed on Mar. 20, 2025, 4 pages.
Examiner's Answer to Appeal Brief received for U.S. Appl. No. 17/747,804, mailed on Mar. 5, 2025, 23 pages.
Intention to Grant received for European Patent Application No. 23158566.2, mailed on Mar. 19, 2025, 9 pages.
International Preliminary Report on Patentability received for PCT Patent Application No. PCT/US2023/032084, mailed on Mar. 20, 2025, 7 pages.
Office Action received for Australian Patent Application No. 2024278098, mailed on Mar. 6, 2025, 3 pages.
Office Action received for European Patent Application No. 23191379.9, mailed on Mar. 24, 2025, 6 pages.
Intention to Grant received for European Patent Application No. 21789897.2, mailed on Feb. 13, 2025, 8 pages.
Office Action received for European Patent Application No. 22737681.1, mailed on Feb. 6, 2025, 9 pages.
Megasafetyfirst,"How to pair Bluetooth Headphones to your TV / SmartTV / Television (How to)", XP093245538, Available online at: https://www.youtube.com/watch?v=19VNMySYouY, Feb. 15, 2020, 2 pages.
Intention to Grant received for European Patent Application No. 22201007.6, mailed on Apr. 4, 2025, 8 pages.
Non-Final Office Action received for U.S. Appl. No. 18/197,681, mailed on Apr. 3, 2025, 30 pages.
Non-Final Office Action received for U.S. Appl. No. 18/441,971, mailed on Apr. 10, 2025, 39 pages.
Decision to Grant received for European Patent Application No. 24211972.5, mailed on Jul. 31, 2025, 2 pages.
Intention to Grant received for European Patent Application No. 23158566.2, mailed on Jul. 30, 2025, 9 pages.
Notice of Allowance received for U.S. Appl. No. 18/383,371, mailed on Jul. 30, 2025, 8 pages.
Notice of Allowance received for U.S. Appl. No. 18/441,971, mailed on Aug. 5, 2025, 11 pages.
Office Action received for European Patent Application No. 23203414.0, mailed on Jul. 29, 2025, 6 pages.
Office Action received for Japanese Patent Application No. 2024-147808, mailed on Aug. 1, 2025, 10 pages (5 pages of English Translation and 5 pages of Official Copy).
Office Action received for Korean Patent Application No. 10-2024-7011347, mailed on Jul. 31, 2025, 7 pages (3 pages of English Translation and 4 pages of Official Copy).
Decision to Grant received for European Patent Application No. 22201007.6, mailed on Jul. 17, 2025, 4 pages.
Intention to Grant received for European Patent Application No. 24211972.5, mailed on Apr. 10, 2025, 9 pages.
Office Action received for Chinese Patent Application No. 202310794146.7, mailed on Apr. 10, 2025, 11 pages (6 pages of English Translation and 5 pages of Official Copy).
Intention to Grant received for European Patent Application No. 24211972.5, mailed on Jun. 16, 2025, 9 pages.
Applicant-Initiated Interview Summary received for U.S. Appl. No. 18/102,036, mailed on Jun. 27, 2025, 3 pages.
Applicant-Initiated Interview Summary received for U.S. Appl. No. 18/197,681, mailed on Apr. 21, 2025, 4 pages.
Applicant-Initiated Interview Summary received for U.S. Appl. No. 18/383,371, mailed on Jul. 10, 2025, 2 pages.
Applicant-Initiated Interview Summary received for U.S. Appl. No. 18/441,971, mailed on Jul. 15, 2025, 4 pages.
Decision to Grant received for European Patent Application No. 21789897.2, mailed on Jun. 5, 2025, 3 pages.
Extended European Search Report received for European Patent Application No. 25154475.5, mailed on Apr. 28, 2025, 11 pages.
Extended European Search Report received for European Patent Application No. 25166659.0, mailed on Apr. 15, 2025, 9 pages.

(56) References Cited

OTHER PUBLICATIONS

Extended European Search Report received for European Patent Application No. 25174339.9, mailed on Jun. 26, 2025, 9 pages.
Final Office Action received for U.S. Appl. No. 18/102,036, mailed on Apr. 21, 2025, 19 pages.
Intention to Grant received for European Patent Application No. 22737681.1, mailed on Jul. 9, 2025, 8 pages.
Intention to Grant received for European Patent Application No. 22737681.1, mailed on May 14, 2025, 8 pages.
Intention to Grant received for European Patent Application No. 23190753.6, mailed on Jun. 18, 2025, 9 pages.
Non-Final Office Action received for U.S. Appl. No. 18/383,371, mailed on Jun. 12, 2025, 9 pages.
Notice of Allowance received for U.S. Appl. No. 17/410,169, mailed on Jul. 17, 2025, 8 pages.
Notice of Allowance received for U.S. Appl. No. 18/197,681, mailed on May 20, 2025, 18 pages.
Office Action received for Chinese Patent Application No. 202110481400.9, mailed on Apr. 23, 2025, 24 pages (14 pages of English Translation and 10 pages of Official Copy).
Office Action received for Chinese Patent Application No. 202411713875.6, mailed on May 10, 2025, 17 pages (9 pages of English Translation and 8 pages of Official Copy).
Office Action received for Chinese Patent Application No. 202411715424.6, mailed on May 17, 2025, 16 pages (8 pages of English Translation and 8 pages of Official Copy).
Office Action received for Chinese Patent Application No. 202411716388.5, mailed on Jun. 8, 2025, 14 pages (7 pages of English Translation and 7 pages of Official Copy).
Office Action received for Japanese Patent Application No. 2024-081986, mailed on May 9, 2025, 6 pages (3 pages of English Translation and 3 pages of Official Copy).
Corrected Notice of Allowance received for U.S. Appl. No. 18/441,971, mailed on Aug. 21, 2025, 2 pages.
Non-Final Office Action received for U.S. Appl. No. 18/102,036, mailed on Aug. 25, 2025, 22 pages.
Notice of Allowance received for Korean Patent Application No. 10-2025-0026405, mailed on Jul. 22, 2025, 7 pages (2 pages of English Translation and 5 pages of Official Copy).
Notice of Allowance received for Chinese Patent Application No. 202310794146.7, mailed on Sep. 29, 2025, 4 pages (1 page of English Translation and 3 pages of Official Copy).

\* cited by examiner

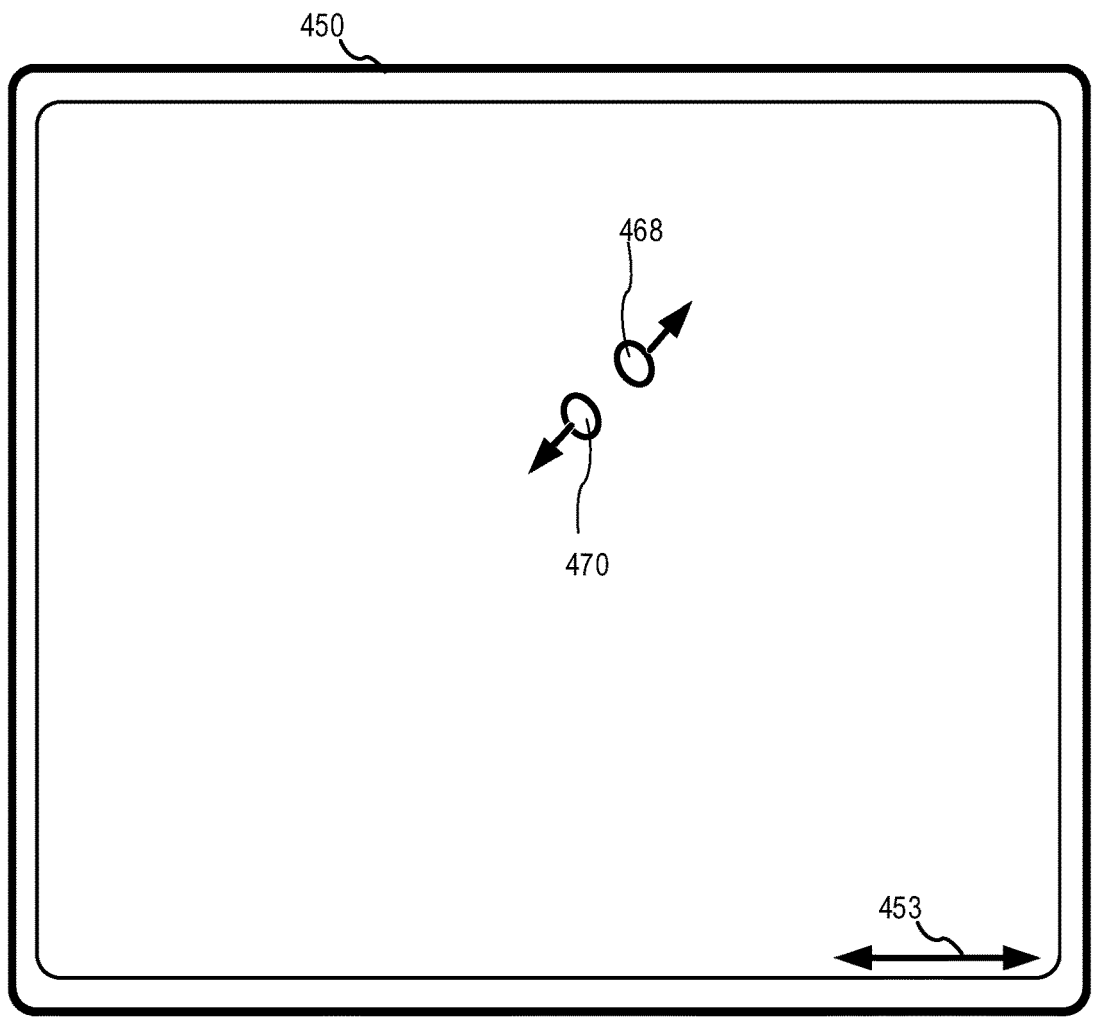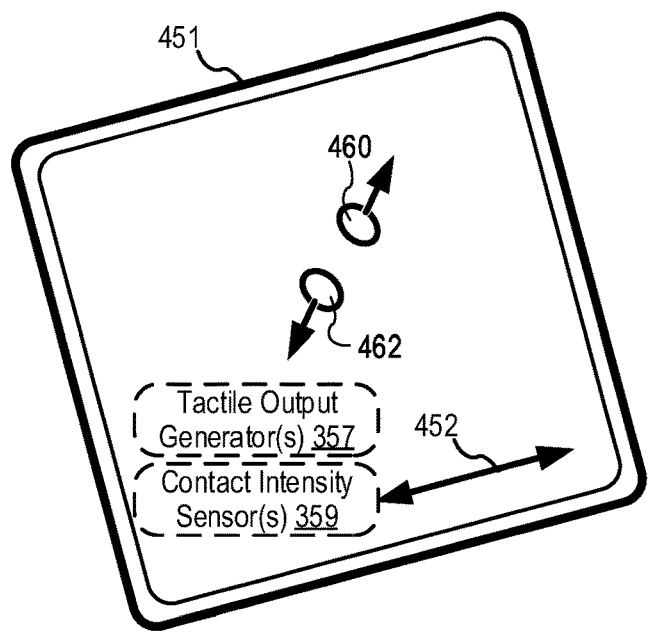
FIG. 4B

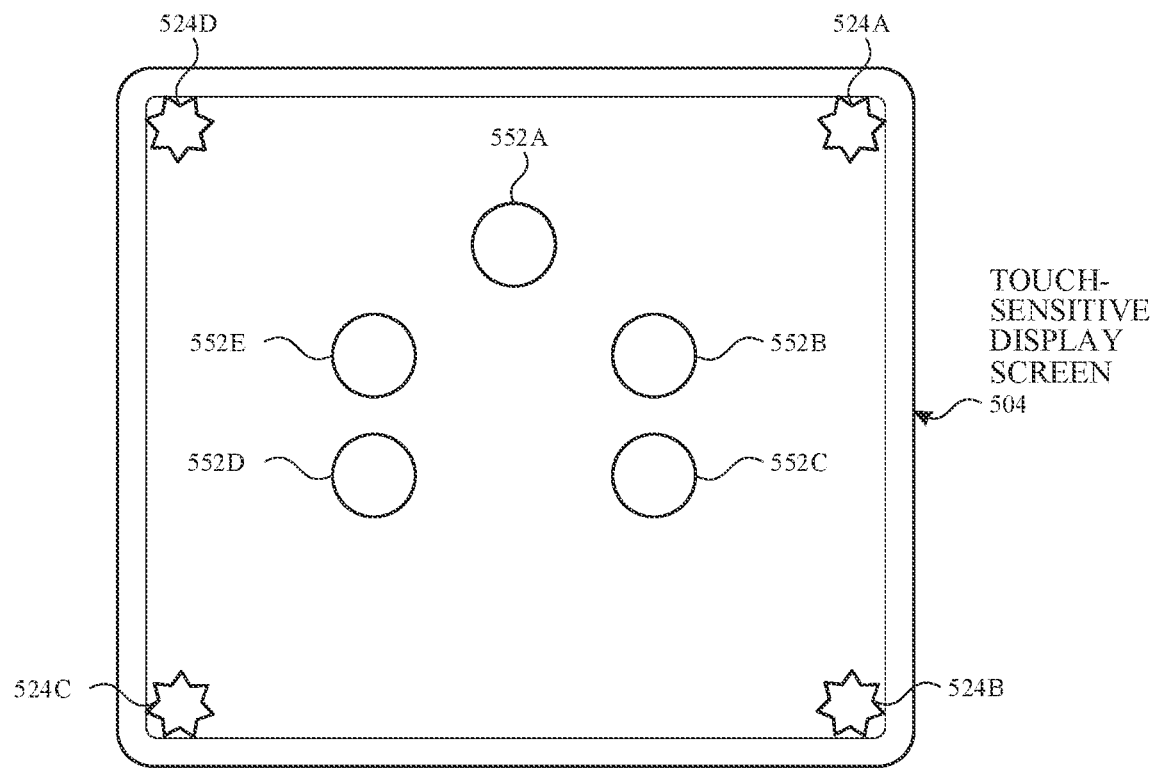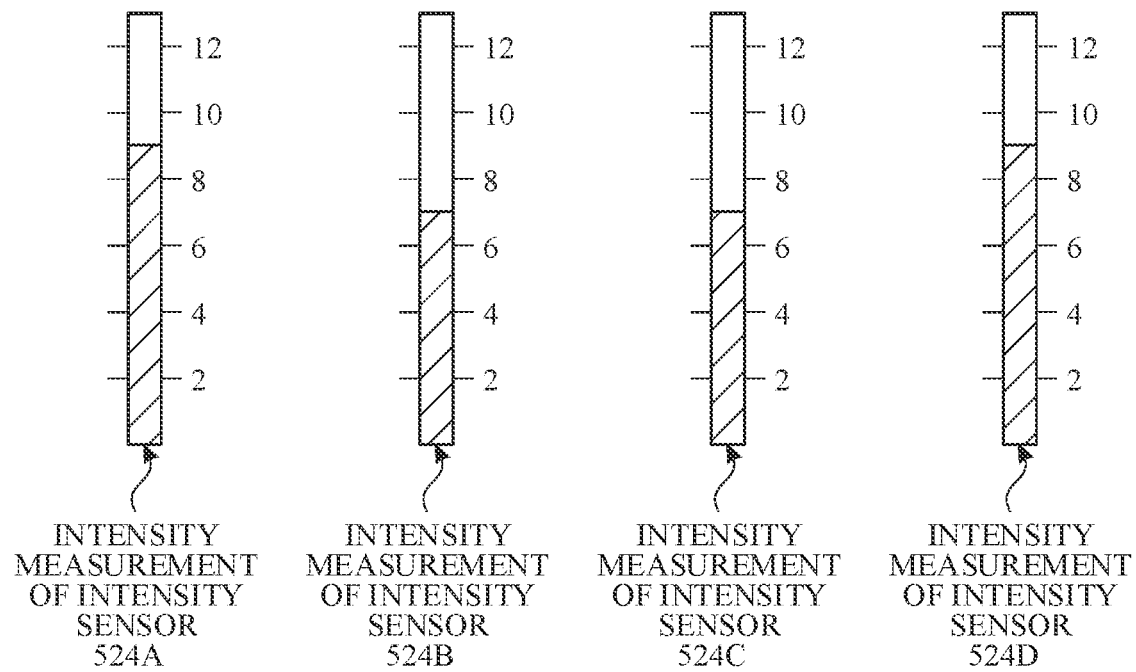
*FIG. 5C*

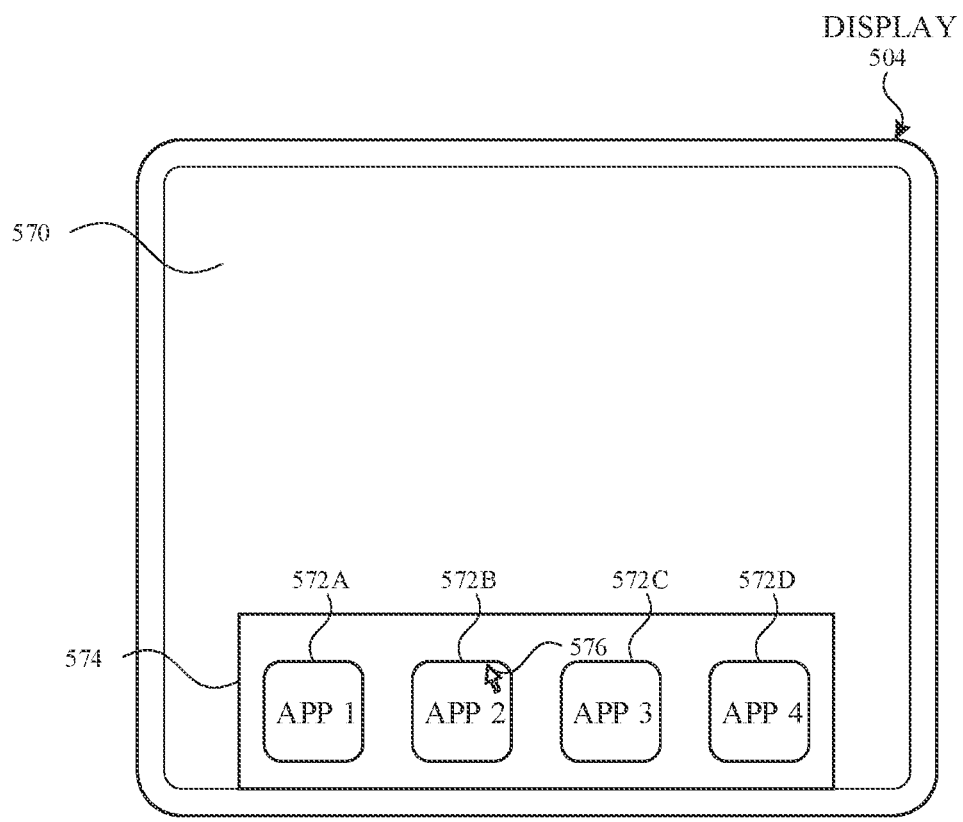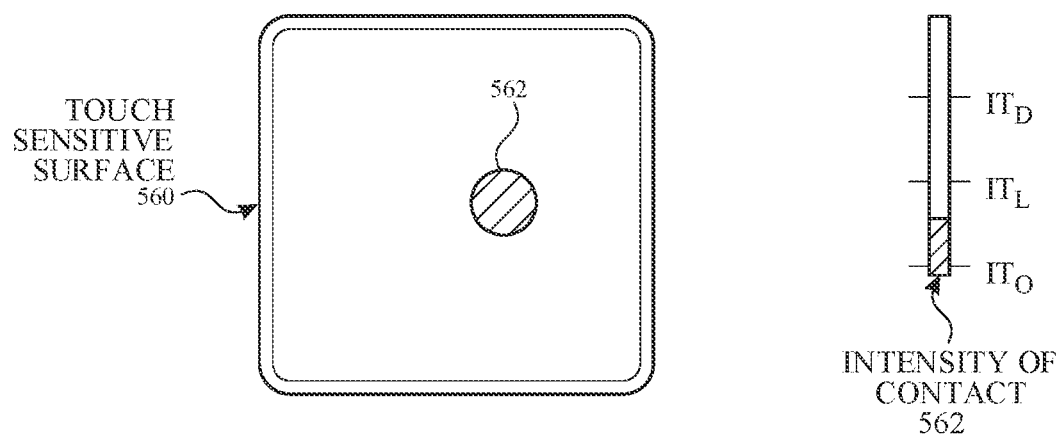
FIG. 5E

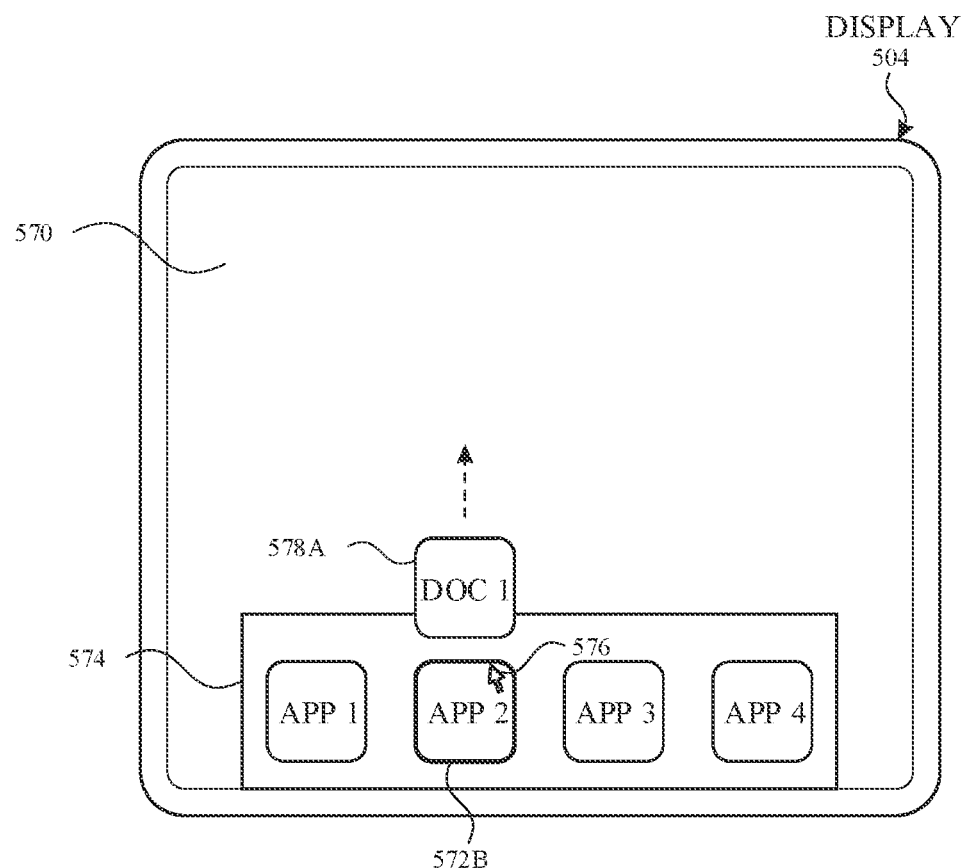
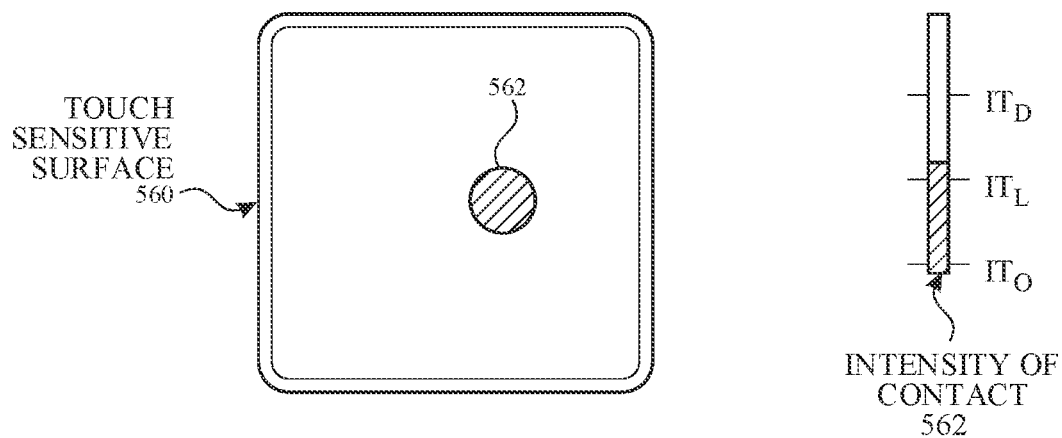
FIG. 5F

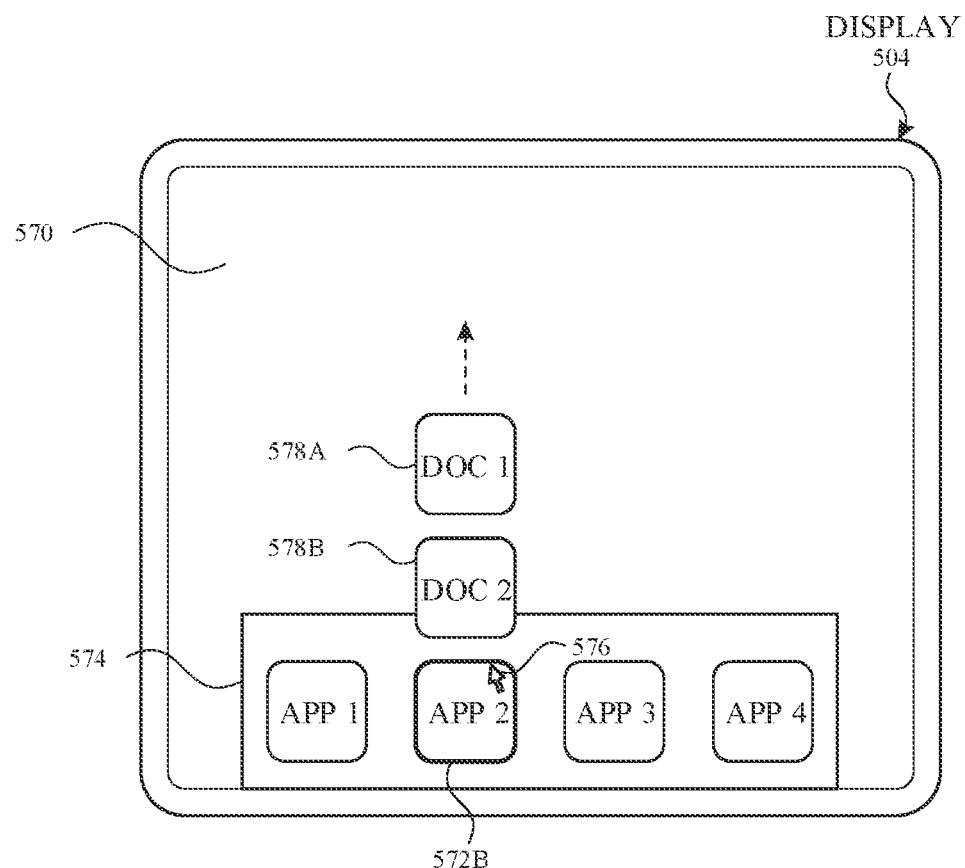
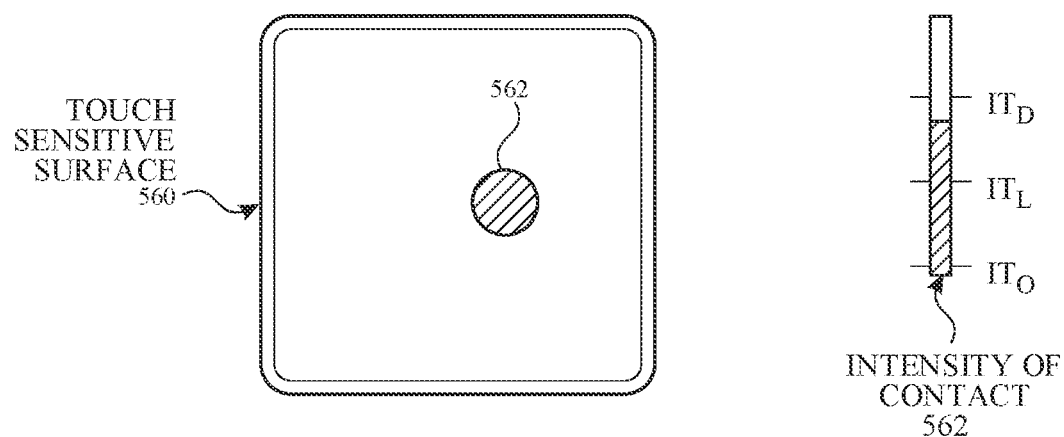
FIG. 5G

700

702
While the electronic device is connected to a first external device via a communication link, wherein the electronic device is configured to provide audio data to the first external device via the communication link, display, via the display device, a first user interface including a first affordance.

704
Detect an input corresponding to selection of the first affordance.

706
In response to detecting the input corresponding to selection of the first affordance, initiate a process to provide audio data concurrently with the first external device and a second external device different from the first external device.

708
After initiating the process to provide audio data concurrently to the first external device and a second external device, detect an indication that a physical proximity between the electronic device and the second external device satisfies a proximity condition.

710
In response to detecting the indication that the physical proximity between the electronic device and the second external device satisfies the proximity condition, display a second user interface indicating that the physical proximity between the electronic device and the second external device satisfies the proximity condition.

802
While the electronic device is connected to a first external device via a communication link, wherein the electronic device is configured to provide audio data to the first external device via the communication link, detect an indication that a physical proximity between the electronic device and a second external device, different from the first external device, satisfies a proximity condition.

↓

804
In response to detecting the indication that the physical proximity between the electronic device and the second external device satisfies the proximity condition, display, via the display device, a first user interface including a first affordance.

↓

806
Detect an input corresponding to selection of the first affordance.

↓

808
In response to detecting the input corresponding to selection of the first affordance, initiate a process to provide audio data concurrently with the first external device and the second external device.

1002
While a first connection condition is satisfied with respect to the electronic device, a first external device, and a second external device, where the electronic device is configured to provide audio data to the first external device when connected to the first external device and to provide audio data to the second external device when connected to the second external device, receive a request to display a first volume control affordance.

1004
In response to receiving the request to display the first volume control affordance, display the first volume control affordance.

1006
Detect an input corresponding to selection of the first volume control affordance.

1008
In response to detecting the input corresponding to selection of the first volume control affordance, displaying a user interface including:

1010
In accordance with a determination that a second connection condition is satisfied with respect to the second external device, display a second volume control affordance that, when selected, adjusts a volume level of the first external device and a third volume control affordance that, when selected, adjusts a volume level of the second external device.

1012
In accordance with a determination that the second connection condition is not satisfied with respect to the second external device, display a fourth volume control affordance that, when selected, adjusts a volume level of the first external device, without displaying a volume control affordance for adjusting the volume level of the second external device.

1202
While displaying a first user interface including controls for an audio media application, receive a request to display a user interface for selecting one or more devices from which audio from the audio media application is to be output.

1204
In response to receiving the request to display a user interface for selecting one or more devices from which audio from the audio media application is to be output, display a second user interface including:

1206
In accordance with a determination that a source electronic device is connected to a first external device and a second external device, different from the first external device, and configured to provide audio data from the audio media application concurrently to the first external device and the second external device, display a first affordance that, when selected, causes audio data from the audio media application to be provided concurrently to the first external device and the second external device.

1208
In accordance with a determination that the source electronic device is connected to the first external device and configured to provide audio data from the audio media application to the first external device without concurrently providing audio data from the audio media application to another external device, display a second affordance that, when selected, causes audio from the audio media application to be provided solely to the first external device.

*FIG. 12*

METHODS AND USER INTERFACES FOR SHARING AUDIO

CROSS-REFERENCE TO RELATED APPLICATIONS

This application is a continuation of U.S. patent application Ser. No. 17/509,356, titled "METHODS AND USER INTERFACES FOR SHARING AUDIO," filed on Oct. 25, 2021, which is a continuation of U.S. patent application Ser. No. 16/583,994, titled "METHODS AND USER INTERFACES FOR SHARING AUDIO," filed on Sep. 26, 2019, which claims priority to U.S. Provisional Patent Application Ser. No. 62/855,897, titled "METHODS AND USER INTERFACES FOR SHARING AUDIO," filed on May 31, 2019, the contents of each of which are hereby incorporated by reference in their entirety.

FIELD

The present disclosure relates generally to computer user interfaces, and more specifically to techniques for sharing audio data.

BACKGROUND

Electronic devices can play various types of media that include audio, such as music tracks, podcasts, audio books, and videos. Modern electronic devices can provide audio data via wireless connections to audio output devices such as wireless speakers and wireless headphones.

BRIEF SUMMARY

Some techniques for sharing audio data using electronic devices, however, are generally cumbersome and inefficient. For example, some existing techniques use a complex and time-consuming user interface, which may include multiple key presses or keystrokes. Existing techniques require more time than necessary, wasting user time and device energy. This latter consideration is particularly important in battery-operated devices.

Accordingly, the present technique provides electronic devices with faster, more efficient methods and interfaces for sharing audio data. Such methods and interfaces optionally complement or replace other methods for sharing audio data. Such methods and interfaces reduce the cognitive burden on a user and produce a more efficient human-machine interface. For battery-operated computing devices, such methods and interfaces conserve power and increase the time between battery charges.

Example methods are disclosed herein. An example method includes, at an electronic device with a display device, while the electronic device is connected to a first external device via a communication link, wherein the electronic device is configured to provide audio data to the first external device via the communication link, displaying, via the display device, a first user interface including a first affordance; detecting an input corresponding to selection of the first affordance; in response to detecting the input corresponding to selection of the first affordance, initiating a process to provide audio data concurrently with the first external device and a second external device different from the first external device; after initiating the process to provide audio data concurrently to the first external device and a second external device, detecting an indication that a physical proximity between the electronic device and the second external device satisfies a proximity condition; and in response to detecting the indication that the physical proximity between the electronic device and the second external device satisfies the proximity condition, displaying a second user interface indicating that the physical proximity between the electronic device and the second external device satisfies the proximity condition.

Example non-transitory computer-readable storage media are described herein. An example non-transitory computer-readable storage medium stores one or more programs configured to be executed by one or more processors of an electronic device with a display device, the one or more programs including instructions for: while the electronic device is connected to a first external device via a communication link, wherein the electronic device is configured to provide audio data to the first external device via the communication link, displaying, via the display device, a first user interface including a first affordance; detecting an input corresponding to selection of the first affordance; in response to detecting the input corresponding to selection of the first affordance, initiating a process to provide audio data concurrently with the first external device and a second external device different from the first external device; after initiating the process to provide audio data concurrently to the first external device and a second external device, detecting an indication that a physical proximity between the electronic device and the second external device satisfies a proximity condition; and in response to detecting the indication that the physical proximity between the electronic device and the second external device satisfies the proximity condition, displaying a second user interface indicating that the physical proximity between the electronic device and the second external device satisfies the proximity condition.

Example transitory computer-readable storage media are described herein. An example transitory computer-readable storage medium stores one or more programs configured to be executed by one or more processors of an electronic device with a display device, the one or more programs including instructions for: while the electronic device is connected to a first external device via a communication link, wherein the electronic device is configured to provide audio data to the first external device via the communication link, displaying, via the display device, a first user interface including a first affordance; detecting an input corresponding to selection of the first affordance; in response to detecting the input corresponding to selection of the first affordance, initiating a process to provide audio data concurrently with the first external device and a second external device different from the first external device; after initiating the process to provide audio data concurrently to the first external device and a second external device, detecting an indication that a physical proximity between the electronic device and the second external device satisfies a proximity condition; and in response to detecting the indication that the physical proximity between the electronic device and the second external device satisfies the proximity condition, displaying a second user interface indicating that the physical proximity between the electronic device and the second external device satisfies the proximity condition.

Example electronic devices are described herein. An example electronic device includes a display device; one or more processors; and memory storing one or more programs configured to be executed by the one or more processors, the one or more programs including instructions for: while the electronic device is connected to a first external device via a communication link, wherein the electronic device is configured to provide audio data to the first external device via the communication link, displaying, via the display device, a first user interface including a first affordance; detecting an input corresponding to selection of the first affordance; in response to detecting the input corresponding to selection of the first affordance, initiating a process to provide audio data concurrently with the first external device and a second external device different from the first external device; after initiating the process to provide audio data concurrently to the first external device and a second external device, detecting an indication that a physical proximity between the electronic device and the second external device satisfies a proximity condition; and in response to detecting the indication that the physical proximity between the electronic device and the second external device satisfies the proximity condition, displaying a second user interface indicating that the physical proximity between the electronic device and the second external device satisfies the proximity condition.

An example electronic device includes a display device; means for, while the electronic device is connected to a first external device via a communication link, wherein the electronic device is configured to provide audio data to the first external device via the communication link, displaying, via the display device, a first user interface including a first affordance; means for detecting an input corresponding to selection of the first affordance; means for, in response to detecting the input corresponding to selection of the first affordance, initiating a process to provide audio data concurrently with the first external device and a second external device different from the first external device; means for, after initiating the process to provide audio data concurrently to the first external device and a second external device, detecting an indication that a physical proximity between the electronic device and the second external device satisfies a proximity condition; and means for, in response to detecting the indication that the physical proximity between the electronic device and the second external device satisfies the proximity condition, displaying a second user interface indicating that the physical proximity between the electronic device and the second external device satisfies the proximity condition.

An example method includes, at an electronic device with a display device: while the electronic device is connected to a first external device via a communication link, wherein the electronic device is configured to provide audio data to the first external device via the communication link, detecting an indication that a physical proximity between the electronic device and a second external device, different from the first external device, satisfies a proximity condition; in response to detecting the indication that the physical proximity between the electronic device and the second external device satisfies the proximity condition, displaying, via the display device, a first user interface including a first affordance; detecting an input corresponding to selection of the first affordance; and in response to detecting the input corresponding to selection of the first affordance, initiating a process to provide audio data concurrently with the first external device and the second external device.

An example non-transitory computer-readable storage medium stores one or more programs configured to be executed by one or more processors of an electronic device with a display device, the one or more programs including instructions for: while the electronic device is connected to a first external device via a communication link, wherein the electronic device is configured to provide audio data to the first external device via the communication link, detecting an indication that a physical proximity between the electronic device and a second external device, different from the first external device, satisfies a proximity condition; in response to detecting the indication that the physical proximity between the electronic device and the second external device satisfies the proximity condition, displaying, via the display device, a first user interface including a first affordance; detecting an input corresponding to selection of the first affordance; and in response to detecting the input corresponding to selection of the first affordance, initiating a process to provide audio data concurrently with the first external device and the second external device.

An example transitory computer-readable storage medium stores one or more programs configured to be executed by one or more processors of an electronic device with a display device, the one or more programs including instructions for: while the electronic device is connected to a first external device via a communication link, wherein the electronic device is configured to provide audio data to the first external device via the communication link, detecting an indication that a physical proximity between the electronic device and a second external device, different from the first external device, satisfies a proximity condition; in response to detecting the indication that the physical proximity between the electronic device and the second external device satisfies the proximity condition, displaying, via the display device, a first user interface including a first affordance; detecting an input corresponding to selection of the first affordance; and in response to detecting the input corresponding to selection of the first affordance, initiating a process to provide audio data concurrently with the first external device and the second external device.

An example electronic device includes a display device; one or more processors; and memory storing one or more programs configured to be executed by the one or more processors, the one or more programs including instructions for: while the electronic device is connected to a first external device via a communication link, wherein the electronic device is configured to provide audio data to the first external device via the communication link, detecting an indication that a physical proximity between the electronic device and a second external device, different from the first external device, satisfies a proximity condition; in response to detecting the indication that the physical proximity between the electronic device and the second external device satisfies the proximity condition, displaying, via the display device, a first user interface including a first affordance; detecting an input corresponding to selection of the first affordance; and in response to detecting the input corresponding to selection of the first affordance, initiating a process to provide audio data concurrently with the first external device and the second external device.

An example electronic device includes a display device; means for, while the electronic device is connected to a first external device via a communication link, wherein the electronic device is configured to provide audio data to the first external device via the communication link, detecting an indication that a physical proximity between the electronic device and a second external device, different from the first external device, satisfies a proximity condition; means for, in response to detecting the indication that the physical proximity between the electronic device and the second external device satisfies the proximity condition, displaying, via the display device, a first user interface including a first affordance; means for detecting an input corresponding to selection of the first affordance; and means for, in response to detecting the input corresponding to selection of the first affordance, initiating a process to provide audio data concurrently with the first external device and the second external device.

An example method includes, at an electronic device with a display device: while a first connection condition is satisfied with respect to the electronic device, a first external device, and a second external device, wherein the electronic device is configured to provide audio data to the first external device when connected to the first external device and to provide audio data to the second external device when connected to the second external device, receiving a request to display a first volume control affordance; in response to receiving the request to display the first volume control affordance, displaying the first volume control affordance; detecting an input corresponding to selection of the first volume control affordance; and in response to detecting the input corresponding to selection of the first volume control affordance, displaying a user interface including: in accordance with a determination that a second connection condition is satisfied with respect to the second external device, displaying a second volume control affordance that, when selected, adjusts a volume level of the first external device and a third volume control affordance that, when selected, adjusts a volume level of the second external device; and in accordance with a determination that the second connection condition is not satisfied with respect to the second external device, displaying a fourth volume control affordance that, when selected, adjusts a volume level of the first external device, without displaying a volume control affordance for adjusting the volume level of the second external device.

An example non-transitory computer-readable storage medium stores one or more programs configured to be executed by one or more processors of an electronic device with a display device, the one or more programs including instructions for: while a first connection condition is satisfied with respect to the electronic device, a first external device, and a second external device, wherein the electronic device is configured to provide audio data to the first external device when connected to the first external device and to provide audio data to the second external device when connected to the second external device, receiving a request to display a first volume control affordance; in response to receiving the request to display the first volume control affordance, displaying the first volume control affordance; detecting an input corresponding to selection of the first volume control affordance; and in response to detecting the input corresponding to selection of the first volume control affordance, displaying a user interface including: in accordance with a determination that a second connection condition is satisfied with respect to the second external device, displaying a second volume control affordance that, when selected, adjusts a volume level of the first external device and a third volume control affordance that, when selected, adjusts a volume level of the second external device; and in accordance with a determination that the second connection condition is not satisfied with respect to the second external device, displaying a fourth volume control affordance that, when selected, adjusts a volume level of the first external device, without displaying a volume control affordance for adjusting the volume level of the second external device.

An example transitory computer-readable storage medium stores one or more programs configured to be executed by one or more processors of an electronic device with a display device, the one or more programs including instructions for: while a first connection condition is satisfied with respect to the electronic device, a first external device, and a second external device, wherein the electronic device is configured to provide audio data to the first external device when connected to the first external device and to provide audio data to the second external device when connected to the second external device, receiving a request to display a first volume control affordance; in response to receiving the request to display the first volume control affordance, displaying the first volume control affordance; detecting an input corresponding to selection of the first volume control affordance; and in response to detecting the input corresponding to selection of the first volume control affordance, displaying a user interface including: in accordance with a determination that a second connection condition is satisfied with respect to the second external device, displaying a second volume control affordance that, when selected, adjusts a volume level of the first external device and a third volume control affordance that, when selected, adjusts a volume level of the second external device; and in accordance with a determination that the second connection condition is not satisfied with respect to the second external device, displaying a fourth volume control affordance that, when selected, adjusts a volume level of the first external device, without displaying a volume control affordance for adjusting the volume level of the second external device.

An example electronic device includes a display device; one or more processors; and memory storing one or more programs configured to be executed by the one or more processors, the one or more programs including instructions for: while a first connection condition is satisfied with respect to the electronic device, a first external device, and a second external device, wherein the electronic device is configured to provide audio data to the first external device when connected to the first external device and to provide audio data to the second external device when connected to the second external device, receiving a request to display a first volume control affordance; in response to receiving the request to display the first volume control affordance, displaying the first volume control affordance; detecting an input corresponding to selection of the first volume control affordance; and in response to detecting the input corresponding to selection of the first volume control affordance, displaying a user interface including: in accordance with a determination that a second connection condition is satisfied with respect to the second external device, displaying a second volume control affordance that, when selected, adjusts a volume level of the first external device and a third volume control affordance that, when selected, adjusts a volume level of the second external device; and in accordance with a determination that the second connection condition is not satisfied with respect to the second external device, displaying a fourth volume control affordance that, when selected, adjusts a volume level of the first external device, without displaying a volume control affordance for adjusting the volume level of the second external device.

An example electronic device includes a display device; means for while a first connection condition is satisfied with respect to the electronic device, a first external device, and a second external device, wherein the electronic device is configured to provide audio data to the first external device when connected to the first external device and to provide audio data to the second external device when connected to the second external device, receiving a request to display a first volume control affordance; means for, in response to receiving the request to display the first volume control affordance, displaying the first volume control affordance; means for detecting an input corresponding to selection of the first volume control affordance; and means for, in response to detecting the input corresponding to selection of the first volume control affordance, displaying a user interface including: in accordance with a determination that a second connection condition is satisfied with respect to the second external device, displaying a second volume control affordance that, when selected, adjusts a volume level of the first external device and a third volume control affordance that, when selected, adjusts a volume level of the second external device; and in accordance with a determination that the second connection condition is not satisfied with respect to the second external device, displaying a fourth volume control affordance that, when selected, adjusts a volume level of the first external device, without displaying a volume control affordance for adjusting the volume level of the second external device.

An example method includes, at an electronic device with a display device: while displaying a first user interface including controls for an audio media application, receiving a request to display a user interface for selecting one or more devices from which audio from the audio media application is to be output; in response to receiving the request to display a user interface for selecting one or more devices from which audio from the audio media application is to be output, displaying a second user interface including: in accordance with a determination that a source electronic device is connected to a first external device and a second external device, different from the first external device, and configured to provide audio data from the audio media application concurrently to the first external device and the second external device, displaying a first affordance that, when selected, causes audio data from the audio media application to be provided concurrently to the first external device and the second external device; and in accordance with a determination that the source electronic device is connected to the first external device and configured to provide audio data from the audio media application to the first external device without concurrently providing audio data from the audio media application to another external device, displaying a second affordance that, when selected, causes audio data from the audio media application to be provided solely to the first external device.

An example non-transitory computer-readable storage medium stores one or more programs configured to be executed by one or more processors of an electronic device with a display device, the one or more programs including instructions for: while displaying a first user interface including controls for an audio media application, receiving a request to display a user interface for selecting one or more devices from which audio from the audio media application is to be output; in response to receiving the request to display a user interface for selecting one or more devices from which audio from the audio media application is to be output, displaying a second user interface including: in accordance with a determination that a source electronic device is connected to a first external device and a second external device, different from the first external device, and configured to provide audio data from the audio media application concurrently to the first external device and the second external device, displaying a first affordance that, when selected, causes audio data from the audio media application to be provided concurrently to the first external device and the second external device; and in accordance with a determination that the source electronic device is connected to the first external device and configured to provide audio data from the audio media application to the first external device without concurrently providing audio data from the audio media application to another external device, displaying a second affordance that, when selected, causes audio data from the audio media application to be provided solely to the first external device.

An example transitory computer-readable storage medium stores one or more programs configured to be executed by one or more processors of an electronic device with a display device, the one or more programs including instructions for: while displaying a first user interface including controls for an audio media application, receiving a request to display a user interface for selecting one or more devices from which audio from the audio media application is to be output; in response to receiving the request to display a user interface for selecting one or more devices from which audio from the audio media application is to be output, displaying a second user interface including: in accordance with a determination that a source electronic device is connected to a first external device and a second external device, different from the first external device, and configured to provide audio data from the audio media application concurrently to the first external device and the second external device, displaying a first affordance that, when selected, causes audio data from the audio media application to be provided concurrently to the first external device and the second external device; and in accordance with a determination that the source electronic device is connected to the first external device and configured to provide audio data from the audio media application to the first external device without concurrently providing audio data from the audio media application to another external device, displaying a second affordance that, when selected, causes audio data from the audio media application to be provided solely to the first external device.

An example electronic device includes a display device; one or more processors; and memory storing one or more programs configured to be executed by the one or more processors, the one or more programs including instructions for: while displaying a first user interface including controls for an audio media application, receiving a request to display a user interface for selecting one or more devices from which audio from the audio media application is to be output; in response to receiving the request to display a user interface for selecting one or more devices from which audio from the audio media application is to be output, displaying a second user interface including: in accordance with a determination that a source electronic device is connected to a first external device and a second external device, different from the first external device, and configured to provide audio data from the audio media application concurrently to the first external device and the second external device, displaying a first affordance that, when selected, causes audio data from the audio media application to be provided concurrently to the first external device and the second external device; and in accordance with a determination that the source electronic device is connected to the first external device and configured to provide audio data from the audio media application to the first external device without concurrently providing audio data from the audio media application to another external device, displaying a second affordance that, when selected, causes audio data from the audio media application to be provided solely to the first external device.

An example electronic device includes a display device; means for while displaying a first user interface including controls for an audio media application, receiving a request to display a user interface for selecting one or more devices from which audio from the audio media application is to be output; and means for, in response to receiving the request to display a user interface for selecting one or more devices from which audio from the audio media application is to be output, displaying a second user interface including: in accordance with a determination that a source electronic device is connected to a first external device and a second external device, different from the first external device, and configured to provide audio data from the audio media application concurrently to the first external device and the second external device, displaying a first affordance that, when selected, causes audio data from the audio media application to be provided concurrently to the first external device and the second external device; and in accordance with a determination that the source electronic device is connected to the first external device and configured to provide audio data from the audio media application to the first external device without concurrently providing audio data from the audio media application to another external device, displaying a second affordance that, when selected, causes audio data from the audio media application to be provided solely to the first external device.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for sharing audio data, thereby increasing the effectiveness, efficiency, and user satisfaction with such devices. Such methods and interfaces may complement or replace other methods for sharing audio data.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 4B illustrates an exemplary user interface for a multifunction device with a touch-sensitive surface that is separate from the display in accordance with some embodiments.

FIGS. 5C-5D illustrate exemplary components of a personal electronic device having a touch-sensitive display and intensity sensors in accordance with some embodiments.

FIGS. 5E-5H illustrate exemplary components and user interfaces of a personal electronic device in accordance with some embodiments.

FIG. 7 illustrates an exemplary method in accordance with some embodiments.

FIG. 8 illustrates an exemplary method in accordance with some embodiments.

FIG. 10 illustrates an exemplary method in accordance with some embodiments.

FIG. 12 illustrates an exemplary method in accordance with some embodiments.

DESCRIPTION OF EMBODIMENTS

Figure 1A:
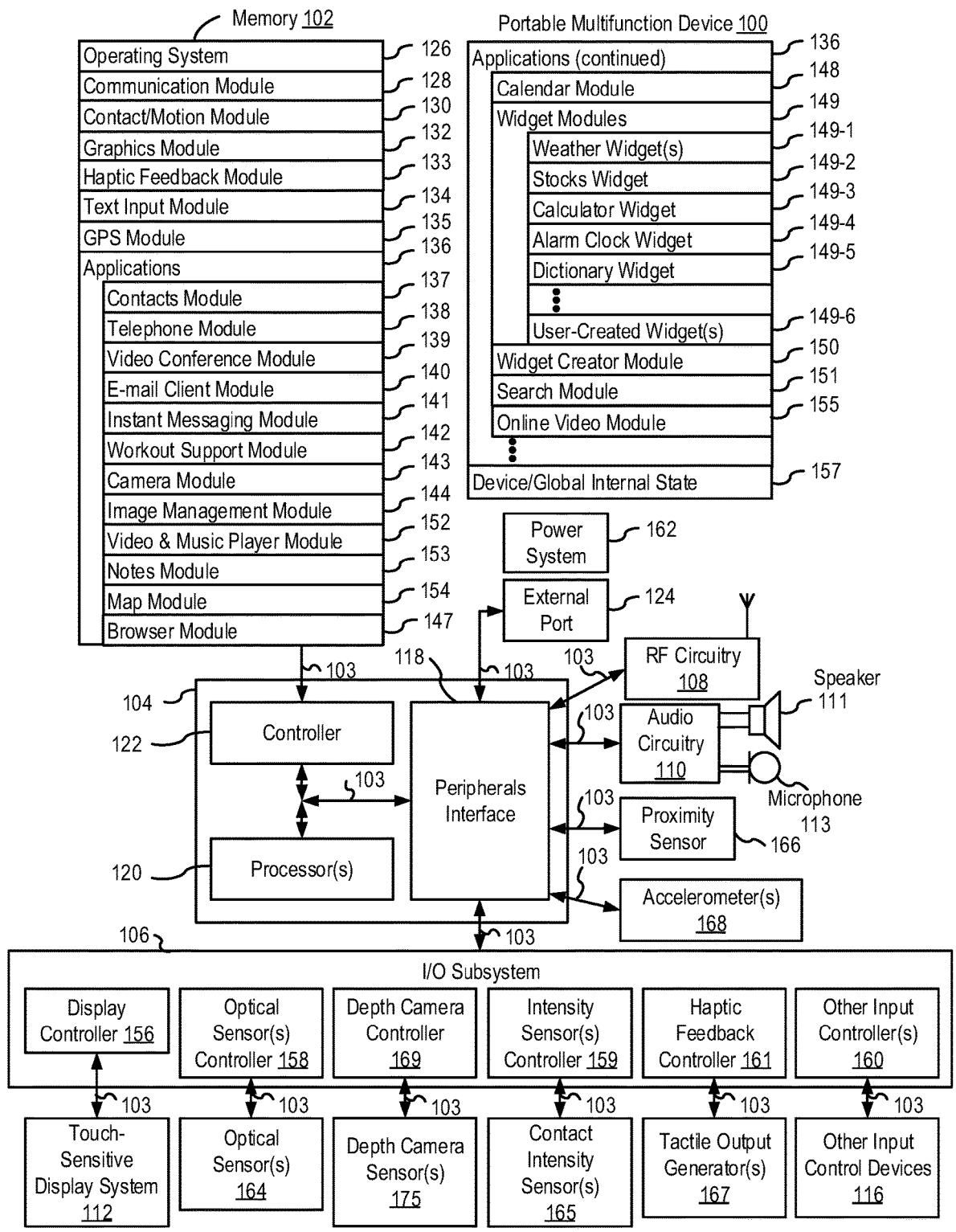
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for sharing audio data. In some embodiments, while a primary device is connected to a first wireless device (e.g., a pair of wireless headphones paired to the primary device), the primary device enters a sharing mode in response to selection of a share audio affordance. In response to a second wireless device (e.g., another user's pair of wireless headphones) being brought into close proximity of the primary device, a process is initiated for the primary device to share audio data with the second external device while concurrently providing the same audio data to the first external device. In some embodiments, the audio data is temporarily shared with the second external device. This allows a user to easily share audio wirelessly with another person so that they can listen to the audio together, e.g., without requiring a preexisting or persistent relationship between the primary device and the second external device. In some embodiments, the sharing process is initiated by bringing the second external device into proximity with the primary device, without initially requiring selection of the share audio affordance. Exemplary techniques for controlling the volume of the first and second external devices while sharing audio data are also described. For example, the primary device can provide a volume control interface based on the configuration of the connection with the second external device (e.g., whether the second external device is being controlled by a third external device (e.g., a phone)). Exemplary techniques for selecting a device for playing audio are also described. For example, an audio media user interface provides options (e.g., affordances) to select where to play music based on whether the primary device is sharing audio. Such techniques can reduce the cognitive burden on a user who share audio data, thereby enhancing productivity. Further, such techniques can reduce processor and battery power otherwise wasted on redundant user inputs.

Below, FIGS. 1A-1B, 2, 3, 4A-4B, and 5A-5H provide a description of exemplary devices for performing the techniques for sharing audio data. FIGS. 6A-6R illustrate exemplary user interfaces for sharing audio data. FIGS. 7-8 are flow diagrams illustrating methods of sharing audio data in accordance with some embodiments. The user interfaces in FIGS. 6A-6R are used to illustrate the processes described below, including the processes in FIGS. 7-8. FIGS. 9A-9E illustrate exemplary user interfaces for sharing audio data. FIG. 10 is a flow diagram illustrating methods of sharing audio data in accordance with some embodiments. The user interfaces in FIGS. 9A-9E are used to illustrate the processes described below, including the processes in FIG. 10. FIGS. 11A-11F illustrate exemplary user interfaces for sharing audio data. FIG. 12 is a flow diagram illustrating methods of sharing audio data in accordance with some embodiments. The user interfaces in FIGS. 11A-11F are used to illustrate the processes described below, including the processes in FIG. 12.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), BLUETOOTH, BLUETOOTH Low Energy (BTLE), Wireless Fidelity (WI-FI) (e.g., IEEE 802.11a, IEEE 802.11b, IEEE 802.11g, IEEE 802.11n, and/or IEEE 802.11ac), voice over Internet Protocol (VoIP), WI-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
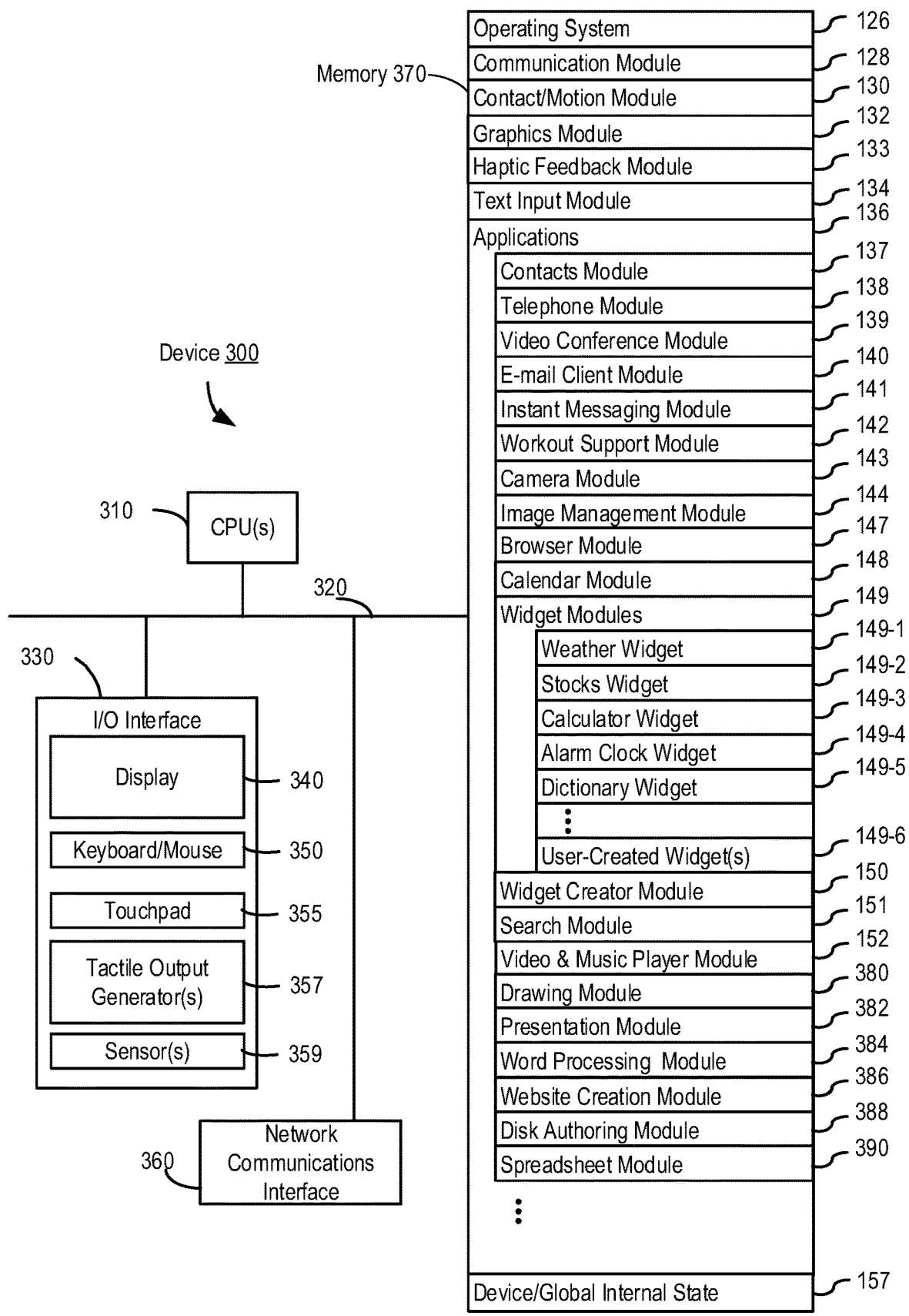
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts module 137, e-mail client module 140, IM module 141, browser module 147, and any other application that needs text input).

GPS module 135 determines the location of the device and provides this information for use in various applications (e.g., to telephone module 138 for use in location-based dialing; to camera module 143 as picture/video metadata; and to applications that provide location-based services such as weather widgets, local yellow page widgets, and map/navigation widgets).

Applications 136 optionally include the following modules (or sets of instructions), or a subset or superset thereof:

Contacts module 137 (sometimes called an address book or contact list);

Telephone module 138;
Video conference module 139;
E-mail client module 140;
Instant messaging (IM) module 141;
Workout support module 142;
Camera module 143 for still and/or video images;
Image management module 144;
Video player module;
Music player module;
Browser module 147;
Calendar module 148;
Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
Widget creator module 150 for making user-created widgets 149-6;
Search module 151;
Video and music player module 152, which merges video player module and music player module;
Notes module 153;
Map module 154; and/or
Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone module 138, video conference module 139, e-mail client module 140, or IM module 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JAVASCRIPT file. In some embodiments, a widget includes an XML (Extensible Markup Language) file and a JAVASCRIPT file (e.g., YAHOO! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
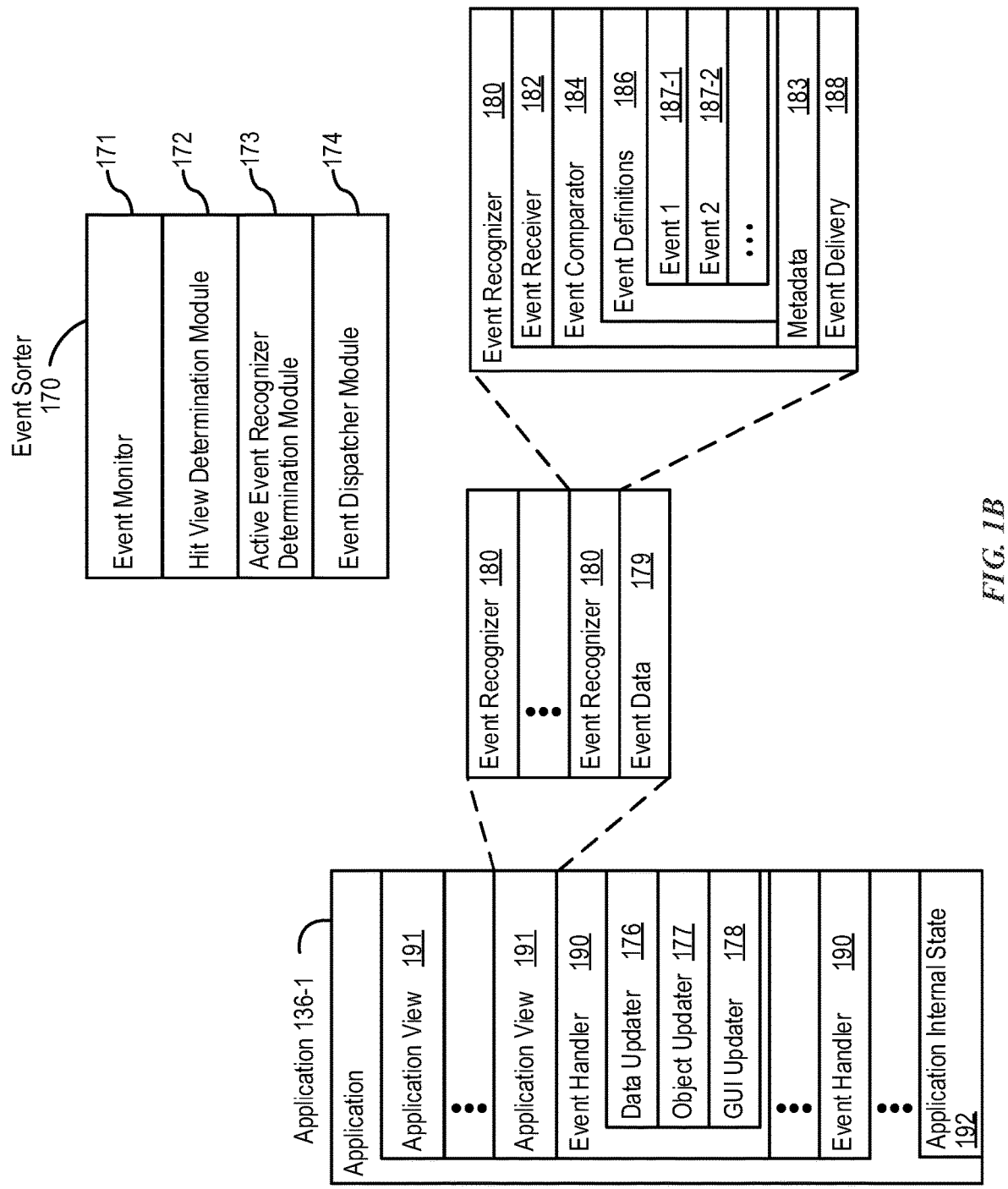
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
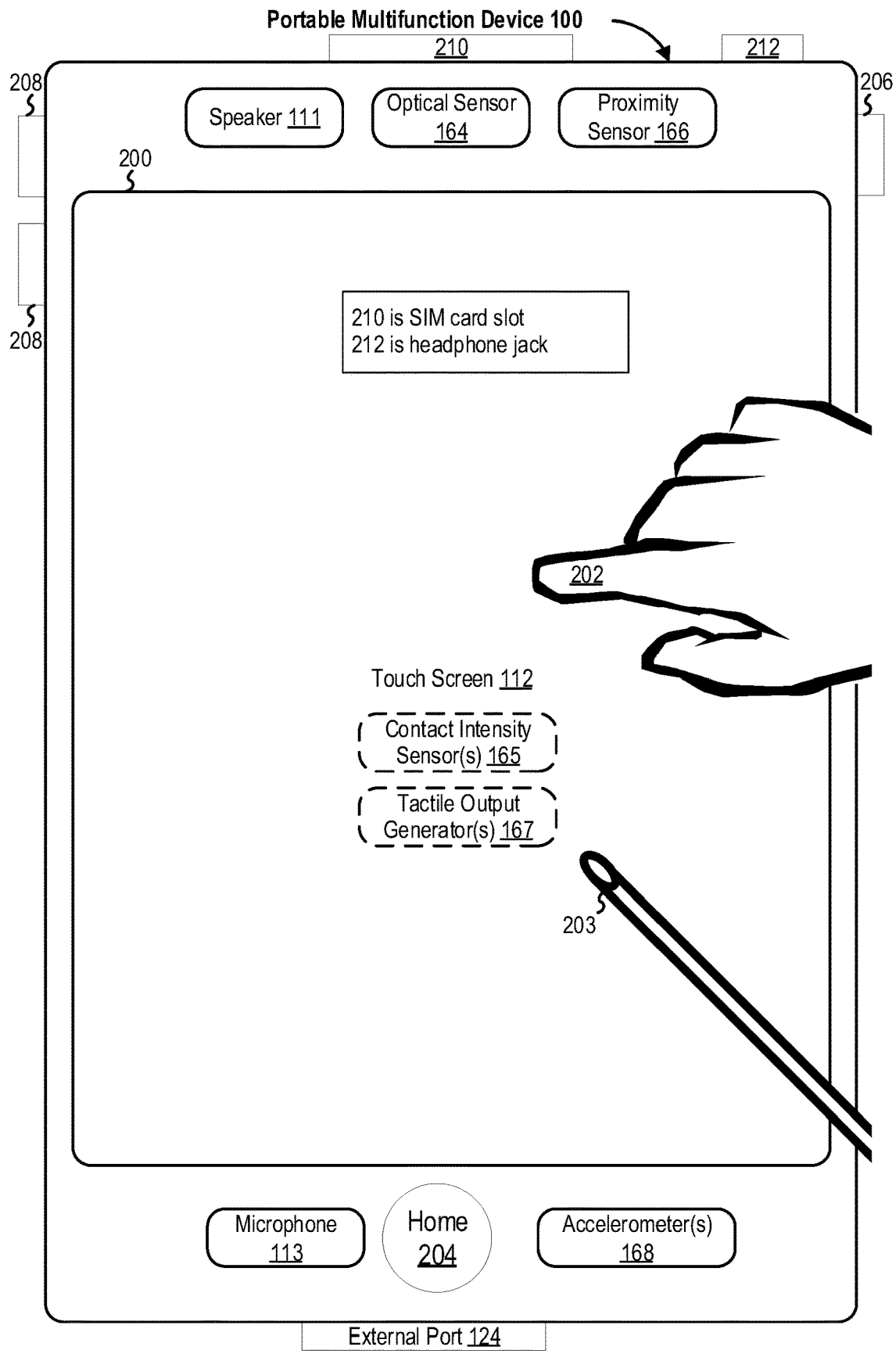
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
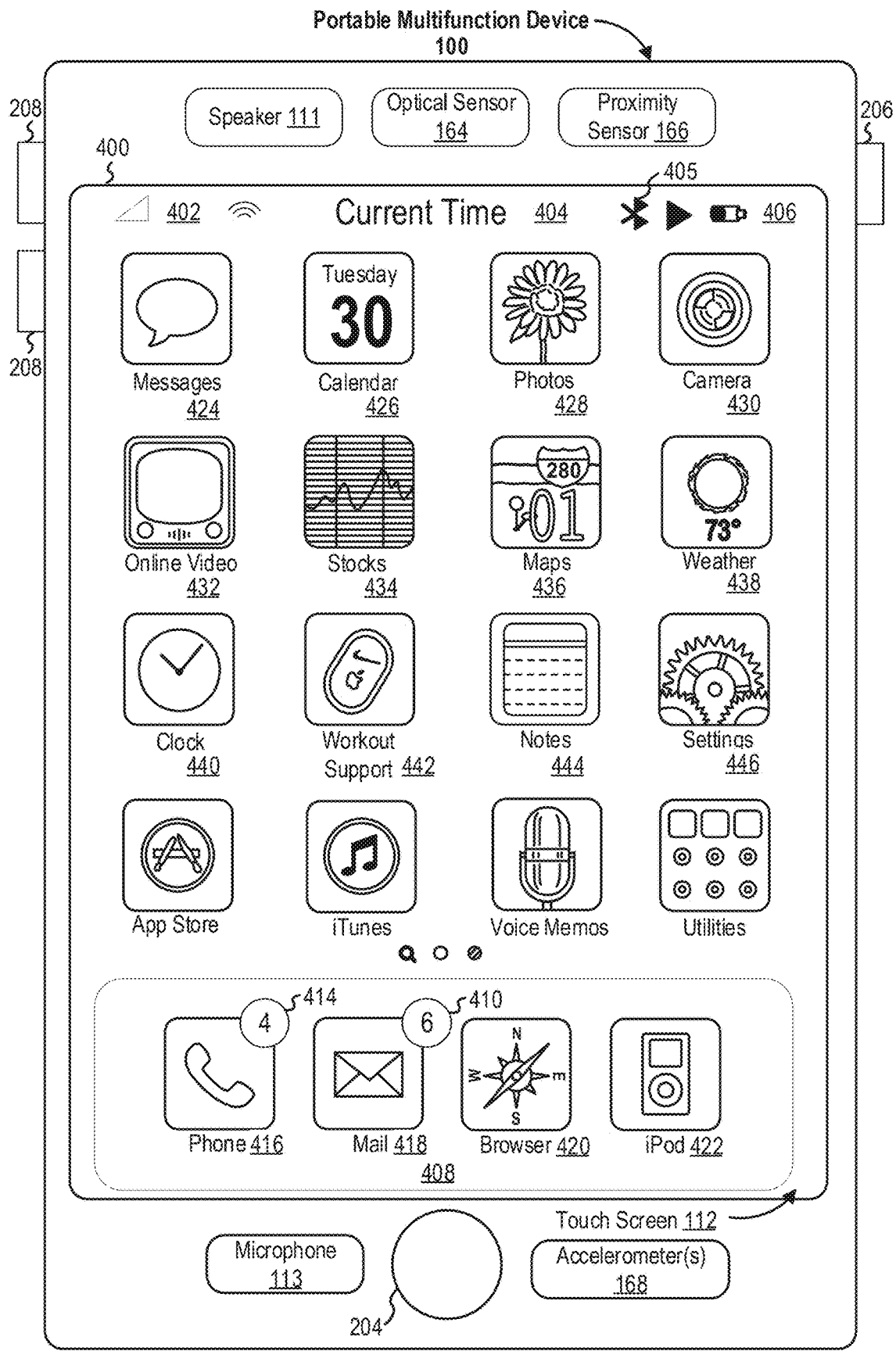
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and WI-FI signals;
Time 404;
BLUETOOTH indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and Icons for other applications, such as:
Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
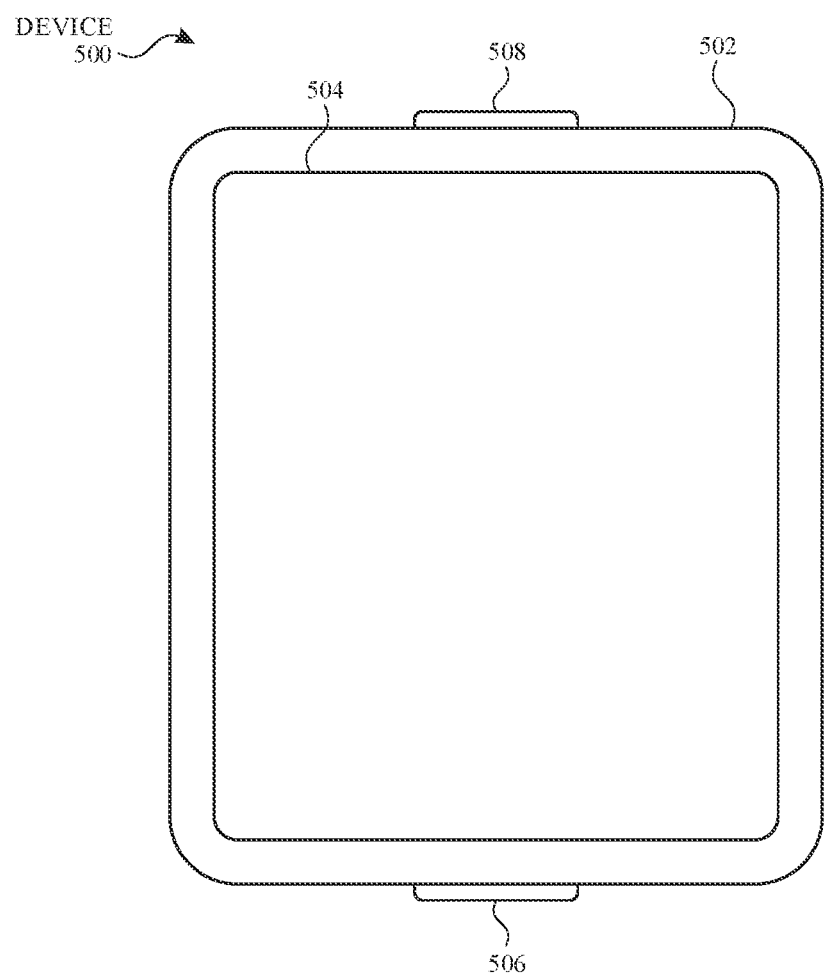
FIG. 5A illustrates a personal electronic device in accordance with some embodiments.
Figure 6A:
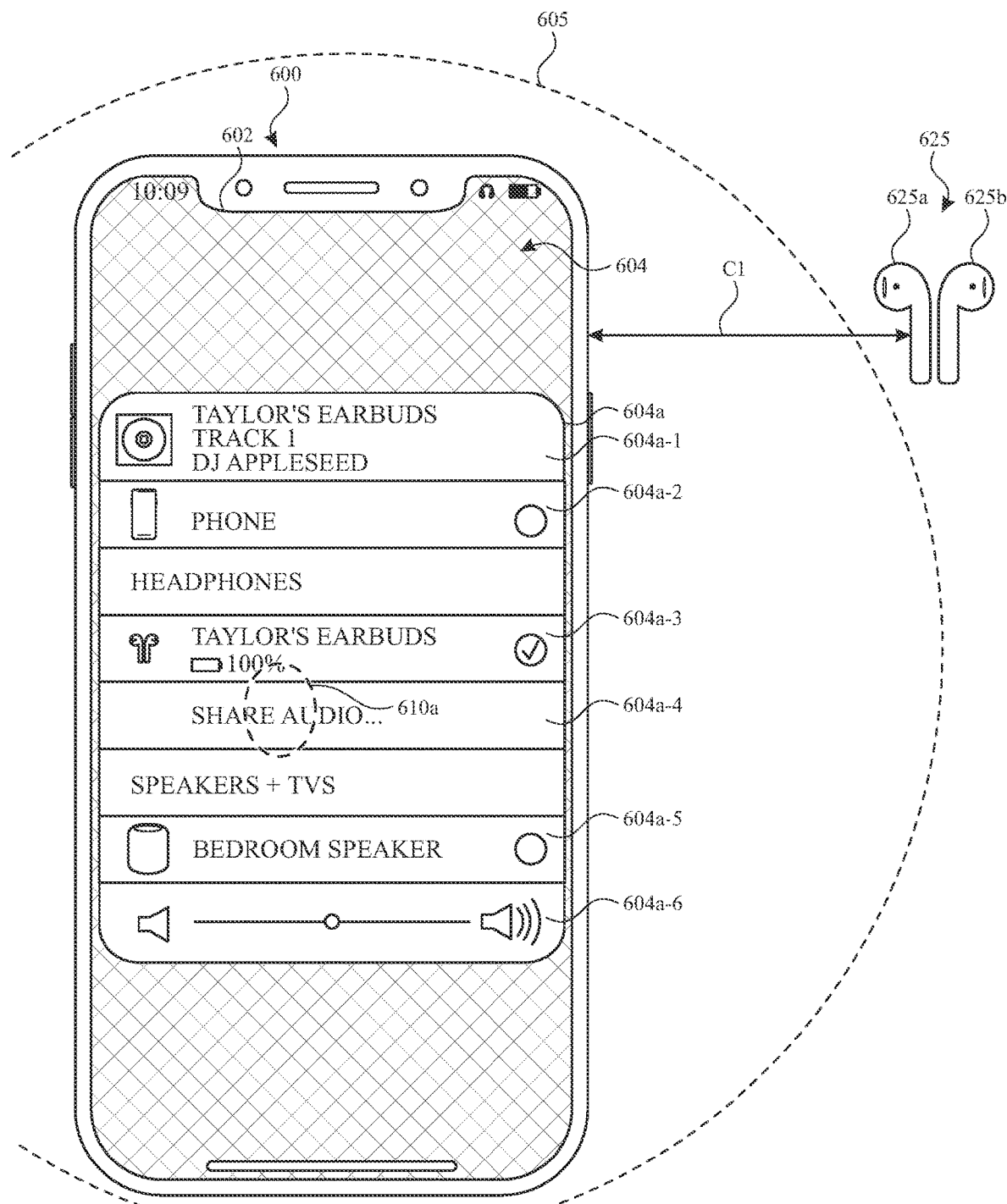
FIGS. 6A-6R illustrate exemplary user interfaces in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
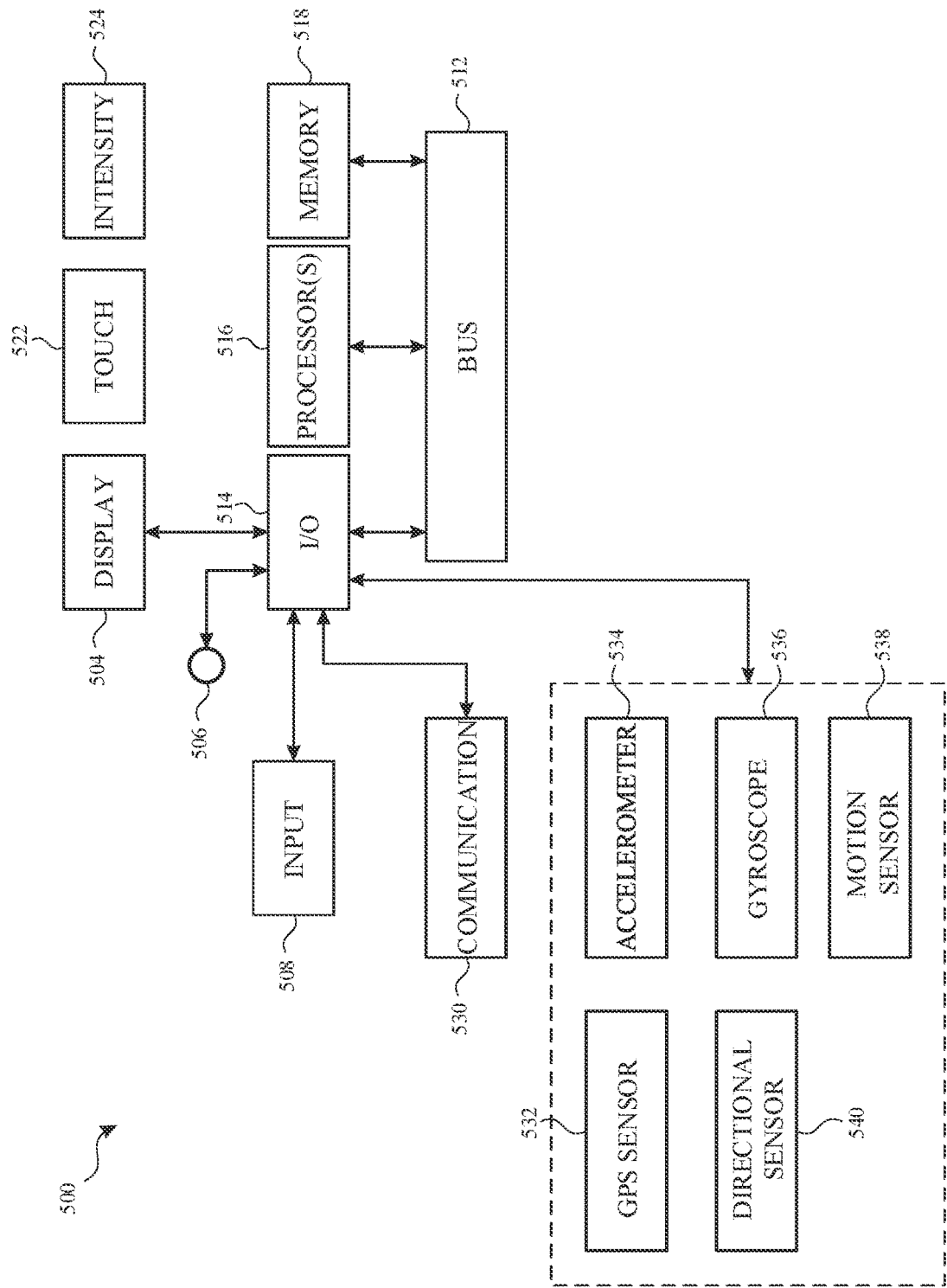
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using WI-FI, BLUETOOTH, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including methods 700, 800, 1000, and 1200 (FIGS. 7, 8, 10, and 12). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Figure 5D:
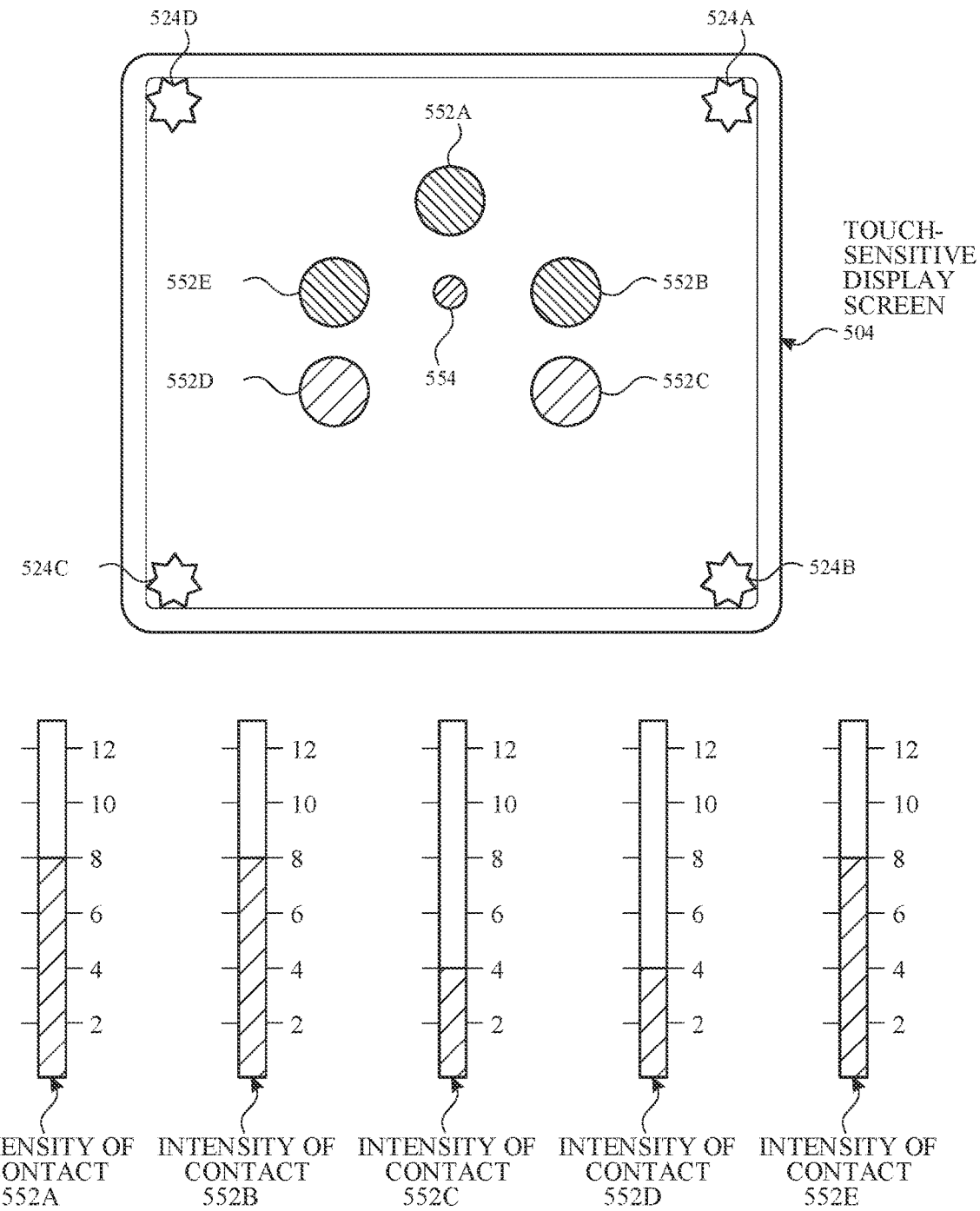

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B, and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity Ij that is a portion of the aggregate intensity, A, in accordance with a predefined mathematical function, $Ij=A \cdot (Dj/\Sigma Di)$, where Dj is the distance of the respective contact j to the center of force, and $\Sigma Di$ is the sum of the distances of all the respective contacts (e.g., i=1 to last) to the center of force. The operations described with reference to FIGS. 5C-5D can be performed using an electronic device similar or identical to device 100, 300, or 500. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

Figure 5H:
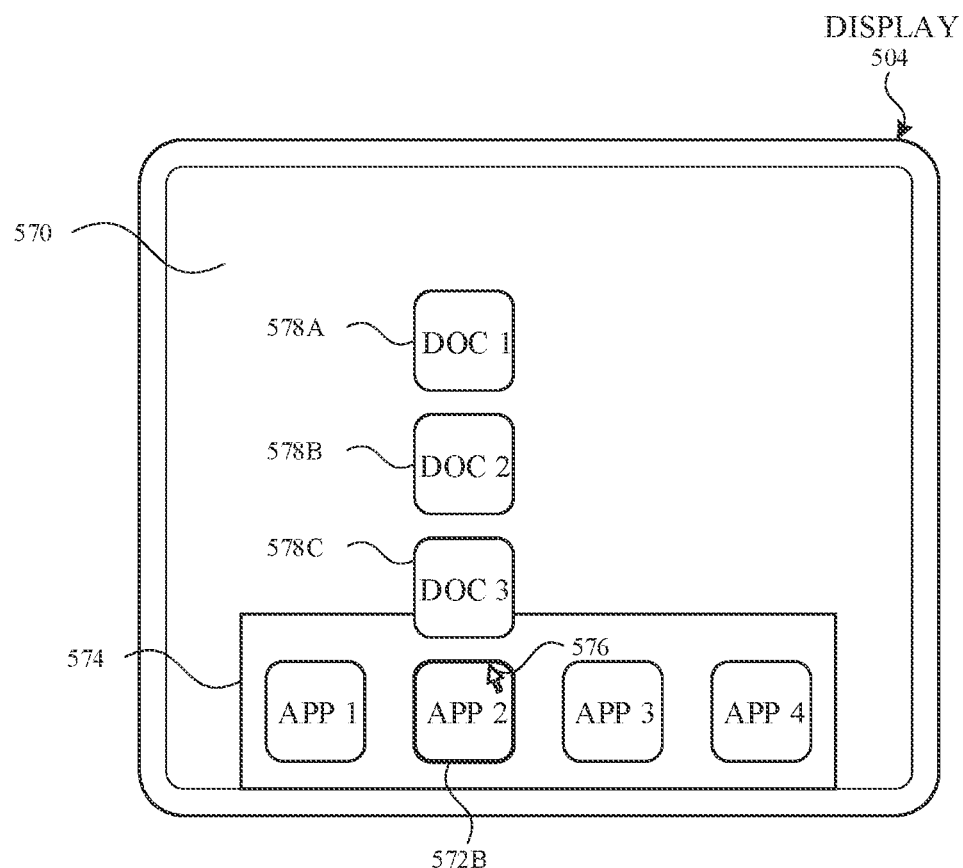

FIGS. 5E-5H illustrate detection of a gesture that includes a press input that corresponds to an increase in intensity of a contact 562 from an intensity below a light press intensity threshold (e.g., "$IT_L$") in FIG. 5E, to an intensity above a deep press intensity threshold (e.g., "$IT_D$") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. The device determines that the intensity of contact 562 peaked above the deep press intensity threshold (e.g., "$IT_D$"). Contact 562 is maintained on touch-sensitive surface 560. In response to the detection of the gesture, and in accordance with contact 562 having an intensity that goes above the deep press intensity threshold (e.g., "$IT_D$") during the gesture, reduced-scale representations 578A-578C (e.g., thumbnails) of recently opened documents for App 2 are displayed, as shown in FIGS. 5F-5H. In some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. 5G. Then, representations 578A moves upward, 578B moves upward toward representation 578A, and representation 578C is displayed in proximity of application icon 572B, as shown in FIG. 5H. Representations 578A-578C form an array above icon 572B. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "$IT_D$"). In some embodiments, the intensity, on which the progress of the animation is based, is the characteristic intensity of the contact. The operations described with reference to FIGS. 5E-5H can be performed using an electronic device similar or identical to device 100, 300, or 500.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:
- an active application, which is currently displayed on a display screen of the device that the application is being used on;
- a background application (or background processes), which is not currently displayed, but one or more processes for the application are being processed by one or more processors; and
- a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards embodiments of user interfaces ("UI") and associated processes that are implemented on an electronic device, such as portable multifunction device 100, device 300, or device 500.

FIGS. 6A-6R illustrate exemplary user interfaces for sharing audio data, in accordance with some embodiments. The user interfaces in these figures are used to illustrate the processes described below, including the processes in FIGS. 7-8.

FIG. 6A illustrates electronic device 600 and device 625 (also referred to as "Taylor's Earbuds"). In some embodiments, device 600 is device 100, 300, or 500. Device 600 has a display device 602 depicted as a touch-sensitive display (e.g., touchscreen 504). Device 625 is configured to connect to device 600 and output audio (e.g., human-audible sound waves) based on audio data received from device 600 via communication link C1. In the embodiment illustrated in FIG. 6A, communication link C1 is a wireless (e.g., BLUETOOTH) connection. In some embodiments, communication link C1 is a wired connection. In some embodiments, device 625 includes one or more features (e.g., audio circuitry 110, speaker 111, microphone 113) of device 100, device 300, or device 500. In some embodiments, device 625 is a wireless speaker, or any device configured to connect to device 600 and output audio based on audio data received from device 600. As illustrated in FIG. 6A, device 625 is a pair of wireless earbuds consisting of earbud 625a and earbud 625b. In the embodiment illustrated in FIG. 6A, although device 625 is a compound device that includes two physically separate earbuds, earbud 625a and earbud 625b operate together as one device. In some embodiments, device 625 has a primary earbud that connects with device 600 and a secondary earbud that communicates with the primary earbud and receives audio signals from device 600 via the primary component. In some embodiments, earbud 625a and earbud 625b are each connected to device 600, but are treated by device 600 as a single external device.

In FIG. 6A, device 600 displays user interface 604, including audio media user interface 604a. Audio media user interface 604a includes current audio indicator 604a-1, which includes information about an audio application (e.g., an open audio application) associated with device 600, such as a device providing audio output ("Taylor's Earbuds"), track name ("Track 1"), and artist name ("DJ Appleseed"). Audio media user interface 604a includes affordances 604a-2, 604a-3, 604a-4, 604a-5, and 604a-6. Affordances 604a-2, 604a-3, 604a-5 correspond to respective audio devices, and when selected, provide audio to the selected device. In FIG. 6A, the check mark on affordance 604a-3 indicates that device 625 ("Taylor's Earbuds") is the currently selected audio device, consistent with current audio indicator 604a-1. Volume affordance 604a-6 can be selected to adjust a volume level for the currently selected audio device.

Share audio affordance 604a-4 can be selected to initiate a process for sharing audio data with another device, while concurrently providing audio via a currently selected audio device (e.g., device 625). For example, sharing audio allows device 600 to create a temporary connection with the device of another user so that the two users can listen to the same audio together at the same time, but without creating a persistent or permanent association with the other user's device (e.g., without pairing device 600 with the other user's device, as discussed in more detail below).

Figure 6B:
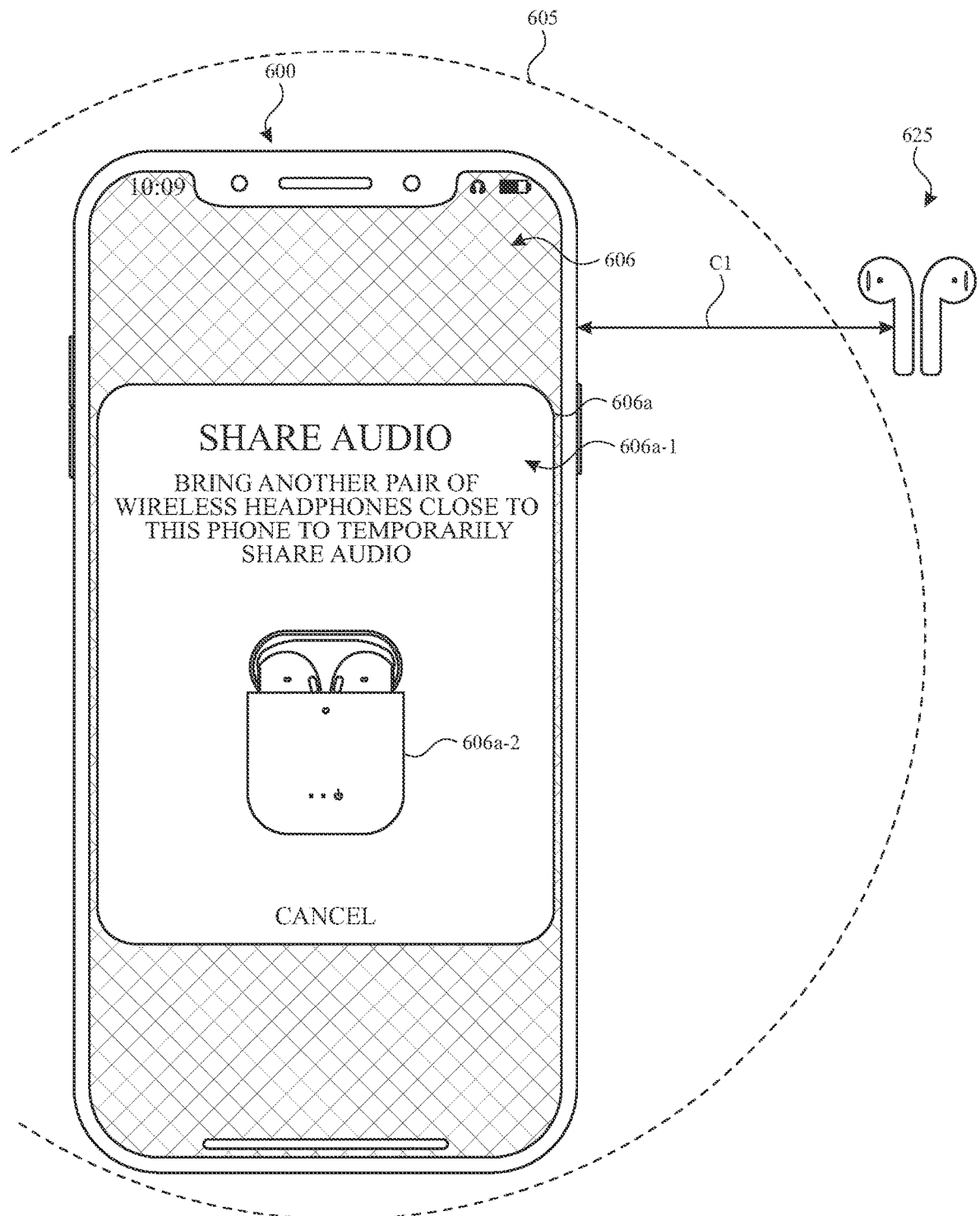
Figure 6C:
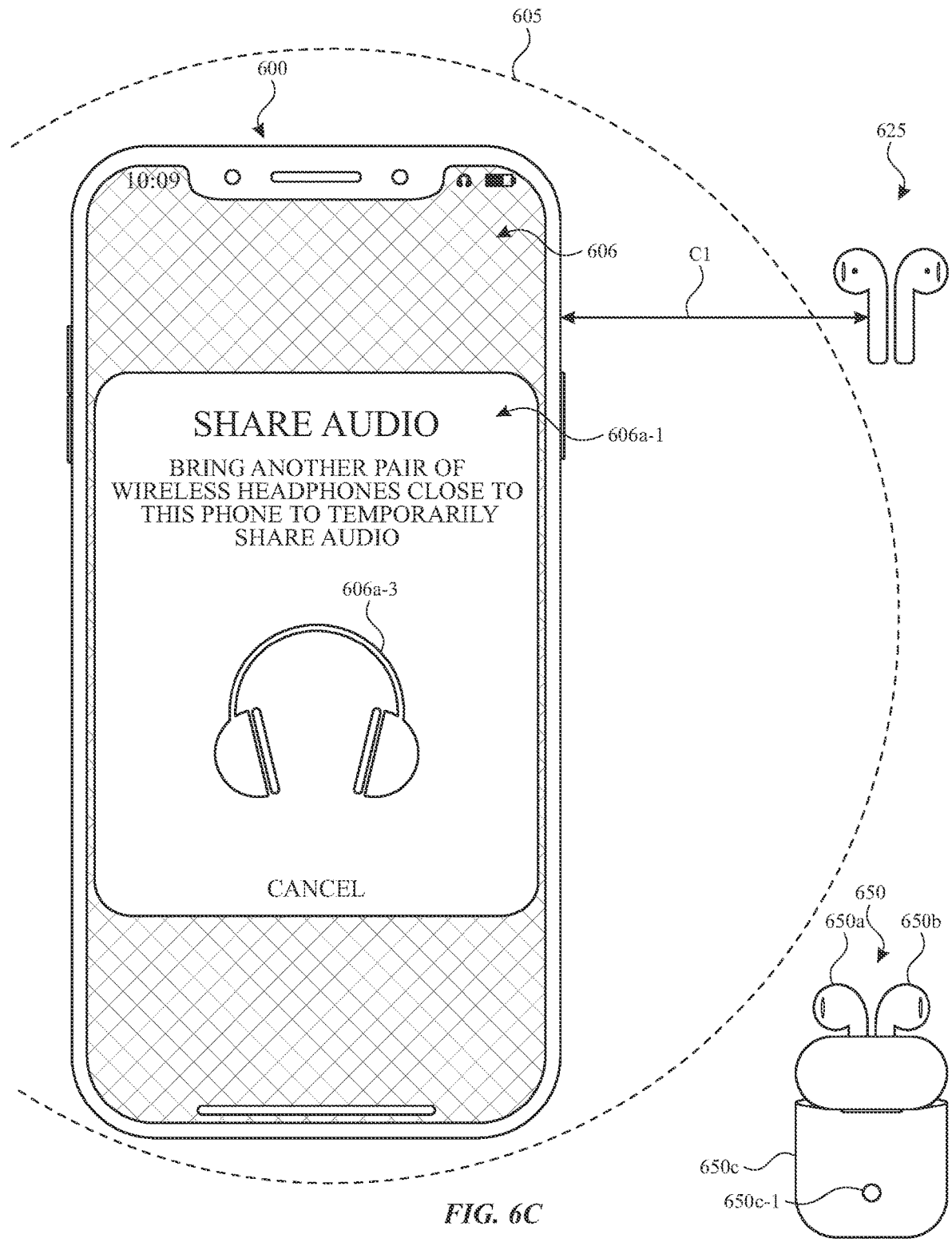

In FIG. 6A, device 600 detects input 610a (e.g., a tap) corresponding to selection of share audio affordance 604a-4. In response to detecting input 610a, device 600 initiates a process to provide audio data concurrently with device 625 and a second external device. In the embodiment illustrated in FIG. 6B, the process includes displaying user interface 606. User interface 606 includes user interface card 606a with instructions 606a-1 for how to share audio data with another device (e.g., another pair of wireless headphones or earbuds). Instructions 606a-1 explain that audio can be shared by bringing another pair of wireless headphones close to device 600. User interface card 606a includes graphical element 606a-2, which represents a device (or type of device) with which device 600 can share audio data if brought close to device 600. In this way, device 600 informs a user of potential devices or products with which audio data can be shared if brought close to device 600. In some embodiments, device 600 displays representations of more than one device with which device 600 can share. In FIG. 6C, device 600 displays graphical element 606a-3, which represents another with which device 600 can share audio data if brought close to device 600. Device 600 can display graphical elements of potential devices (e.g., graphical elements 606a-2 and 606a-3) in various ways (e.g., concurrently or sequentially). As shown in FIG. 6C, device 600 replaces graphical element 606a-2 with graphical element 606a-3 on user interface 606.

As indicated by instructions 606a-1, device 600 can use the satisfaction of a proximity condition to share audio data with another device, while concurrently providing audio data (e.g., the same audio data) with device 625. The use of proximity of one device to another device can be used as a clear indicator that a user would like to perform some action (e.g., invoke an interface, share audio data) on one or both of the devices. For example, this can prevent a waste of device resources by avoiding excessive user input (e.g., to navigate one or more menus on a device display) in order perform a function. Moreover, this can save the user time as well, for example, by reducing the number of user inputs required to perform a function (e.g., invoke an interface on a display, share audio data).

FIG. 6C illustrates an exemplary view of a scenario that includes device 650 (also referred to as "Chance's Earbuds") at a relatively long distance away from the device 600. Device 650 is configured to connect to device 600 and output audio (e.g., human-audible sound waves) based on audio data received from device 600. In some embodiments, device 650 includes one or more features (e.g., audio circuitry 110, speaker 111, microphone 113) of device 100, 300, 500, or 625. In some embodiments, device 650 is a wireless speaker, or any device configured to connect to device 600 and output audio based on audio data received from device 600. As illustrated in FIG. 6C, device 650 is a pair of wireless earbuds consisting of earbud 650a, earbud 650b, and case 650c. In some embodiments, case 650c interfaces with earbud 650a and earbud 650b to initialize connection with device 600 (e.g., as described below with reference to FIG. 6E) and/or perform other operations associated with earbud 650a and earbud 650b (e.g., charging). In the embodiment illustrated in FIG. 6C, earbud 650a, earbud 650b, and case 650c operate together as one single device and are treated by device 600 as a single device.

In the embodiment illustrated in FIG. 6C, device 600 is associated with the same user (e.g., Taylor) as device 625 and is paired with device 625. In some embodiments, two devices are paired if they have a persistent association with each other and are configured to exchange data via a communication link. For example, device 625 remains associated with device 600 when communication link C1 between the devices is not currently active (e.g., device 600 will attempt to automatically reconnect with device 625 if a connection is lost or device 600 shares common persistent configuration settings with device 625). In FIG. 8C, device 650 is not paired with device 600. As described below, device 600 can establish a temporary connection with device 650 to share audio data with another user (e.g., Chance) that is also being provided to paired device 625 (e.g., Taylor's own earbuds), but device 650 does not remain associated with device 600 after the temporary connection ends.

FIG. 6C shows proximity condition range indicator 605 around device 600. A proximity condition range indicator is also referred to herein as a "proximity zone indicator" or simply as a "proximity zone." Device 650 is not inside of proximity condition range indicator 605. Proximity condition range indicator 605 is included as a visual aid, and is intended to represent a physical proximity that would satisfy a proximity condition. For example, range indicator 605 can represent the range of a near-field communication detection circuitry of device 600. In some embodiments, any appropriate technique can be used to detect proximity between devices. For instance, in some examples, wide-band wireless connection is used. Wide-band wireless connection is used, for example, to determine one or more of: directionality, distance, and orientation, of one or more devices. Thus, presence of a detectable device within (e.g., partially or completely) proximity condition range indicator 605 would satisfy a proximity condition, but would not if the detectable device is located outside of the range indicator 605. One of skill would appreciate that a detection range of physical proximity can be non-uniform, can be affected by numerous variables (e.g., wireless interference, air humidity, or the like), and can include points in space in three dimensions, all of which are intended to be within the scope of this disclosure. Thus, the graphical representation of proximity condition range indicator 605 is not intended to limit the scope of determining whether a proximity condition is satisfied. Furthermore, the figures are not necessarily to scale and are included merely as a visual aid. Thus, unless otherwise noted, the size and scale of features depicted in the figures are not intended as a limitation on a distance required to be in close proximity or to satisfy a proximity condition. In some embodiments, in response to detecting input 610a, device 600 enters a mode in which device 600 is configured to detect devices within proximity condition range indicator 605 with which audio data can be shared.

Figure 6D:
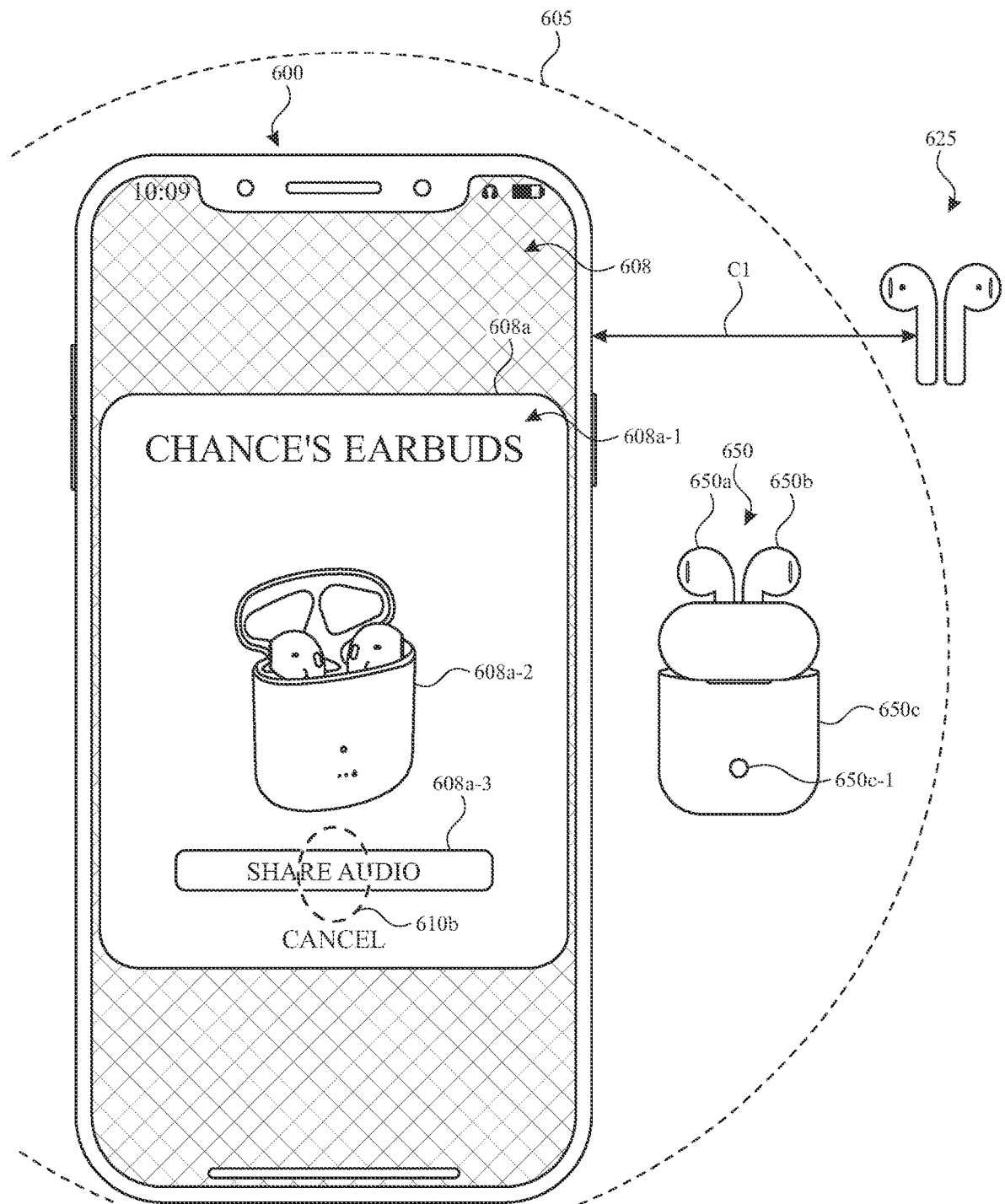

FIG. 6D illustrates an exemplary view of a scenario that includes device 600 at a short distance away from device 600. As shown in 6D, device 600 and device 650 are close together, and now device 650 is at least partially within the proximity condition range indicator 605. Since proximity condition range indicator 605 represents a physical proximity that satisfies the proximity condition, device 600 detects an indication that a physical proximity between the device 600 and device 650 satisfies the proximity condition (e.g., and, in response, initiates communication with device 650, for example, to send an indication that the condition is satisfied). In some examples, device 650 detects an indication that the proximity condition is satisfied (e.g., and, in response, initiates communication with device 600, for example, to send an indication that the condition is satisfied)
.

In response to detecting the indication that the physical proximity satisfies the proximity condition, device 600 displays user interface 608 indicating that the physical proximity between device 600 and the device 650 satisfies the proximity condition, as shown in FIG. 6D. User interface 608 includes proximity user interface 608*a*, which identifies the device that satisfied the proximity condition with device 600 and provides confirmation affordance 608*a*-3 that, when selected, continues the process of sharing audio data by initiating a connection (e.g., communication link) with device 650 for providing audio data, while concurrently providing audio data to device 625. Proximity user interface 608*a* identifies device 650 as being within proximity condition range indicator 605 with text indicator 608*a*-1 ("Chance's Earbuds") and graphical element 608*a*-2, which includes a representative image of device 650. Graphical element 608*a*-2 indicates that device 650 is a pair of wireless earbuds (as opposed to, e.g., a pair of wireless headphones, as depicted by graphical element 606*a*-3 in FIG. 6C).

Figure 6E:
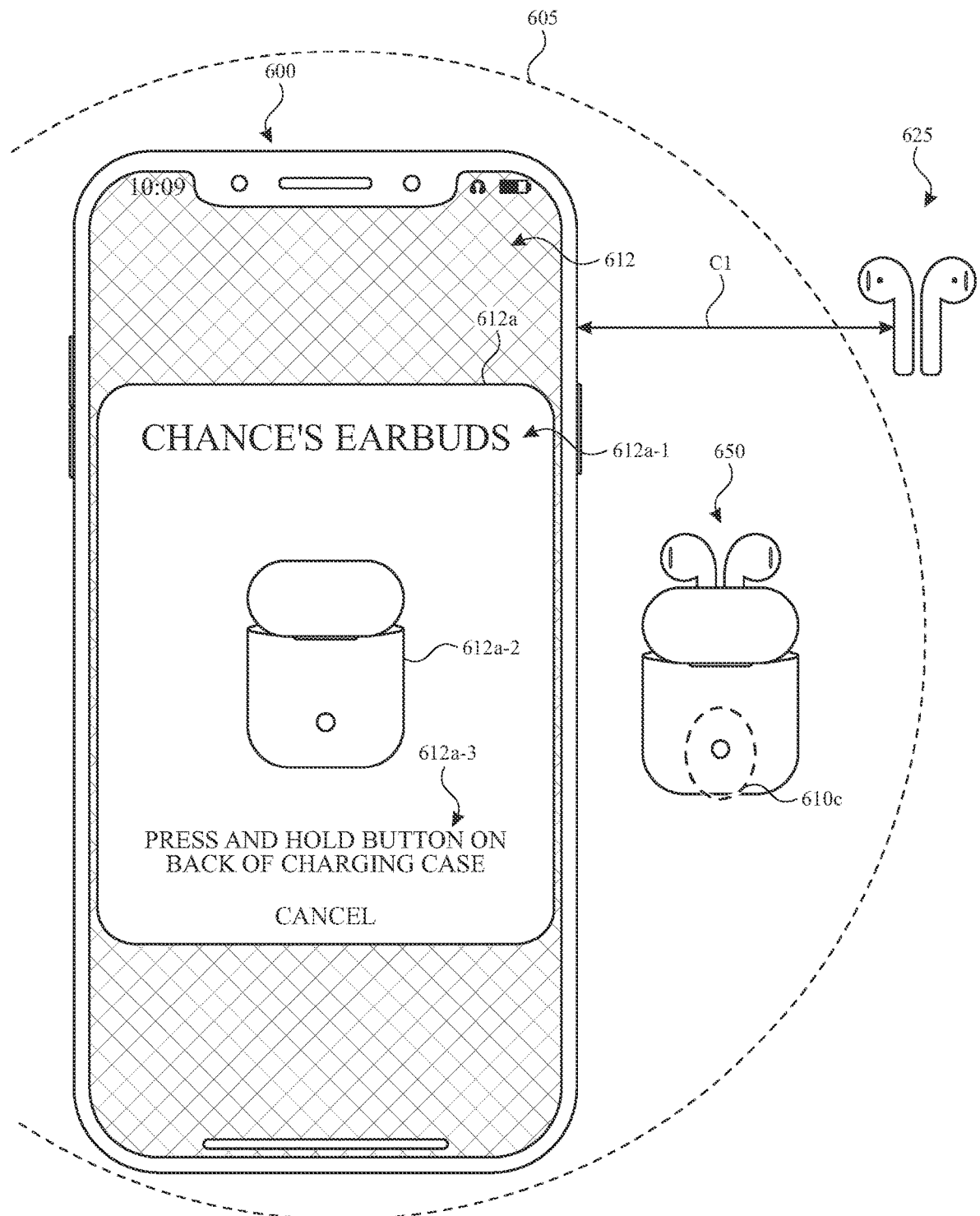

In FIG. 6D, device 600 detects input 610*b* (e.g., a tap) corresponding to selection of confirmation affordance 608*a*-3. In response to detecting input 610*b*, device 600 displays user interface 612, as shown in FIG. 6E. User interface 612 includes connection instructions user interface 612*a*, which includes text indicator 612*a*-1 (e.g., 608*a*-1), graphical element 612*a*-2, and instructions 612*a*-3 for continuing the process of connecting device 650 with device 600. Instructions 612*a*-3 direct a user to press and hold button 650*c*-1 on device 650, and graphical element 612*a*-2 includes a representative image of device 650 from a perspective in which a representation of button 650*c*-1 can be seen.

Figure 6F:
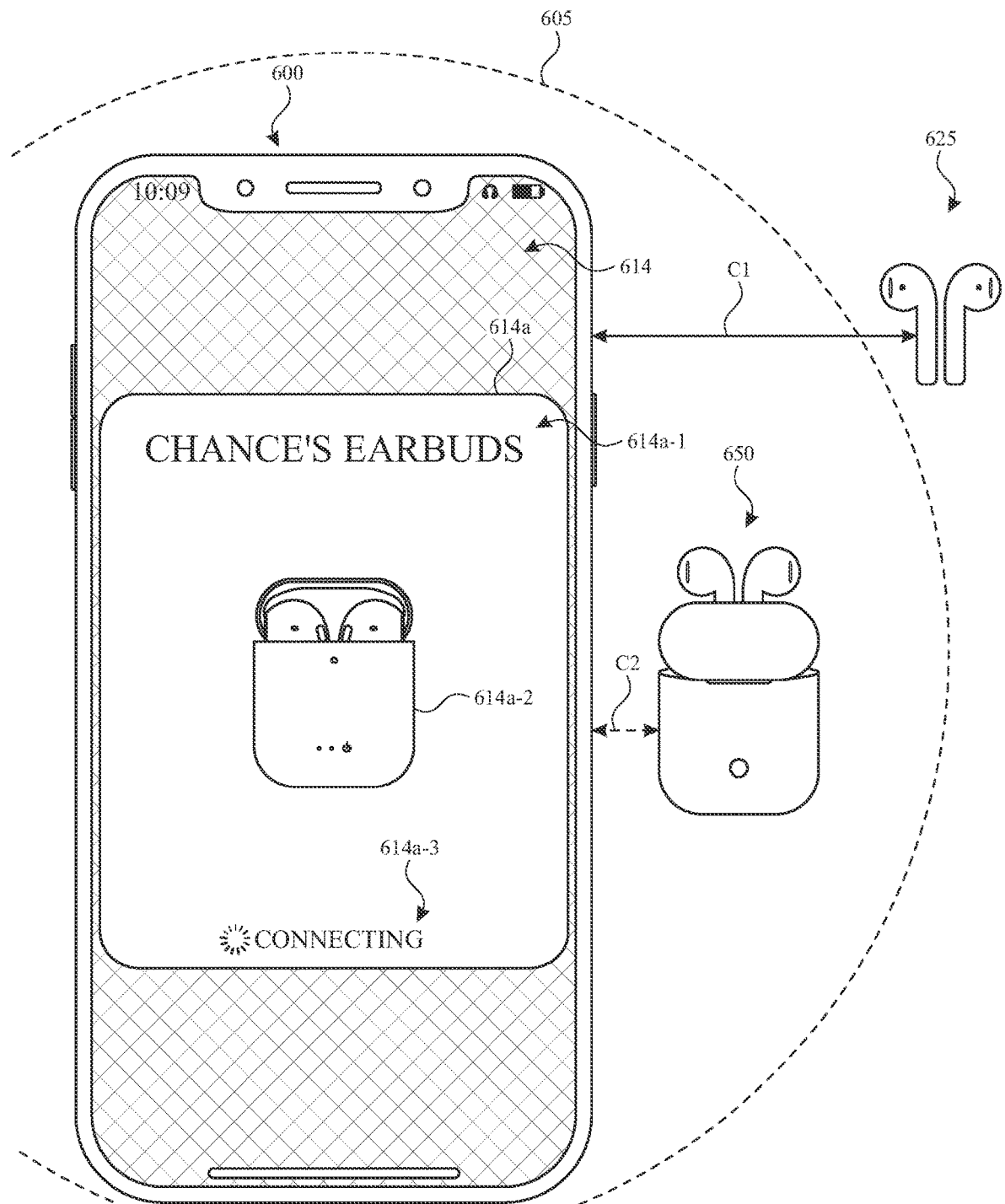

In FIG. 6E, device 650 detects input 610*c*, which includes a press and hold of button 650*c*-1. In some embodiments, in response to detecting input 610*c*, device 650 sends a signal to device 600 indicating that device 650 can be connected to device 600. After (e.g., in response to) receiving the signal from device 650, device 600 displays user interface 614, as shown in FIG. 6F. User interface 614 indicates that device 600 is in the process of creating communication link C2 with device 650. User interface 614 includes connecting user interface 614*a*, which includes text indicator 614*a*-1 (e.g., 608*a*-1), graphical element 614*a*-2 (e.g., a representative image of device 650 from a different perspective than graphical element 608*a*-3 and graphical element 612*a*-3). In some embodiments, device 600 connects to a second external device (e.g., device 650) and displays user interface 614 in response to detecting input 610*b* (e.g., without requiring input 610*c* on device 650 and without displaying user interface 612).

Figure 6G:
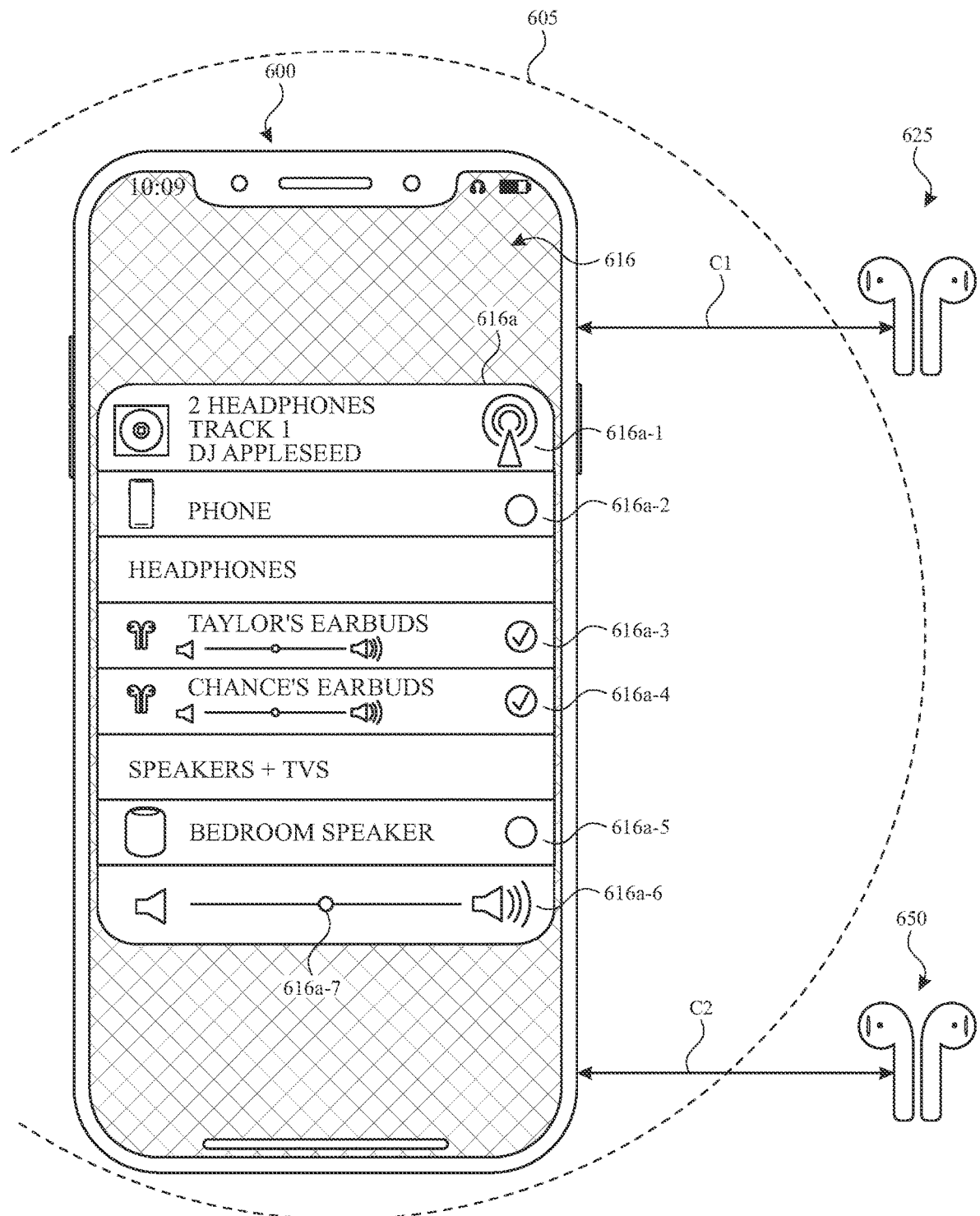

After (e.g., in response to) establishing communication link C2 with device 600 displays user interface 616, as shown in FIG. 6G. In FIG. 6G, device 600 is concurrently connected to and providing audio data to device 625 (via communication link C1) and device 650 (via communication link C2) such that device 625 and device 650 output the same audio. In some embodiments, device 600 connects to a second external device (e.g., device 650) and displays user interface 616 in response to detecting input 610*b* (e.g., without requiring input 610*c* on device 650 and without displaying user interfaces 612 and 614).

User interface 616 includes audio media user interface 616*a* (e.g., an updated version of audio media user interface 604*a*) indicating that device 600 is concurrently providing audio data to device 625 and device 650. Audio media user interface 616*a* includes current audio indicator 616*a*-1, which includes track name (Track 1) and artist name (DJ Appleseed). Compared to current audio indicator 604*a*-1, current audio indicator 616*a*-1 indicates that audio is being provided to two headphones, instead of only device 625 (Taylor's Earbuds) as in FIG. 6A. Audio media user interface 616*a* includes affordances 616*a*-2, 616*a*-3, 616*a*-4, 616*a*-5, and 616*a*-6. The check marks on affordance 616*a*-3 and affordance 616*a*-4 indicate that device 625 ("Taylor's Earbuds") and device 650 are currently selected for audio output, consistent with current audio indicator 616*a*-1. Affordance 616*a*-3 and affordance 616*a*-4 each include a volume slider that, when selected, controls the individual volume level of the corresponding device (e.g., the volume slider on affordance 616*a*-4 can be selected to adjust the volume level of device 650 without changing the volume level for device 625). Affordance 616*a*-2 can be selected to output audio data on a bedroom speaker associated with device 600 (e.g., and to cease providing audio data to device 625 and device 650). Volume affordance 616*a*-6 can be selected to adjust the volume levels for device 625 and device 650 with a single input. In some embodiments, adjusting the volume level for device 625 and device 650 with affordance 616*a*-6 sets the volume levels for device 625 and device 650 to the same volume level (e.g., even if device 625 and device 650 had different volume levels prior to selection of affordance 616*a*-6). In some embodiments, adjusting the volume level for device 625 and device 650 with affordance 616*a*-6 sets the volume levels for device 625 and device 650 to respective volume levels based on the initial volume level of the respective device and the input on affordance 616*a*-6 (e.g., the position to which volume adjustment affordance 616*a*-7 is moved from its initial position).

In FIG. 6G, earbuds 650*a* and 650*b* of device 650 are depicted without case 650*c* and outside of proximity condition range indicator 605. In some embodiments, earbuds 650*a* and 650*b* must be in case 650*c* to establish communication link C2 (e.g., during input 610*c*), and can receive audio data from device 600 without case 650*c* after communication line C2 is established. In some embodiments, device 650 does not include case 650*c* and/or earbuds 650*a* and 650*b* do not need to be in case 650*c* to establish communication link C2 with device 600.

Figure 6H:
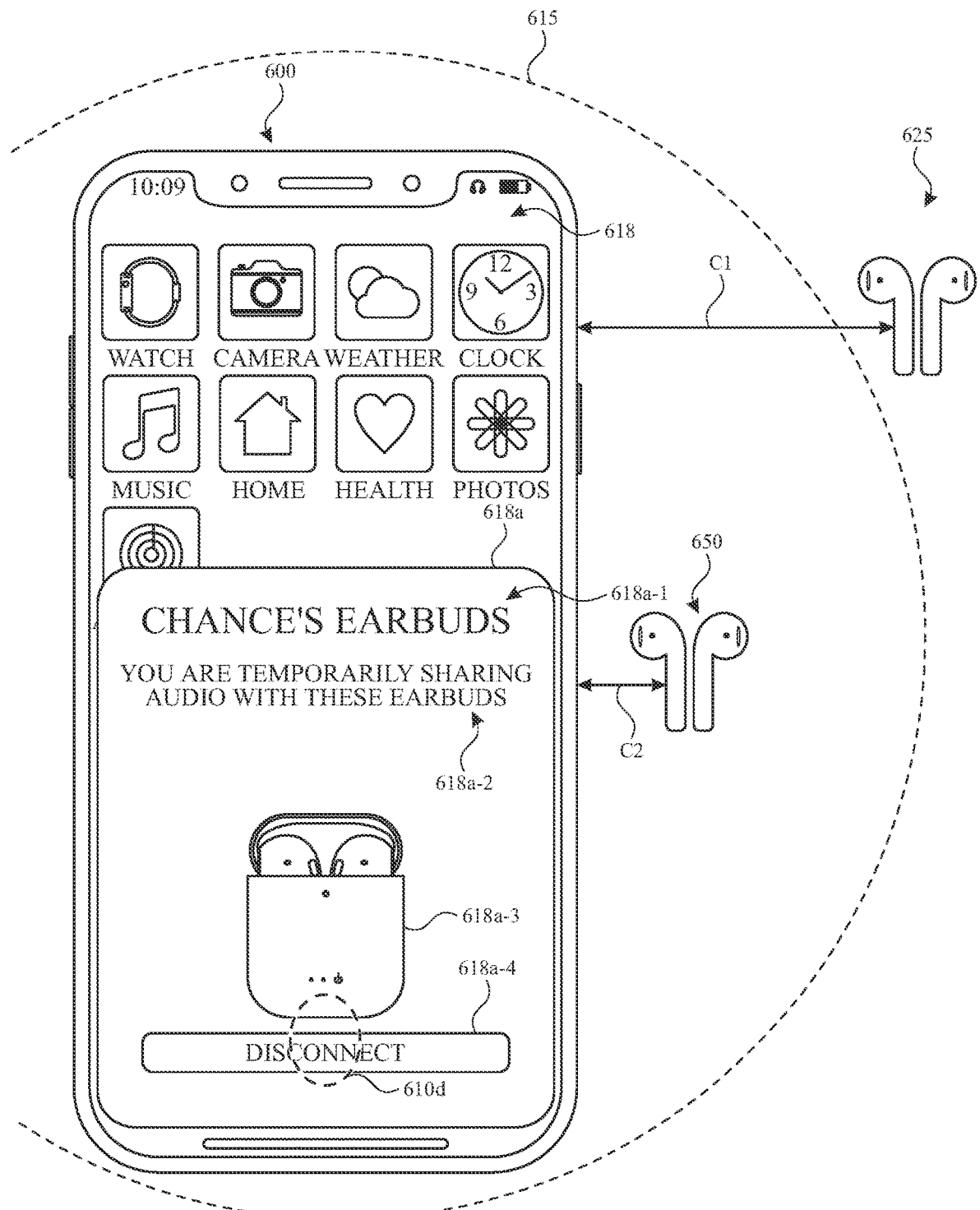

As mentioned, in FIG. 6G, device 650 is outside of proximity condition range indicator 605, while maintaining communication link C2 (e.g., device 650 does not need to remain inside of proximity condition range indicator 605 to receive audio data). In FIG. 6H (e.g., after device 650 is moved away from device 600 and outside of proximity condition range indicator 605), device 650 is positioned inside of proximity condition range indicator 615 (e.g., device 650 is moved back towards device 600). In some embodiments, proximity condition range indicator 615 is the same as proximity condition range indicator 605. In some embodiments, proximity condition range indicator 615 is different from proximity condition range indicator 605. Proximity condition range indicator 615 represents a physical proximity that satisfies a disconnect proximity condition. In some embodiments, the disconnect proximity condition is the same as the proximity condition described above for initiating the process for providing audio data with a second external device. In some embodiments, the disconnect proximity condition is different from the proximity condition for initiating the process for providing audio data with a second external device.

Since proximity condition range indicator 615 represents a physical proximity that satisfies the disconnect proximity condition, device 600 detects an indication that a physical proximity between the device 600 and device 650 satisfies the disconnect proximity condition (e.g., and, in response, initiates communication with device 650, for example, to send an indication that the disconnect condition is satisfied). In some examples, device 650 detects an indication that the disconnect proximity condition is satisfied (e.g., and, in response, initiates communication with device 600, for example, to send an indication that the disconnect condition is satisfied).

In response to detecting the indication that the physical proximity satisfies the disconnect proximity condition, device 600 displays user interface 618 indicating that the physical proximity between device 600 and the device 650 satisfies the disconnect proximity condition. User interface 618 includes disconnect user interface 618a, which identifies the device (e.g., device 650) that satisfied the disconnect proximity condition with device 600 and provides disconnect affordance 618a-4 that, when selected, initiates a process for disconnecting from device 600 the device that is in proximity with device 600. Disconnect proximity user interface 618a identifies device 650 as being within proximity condition range indicator 615 with text indicator 618a-1 ("Chance's Earbuds") and includes graphical element 618a-2 and graphical element 618a-3. graphical element 618a-2 indicates that device 600 is temporarily sharing audio with the device represented by graphical element 618a-3, which includes a representative image of device 650.

In some embodiments, device 600 displays disconnect user interface 618a in accordance with a determination that the device that satisfies the disconnect proximity condition with device 600 is not paired with device 600. In some embodiments, if device 600 determines that the device that satisfies the disconnect proximity condition with device 600 is paired with device 600, device 600 foregoes displaying disconnect user interface 618a and optionally displays a different user interface. For example, in some embodiments, in which device 625 is paired with device 600, in accordance with a determination that device 625 satisfies the disconnect proximity condition with device 600, device 600 displays information about device 625 (e.g., a current state of device 625, such as battery level) without an option to disconnect device 625 from device 600 or cease providing audio data to device 625.

Figure 6I:
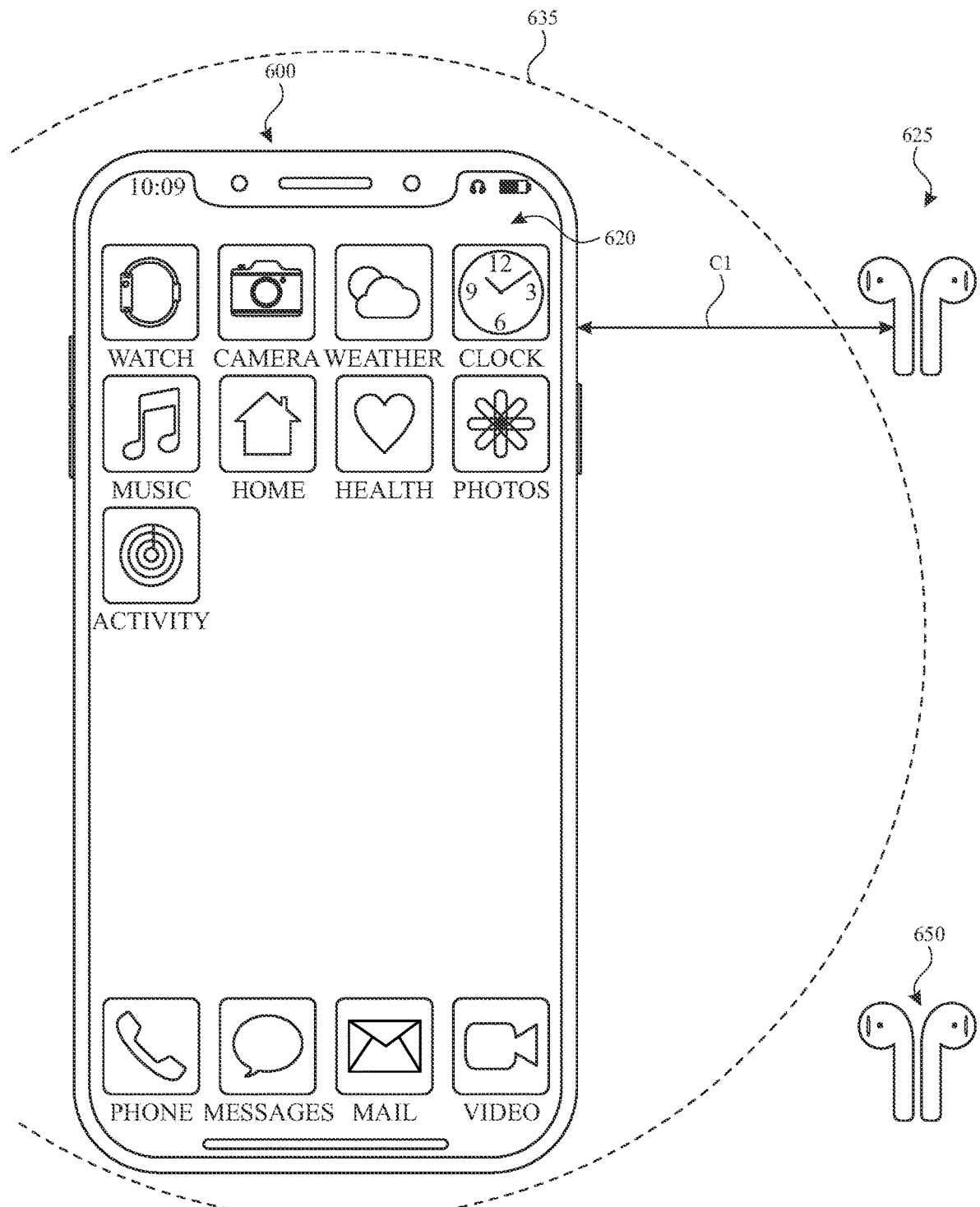

In FIG. 6H, device 600 detects input 610d (e.g., a tap) corresponding to selection of disconnect affordance 618a-4. In response to detecting input 610d, device 600 ceases providing audio data to device 650. In some embodiments, in response to detecting input 610d, device 600 disconnects from device 650 (e.g., disconnects communication link C2) and displays user interface 620 (e.g., user interface 618 without disconnect user interface 618a), as shown in FIG. 6I. In some embodiments, device 600 continues to provide audio data to device 625 after ceasing to provide audio data with device 650 and/or disconnecting from device 650.

Figure 6J:
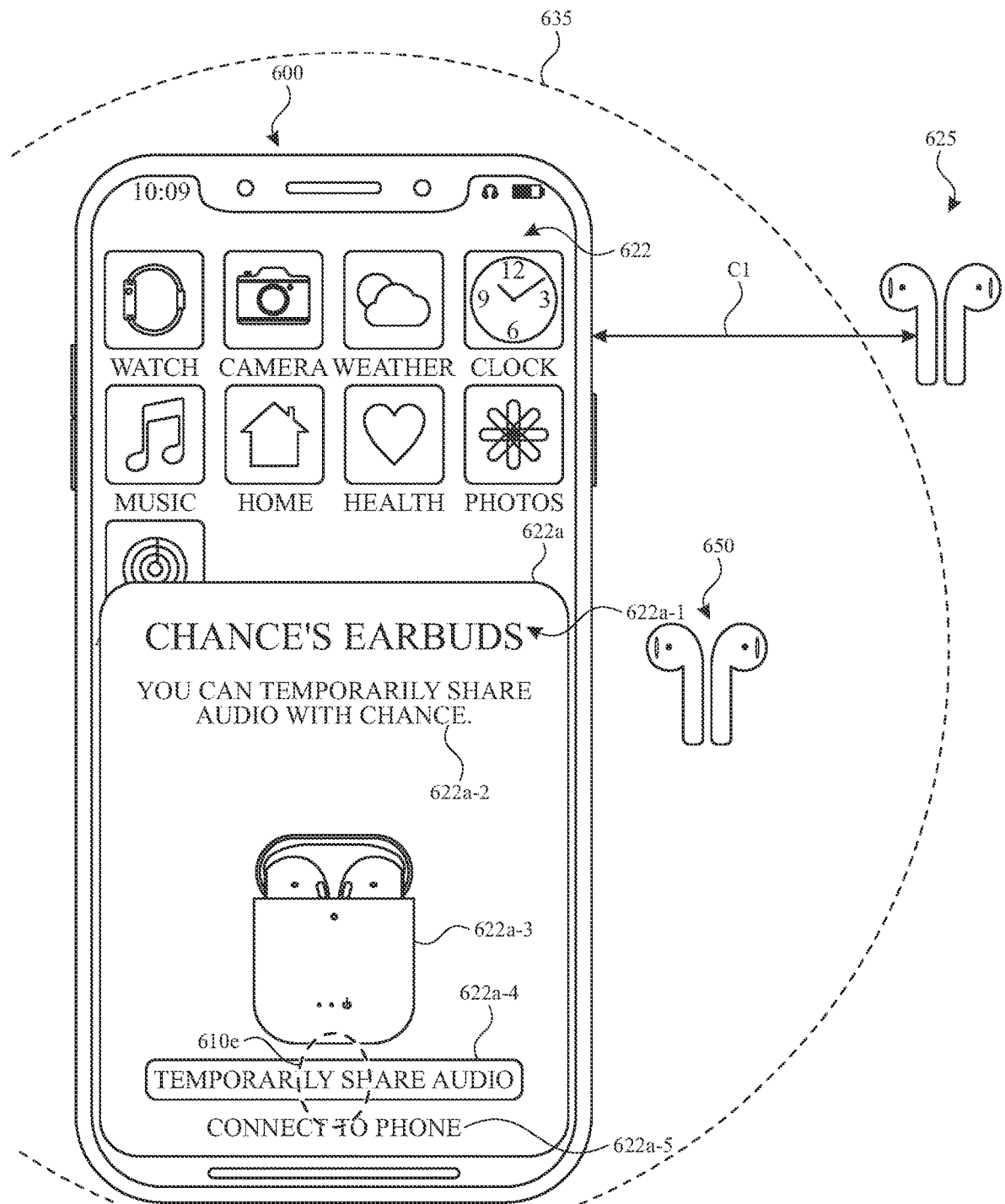

In FIG. 6I, after device 600 is disconnected from device 650, device 600 remains connected with device 625, and device 650 is positioned outside of proximity condition range indicator 635. In FIG. 6J, device 650 is positioned inside of proximity condition range indicator 635 (e.g., device 650 is moved back towards device 600). In some embodiments, proximity condition range indicator 635 is the same as proximity condition range indicator 605 and/or 615. In some embodiments, proximity condition range indicator 635 is different from proximity condition range indicator 605 and/or 615. Proximity condition range indicator 635 represents a physical proximity that satisfies a second proximity condition. In some embodiments, the second proximity condition is the same as the proximity condition described above for initiating the process for providing audio data with a second external device. In some embodiments, the second proximity condition is different from the proximity condition for initiating the process for providing audio data with a second external device.

Since proximity condition range indicator 635 represents a physical proximity that satisfies the second proximity condition, device 600 detects an indication that a physical proximity between the device 600 and device 650 satisfies the second proximity condition (e.g., and, in response, initiates communication with device 650, for example, to send an indication that the second condition is satisfied). In some embodiments, device 650 detects an indication that the second proximity condition is satisfied (e.g., and, in response, initiates communication with device 600, for example, to send an indication that the second condition is satisfied). In some embodiments, device 600 detects the indication that the physical proximity between the device 600 and device 650 satisfies the second proximity condition without having previously detected an input corresponding to selection of share audio affordance 604a-1.

In response to detecting the indication that the physical proximity satisfies the second proximity condition, device 600 displays user interface 622 indicating that the physical proximity between device 600 and the device 650 satisfies the second proximity condition. User interface 622 includes second proximity user interface 622a, which identifies the device that satisfied the second proximity condition with device 600 and provides share audio affordance 622a-4 that, when selected, initiates the process of establishing a connection with device 650 to provide audio data concurrently with device 625 and device 650. In some embodiments, device 600 does not have to have previously established a connection or communication link with device 650 in order to display second proximity user interface 622a.

Second proximity user interface 622a identifies device 650 as being within proximity condition range indicator 635 with text indicator 622a-1 ("Chance's Earbuds"), graphical element 622a-2, and graphical element 622a-3. Graphical element 622a-2 includes information (e.g., text) that device 600 can temporarily share audio with device 650. Graphical element 622a-3 includes a representative image of device 650. In addition, second proximity user interface 622a includes affordance 622a-5 that, when selected, connects (e.g., pairs) device 650 to device 600. In some embodiments, in contrast to temporarily sharing audio by selecting share affordance 622a-4, connecting device 650 to device 600 by selecting affordance 622a-5 disconnects communication link C1 between device 625 and device 600, such that device 600 does not concurrently provide audio data to both device 625 and device 650 (e.g., device 650 replaces device 625 as the primary headphone device).

In FIG. 6J, device 600 detects input 610e (e.g., a tap) corresponding to selection of share affordance 622a-4. In response to detecting input 610e, device 600, initiates the process of establishing a connection with device 650 to provide audio data concurrently to device 625 and device 650 (e.g., including the process described with reference to FIGS. 6E-6F).

Figure 6K:
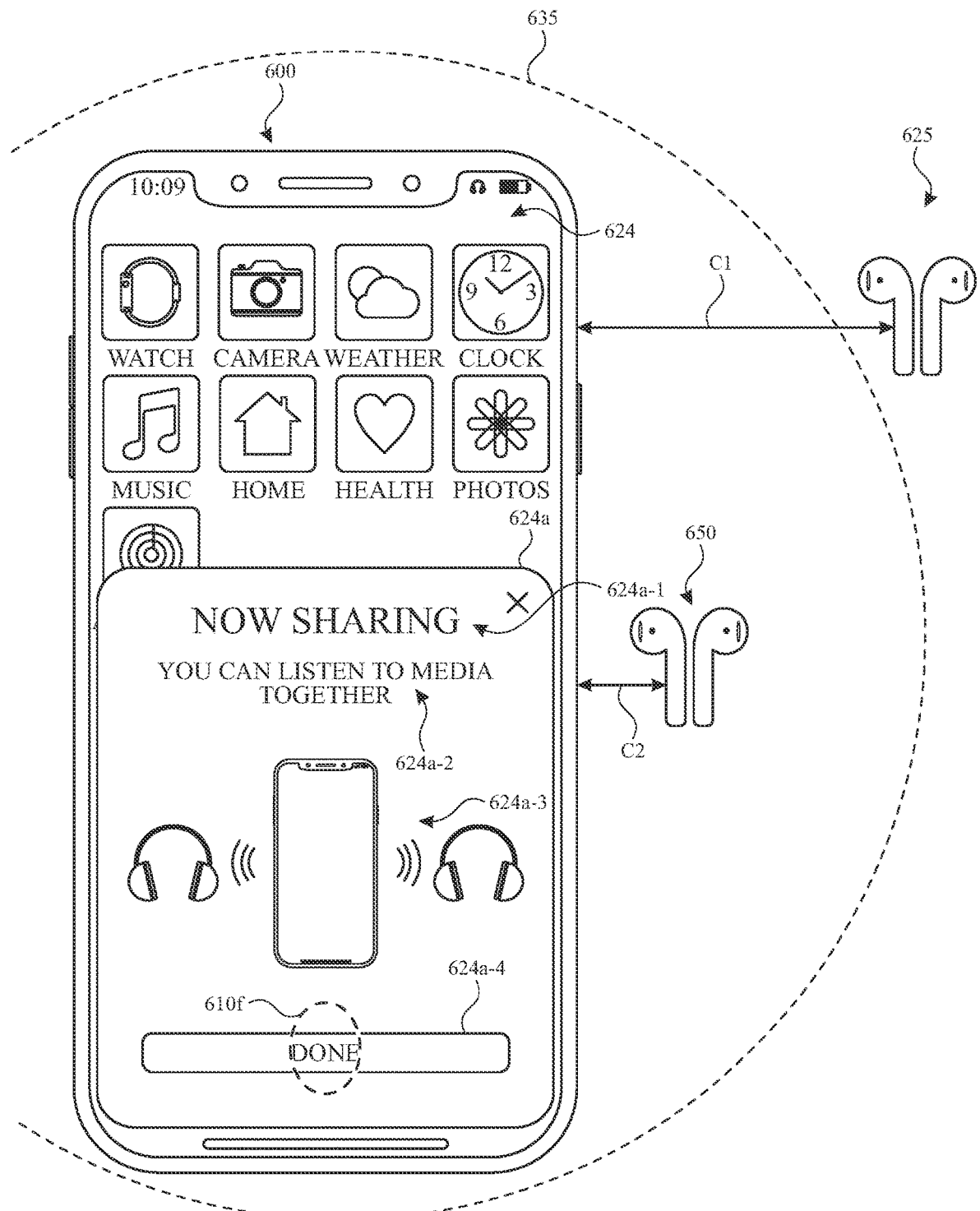

In some embodiments, after device 600 has established communication link C2 with device 650, device 600 displays user interface 624, including confirmation user interface 624a, as shown in FIG. 6K. Confirmation user interface 624a indicates (e.g., via graphical elements 624a-1, 624a-2, and 624a-3) that device 600 is sharing (or configured to share) audio data with device 650, while concurrently providing audio data to device 625. In some embodiments, confirmation user interface 624*a* is displayed upon establishing a communication link between device 600 and device 650 in response to input 610*b* or input 610*c*, or after displaying connecting user interface 614*a*.

In FIG. 6K, device 600 detects input 610*f* (e.g., a tap) corresponding to selection of done affordance 624*a*-4. In response to detecting input 610*f*, device 600 ceases displaying confirmation user interface 624*a*, while maintaining communication links C1 and C2.

Figure 6L:
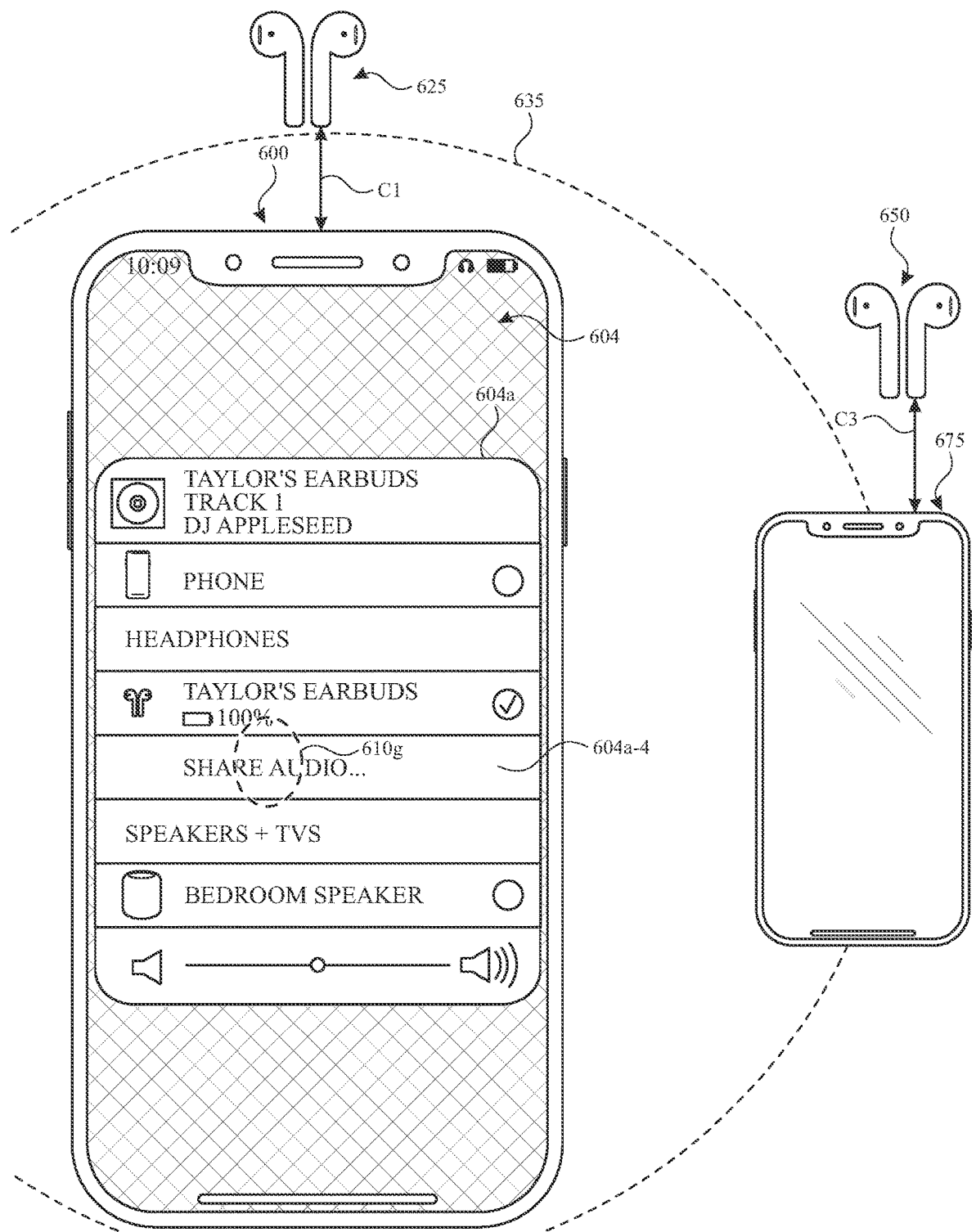

Turning now to FIG. 6L, a scenario is depicted in which device 600 displays user interface 604 (described above) and is connected (e.g., via communication link C1) with device 625 ("Taylor's Earbuds"). Device 650 is connected (via communication link C3) to device 675 (e.g., a phone associated with the same user as device 650). Device 675 is within proximity condition range indicator 635, and neither device 650 nor device 675 is connected to device 600. In some embodiments, in contrast to device 650 being within proximity condition range indicator 635 in FIG. 6J, device 600 does not display a proximity user interface (e.g., 622*a*) for sharing audio data with device 675. For example, device 600 foregoes displaying a proximity user interface identifying device 675 in accordance with a determination that device 675 is a particular type of device (e.g., a phone) or that device 675 is not a particular type of device (e.g., wireless headphones or wireless earbuds).

In FIG. 6L, device 600 detects input 610*g* (e.g., a tap) corresponding to selection of share audio affordance 604*a*-4. In response to detecting input 610*g*, device 600 initiates the process to provide audio data concurrently with device 625 and a second external device (e.g., the process described with reference to FIG. 6A). In some embodiments, in response to detecting selection of share audio affordance 604*a*-4, device 600 enters a mode in which device 600 will share audio data with device 675, while concurrently providing audio data to device 625 (e.g., device 600 applies a proximity condition in response to selection of audio share affordance 604*a*-4 that is different from a proximity condition applied prior to selection of audio share affordance 604*a*-4).

Figure 6M:
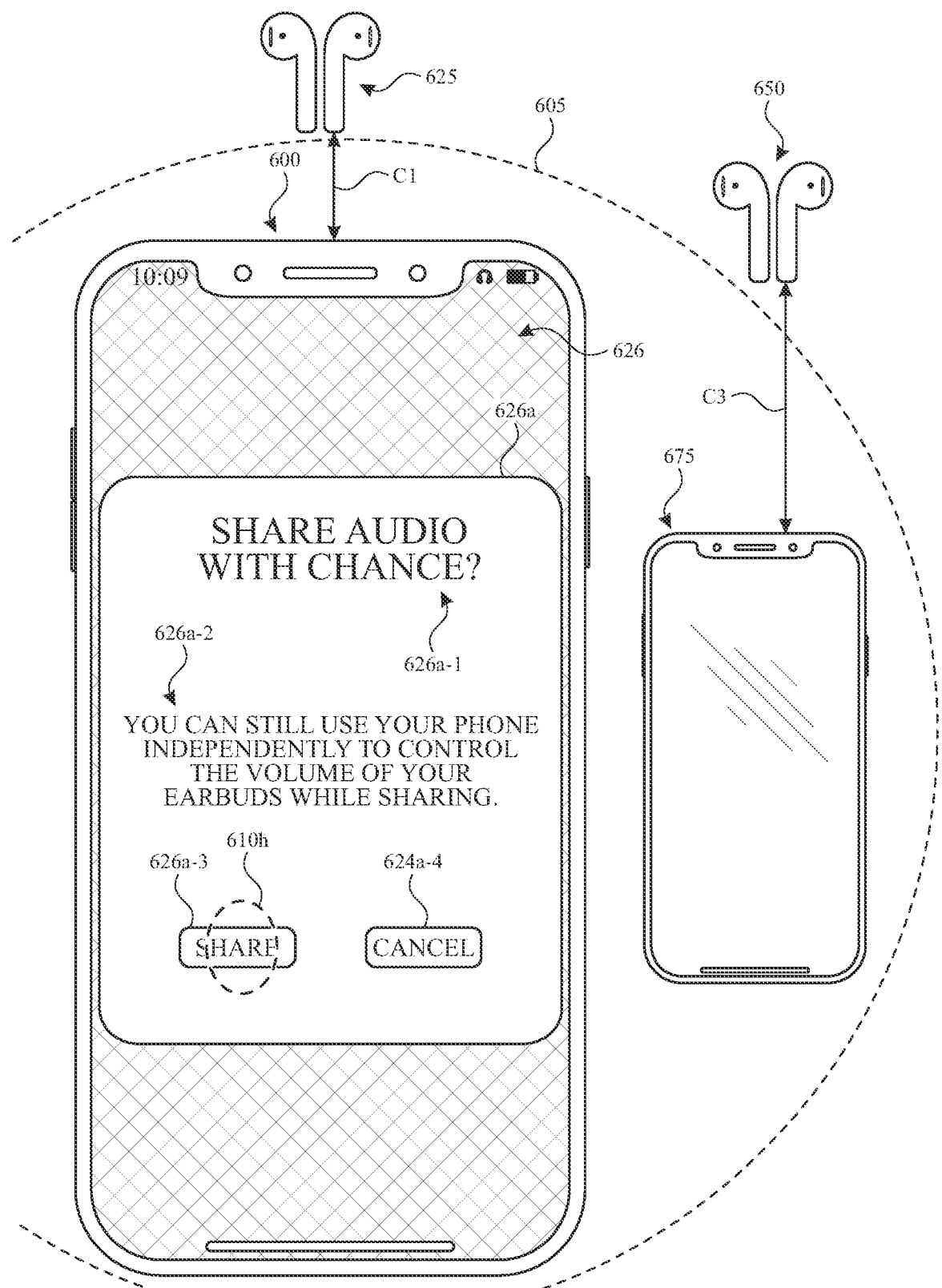

In FIG. 6M, device 675 is within proximity condition range indicator 605. In some embodiments, proximity condition range indicator 635 applies prior to selection of share audio affordance 604*a*-4 and proximity condition range indicator 605 applies after selection of share audio affordance 604*a*-4 (e.g., for a predetermined amount of time). Since proximity condition range indicator 605 represents a physical proximity that satisfies the proximity condition, device 600 detects an indication that a physical proximity between device 600 and device 675 satisfies the proximity condition (e.g., and, in response, initiates communication with device 675, for example, to send an indication that the condition is satisfied). In some embodiments, device 675 detects an indication that the proximity condition is satisfied (e.g., and, in response, initiates communication with device 600, for example, to send an indication that the condition is satisfied).

In response to detecting the indication that the physical proximity satisfies the proximity condition, device 600 displays user interface 626 indicating that the physical proximity between device 600 and the device 675 satisfies the proximity condition, as shown in FIG. 6M. User interface 626 includes proximity user interface 626*a*, which identifies the user (e.g., Chance) of the device (e.g., 675) that satisfied the proximity condition with device 600. Proximity user interface 626*a* provides, inter alia, confirmation affordance 626*a*-3 that, when selected, continues the process of sharing audio data by initiating a connection (e.g., communication link) with device 675 for providing audio data, while concurrently providing audio data to device 625. Proximity user interface 626*a* identifies device 675 as being within proximity condition range indicator 605 with text indicator 626*a*-1, which indicates the action performed by selecting share audio affordance 626*a*-3, and includes graphical element 626*a*-2, which provides information that device 600 can be used independently to control the volume of device 625 while sharing audio data with device 675. In some embodiments, user interface 626*a* is displayed in accordance with a determination that the proximity of device 675 with device 600 satisfies the proximity condition (e.g., instead of the proximity of device 650). In some embodiments, in response to detecting the indication that the physical proximity between device 600 and device 675 satisfies the proximity condition, device 600 displays a proximity user interface similar to proximity user interface 608*a*, except with information and graphical elements corresponding to device 675 instead of device 650.

In FIG. 6M, device 600 detects input 610*h* (e.g., a tap) corresponding to selection of share affordance 626*a*-3. In response to detecting input 610*h*, device 600 initiates communication link C4 with device 675 to provide audio data concurrently to device 625 and device 650 (via communication link C3 between device 675 and device 650), as shown in FIG. 6N.

Figure 6N:
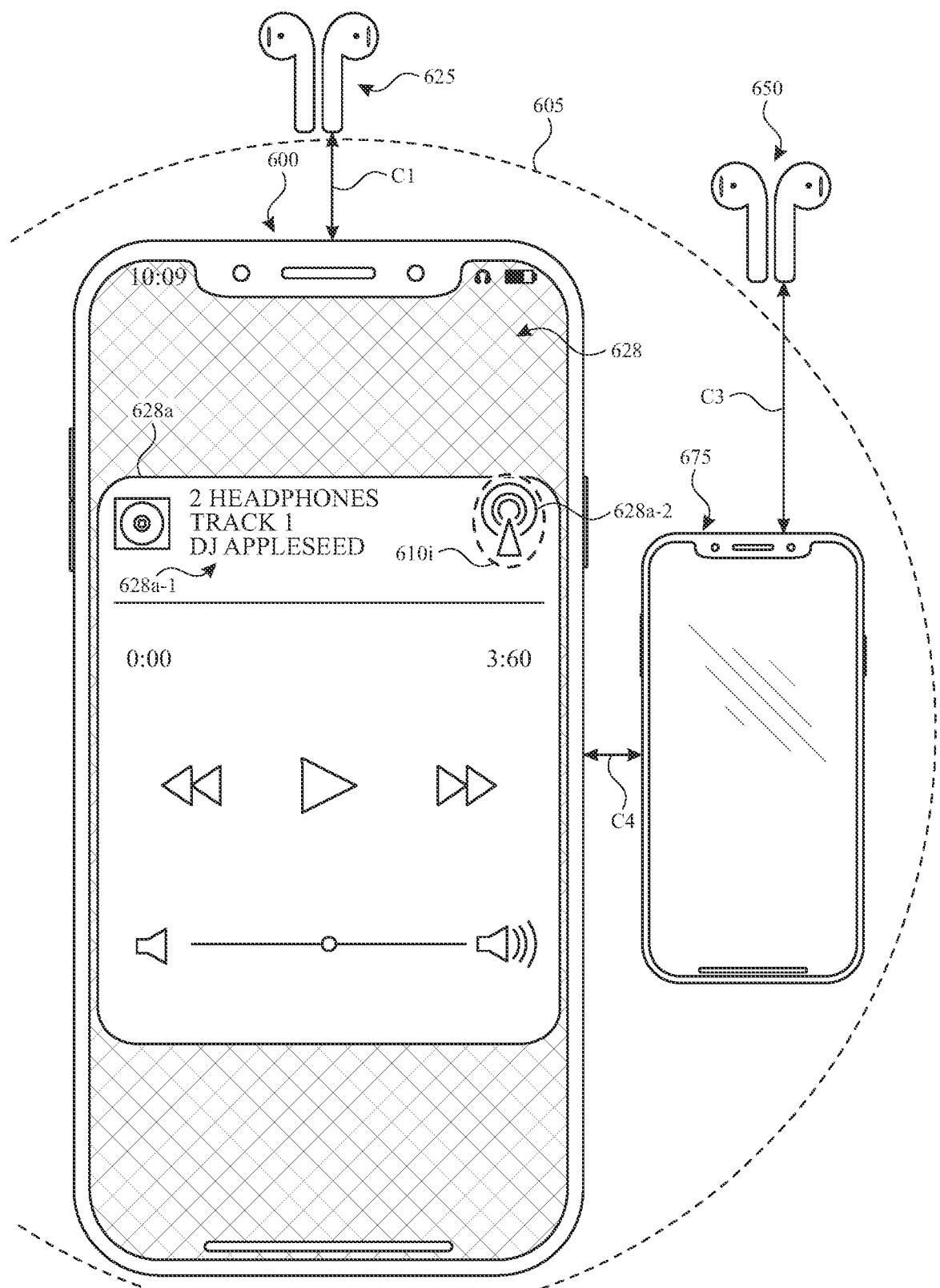
Figure 6O:
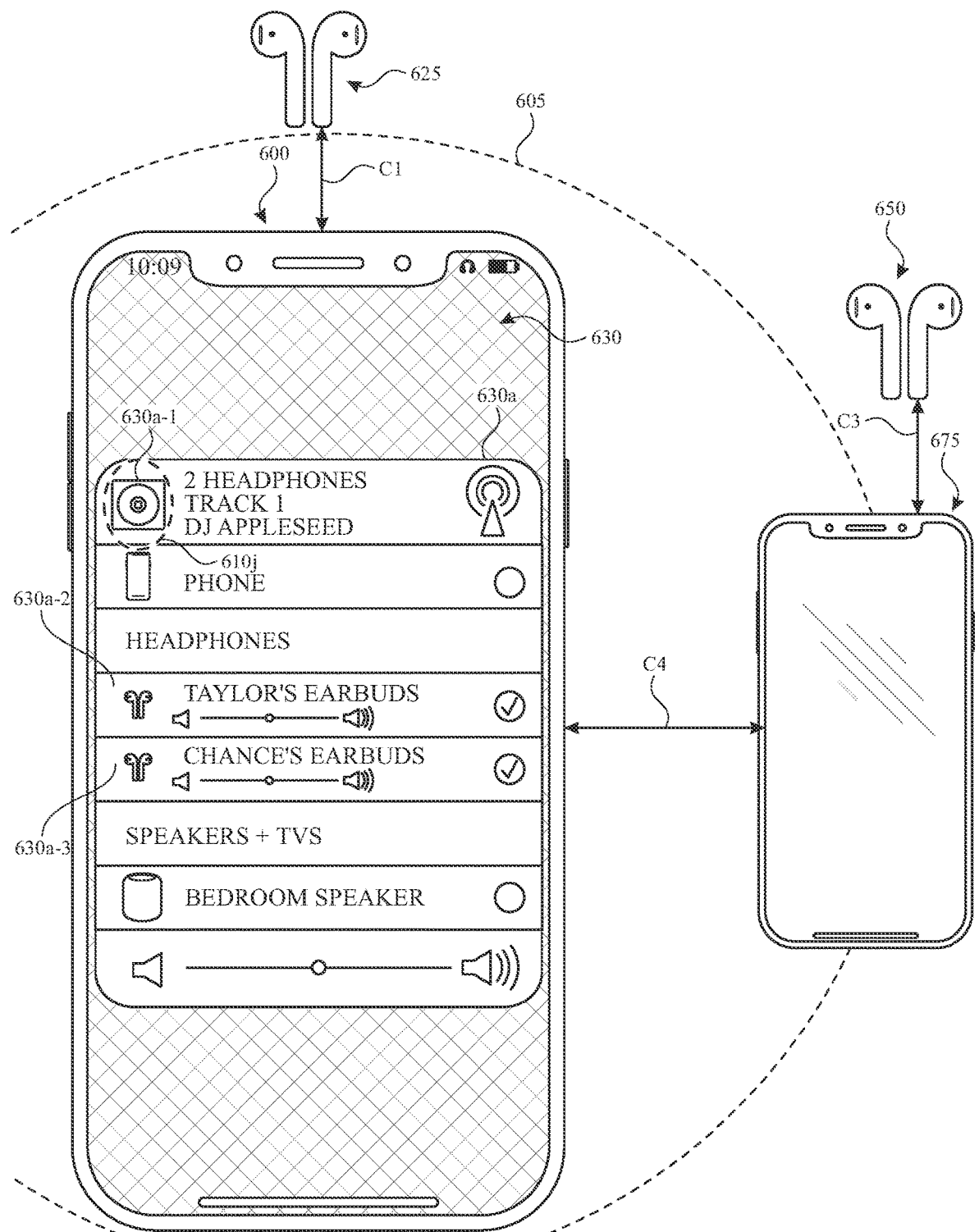
Figure 6P:
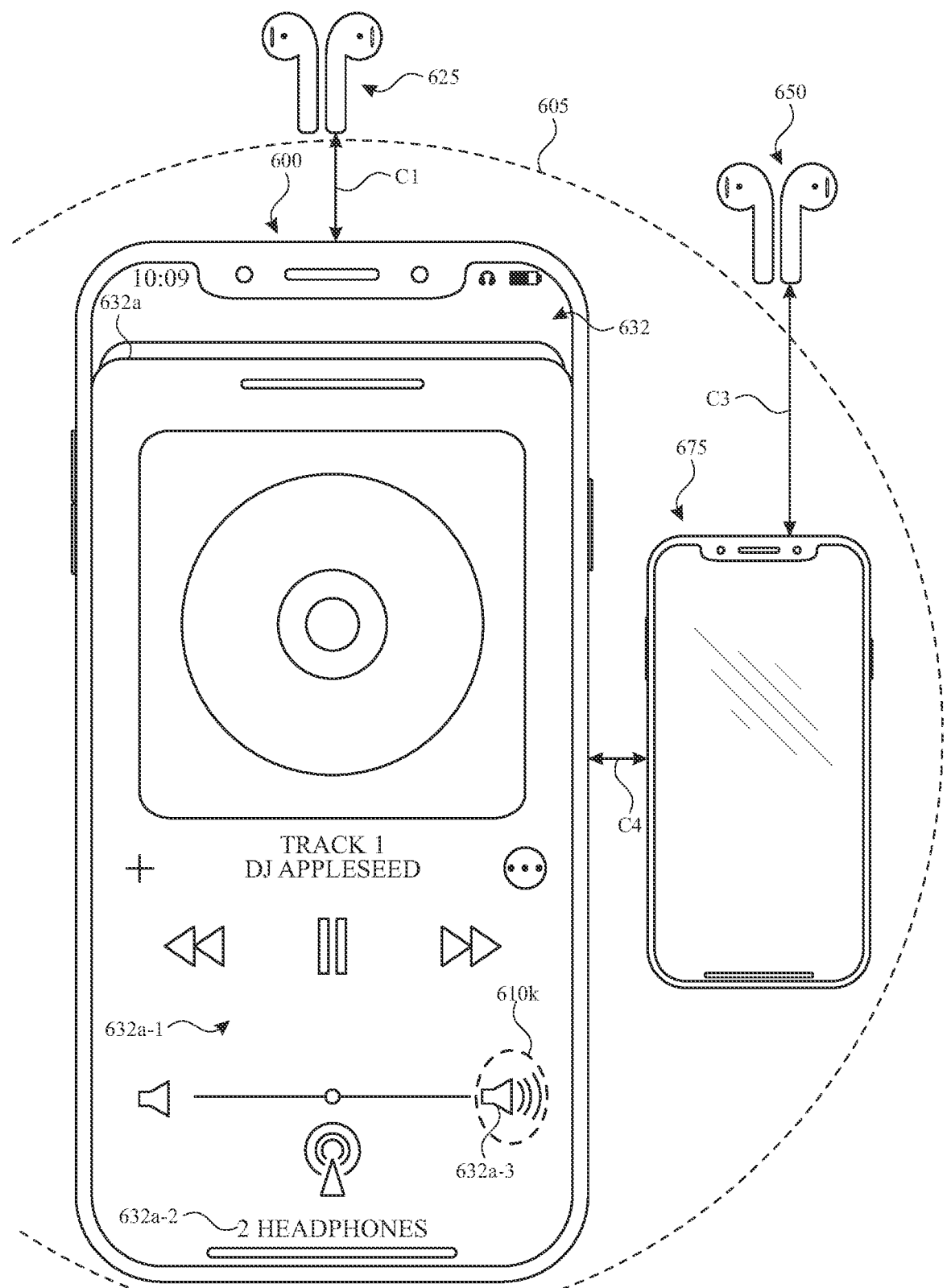
Figure 6Q:
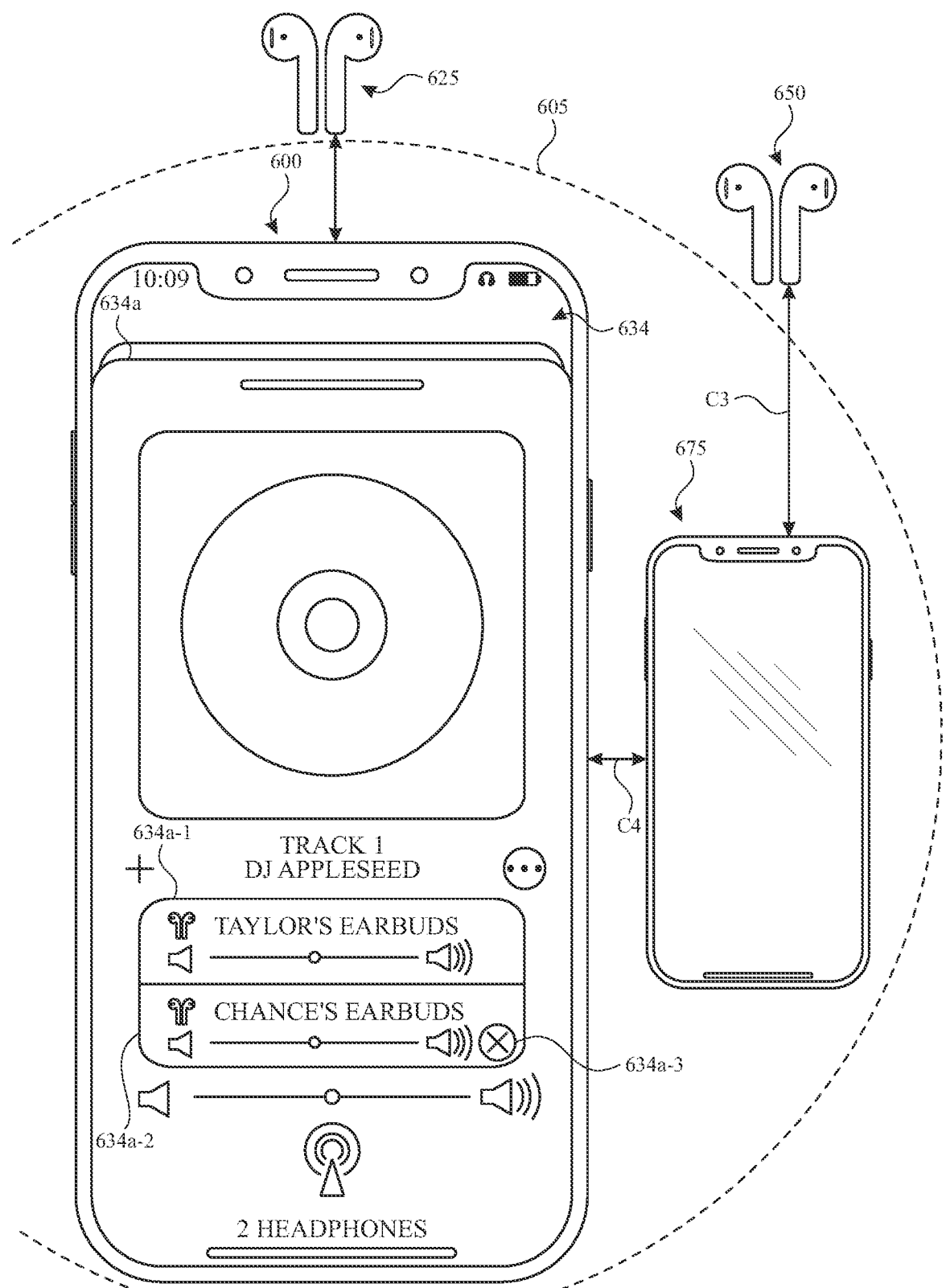
Figure 6R:
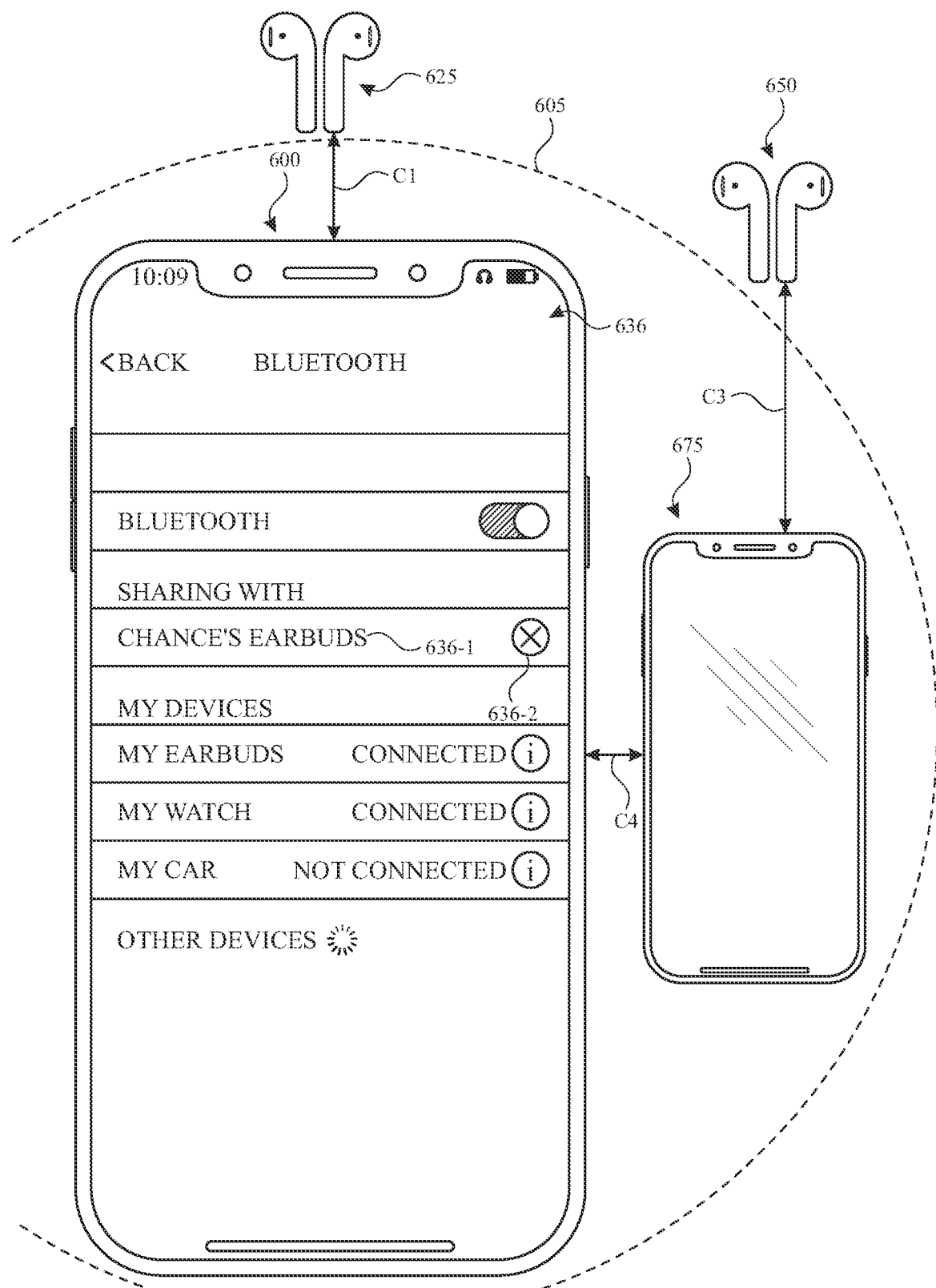

In the embodiment illustrated in FIG. 6N, device 600 displays user interface 628 while concurrently providing audio data to device 625 and device 650 (via device 675). User interface 628 includes audio media user interface 628*a*, which indicates (via audio information 628*a*-1) that audio data is being provided concurrently to two headphones. Audio media user interface 628*a* includes affordance 628*a*-2 that, when selected, displays user interface 630, including audio media user interface 630*a* (e.g., audio media user interface 616*a*), as shown in FIG. 6O. Audio media user interface 630*a* includes affordance 630*a*-1 that, when selected (e.g., via input 610*j*), displays audio application user interface 632*a*, as shown in FIG. 6P. Audio application user interface 632*a* includes, inter alia, track controls 632*a*-1, indication 632*a*-2 that audio data is being concurrently provided to two headphones, and volume control affordance 632*a*-3. In FIG. 6P, device 600 detects input 610*k* (e.g., a tap) corresponding to selection of volume control affordance 632*a*-3. In response to detecting input 610*k*, device 600 displays user interface 634, including audio media user interface 634*a*, as shown in FIG. 6Q. Audio media user interface 634*a* is the same as audio media user interface 632*a*, except that track controls 632*a*-1 are replaced with individual volume control affordances 634*a*-1 and 634*a*-2 corresponding to device 625 and device 650, respectively. Volume control affordance 634*a*-2 corresponding to device 650 includes disconnect affordance 634*a*-3 that, when selected, causes device 600 to cease sharing audio data with device 650, e.g., by disconnecting communication link C4 between device 600 and device 675. In some embodiments, device 600 displays user interface 634*a*, including disconnect affordance 634*a*-3, while device 650 is connected directly to device 600 (e.g., via communication link C2, as shown in FIG. 6G), and disconnects from device 650 in response to selection of disconnect affordance 634*a*-3.

Turning to FIG. 6R, device 600 displays an exemplary user interface for ceasing to share audio data with a second external device while concurrently providing audio data with device 625. In FIG. 6R, device 600 is connected to device 625 and device 650 (via device 675). In some embodiments, device 650 is connected directly to device 600. While device 600 is configured to concurrently provide audio data to both device 625 and device 650, device 600 displays settings user interface 636 (e.g., a BLUETOOTH settings menu). Settings user interface 636 includes graphical element 636-1 and disconnect affordance 636-2. Graphical element 636-1 indicates that device 600 is sharing audio with device 650 (Chance's Earbuds). Disconnect affordance 636-2, when selected, causes device 600 to cease sharing audio data with device 650, e.g., by disconnecting communication link C4 between device 600 and device 675. In embodiments in which device 600 displays user interface 636 while device 650 is connected directly to device 600 (e.g., via communication link C2, as shown in FIG. 6G), device 600 disconnects from device 650 in response to selection of disconnect affordance 636-2.

FIG. 7 is a flow diagram illustrating a method for sharing audio data using an electronic device in accordance with some embodiments. Method 700 is performed at a device (e.g., 100, 300, 500, or 600) with a display device (e.g., 602). Some operations in method 700 are, optionally, combined, the orders of some operations are, optionally, changed, and some operations are, optionally, omitted.

As described below, method 700 provides an intuitive way for sharing audio data. The method reduces the cognitive burden on a user for sharing audio data, thereby creating a more efficient human-machine interface. For battery-operated computing devices, enabling a user to share audio data faster and more efficiently conserves power and increases the time between battery charges.

While the electronic device (e.g., 600) is connected to a first external device (e.g., 625; wireless headphones or wireless earbuds) via a communication link (e.g., C1; BLUETOOTH), where the electronic device is configured to provide audio data to the first external device via the communication link, the electronic device displays (702), via the display device, a first user interface (e.g., 604) including a first affordance (e.g., 604-4). In some embodiments, the electronic device displays the first affordance concurrently with an indication that the electronic device is connected to the first external device. In some embodiments, the electronic device displays the first affordance in accordance with a determination that the electronic device is connected to the first external device and, optionally, that the electronic device is running an audio media application or actively providing audio data to the first external device via the communication link. In some embodiments, an external device is a single physical device, such as a pair of headphones with two ear cups or earbuds that are physically connected via, e.g., a wire or headband. In some embodiments, an external device is a compound device with multiple, physically separate components or physical units that operate together as one device. In some embodiments, a compound device has a primary component (e.g., earbud) that connects with the electronic device and a secondary component that communicates with the primary component and receives audio signals from the electronic device via the primary component. In some embodiments, a compound device includes two components that are each connected to the electronic device, but are treated by the electronic device as a single external device.

In some embodiments, the electronic device displays the first user interface including the first affordance in accordance with a determination that the first external device is configured to receive audio data from the electronic device while the electronic device is concurrently providing audio data to the second external device. In some embodiments, in accordance with a determination that the first external device is not configured to receive audio data from the electronic device while the electronic device is concurrently providing audio data to the second external device, the electronic device displays the first user interface without the first affordance.

In some embodiments, the electronic device displays the first user interface including the first affordance in accordance with a determination that the electronic device is running an audio media application (e.g., a music application, a podcast application, an audio book application, a multimedia application, a web browser playing audio and/or video). In some embodiments, in accordance with a determination that the electronic device is not running an audio media application, the electronic device displays the first user interface without the first affordance.

The electronic device detects (704) an input (e.g., 610a) corresponding to selection of the first affordance.

In response to detecting the input corresponding to selection of the first affordance, the electronic device initiates (706) a process to provide audio data concurrently with the first external device (e.g., 625) and a second external device (e.g., 650, 675; wireless headphones or wireless ear pods) different from the first external device. In some embodiments, the electronic device displays a visual indication that the electronic device has initiated a process to share audio data concurrently with the first external device and a second external device. In some embodiments, the process to share audio data includes displaying a user interface with instructions to bring another device close to the electronic device to temporarily share audio. Displaying a visual indication that the electronic device has initiated a process to share audio data concurrently with the first external device and a second external device and displaying a user interface with instructions to bring another device close to the electronic device to temporarily share audio provides feedback to a user that the electronic device is prepared to share audio data and informs the user how to continue the audio sharing process. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

After initiating the process to provide audio data concurrently to the first external device and a second external device, the electronic device detects (708) an indication that a physical proximity between the electronic device and the second external device satisfies a proximity condition (e.g., represented by 605). In some embodiments, the indication is detected using a near-field communication technique. In some embodiments, the proximity condition is satisfied if the second electronic device is no farther than a threshold distance away from the electronic device. In some embodiments, the threshold distance is 6 inches, 12 inches, or 18 inches.

In response to detecting the indication that the physical proximity between the electronic device and the second external device satisfies the proximity condition, the electronic device displays (710) a second user interface (e.g., 608, 608a) indicating that the physical proximity between the electronic device and the second external device satisfies the proximity condition. Displaying the second user interface indicating that the physical proximity between the electronic device and the second external device satisfies the proximity condition automatically provides feedback by indicating to the user that the physical proximity satisfies the proximity condition, thus reducing the number of inputs needed to share audio data. Providing improved feedback, reducing the number of inputs needed to perform an operation, and performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the second user interface includes instructions for completing the process to share audio data concurrently with the first external device and the second external device. In some embodiments, the process to share audio data concurrently with the first external device and the second external device includes establishing a temporary connection between the electronic device and the second external device. In some embodiments, second user interface includes an indication the electronic device has established, or is in the process of establishing, a connection with the second electronic device to share audio data with the second external device concurrently with the first device.

In some embodiments, the second external device is configured to output audio based on the audio data from the electronic device and is connected directly to the electronic device (e.g., FIG. 6G, 6K). For example, in some embodiments, the second external device does not receive audio data from the electronic device via an intermediate device, such as a phone, to which the second external device is connected.

In some embodiments, the second external device (e.g., 675) is connected to a third external device (e.g., 650; wireless headphones or wireless earbuds) and is configured to provide the audio data from the electronic device to the third external device.

In some embodiments, as part of initiating a process to provide audio data concurrently with the first external device and a second external device, the electronic device displays a representation (e.g., 606a-2) of a first potential second external device. In some embodiments, as part of initiating a process to provide audio data concurrently with the first external device and a second external device, the electronic device displays a representation (e.g., 606a-3) of a second potential second external device. In some embodiments, the electronic device displays images of audio output devices that are configured to connect to the electronic device and receive audio data from the electronic device while the electronic device concurrently provides audio data to the first external device. In some embodiments, the electronic device sequentially displays the representation of the first potential second external device followed by the representation of the second potential second external device (e.g., the electronic device cycles through representations of potential second external devices). Displaying a representation of one or more external devices with which the electronic device can share data provides feedback by indicating to the user which device(s) can be used to share data. Since not all devices support sharing capability, displaying potential options helps the user know which devices can be used. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the second user interface includes a second affordance (e.g., 608a-3) that, when selected, causes the electronic device to provide audio data concurrently with the first external device and a second external device. In some embodiments, although the electronic device initiates the process to provide audio data concurrently with the first external device and a second external device in response to detecting the input corresponding to selection of the first affordance, the electronic device does not actually provide the audio data until the second affordance is selected. Causing the electronic device to provide audio data concurrently with the first external device and a second external device in response to selection of a second affordance on the second user interface provides improved control by confirming that sharing is truly desired and avoids inadvertently sharing audio data before intended or with an unintended device. Providing improved control over the sharing process enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, after detecting the indication that the physical proximity between the electronic device and the second external device satisfies the proximity condition and before providing audio data concurrently with the first external device and the second external device, the electronic device displays instructions (e.g., 612a-3) to provide an input at the second external device. In some embodiments, the second external device requires an input (e.g., a press of a hardware button on the second external device) to connect to the electronic device.

In some embodiments, the electronic device receives an indication that the second external device is connected to the electronic device. In some embodiments, in response to receiving the indication that the second external device is connected to the electronic device, the electronic device provides an indication that the second external device is connected to the electronic device (e.g., 608a, 616a-4, 624a). In some embodiments, providing the indication that the second external device is connected to the electronic device includes displaying a graphical representation of the second external device. In some embodiments, the indication that the second external device is connected to the electronic device includes an audio output and/or a tactile output.

In some embodiments, while the second external device is connected to the electronic device, the electronic device displays a third affordance (e.g., 618a-4, 634a-3, 636-2, 906-3) that, when selected, disconnects the second external device from the electronic device.

In some embodiments, while the second external device is connected to the electronic device, the electronic device detects an indication that the physical proximity between the electronic device and the second external device satisfies a second proximity condition (e.g., represented by 615). In some embodiments, the electronic device displays the third affordance (e.g., 618a-4) in response to detecting the indication that the physical proximity between the electronic device and the second external device satisfies the second proximity condition. In some embodiments, the third affordance is displayed in accordance with a determination that the second external device has re-entered a range required to satisfy the proximity condition. In some embodiments, the second proximity condition is the same as the (first) proximity condition. Displaying an affordance for disconnecting the second external device in response to detecting an indication that the physical proximity between the electronic device and the second external device satisfies a second proximity condition provides feedback that the user can cease sharing audio with the second external device and automatically presents the option to disconnect the second external device, thus reducing the number of inputs needed to cease sharing audio data. Providing improved feedback, reducing the number of inputs needed to perform an operation, and performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the electronic device displays the third affordance in accordance with a determination that the second external device is not paired with the electronic device. In some embodiments, two devices (e.g., the second external device and the electronic device) are paired if they have a persistent association with each other and are configured to exchange data via a communication link. In some embodiments, devices are not paired if they do not have a persistent association with each other. In some embodiments, paired devices remain associated with each other when a communication link between the devices is not currently active, whereas devices that are temporarily connected but not paired are not associated with each other after the temporary connection ends. In some embodiments, paired devices share common configuration settings. In some embodiments, if the second external device is paired with the electronic device, the electronic device foregoes display of the third affordance and, optionally, displays information (e.g., battery level) of the second external device.

In some embodiments, the third affordance is displayed in a menu user interface (e.g., 636). In some embodiments, the menu user interface is a BLUETOOTH settings menu or an audio output menu user interface of an audio media player application.

Note that details of the processes described above with respect to method 700 (e.g., FIG. 7) are also applicable in an analogous manner to the methods described below. For example, method 800, 1000, and/or 1200 optionally includes one or more of the characteristics of the various methods described above with reference to method 700. For example, operation 710 displaying the second user interface in method 700 can be performed in response to detecting the indication in operation 802 of method 800. As another example, the operations of method 700 can be performed prior to the operations of method 1000 and/or method 1200. For brevity, these details are not repeated below.

FIG. 8 is a flow diagram illustrating a method for sharing audio data using an electronic device in accordance with some embodiments. Method 800 is performed at a device (e.g., 100, 300, 500, or 600) with a display device (e.g., 602). Some operations in method 800 are, optionally, combined, the orders of some operations are, optionally, changed, and some operations are, optionally, omitted.

As described below, method 800 provides an intuitive way for sharing audio data. The method reduces the cognitive burden on a user for sharing audio data, thereby creating a more efficient human-machine interface. For battery-operated computing devices, enabling a user to share audio data faster and more efficiently conserves power and increases the time between battery charges.

While the electronic device is connected to a first external device (e.g., 625; wireless headphones or wireless ear pods) via a communication link (e.g., C1), where the electronic device is configured to provide audio data to the first external device via the communication link (e.g., and not currently configured to provide audio data to a second external device (e.g., 650)), the electronic device detects (802) an indication that a physical proximity between the electronic device and a second external device (e.g., 650; wireless headphones or wireless ear pods), different from the first external device, satisfies a proximity condition (e.g., represented by 635). In some embodiments, the indication is detected using a near-field communication technique. In some embodiments, the proximity condition is satisfied if the second electronic device is no farther than a threshold distance away from the electronic device. In some embodiments, the threshold distance is 6 inches, 12 inches, or 18 inches.

In response to detecting the indication that the physical proximity between the electronic device and the second external device satisfies the proximity condition, the electronic device displays (804), via the display device, a first user interface (e.g., 622, 622a) including a first affordance (e.g., 622a-5).

In some embodiments, the first user interface includes an indication that the electronic device can temporarily share audio data with the second external device. In some embodiments, the first user interface includes an indication (e.g., on the first affordance) that selecting the first affordance will cause the electronic device to share audio data with the second external device. In some embodiments, the electronic device displays the first affordance in accordance with a determination that the electronic device is connected to the first external device and, optionally, that the electronic device is running an audio media application or actively providing audio data to the first external device via the communication link. Displaying the first user interface with the first affordance for sharing audio data in response to detecting the indication that the physical proximity between the electronic device and the second external device satisfies the proximity condition automatically provides feedback by indicating to the user that the physical proximity satisfies the proximity condition and that audio data can be shared, thus reducing the number of inputs needed to share audio data. Providing improved feedback, reducing the number of inputs needed to perform an operation, and performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

The electronic device detects (806) an input (e.g., 610e) corresponding to selection of the first affordance.

In response to detecting the input corresponding to selection of the first affordance, the electronic device initiates (808) a process to provide audio data concurrently with the first external device (e.g., 625) and the second external device (e.g., 650). In some embodiments, the process to share audio data concurrently with the first external device and the second external device includes establishing a temporary connection between the electronic device and the second external device. In some embodiments, the process to share audio data concurrently with the first external device and the second external device includes displaying a visual indication that the electronic device has established, or is in the process of establishing, a connection with the second external device to share audio data concurrently with the first external device and a second external device. In some embodiments, the process to share audio data concurrently with the first external device and the second external device includes displaying instructions for completing the process to share audio data concurrently with the first external device and the second external device. Displaying instructions for completing the process to share audio data provides feedback to a user that the electronic device is prepared to share audio data and informs the user how to continue the audio sharing process. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the electronic device displays the first user interface including the first affordance in accordance with a determination that the first external device is configured to receive audio data from the electronic device while the electronic device is concurrently providing audio data to the second external device. In some embodiments, in accordance with a determination that the first external device is not configured to receive audio data from the electronic device while the electronic device is concurrently providing audio data to the second external device, the electronic device foregoes displaying the first user interface.

In some embodiments, the electronic device displays the first user interface including the first affordance in accordance with a determination that the electronic device is running an audio media application (e.g., a music application, a podcast application, an audio book application, a multimedia application, a web browser playing audio and/or video). In some embodiments, in accordance with a determination that the electronic device is not running an audio media application, the electronic device foregoes displaying the first user interface.

In some embodiments, the electronic device displays the first user interface including the first affordance in accordance with a determination that the second external device is not paired with the electronic device. In some embodiments, two devices (e.g., the second external device and the electronic device) are paired if they have a persistent association with each other and are configured to exchange data via a communication link. In some embodiments, devices are not paired if they do not have a persistent association with each other. In some embodiments, paired devices remain associated with each other when a communication link between the devices is not currently active, whereas devices that are temporarily connected but not paired are not associated with each other after the temporary connection ends. In some embodiments, paired devices share common configuration settings. In some embodiments, if the second external device is paired with the electronic device, the electronic device foregoes displaying the first user interface and, optionally, displays information (e.g., battery level) of the second external device.

In some embodiments, the first user interface includes a second affordance (e.g., 622*a*-5) that, when selected, pairs the second external device with the electronic device. In some embodiments, pairing the second external device with the electronic device creates a persistent association between the second external device and the electronic device. In some embodiments, a second affordance, when selected, disconnects the first external device from the electronic device. Displaying an affordance to pair the second external device (e.g., in addition to concurrently displaying an affordance for temporarily sharing data with the second external device) in response to detecting the indication that the physical proximity between the electronic device and the second external device satisfies the proximity condition provides feedback that a user has the option of either pairing or temporarily sharing audio data with the second external device, and automatically presents those options. Providing improved visual feedback to the user and performing an operation (e.g., displaying the pairing and sharing options) when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the second external device is configured to output audio based on the audio data from the electronic device and is wirelessly connected directly to the electronic device (e.g., FIG. 6K). For example, in some embodiments, the second external device does not receive audio data from the electronic device via an intermediate device, such as a phone, to which the second external device is connected.

In some embodiments, after detecting the input corresponding to selection of the first affordance and before providing audio data concurrently with the first external device and the second external device, the electronic device displays instructions (e.g., 612*a*-3) to provide an input at the second external device. In some embodiments, the second external device requires an input (e.g., a press (e.g., 610*c*) of a hardware button on the second external device) to connect to the electronic device.

In some embodiments, the electronic device receives an indication that the second external device is connected to the electronic device. In some embodiments, in response to receiving the indication that the second external device is connected to the electronic device, the electronic device provides an indication (e.g., 616*a*-4, 624*a*) that the second external device is connected to the electronic device. In some embodiments, providing the indication that the second external device is connected to the electronic device includes displaying a graphical representation of the second external device. In some embodiments, the indication that the second external device is connected to the electronic device includes an audio output and/or a tactile output.

In some embodiments, while the second external device is connected to the electronic device, the electronic device displays a second affordance (e.g., 618*a*-4, 634*a*-3, 636-2, 906-3) that, when selected, disconnects the second external device from the electronic device. In some embodiments, while the second external device is connected to the electronic device, the electronic device detects an indication that the physical proximity between the electronic device and the second external device satisfies a second proximity condition (e.g., FIG. 6H). In some embodiments, the electronic device displays the second affordance in response to detecting the indication that the physical proximity between the electronic device and the second external device satisfies the second proximity condition. In some embodiments, the second affordance is displayed in accordance with a determination that the second external device has re-entered a range required to satisfy the proximity condition (e.g., the second proximity condition or the (first) proximity condition. In some embodiments, the second proximity condition is the same as the (first) proximity condition. Displaying an affordance for disconnecting the second external device in response to detecting an indication that the physical proximity between the electronic device and the second external device satisfies a second proximity condition provides feedback that the user can cease sharing audio with the second external device and automatically presents the option to disconnect the second external device, thus reducing the number of inputs needed to cease sharing audio data. Providing improved feedback, reducing the number of inputs needed to perform an operation, and performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the electronic device displays the second affordance (e.g., 618a-4) in accordance with a determination that the second external device is not paired with the electronic device. In some embodiments, if the second external device is paired with the electronic device, the electronic device foregoes display of the second affordance and, optionally, displays information (e.g., battery level) of the second external device. In some embodiments, the second affordance is displayed in a menu user interface (e.g., 636). In some embodiments, the menu user interface is a BLUETOOTH settings menu or an audio output menu user interface of an audio media player application.

Note that details of the processes described above with respect to method 800 (e.g., FIG. 8) are also applicable in an analogous manner to the methods described above and below. For example, method 700, method 1000, and/or method 1200 optionally includes one or more of the characteristics of the various methods described above with reference to method 800. For example, operation 804 displaying the second user interface in method 700 can be performed in response to detecting the indication in operation 708 of method 700. As another example, the operations of method 800 can be performed prior to the operations of method 1000 and/or method 1200. For brevity, these details are not repeated below.

FIGS. 9A-9E illustrate exemplary user interfaces for adjusting a volume level of one or more devices, in accordance with some embodiments. The user interfaces in these figures are used to illustrate the processes described below, including the processes in FIG. 10.

Figure 9A:
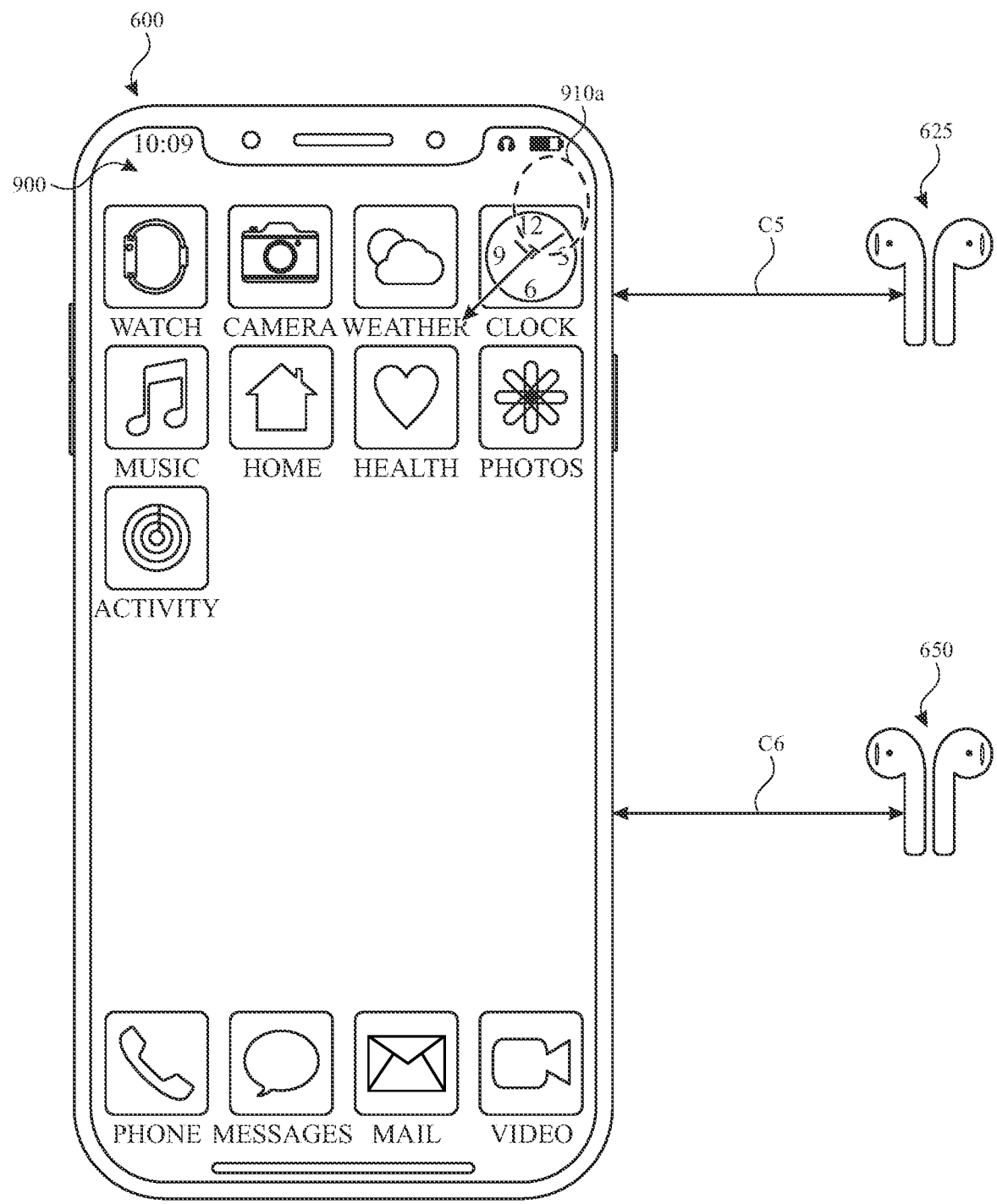
FIGS. 9A-9E illustrate exemplary user interfaces in accordance with some embodiments.

FIG. 9A illustrates device 600 concurrently connected to and providing audio data to device 625 (via communication link C5) and device 650 (via communication link C6). Device 600 displays user interface 900 (e.g., a home screen or application springboard) and detects input 910a (e.g., a swipe on touch-sensitive display 602). In response to detecting input 910a, device 600 displays user interface 902 (e.g., a control center). User interface 902 includes affordances for controlling various functions and setting of device 600 and peripheral devices connected to device 600, such as device 625 and device 650. Affordance 902-1 corresponds to an audio media application that is currently playing a media item (Track 1 by DJ Appleseed). Volume affordance 902-2 provides the ability to adjust the volume level of device 625 and device 650 from user interface 902 with a single input. In accordance with a determination that device 600 is providing audio data to more than one device (e.g., sharing audio data with device 650 while concurrently providing audio data to device 625), user interface 902 includes graphical element 902-3 (e.g., a badge on volume affordance 902-2). Graphical element 902-3 provides a visual indication that device 600 is providing audio data to multiple devices (e.g., devices associated with multiple users).

Figure 9B:
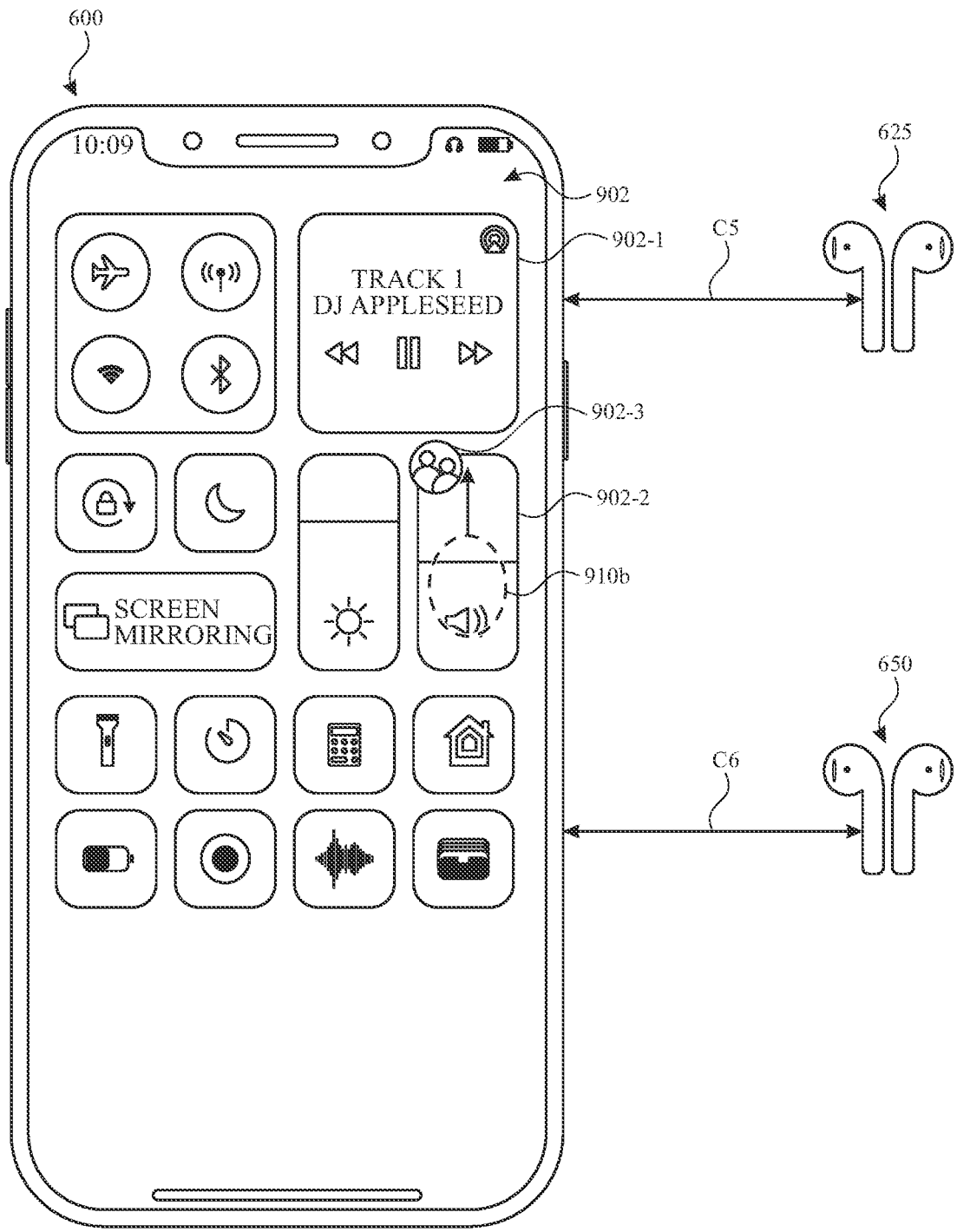

In FIG. 9B, device 600 detects input 910b (e.g., an upward drag) corresponding to selection of volume affordance 902-2. In accordance with input 910b being a first type of input (e.g., the upward drag illustrated in FIG. 9B), device 600 adjusts (e.g., increases) the volume level of device 625 and the volume level of device 650, as indicated by the updated visual appearance of volume affordance 902-2 in FIG. 9C. In the embodiment illustrated in FIG. 9C, the height of the horizontal line inside volume affordance 902-2 indicates a current master volume level of device 625 and device 650. In some embodiments, adjusting the volume level for device 625 and device 650 with affordance 902-2 sets the volume levels for device 625 and device 650 to the same volume level (e.g., even if device 625 and device 650 had different volume levels prior to selection of affordance 902-2). In some embodiments, adjusting the volume level for device 625 and device 650 with affordance 902-2 sets the volume levels for device 625 and device 650 to respective volume levels based on the initial volume level of the respective device and the input on affordance 902-2 (e.g., the direction and length of input 910b). In some embodiments, if the volume level of device 625 is the same as the volume level of device 650, volume affordance 902-2 indicates the volume level of device 625 and device 650. In some embodiments, if the volume level of device 625 is different from the volume level of device 650, volume affordance 902-2 indicates the volume level of device 625, the volume level of device 650, the volume level of the device with the higher volume level, the volume level of the device with the lower volume level, or a combination (e.g., average) of the volume levels of device 625 and device 650.

Figure 9C:
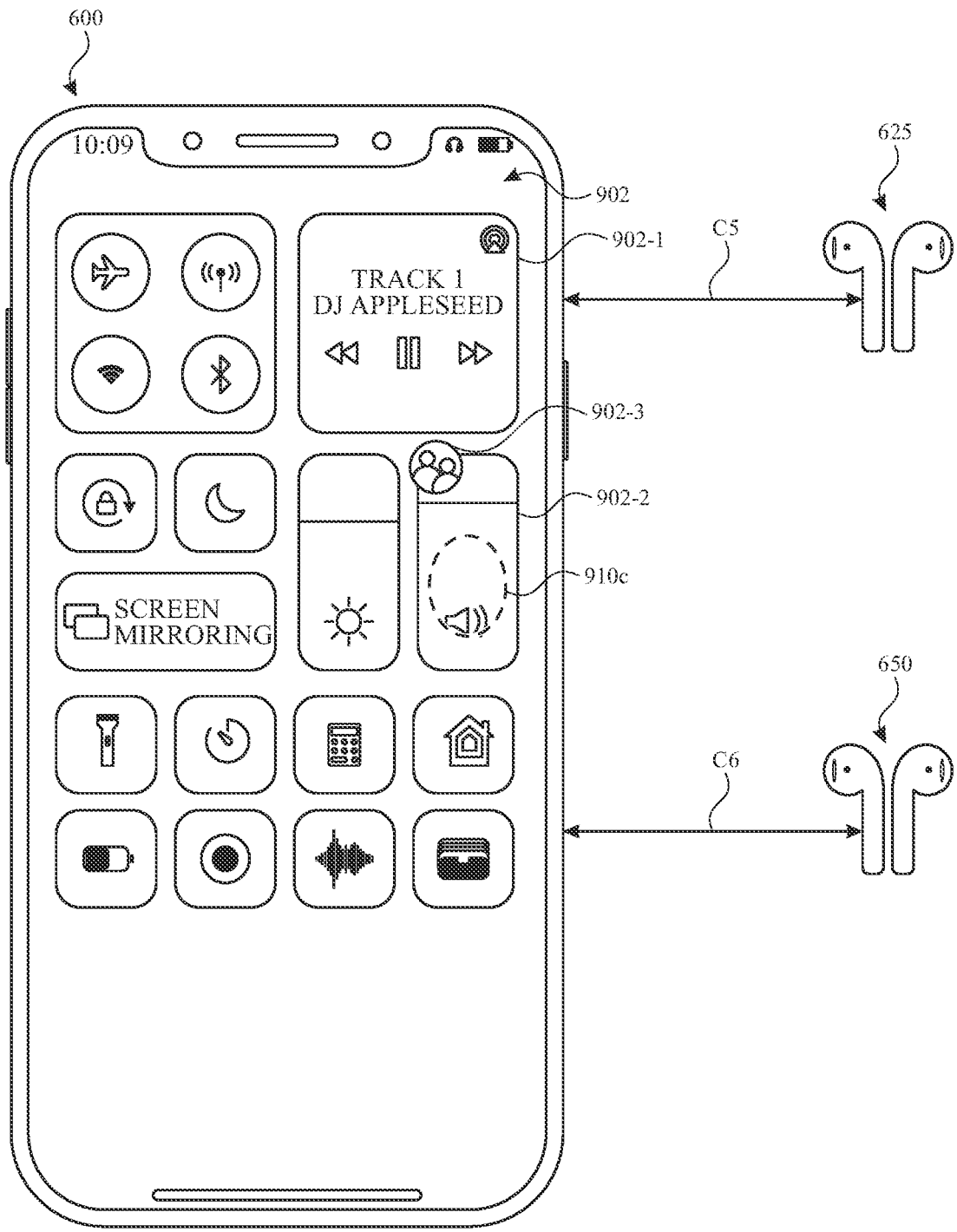

In FIG. 9C, device 600 detects input 910c corresponding to selection of volume affordance 902-2. In accordance with input 910c being a second type of input different from input 910b, device 600 displays a user interface, where the user interface that is displayed depends on a connection condition with respect to an external device (e.g., device 650).

Figure 9D:
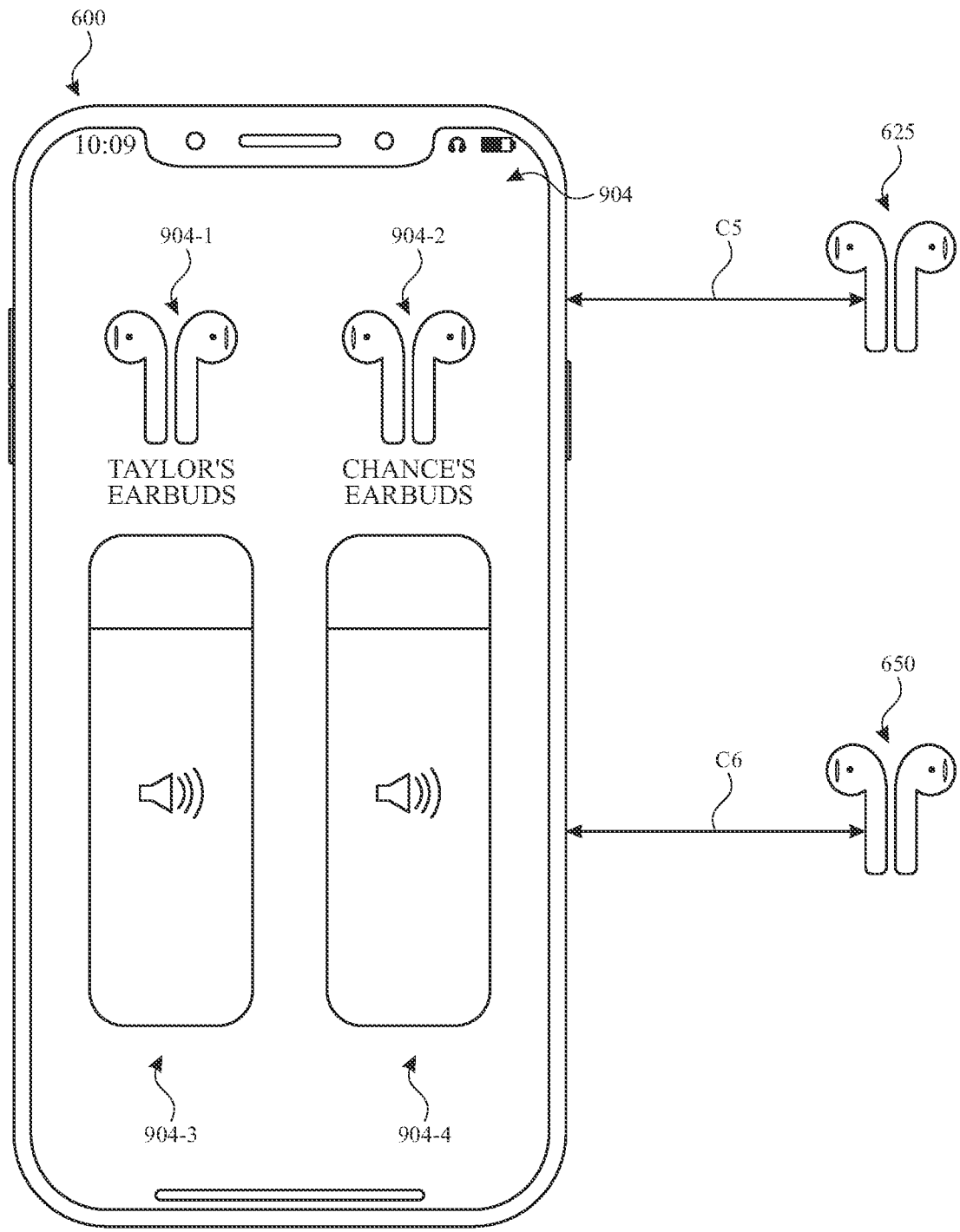

In accordance with a determination that the connection condition is satisfied (e.g., device 650 is connected to device 600 concurrently with device 625), device 600 displays user interface 904, as shown in FIG. 9D. User interface 904 includes graphical elements 904-1 through 904-4. Graphical element 904-1 represents device 625 and indicates that volume affordance 904-3 controls the volume level of device 625. Graphical element 904-2 represents device 650 and indicates that volume affordance 904-4 controls the volume level of device 650. Affordance 904-3, when selected (e.g., with a vertical drag), adjusts the volume level of device 625 without changing the volume level of device 650. Affordance 904-4, when selected (e.g., with a vertical drag), adjusts the volume level of device 650 without changing the volume level of device 625. In the embodiment illustrated in FIG. 9D, the volume level of device 625 is the same as the volume level of device 650, which corresponds to the volume level indicted by volume affordance 902-2.

Figure 9E:
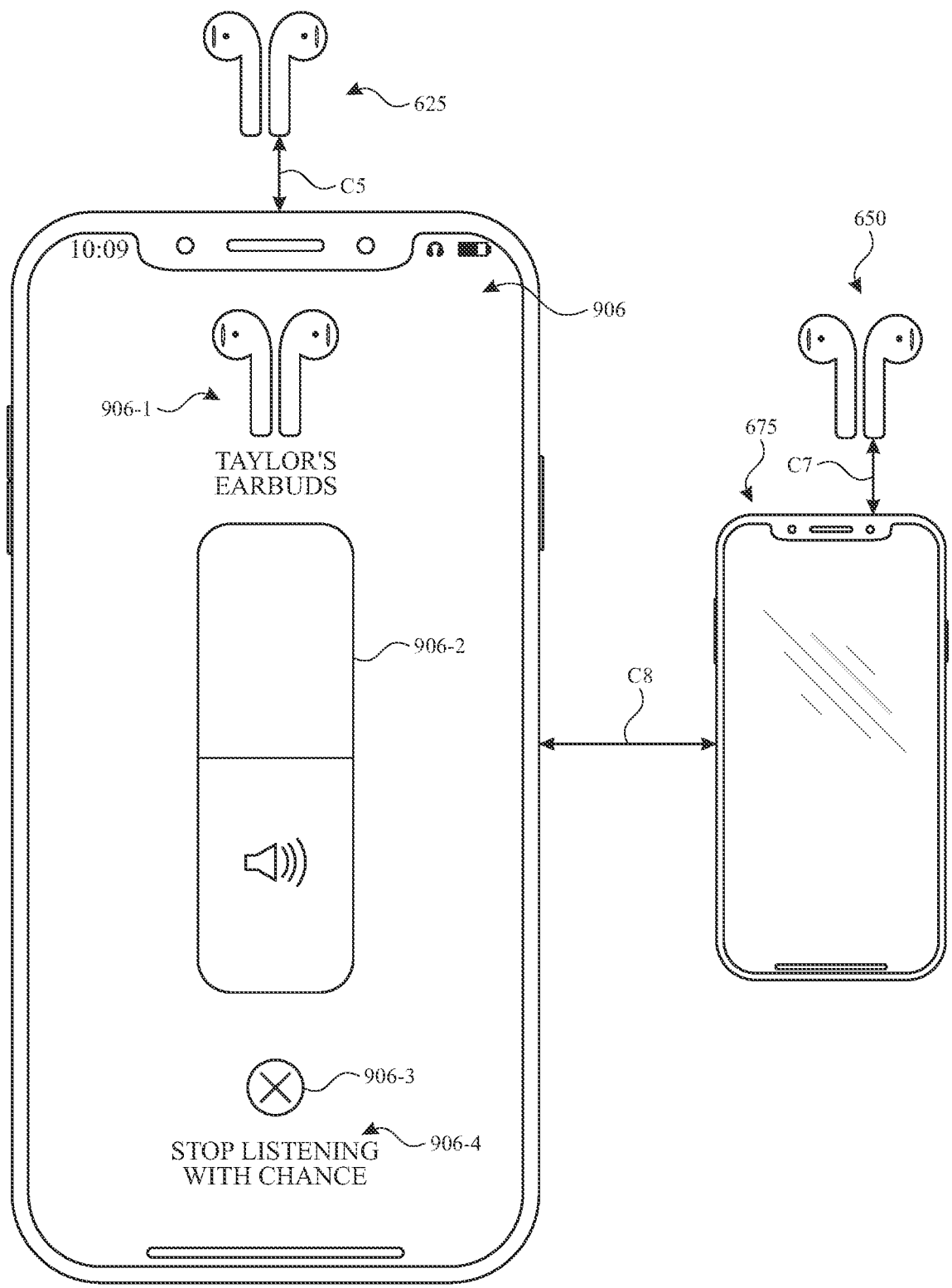

In accordance with a determination that the connection condition is not satisfied (e.g., device 650 is connected to device 600 via device 675), device 600 displays user interface 906, as shown in FIG. 9E. In FIG. 9E, device 625 is connected to device 600 via communication link C5; device 675 is connected to device 600 via communication link C8; and device 650 is connected to device 675 via communication link C7. In accordance with device 600, device 625, and device 675 being in this configuration, user interface 906 includes graphical elements 906-1 through 906-4. Graphical element 906-1 represents device 625 and indicates that volume affordance 906-2 controls the volume level of device 625. User interface 906 does not include an affordance to control the volume level of device 650 (e.g., since device 650 is connected to device 600 through device 675). For example, since device 650 is connected via communication link C7 to device 675, device 675 maintains control over the volume level of device 650 (e.g., the volume level of device 650 can only be controlled via inputs on device 675). Disconnect affordance 906-3, when selected, causes device 600 to cease sharing audio data with device 650 (e.g., device 600 disconnects communication link C8 with device 675), as indicated by graphical element 906-4 ("Stop Listening with Chance").

FIG. 10 is a flow diagram illustrating a method for adjusting a volume level of one or more devices using an electronic device in accordance with some embodiments. Method 1000 is performed at a device (e.g., 100, 300, 500, or 600) with a display device (e.g., 602). Some operations in method 1000 are, optionally, combined, the orders of some operations are, optionally, changed, and some operations are, optionally, omitted.

As described below, method 1000 provides an intuitive way for adjusting a volume level of one or more devices. The method reduces the cognitive burden on a user for adjusting a volume level of one or more devices, thereby creating a more efficient human-machine interface. For battery-operated computing devices, enabling a user to adjust a volume level of one or more devices faster and more efficiently conserves power and increases the time between battery charges.

While a first connection condition is satisfied with respect to the electronic device (e.g., 600), a first external device (e.g., 625), and a second external device (e.g., 650, 675) where the electronic device is configured to provide audio data to the first external device when connected to the first external device and to provide audio data to the second external device when connected to the second external device, the electronic device receives (1002) a request (e.g., input 910a) to display a first volume control affordance (e.g., 902-2). In some embodiments, the connection condition is based on a connection status of the first external device and/or the second external device to the electronic device. In some embodiments, the connection condition is satisfied if the electronic device is concurrently connected to a first external device (e.g., wireless headphones or a pair of wireless earbuds operating as a single device) and a second external device (e.g., wireless headphones or a pair of wireless earbuds operating as a single device) different from the first external device. In some embodiments, the electronic device is connected directly to the second external device. In some embodiments, the electronic device is connected to the second external device via a third external device (e.g., a phone). For example, the electronic device is connected to the third external device, and the third external device is connected to the second external device. In some embodiments, the connection condition is satisfied only if the first external device and the second external device are operating as independent devices (e.g., not as a pair of earbuds operating together). Examples of a request to display the first volume control affordance include, but are not limited to, a touch input on a touch-sensitive surface of the electronic device (e.g., an upward swipe gesture from a bottom edge of the touch-sensitive surface, a downward swipe gesture from a top edge of the touch-sensitive surface), selection of an affordance, a press of a mechanical button on the electronic device (e.g., while the electronic device is in a sleep state or the display device is inactive), movement of the electronic device that satisfies a motion condition (e.g., picking up the electronic device or moving the electronic device into a viewing position). In some embodiments, the request to display the volume control affordance includes a request to display a user interface (e.g., a control center user interface) with the volume control affordance.

In response to receiving the request to display the first volume control affordance, the electronic device displays (1004) the first volume control affordance (e.g., 902-2).

The electronic device detects (1006) an input (e.g., 910c) corresponding to selection of the first volume control affordance. In some embodiments, the input corresponding to selection of the volume control affordance includes a contact on a touch-sensitive surface of the electronic device, where the contact is determined to have a characteristic intensity that exceeds a predefined threshold intensity. In some embodiments, the input corresponding to selection of the volume control affordance includes a contact on a touch-sensitive surface of the electronic device, where the contact is determined to have a duration that exceeds a predefined threshold duration.

In response to detecting the input corresponding to selection of the first volume control affordance, the electronic device displays (1008) a user interface (e.g., 904, 906). As part of displaying the user interface, in accordance with a determination that a second connection condition is satisfied with respect to the second external device (e.g., the second external device is connected directly to the electronic device; the second external device is not connected to the electronic device via a third external device (e.g., a phone); the second external device is connected solely to the electronic device), the electronic device displays (1010) a second volume control affordance (e.g., 904-3) that, when selected, adjusts a volume level of the first external device (e.g., without adjusting the volume of the second external device) and a third volume control affordance (e.g., 904-4) that, when selected, adjusts a volume level of the second external device (e.g., without adjusting the volume of the first external device; the electronic device displays separate controls for the first external device and the second external device that provide the capability to control the volume level of the first external device independently from the volume level of the second external device, and vice versa). In some embodiments, the electronic device ceases display of the first volume control affordance and displays the second volume control affordance and the third volume control affordance. In some embodiments, the second connection condition is satisfied with respect to the second external device if the second external device is a compound device (e.g., a pair of earbuds operating cooperatively as one device) and one or more of the elements of the compound device is connected directly to the electronic device. Displaying a volume control affordance for the first external device and a separate volume control affordance for the second external device based on a determination that a connection condition is satisfied with respect to the second external device provides feedback to the user by displaying controls that are relevant to the current context. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

As part of displaying the user interface, in accordance with a determination that the second connection condition is not satisfied with respect to the second external device, the electronic device displays (1012) a fourth volume control affordance (e.g., 906-2) that, when selected, adjusts a volume level of the first external device (e.g., without adjusting the volume of the second external device), without displaying a volume control affordance for adjusting the volume level of the second external device (e.g., the electronic device displays a single volume control affordance to adjust the volume level of the first external device). Displaying a volume control affordance for only the first external device based on a determination that the connection condition is not satisfied with respect to the second external device provides feedback to the user by displaying controls that are relevant to the current context. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the second connection condition is not satisfied with respect to the second external device if the second external device is paired to a third external device (e.g., a phone), and receives audio data either directly from the electronic device or indirectly via the third external device. In some embodiments, the second connection condition is not satisfied with respect to the second external device if the second external device is a pair of earbuds paired to a device other than the electronic device. In some embodiments, two devices are paired if they have a persistent association with each other and are configured to exchange data via a communication link. In some embodiments, devices are not paired if they do not have a persistent association with each other. In some embodiments, paired devices remain associated with each other when a communication link between the devices is not currently active, whereas devices that are temporarily connected but not paired are not associated with each other after the temporary connection ends. In some embodiments, paired devices share common configuration settings. In some embodiments, the electronic device ceases display of the first volume control affordance and displays the fourth volume control affordance. In some embodiments, the user interface is displayed in accordance with a determination that the input corresponding to selection of the first volume control affordance is a first type of input (e.g., a hard press or a static long press). In some embodiments, the first volume affordance provides the capability to simultaneously adjust the volume level of the first external device and the second external device. For example, in some embodiments, in accordance with a determination that the input corresponding to selection of the first volume control affordance is a second type of input (e.g., an upward or downward swipe gesture on the first volume control affordance) different from the first type, the electronic device updates the first volume control affordance to indicate a new volume level and sends instructions to adjust the volume level of the first external device and, if the second external device is not connected to a third external device, the volume level of the second external device.

In some embodiments, the electronic device displays, concurrently with the second volume control affordance (e.g., 616a-3) and the third volume control affordance (e.g., 616a-4), a fifth volume control affordance (e.g., 616a-6) that, when selected, adjusts a volume level of the first external device and adjusts a volume level of the second external device (see also, e.g., FIGS. 6O and 6Q). In some embodiments, the fifth volume control affordance is the first volume control affordance (e.g., the first volume control affordance remains displayed when it is selected).

In some embodiments, the input (e.g., 910c) corresponding to selection of the first volume control affordance includes a contact having a characteristic intensity, and displaying the user interface (e.g., 904, 906) is performed in accordance with a determination that the characteristic intensity exceeds a threshold intensity. In some embodiments, in accordance with a determination that the characteristic intensity does not exceed the threshold intensity, the electronic device foregoes displaying the user interface. Displaying the user interface based on a characteristic of the input provides additional control options for the first volume control affordance and avoids cluttering the display with additional displayed controls. Providing additional control options without cluttering the display with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the electronic device displays, concurrently with the first volume control affordance, an indication (e.g., 902-3) that the first connection condition is satisfied with respect to the electronic device, a first external device, and a second external device. In some embodiments, the indication that the first connection condition is satisfied with respect to the electronic device, a first external device, and a second external device is displayed on the first volume control affordance.

In some embodiments, the electronic device displays, concurrently with the fifth volume control affordance, a disconnect affordance (e.g., 906-3) that, when selected, disconnects the second external device from the electronic device. In some embodiments, the disconnect affordance is displayed concurrently with the fourth volume control affordance. Displaying an affordance for disconnecting the second external device provides feedback that the user can cease sharing audio with the second external device and presents the option to disconnect the second external device without requiring additional inputs (e.g., to access a separate options menu), thus reducing the number of inputs needed to cease sharing audio data. Providing improved feedback and reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Note that details of the processes described above with respect to method 1000 (e.g., FIG. 10 are also applicable in an analogous manner to the methods described above and below. For example, method 700, 800, and/or 1200 optionally includes one or more of the characteristics of the various methods described above with reference to method 1000. For example, the operations of method 1000 can be performed after the operations of method 700 and/or method 800, and either before or after the operations of method 1200. For brevity, these details are not repeated below.

FIGS. 11A-11F illustrate exemplary user interfaces for controlling an audio media application, in accordance with some embodiments. The user interfaces in these figures are used to illustrate the processes described below, including the processes in FIG. 12.

Figure 11A:
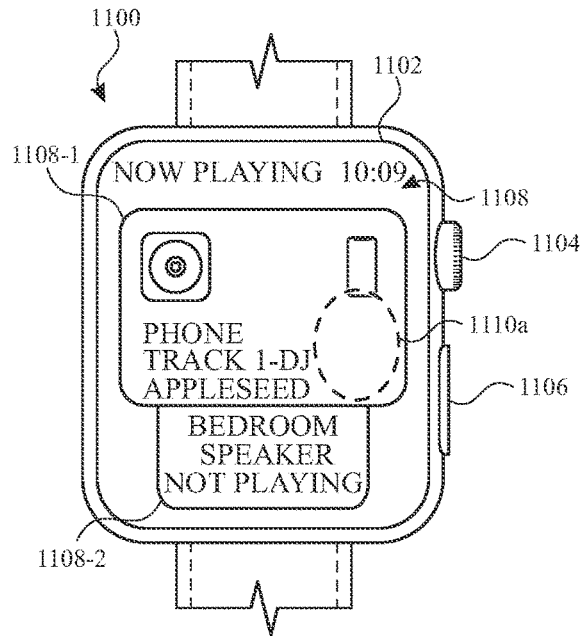
FIGS. 11A-11F illustrate exemplary user interfaces in accordance with some embodiments.

FIG. 11A illustrates device 1100 (e.g., a watch) with display device 1102, rotatable input device 1104, and mechanical button 1106. In some embodiments, device 1100 is device 100, 300, or 500. In some embodiments, rotatable input device 1104 is depressible and rotatable. In FIG. 11A, device 1100 displays user interface 1108, which includes affordance 1108-1 and affordance 1108-2. Affordance 1108-1 corresponds to an audio media application on a first device (e.g., a phone) with which device 1100 is connected (e.g., via a BLUETOOTH or internet connection). In the embodiment illustrated in FIGS. 11A-11F, device 1100 is connected (e.g., paired) with device 600 described above, and affordance 1108-1 corresponds to an audio media application on device 600. Affordance 1108-2 corresponds to an audio media application on a second device (e.g., a wireless speaker) with which device 1100 is connected (e.g., via a BLUETOOTH or internet connection). Affordance 1108-1 and 1108-2 can be selected to display a user interface for controlling the corresponding application on the corresponding device.

In FIG. 11A, device 1100 detects input 1110a (e.g., a tap) corresponding to selection of affordance 1108-1. In response to detecting input 1110a, device 1100 displays audio media user interface 1112 for controlling the audio media application on device 600 corresponding to affordance 1108-1. Audio media user interface 1112 includes, inter alia, track information 1112-1, volume level indicator 1112-2, and controls 1112-3. Volume level indicator 1112-2 indicates the volume level (or volume levels) of an audio output device (or audio output devices) to which device 600 is providing audio data. In some embodiments, the number of arcs on the right side of volume level indicator 1112-2 indicates a volume level (e.g., one arc is LOW, two arcs in MEDIUM, and three arcs is HIGH).

Figure 11B:
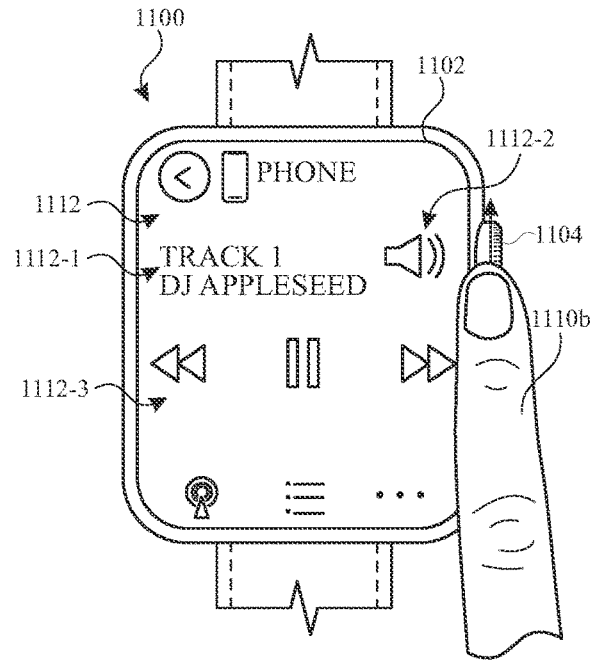

In FIG. 11B, device 1100 detects input 1110b (e.g., a rotation of rotatable input device 1104). In response to detecting input 1110b, device 1100 sends instructions to device 600 to adjust the volume level of the device or devices outputting the audio provided by the application corresponding to audio media user interface 1112. For example, if device 600 is providing audio data concurrently to device 625 and device 650 as described above, rotatable input device 1104 can be rotated to adjust the volume levels for device 625 and device 650 with a single input. In some embodiments, adjusting the volume level for device 625 and device 650 with rotatable input device 1104 sets the volume levels for device 625 and device 650 to the same volume level (e.g., even if device 625 and device 650 had different volume levels prior to movement of rotatable input device 1104). In some embodiments, adjusting the volume level for device 625 and device 650 with rotatable input device 1104 sets the volume levels for device 625 and device 650 to respective volume levels based on the initial volume level of the respective device and the movement of rotatable input device 1104 (e.g., the amount and/or speed of rotation of rotatable input device 1104).

Figure 11C:
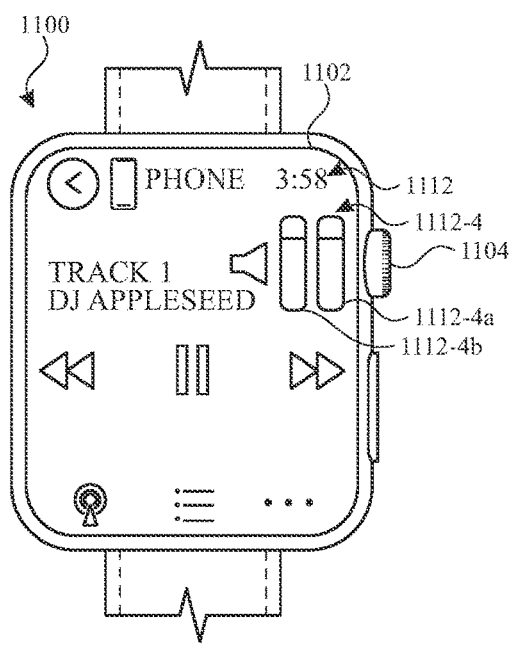
Figure 11D:
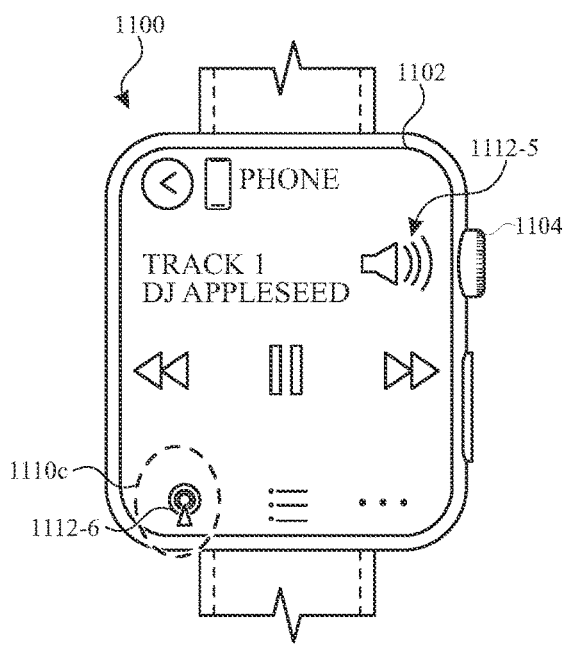

In accordance with a determination that the device corresponding to audio media user interface 1112 is providing audio to multiple devices (e.g., device 600 is providing audio data to device 625 and device 650), device 1100 displays multiple volume level indicators in response to detecting input 1110b. As shown in FIG. 11C, device 1100 displays volume level indicator 1112-4, which includes individual volume level indicator 1112-4a corresponding to a first output device (e.g., device 625) and individual volume level indicator 1112-4b corresponding to a second output device (e.g., device 650). In response to detecting that input 1110b has ceases (e.g., a predetermined amount of time after detecting that input 1110b has ceased), device 1100 displays updated volume level indicator 1112-5 indicating a volume level after input 1110b, as shown in FIG. 11D. In some embodiments, if the volume level of device 625 is the same as the volume level of device 650, volume level indicator 1112-5 indicates the volume level of device 625 and device 650. In some embodiments, if the volume level of device 625 is different from the volume level of device 650, volume level indicator 1112-5 indicates the volume level of device 625, the volume level of device 650, the volume level of the device with the higher volume level, the volume level of the device with the lower volume level, or a combination (e.g., average) of the volume levels of device 625 and device 650.

In FIG. 11D, device 1100 detects input 1110c (e.g., a tap) corresponding to selection of affordance 1112-6 on user interface 1112. In response to detecting input 1110c, device 1100 displays a user interface for selecting an audio output device or devices. The user interface depends on an output device condition based on, e.g., the configuration of available output devices.

Figure 11E:
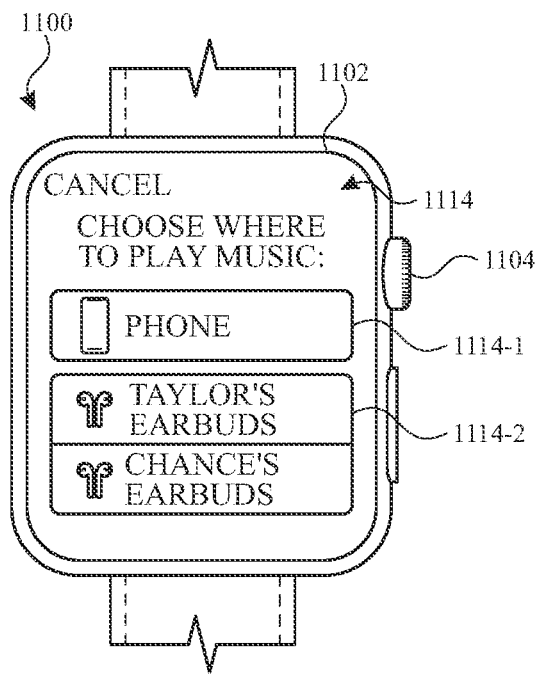

For example, if device 600 is concurrently providing audio data to two devices (device 625 and device 650), device 1100 displays device selection user interface 1114 as shown in FIG. 11E. Device selection user interface 1114 includes affordance 1114-1 and affordance 1114-2. Affordance 1114-1 corresponds to device 600 and, when selected, selects device 600 as the device to output audio. Affordance 1114-2 corresponds to device 625 and device 650 and, when selected, selects both device 625 and device 650 as devices to output audio. That is, selecting a single affordance (affordance 1114-2) causes audio data from the audio media application to be provided concurrently to more than one device (device 625 and device 650).

Figure 11F:
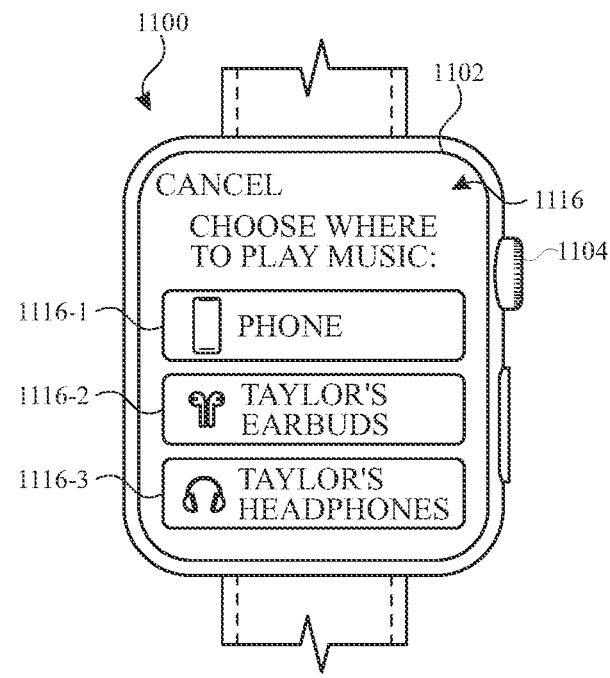

If device 600 is not concurrently providing audio data to two devices (e.g., device is providing audio data to only device 625), device 1100 displays device selection user interface 1116 as shown in FIG. 11F. Device selection user interface 1116 includes affordance 1116-1, affordance 1116-2, and affordance 1116-3. Affordance 1116-1 corresponds to device 600 and, when selected, selects device 600 as the device to output audio; affordance 1116-2 corresponds to device 625 and, when selected, selects device 625 as devices to output audio; and affordance 1116-3 corresponds to a third device to which device 600 is configured to provide audio data. In some embodiments, there is no single affordance on device selection user interface 1116 that corresponds to more than one device (e.g., there is no single affordance that causes audio to be output on more than one device).

FIG. 12 is a flow diagram illustrating a method for controlling audio media output application using an electronic device in accordance with some embodiments. Method 1200 is performed at a device (e.g., 100, 300, 500, or 1100) with a display device (e.g., 1102). Some operations in method 1200 are, optionally, combined, the orders of some operations are, optionally, changed, and some operations are, optionally, omitted.

As described below, method 1200 provides an intuitive way for controlling audio media output. The method reduces the cognitive burden on a user for controlling audio media output, thereby creating a more efficient human-machine interface. For battery-operated computing devices, enabling a user to control audio media output faster and more efficiently conserves power and increases the time between battery charges.

While displaying a first user interface (e.g., 1112) including controls (e.g., 1112-3) for an audio media application, the electronic device receives (1202) a request (e.g., input 1110c) to display a user interface (e.g., 1114, 1116) for selecting one or more devices (e.g., wireless headphones or wireless earbuds) from which audio from the audio media application is to be output.

In response to receiving the request to display a user interface for selecting one or more devices from which audio from the audio media application is to be output, the electronic device displays (1204) a second user interface (e.g., 1114, 1116).

As part of displaying the second user interface, in accordance with a determination that a source electronic device (e.g., 600, 1100) is connected to a first external device (e.g., 625; wireless headphones or a pair of wireless ear pods operating together as a single device) and a second external device (e.g., 650; wireless headphones or a pair of wireless earbuds operating as a single device), different from the first external device, and configured to provide audio data from the audio media application concurrently to the first external device and the second external device, the electronic device displays (1206) a first affordance (e.g., 1114-2) that, when selected, causes audio data from the audio media application to be provided concurrently to the first external device and the second external device. Displaying a first affordance for causing audio data from the audio media application to be provided concurrently to the first external device and the second external device based on a determination that a source electronic device is connected to a first external device and a second external device, and that the source electronic device is configured to provide audio data from the audio media application concurrently to the first external device and the second external device, provides feedback to the user by displaying controls that are relevant to the current context. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the source electronic device is the electronic device. In some embodiments, the source electronic device is an external device connected to the electronic device. In some embodiments, the audio media application is running on a source device external to the electronic device, and the audio media application is controllable by input at the electronic device via the connection between the electronic device and the source device. In some embodiments, audio is not provided to the second external device via the first external device. In some embodiments, the second external device appears to the electronic device as a separate external device from the first external device. In some embodiments, the first external device and the second external device are not a pair of earbuds that operate as a single device.

As part of displaying the second user interface, in accordance with a determination that the source electronic device is connected to the first external device and configured to provide audio data from the audio media application to the first external device without concurrently providing audio data from the audio media application to another external device, the electronic device displays (1208) a second affordance (e.g., 1116-2) that, when selected, causes audio data from the audio media application to be provided solely to the first external device. Displaying a second affordance for causing audio data from the audio media application to be provided solely to the first external device based on a determination that a source electronic device is connected to a first external device and configured to provide audio data from the audio media application to the first external device, without concurrently providing audio data from the audio media application to another external device, provides feedback to the user by displaying controls that are relevant to the current context. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, if the source electronic device is connected to multiple output devices (e.g., the first external device and the second external device) and is configured to provide audio data from the audio media application to each of the output devices, but not concurrently to more than one at a time, the electronic device displays one affordance for each output device to provide audio data to the corresponding output device. In some embodiments, providing audio solely to the first external device includes providing audio to a pair of physically separated earbuds that operate as a single external device.

In some embodiments, the first external device (e.g., 625) is paired with the source electronic device (e.g., 600, 1100). In some embodiments, two devices (e.g., the first external device and the source electronic device) are paired if they have a persistent association with each other and are configured to exchange data via a communication link. In some embodiments, devices are not paired if they do not have a persistent association with each other. In some embodiments, paired devices remain associated with each other when a communication link between the devices is not currently active, whereas devices that are temporarily connected but not paired are not associated with each other after the temporary connection ends. In some embodiments, paired devices share common configuration settings.

In some embodiments, the second external device (e.g., 650) is not paired with the source electronic device (e.g., 600, 1100). In some embodiments, the source electronic device (e.g., 600) is paired with the electronic device (e.g., 1100).

In some embodiments, the second user interface includes a third affordance (e.g., 1114-1, 1116-1) that, when selected, causes audio from the audio media application to be outputted by the source electronic device.

In some embodiments, the electronic device detects an input (e.g., a single input; a single input on a single volume adjustment affordance). In some embodiments, in response to detecting the input (e.g., 1110*b*), the electronic device adjusts a volume level of the first external device and adjusts a volume level of the second external device. Adjusting a volume level of the first external device and a volume level of the second external device in response to a single input reduces the number of inputs needed to adjust the volume of both devices and reduces the need to display additional controls to adjust the volume of both devices. Reducing the number of inputs needed to perform an operation and providing additional control options without cluttering the user interface with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, in response to detecting the input, the electronic device displays a graphical indication (e.g., 1112-4*a*) of the volume level of the first external device and a graphical indication (e.g., 1112-4*b*) of the volume level of the second external device different from the graphical indication of the volume level of the first external device. In some embodiments, the graphical indications of the volume levels of the first and second external devices are visually distinct graphical elements (e.g., separate sliders or bars). Displaying separate graphical indications of the volume level for each device provides feedback to the user that the input adjusts the volume of both devices. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the input includes rotation of a rotatable input device (e.g., 1104) of the electronic device that rotates relative to a housing of the electronic device. In some embodiments, the rotatable input device is rotatable and depressible.

Note that details of the processes described above with respect to method 1200 (e.g., FIG. 12) are also applicable in an analogous manner to the methods described above. For example, method 700, 800, and/or 1000 optionally includes one or more of the characteristics of the various methods described above with reference to method 1200. For example, the operations of method 1200 can be performed before or after the operations of method 700 and/or method 800, and either before or after the operations of method 1000. For brevity, these details are not repeated below.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve the delivery to users of audio media. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, account information and/or user preferences for audio media services (e.g., streaming music services), data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to provide audio media that is of greater interest to the user. Accordingly, use of such personal information data enables users to have calculated control of the provided content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of streaming audio services, the present technology can be configured to allow users to select to "opt in" or "opt out" of participation in the collection of personal information data during registration for services or anytime thereafter. In another example, users can select not to provide user preferences or account information for streaming audio services. In yet another example, users can select to limit the length of time preference data is maintained or entirely prohibit the development of a baseline preference profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, audio content can be selected and delivered to users by inferring preferences based on non-personal information data or a bare minimum amount of personal information, such as the content being requested by the device associated with a user, other non-personal information available to the audio content delivery services, or publicly available information.

What is claimed is:

1. An electronic device, comprising:
a display device;
one or more processors; and
memory storing one or more programs configured to be executed by the one or more processors, the one or more programs including instructions for:
while the electronic device is connected to a first external device via a communication link and while displaying a first user interface, wherein the electronic device is configured to provide audio data to the first external device via the communication link, determining a physical distance between the electronic device and a second external device:

in accordance with a determination that the physical distance between the electronic device and the second external device satisfies a proximity condition, concurrently displaying, via the display device, the first user interface and a second user interface, wherein the second user interface includes a first affordance and a second affordance; and
in accordance with a determination that the physical distance between the electronic device and the second external device does not satisfy the proximity condition, forgoing displaying, via the display device, the second user interface including the first affordance and the second affordance;
while concurrently displaying the first user interface and the second user interface, detecting an input:
in accordance with a determination that the input includes selection of the first affordance, initiating a process to provide audio data concurrently with the first external device and the second external device via a second communication link, wherein the second external device and the electronic device are not associated when the second communication link disconnects; and
in accordance with a determination that the input includes selection of the second affordance, initiating a process to provide audio data with the second external device via a third communication link, wherein the electronic device and the second external device remain associated when the third communication link disconnects.

2. The electronic device of claim 1, wherein displaying the second user interface including the first affordance is performed in accordance with a determination that the first external device is configured to receive audio data from the electronic device while the electronic device is concurrently providing audio data to the second external device.

3. The electronic device of claim 1, wherein displaying the second user interface including the first affordance is performed in accordance with a determination that the electronic device is running an audio media application.

4. The electronic device of claim 1, wherein displaying the second user interface including the first affordance is performed in accordance with a determination that the second external device is not paired with the electronic device.

5. The electronic device of claim 1, wherein selecting the second affordance pairs the second external device with the electronic device.

6. The electronic device of claim 1, wherein the second external device is configured to output audio based on the audio data from the electronic device and is wirelessly connected directly to the electronic device.

7. The electronic device of claim 1, the one or more programs further including instructions for:
after detecting the input corresponding to selection of the first affordance and before providing audio data concurrently with the first external device and the second external device, displaying instructions to provide an input at the second external device.

8. The electronic device of claim 1, the one or more programs further including instructions for:
receiving an indication that the second external device is connected to the electronic device; and
in response to receiving the indication that the second external device is connected to the electronic device, providing an indication that the second external device is connected to the electronic device.

9. The electronic device of claim 1, the one or more programs further including instructions for:
while the second external device is connected to the electronic device, displaying a third affordance that, when selected, disconnects the second external device from the electronic device.

10. The electronic device of claim 9, the one or more programs further including instructions for:
while the second external device is connected to the electronic device, detecting an indication that the physical distance between the electronic device and the second external device satisfies a second proximity condition, wherein displaying the third affordance is performed in response to detecting the indication that the physical distance between the electronic device and the second external device satisfies the second proximity condition.

11. The electronic device of claim 10, wherein displaying the third affordance is performed in accordance with a determination that the second external device is not paired with the electronic device.

12. The electronic device of claim 9, wherein the third affordance is displayed in a menu user interface.

13. A non-transitory computer-readable storage medium storing one or more programs configured to be executed by one or more processors of an electronic device with a display device, the one or more programs including instructions for:
while the electronic device is connected to a first external device via a communication link and while displaying a first user interface, wherein the electronic device is configured to provide audio data to the first external device via the communication link, determining a physical distance between the electronic device and a second external device:
in accordance with a determination that the physical distance between the electronic device and the second external device satisfies a proximity condition, concurrently displaying, via the display device, the first user interface and a second user interface, wherein the second user interface includes a first affordance and a second affordance; and
in accordance with a determination that the physical distance between the electronic device and the second external device does not satisfy the proximity condition, forgoing displaying, via the display device, the second user interface including the first affordance and the second affordance;
while concurrently displaying the first user interface and the second user interface, detecting an input:
in accordance with a determination that the input includes selection of the first affordance, initiating a process to provide audio data concurrently with the first external device and the second external device via a second communication link, wherein the second external device and the electronic device are not associated when the second communication link disconnects; and
in accordance with a determination that the input includes selection of the second affordance, initiating a process to provide audio data with the second external device via a third communication link, wherein the electronic device and the second external device remain associated when the third communication link disconnects.

14. The non-transitory computer-readable storage medium of claim 13, wherein displaying the second user interface including the first affordance is performed in accordance with a determination that the first external device is configured to receive audio data from the electronic device while the electronic device is concurrently providing audio data to the second external device.

15. The non-transitory computer-readable storage medium of claim 13, wherein displaying the second user interface including the first affordance is performed in accordance with a determination that the electronic device is running an audio media application.

16. The non-transitory computer-readable storage medium of claim 13, wherein displaying the second user interface including the first affordance is performed in accordance with a determination that the second external device is not paired with the electronic device.

17. The non-transitory computer-readable storage medium of claim 13, wherein selecting the second affordance pairs the second external device with the electronic device.

18. The non-transitory computer-readable storage medium of claim 13, wherein the second external device is configured to output audio based on the audio data from the electronic device and is wirelessly connected directly to the electronic device.

19. The non-transitory computer-readable storage medium of claim 13, the one or more programs further including instructions for:
after detecting the input corresponding to selection of the first affordance and before providing audio data concurrently with the first external device and the second external device, displaying instructions to provide an input at the second external device.

20. The non-transitory computer-readable storage medium of claim 13, the one or more programs further including instructions for:
receiving an indication that the second external device is connected to the electronic device; and
in response to receiving the indication that the second external device is connected to the electronic device, providing an indication that the second external device is connected to the electronic device.

21. The non-transitory computer-readable storage medium of claim 13, the one or more programs further including instructions for:
while the second external device is connected to the electronic device, displaying a third affordance that, when selected, disconnects the second external device from the electronic device.

22. The non-transitory computer-readable storage medium of claim 21, the one or more programs further including instructions for:
while the second external device is connected to the electronic device, detecting an indication that the physical distance between the electronic device and the second external device satisfies a second proximity condition, wherein displaying the third affordance is performed in response to detecting the indication that the physical distance between the electronic device and the second external device satisfies the second proximity condition.

23. The non-transitory computer-readable storage medium of claim 22, wherein displaying the third affordance is performed in accordance with a determination that the second external device is not paired with the electronic device.

24. The non-transitory computer-readable storage medium of claim 21, wherein the third affordance is displayed in a menu user interface.

25. A method, comprising:
- at an electronic device with a display device:
  - while the electronic device is connected to a first external device via a communication link and while displaying a first user interface, wherein the electronic device is configured to provide audio data to the first external device via the communication link, determining a physical distance between the electronic device and a second external device:
    - in accordance with a determination that the physical distance between the electronic device and the second external device satisfies a proximity condition, concurrently displaying, via the display device, the first user interface and a second user interface, wherein the second user interface includes a first affordance and a second affordance; and
    - in accordance with a determination that the physical distance between the electronic device and the second external device does not satisfy the proximity condition, forgoing displaying, via the display device, the second user interface including the first affordance and the second affordance;
  - while concurrently displaying the first user interface and the second user interface, detecting an input:
    - in accordance with a determination that the input includes selection of the first affordance, initiating a process to provide audio data concurrently with the first external device and the second external device via a second communication link, wherein the second external device and the electronic device are not associated when the second communication link disconnects; and
    - in accordance with a determination that the input includes selection of the second affordance, initiating a process to provide audio data with the second external device via a third communication link, wherein the electronic device and the second external device remain associated when the third communication link disconnects.

26. The method of claim 25, wherein displaying the second user interface including the first affordance is performed in accordance with a determination that the first external device is configured to receive audio data from the electronic device while the electronic device is concurrently providing audio data to the second external device.

27. The method of claim 25, wherein displaying the second user interface including the first affordance is performed in accordance with a determination that the electronic device is running an audio media application.

28. The method of claim 25, wherein displaying the second user interface including the first affordance is performed in accordance with a determination that the second external device is not paired with the electronic device.

29. The method of claim 25, wherein selecting the second affordance pairs the second external device with the electronic device.

30. The method of claim 25, wherein the second external device is configured to output audio based on the audio data from the electronic device and is wirelessly connected directly to the electronic device.

31. The method of claim 25, further comprising:
- after detecting the input corresponding to selection of the first affordance and before providing audio data concurrently with the first external device and the second external device, displaying instructions to provide an input at the second external device.

32. The method of claim 25, further comprising:
- receiving an indication that the second external device is connected to the electronic device; and
- in response to receiving the indication that the second external device is connected to the electronic device, providing an indication that the second external device is connected to the electronic device.

33. The method of claim 25, further comprising:
- while the second external device is connected to the electronic device, displaying a third affordance that, when selected, disconnects the second external device from the electronic device.

34. The method of claim 33, further comprising:
- while the second external device is connected to the electronic device, detecting an indication that the physical distance between the electronic device and the second external device satisfies a second proximity condition, wherein displaying the third affordance is performed in response to detecting the indication that the physical distance between the electronic device and the second external device satisfies the second proximity condition.

35. The method of claim 34, wherein displaying the third affordance is performed in accordance with a determination that the second external device is not paired with the electronic device.

36. The method of claim 33, wherein the third affordance is displayed in a menu user interface.

* * * * *